(12) United States Patent
Taira et al.

(10) Patent No.: US 7,574,119 B2
(45) Date of Patent: Aug. 11, 2009

(54) INFORMATION PLAYBACK APPARATUS AND INFORMATION PLAYBACK METHOD

(75) Inventors: Kazuhiko Taira, Yokohama (JP); Hideo Ando, Yokohama (JP); Yoichiro Yamagata, Yokohama (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 707 days.

(21) Appl. No.: 11/187,985

(22) Filed: Jul. 25, 2005

(65) Prior Publication Data

US 2006/0024031 A1  Feb. 2, 2006

(30) Foreign Application Priority Data

Jul. 27, 2004  (JP) .............................. 2004-219019

(51) Int. Cl.
H04N 5/91 (2006.01)
(52) U.S. Cl. ............................ 386/131; 386/46; 386/95
(58) Field of Classification Search .................. 386/45, 386/46, 95, 96, 108, 120, 123–126, 131; 725/89, 134, 142
See application file for complete search history.

(56) References Cited

U.S. PATENT DOCUMENTS 5,636,200 A   6/1997  Taira et al.
7,423,672 B2 * 9/2008  Taga et al. ............... 348/222.1
2004/0033062 A1  2/2004  Taira et al.
2004/0135597 A1  7/2004  Seike
2004/0163116 A1 * 8/2004  Taira et al. ..................... 725/89
2005/0123280 A1  6/2005  Taira et al.

FOREIGN PATENT DOCUMENTS

| JP | 2677775 | 7/1997 |
| JP | 2000-75985 | 3/2000 |
| JP | 2001-320673 | 11/2001 |
| JP | 2002-209177 | 7/2002 |
| JP | 2004-194131 | 7/2004 |

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

There are provided a first image information output unit which overlaps first sub-picture information having high resolution HD onto main image information having high resolution HD to be outputted in accordance with a required image output format, and a second image information output unit which overlaps second sub-picture information having low resolution SD onto information into which the main image information having high resolution HD has been converted to have the low resolution SD to be outputted in accordance with a required image output format.

4 Claims, 103 Drawing Sheets

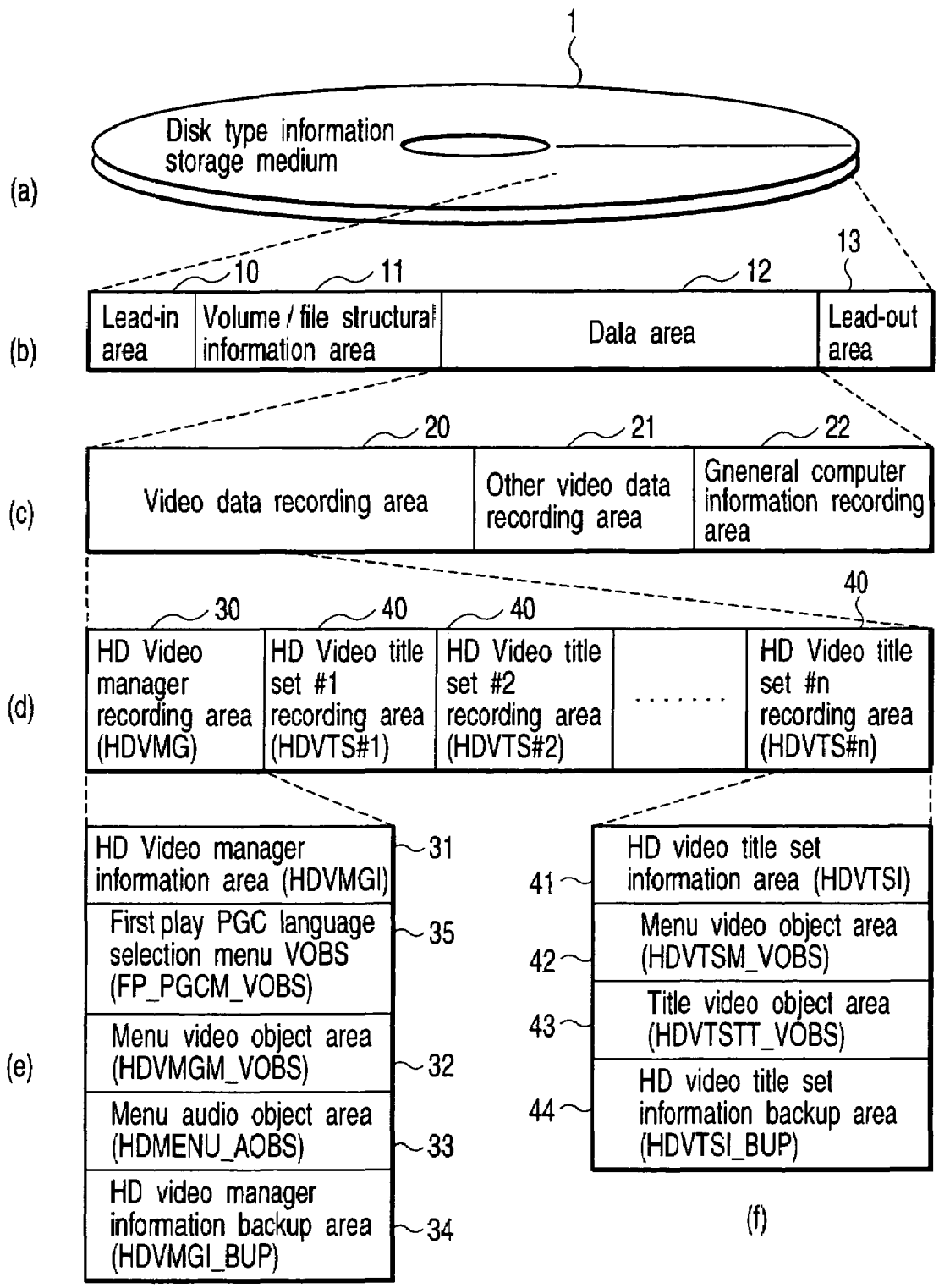
F I G. 1

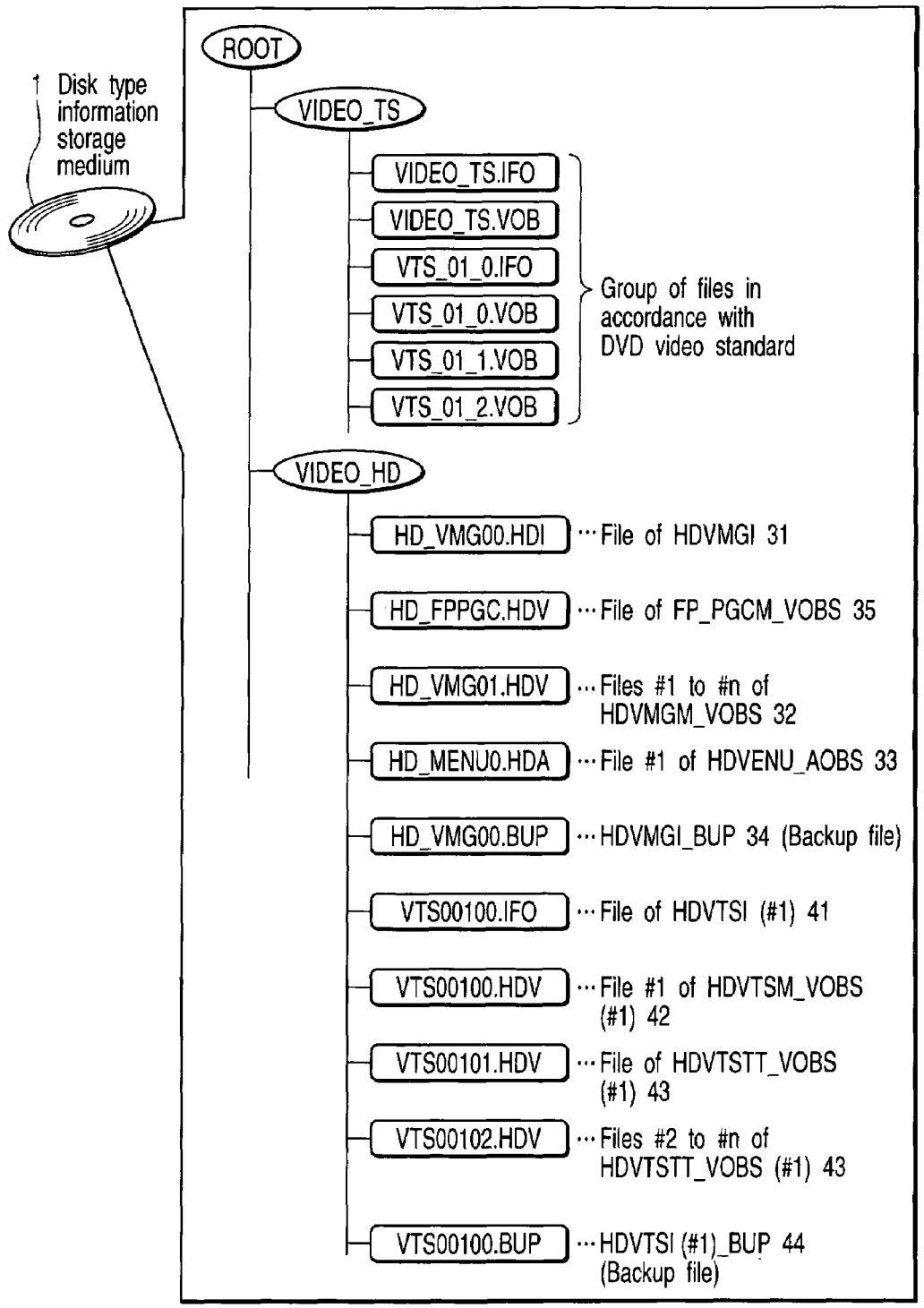
F I G. 2

HD video manager information management table (HDVMGI_MAT) 310

| HDVMGI_MAT | |
|---|---|
| HDVMG_ID | HD video manager identifier |
| HDVMG_EA | HD video manager end address |
| HDVMGI_EA | HD video manager information end address |
| VERN | HD-DVD video standard version number |
| HDVMG_CAT | HD video manager category |
| VLMS_ID | Volume set identifier |
| ADP_ID | Adaptation identifier |
| HDVTS_Ns | The number of HD video title sets |
| PVR_ID | Provider characteristic identifier |
| POS_CD | POS code |
| HDVMGI_MAT_EA | HD video manager management information table end address |
| FP_PGCI_SA | First play program chain information start address |
| HDVMGM_VOBS_SA | HDVMGM_VOBS start address |
| HDMENU_AOBS_SA | HDMENU_AOBS start address |
| TT_SRPT_SA | TT_SRPT start address |
| HDVMGM_PGCI_UT_SA | HDVMGM_PGCI_UT start address |
| PTL_MAIT_SA | PTL_MAIT start address |
| HDVTS_ATRT_SA | HDVTS_ATRT start address |
| TXTDT_MG_SA | TXTDT_MG start address |
| HDVMGM_C_ADT_SA | HDVMGM_C_ADT start address |
| HDVMGM_VOBU_ADMAP_SA | HDVMGM_VOBU_ADMAP start address |
| HDMENU_AOBSIT_SA | HDVMGM_AOBS information table start address |
| HDVMGM_V_ATR | HDVMGM video attribute |
| HDVMGM_AST_Ns | The number of HDVMGM audio streams |
| HDVMGM_AST_ATR | HDVMGM audio stream attribute |
| HDVMGM_SPST_Ns | The number of HDVMGM sub-picture streams |
| HDVMGM_SPST_ATR | HDVMGM sub-picture stream attribute |
| HDVMGM_GUST_Ns | The number of HDVMGM graphic unit streams |
| HDVMGM_GUST_ATR | HDVMGM graphic unit stream attribute |
| FP_PGCI | First play PGCI |

F I G. 4

HDVMGM_PGC_CAT

| Bit<br>Byte | b7 | b6 | b5 | b4 | b3 | b2 | b1 | b0 |
|---|---|---|---|---|---|---|---|---|
| 0 | Entry type | Reserved | Voice information selection | Menu | | | | |
| 1 | Block mode | | | Block type | | | | |
| 2 | PTL_ID_FLD (Higher bit) | | | | | | | |
| 3 | PTL_ID_FLD (Lower bit) | | | | | | | |
| | | | | | | Voice informatio number | | |

Voice information selection
Denoting selection of playback of audio of HDMENU_AOBS or playback of audio of HDVMGM_VOBS, and start/end triggers of HDMENU_AOBS.
  ...00b : Audio in VOB designated in PGC is played back (HDVMGM_VOBS is stopped)
  ...10b : HDVMGM_VOBS is continuously played back (Audio in VOB is ignored)
  ...11b : HDVMGM_VOBS is started to be played back (Audio in VOB is ignored)

Voice information number
Designating AOB number #n to be played back in HDMENU_AOBS.

F I G. 8

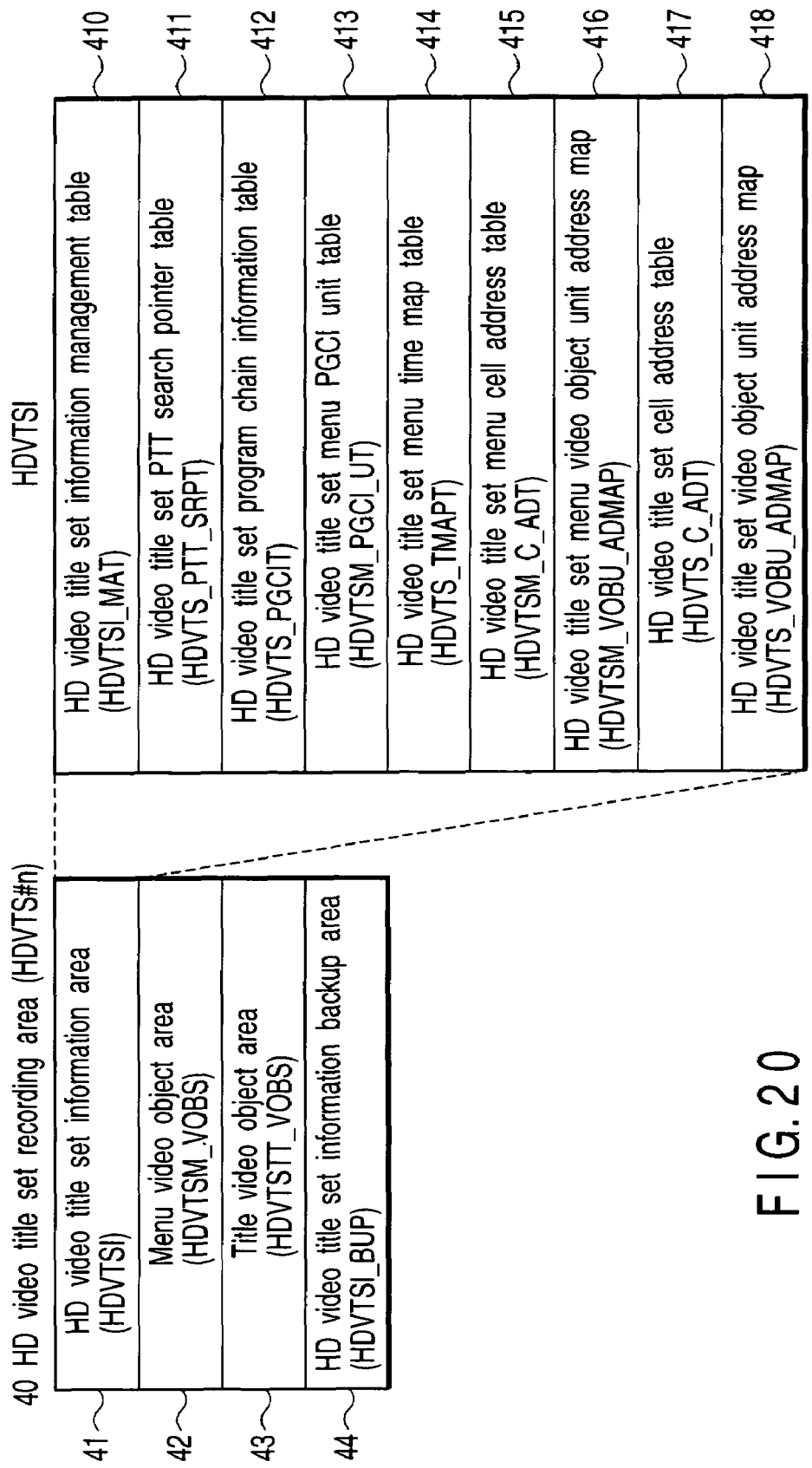
F I G. 20

| HDVTSI_MAT | |
|---|---|
| HDVTS_ID | HD video title set identifier |
| HDVTS_EA | HDVTS end address |
| HDVTSI_EA | HDVTSI end address |
| VERN | Version number of HD-DVD video standard |
| HDVTS_CAT | HDVTS category |
| HDVTSI_MAT_EA | HDVTSI_MAT end address |
| HDVTSM_VOBS_SA | HDVTSM_VOBS start address |
| HDVTSTT_VOBS_SA | HDVTSTT_VOBS start address |
| HDVTS_PTT_SRPT_SA | HDVTS_PTT_SRPT start address |
| HDVTS_PGCIT_SA | HDVTS_PGCIT start address |
| HDVTSM_PGCI_UT_SA | HDVTSM_PGCI_UT start address |
| HDVTS_TMAP_SA | HDVTS_TMAP start address |
| HDVTSM_C_ADT_SA | HDVTSM_C_ADT start address |
| HDVTSM_VOBU_ADMAP_SA | HDVTSM_VOBU_ADMAP start address |
| HDVTS_C_ADT_SA | HDVTS_C_ADT start address |
| HDVTS_VOBU_ADMAP_SA | HDVTS_VOBU_ADMAP start address |
| HDVTSM_V_ATR | HDVTSM video attribute |
| HDVTSM_AST_Ns | The number of HDVTSM audio streams |
| HDVTSM_AST_ATR | HDVTSM audio stream attribute |
| HDVTSM_SPST_Ns | Start address of the number of HDVTSM sub-picture streams |
| HDVTSM_SPST_ATR | HDVTSM sub-picture stream attribute |
| HDVTS_V_ATR | HDVTS video attribute |
| HDVTS_AST_Ns | The number of HDVTS audio streams |
| HDVTS_AST_ATRT | HDVTS audio stream attribute table |
| HDVTS_SPST_Ns | The number of HDVTS sub-picture streams |
| HDVTS_SPST_ATRT | HDVTS sub-picture stream attribute table |
| HDVTS_MU_AST_ATRT | HDVTS multi-channel audio stream attribute table |
| HDVTSM_GUST_Ns | The number of HDVTSM graphic unit streams |
| HDVTSM_GUST_ATR | HDVTSM graphic unit stream attribute |
| HDVTS_GUST_Ns | The number of HDVTS graphic unit streams |
| HDVTS_GUST_ATRT | HDVTS graphic unit stream attribute table |

410 HD video title set information management table (HDVTSI_MAT)

F I G. 21

HDVTS_PGC_CAT

| Bit\Byte | b7 | b6 | b5 | b4 | b3 | b2 | b1 | b0 |
|---|---|---|---|---|---|---|---|---|
| 0 | Entry type | | | | VTS_TTN | | | |
| 1 | Block mode | | Block type | | Reserved | | | RSM permission |
| 2 | PTL_ID_FLD (Higher bit) | | | | | | | |
| 3 | PTL_ID_FLD (Lower bit) | | | | | | | |

RSM permission
Denoting whether or not playback resume by RSM command or Resume ( ) function is permitted in PGC.
...0b: Permission (RSM information is updated)
...1b: Prohibition (RSM information is not updated)

F I G. 24

HDVTSM_PGC_CAT

| Bit / Byte | b7 | b6 | b5 | b4 | b3 | b2 | b1 | b0 |
|---|---|---|---|---|---|---|---|---|
| 0 | Entry type | Reserved | Voice information selection | | | Menu ID | | |
| 1 | Block mode | | Block type | | | | | |
| 2 | | | | | | Voice information number | | |
| 3 | PTL_ID_FLD (Higher bitt) | | | | | | | |
|   | PTL_ID_FLD (Lower bit) | | | | | | | |

Voice information selection
Denoting selection of playback of audio of HDMENU_AOBS or playback of audio of HDVTSM_VOBS, and start/end triggers of HDMENU_AOBS.
...00b: Audio in VOB designated in PGC is played back (HDMENU_AOBS is stopped)
...10b: HDMENU_AOBS is continuously played back (Audio in VOB is ignored)
...11b: HDMENU_AOBS is started to be played back (Audio in VOB is ignored)

Voice information number
Designating AOB number #n to be played back in HDMENU_AOBS.

F I G. 27

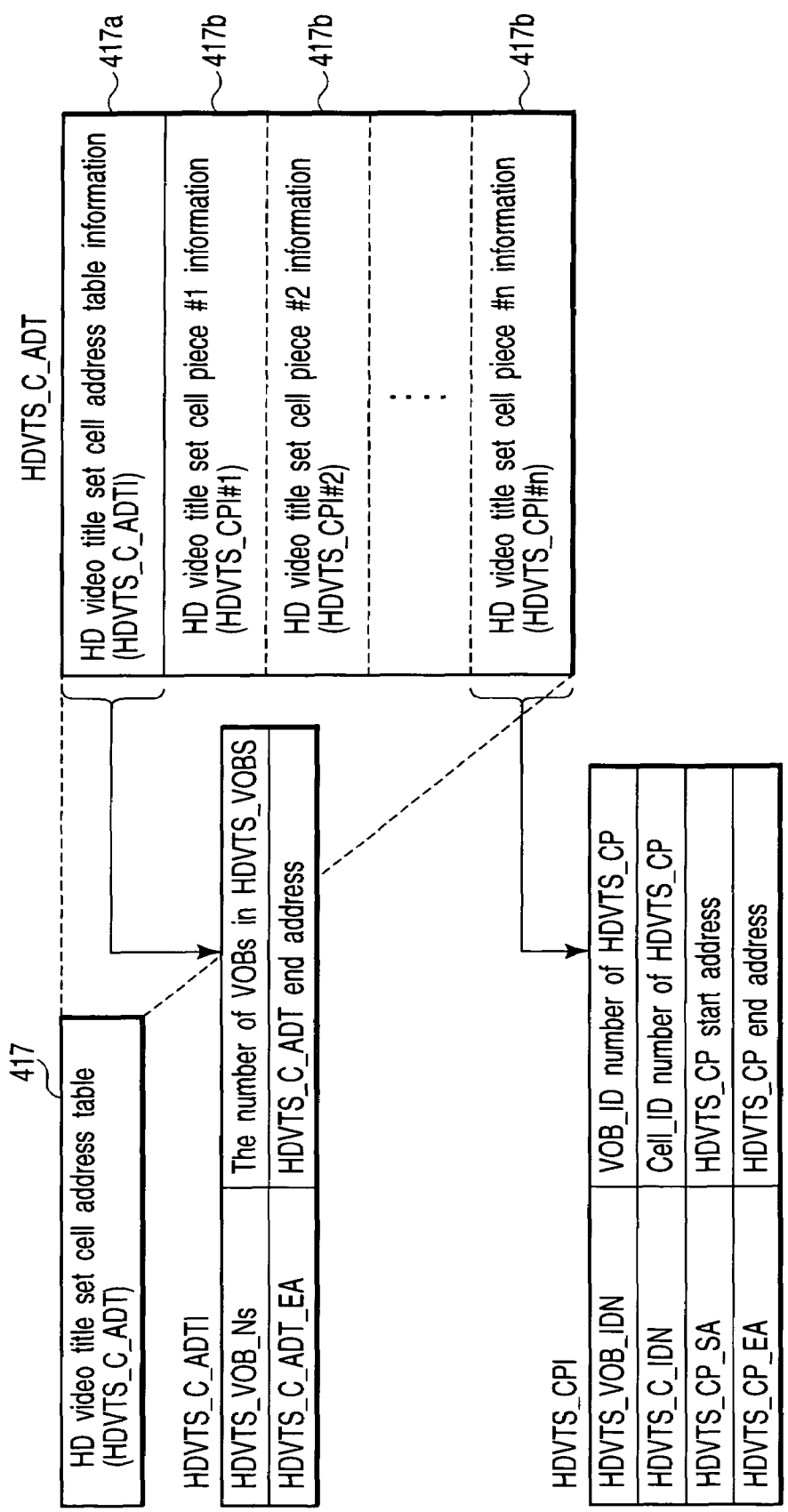
F I G. 31

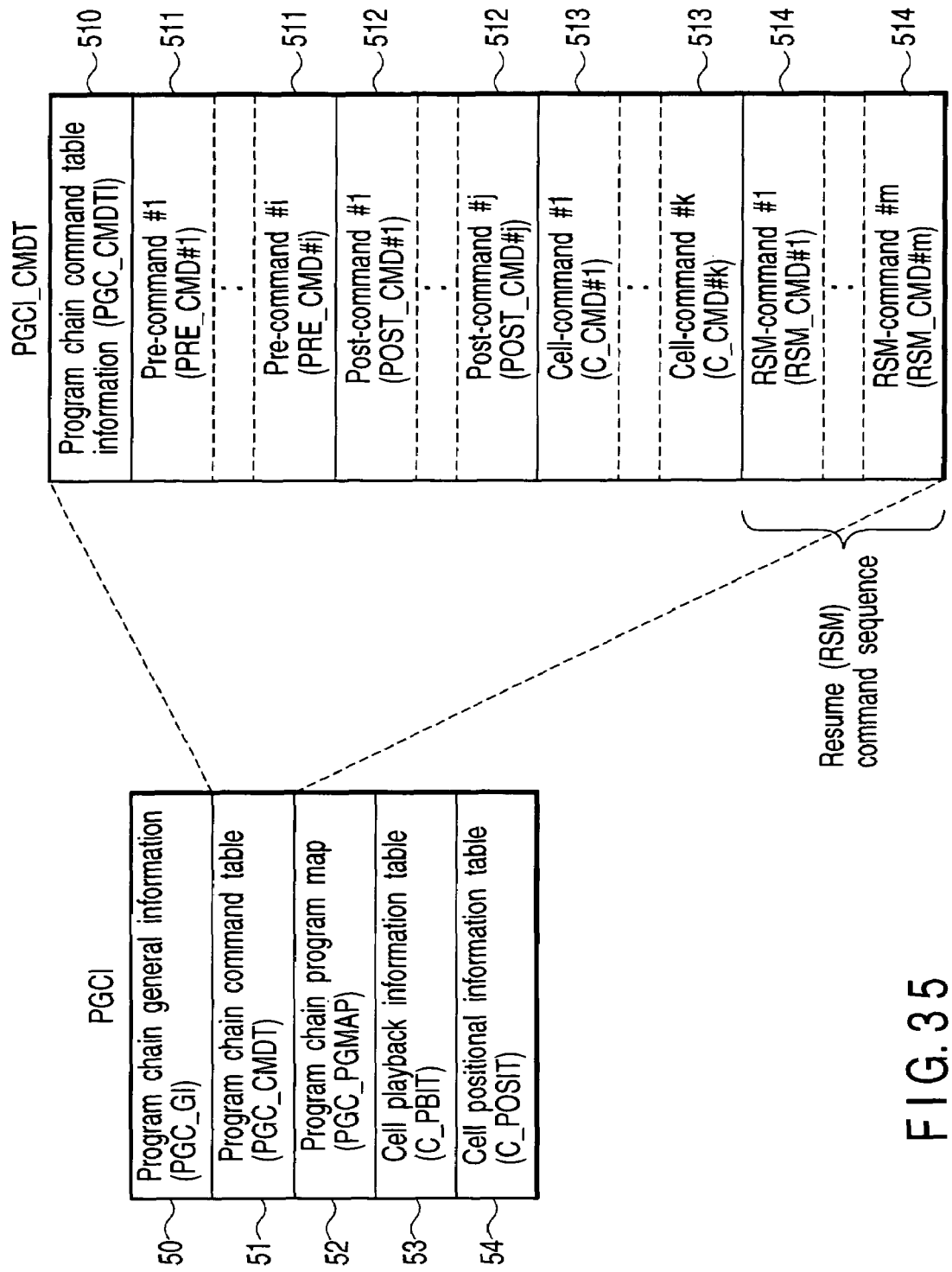
F I G. 35

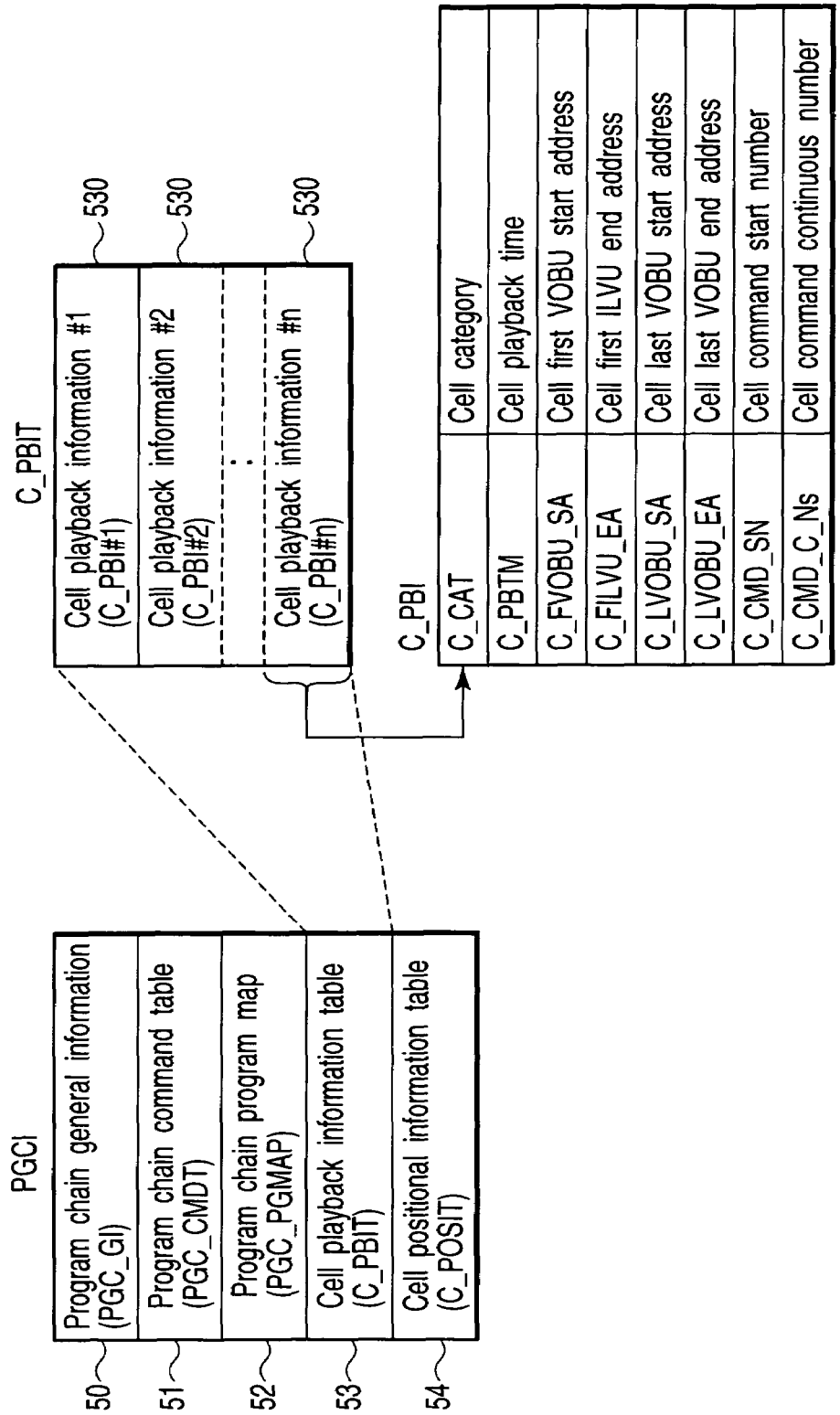
F I G. 38

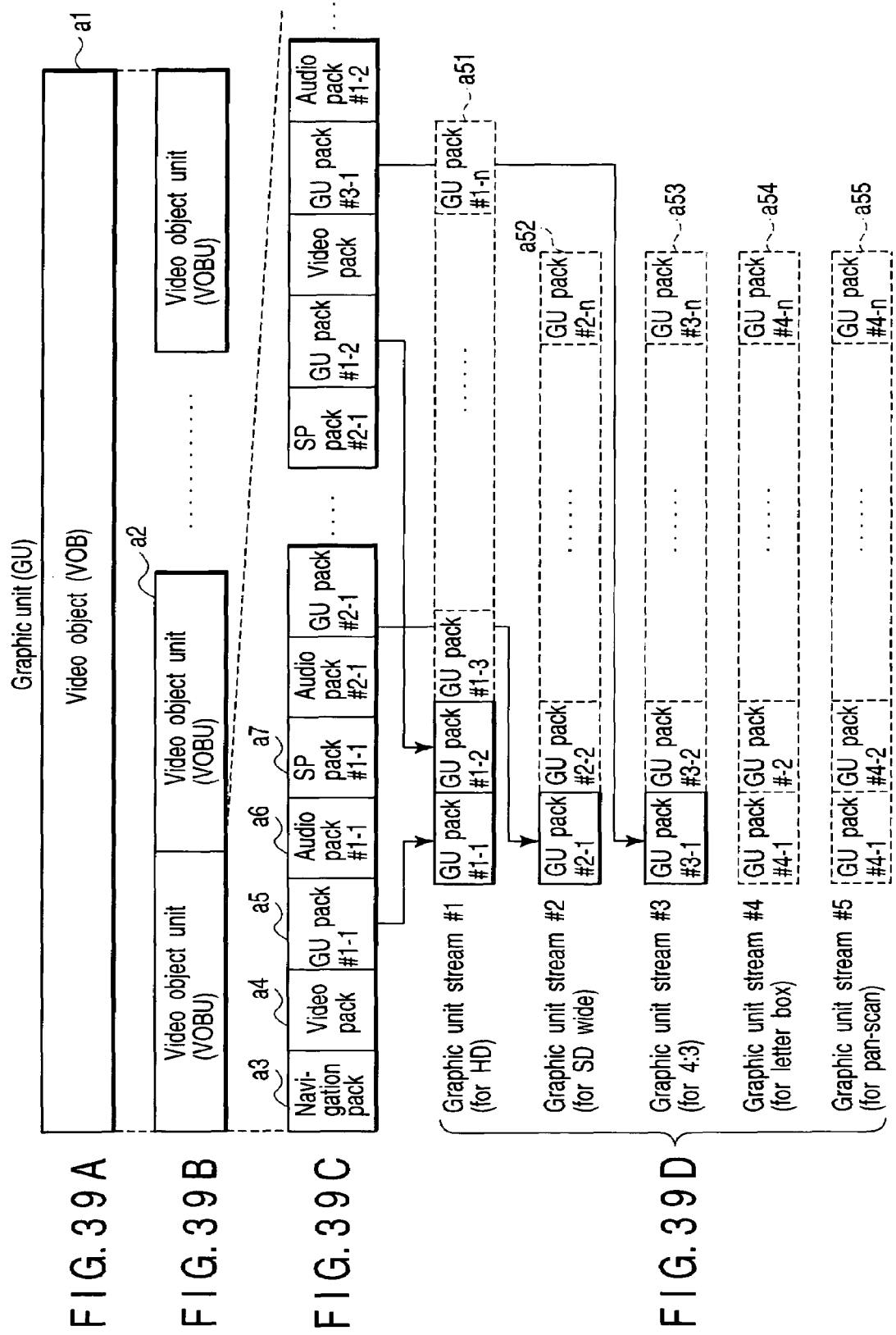

Sub-stream ID of graphic unit stream

Private stream 1:1011 1101b

| Sub stream ID 0101 0xxxb | Graphic stream number | Contents |
|---|---|---|
| 0101 0001b | 1 | HD graphic unit |
| 0101 0010b | 2 | SD wide graphic unit stream |
| 0101 0011b | 3 | 4:3 graphic unit stream |
| 0101 0100b | 4 | Letter box graphic unit stream |
| 0101 0101b | 5 | Pan-scan graphic unit stream |

F I G. 4 0

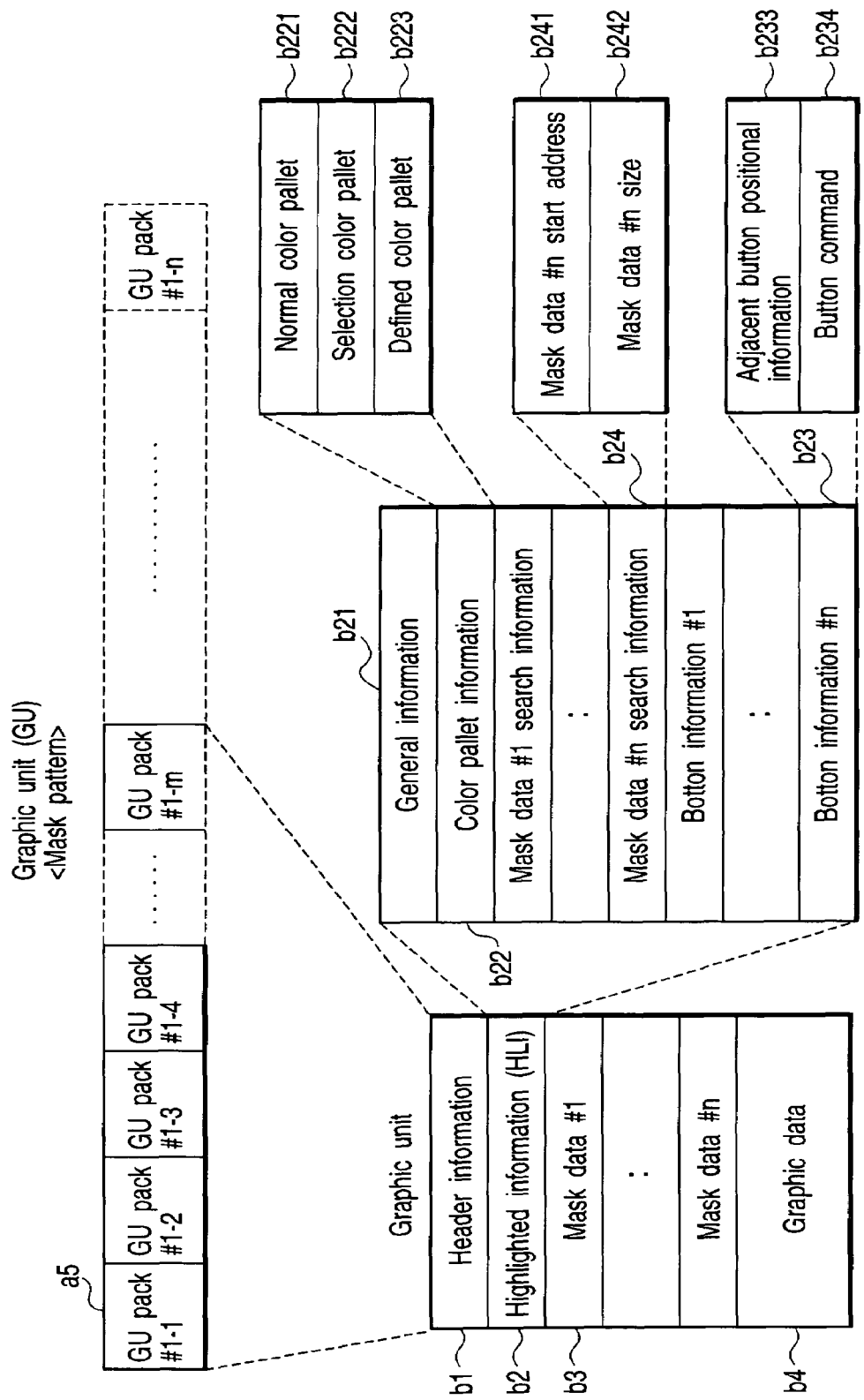
F I G. 42

FIG. 43

(a) Information in graphic unit

Header information  b1

| GU_SZ | Graphic unit size |
|---|---|
| GU_ATRI | Graphic unit attribute information |
| HLI_SA | Highlighted information (HLI) start address |
| GD_SA | Graphic data start address |

(b) General information  b21

| GU_PB_S_PTM | Graphic unit playback start time |
|---|---|
| GU_PB_E_PTM | Graphic unit playback end time |
| BTN_OFN | Button offset number |
| BTN_Ns | The number of buttons |
| NSL_BTN_Ns | The number of numerical selection buttons |
| FOSL_BTNN | Forced selection button number |
| FOAC_BTNN | Forced decision button number |

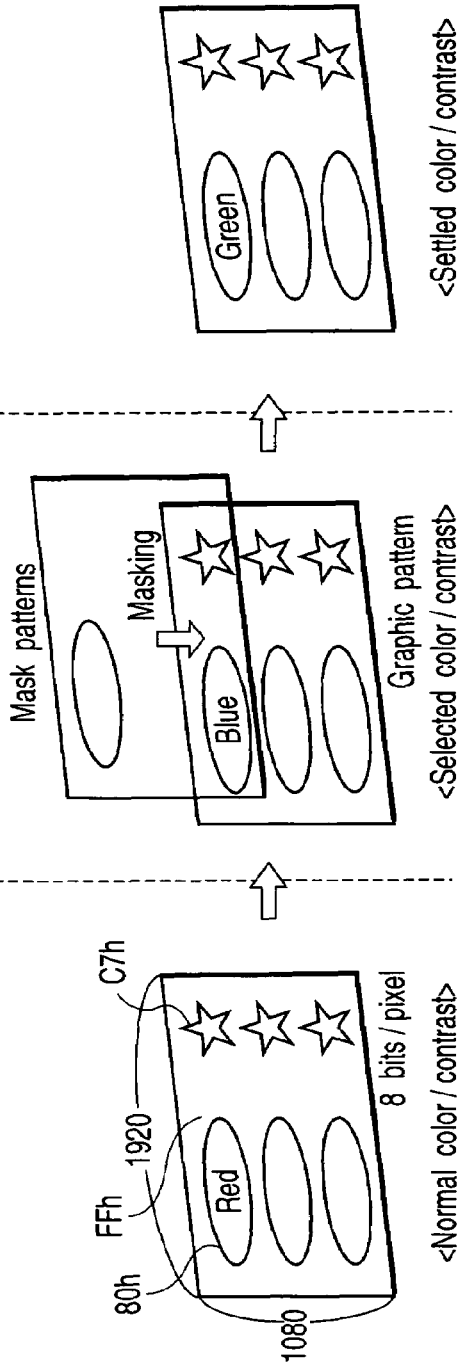
F I G. 46

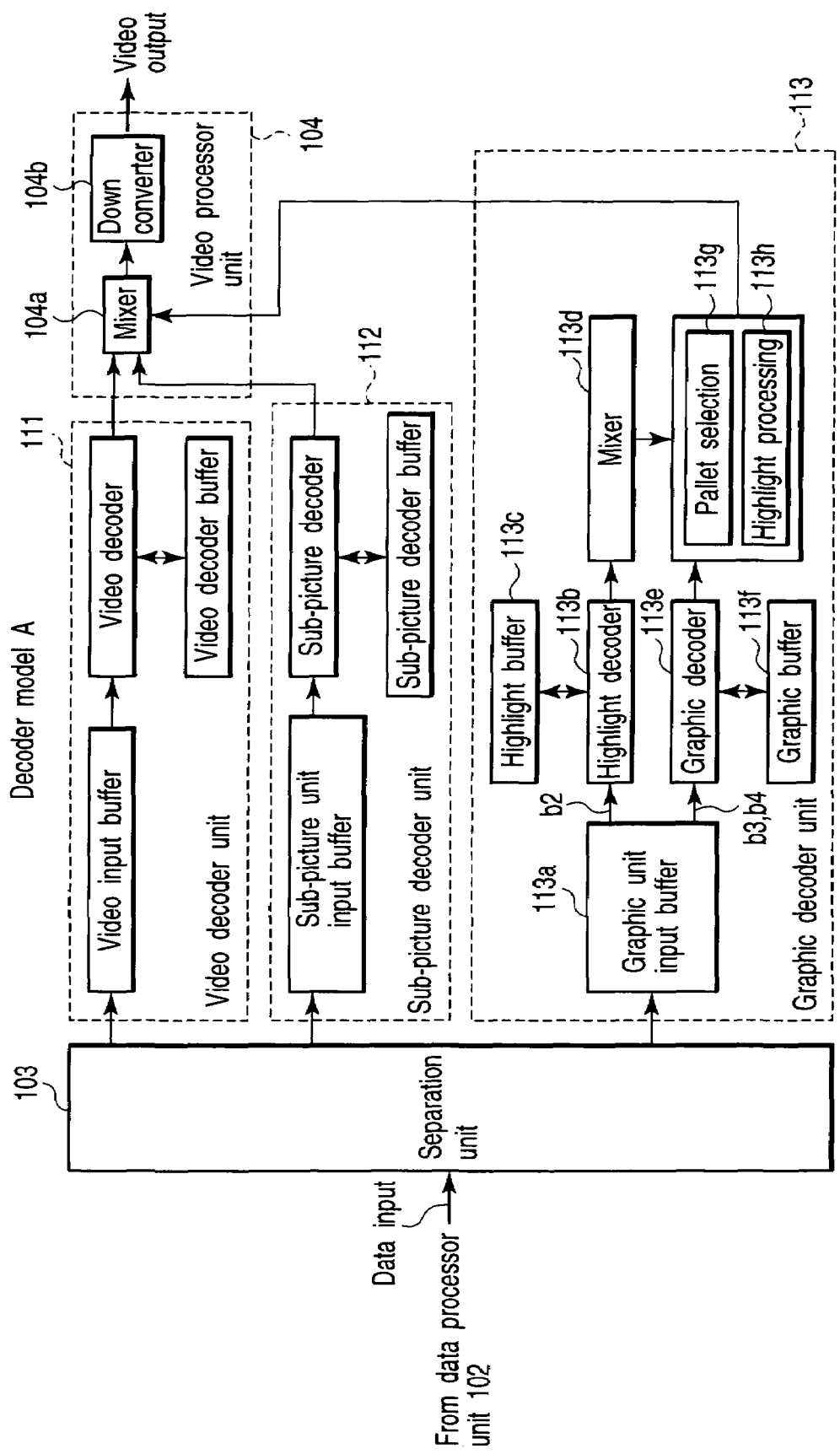
F I G. 49

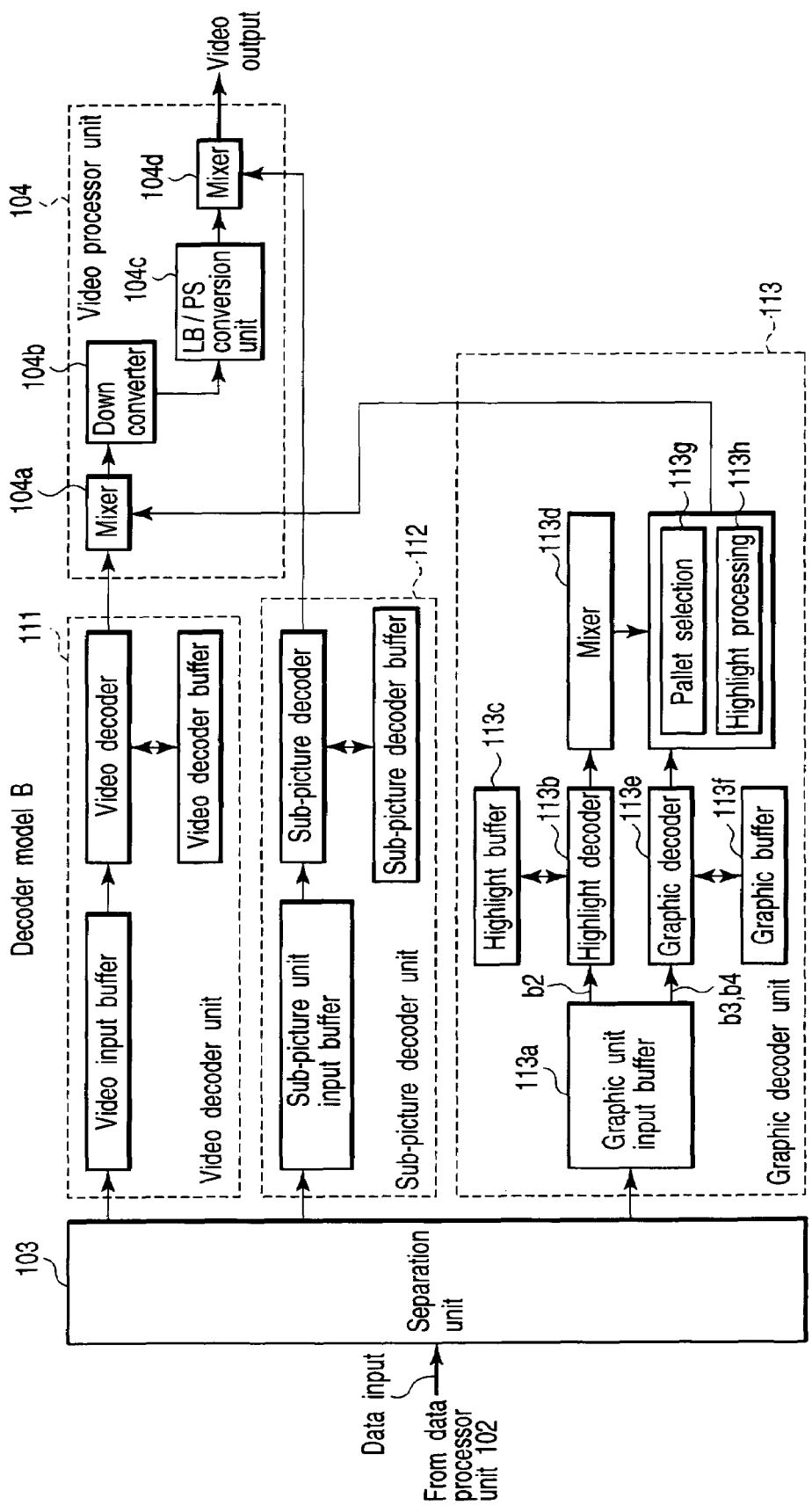
F I G. 50

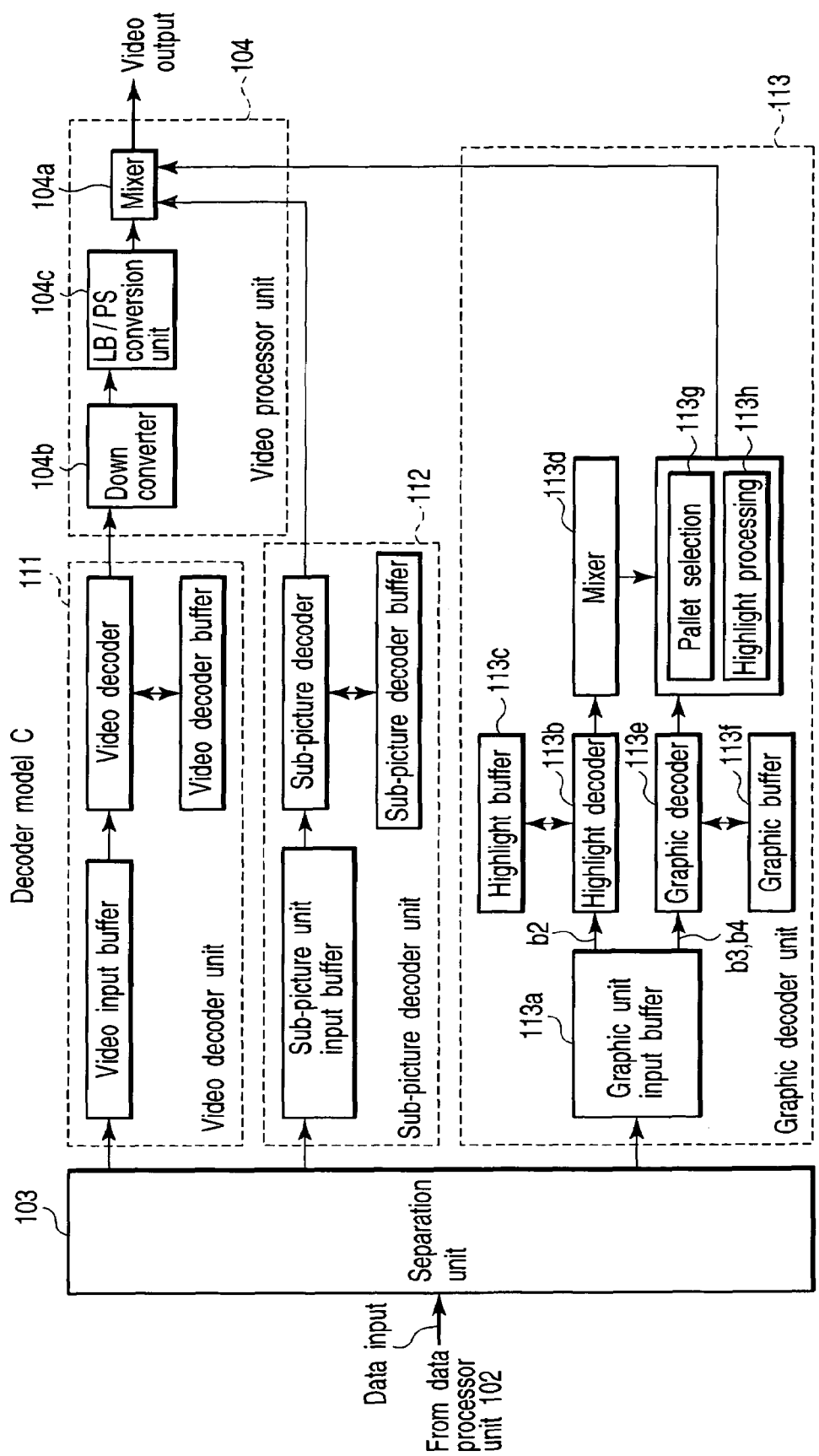
F I G. 51

Structure of HDMENU_AOB header information

HDMENU_AOB_HI

| AOB_EA | HDMENU_AOB end address |
|---|---|
| AOB_EP_Ns | The number of HDMENU_AOB entry points |
| AOB_ATR | HDMENU_AOB attribute |
| AOB_1ST_EP | HDMENU_AOB first entry point start address |
| AOB_2ND_EP | HDMENU_AOB second entry point start address |
| AOB_3RD_EP | HDMENU_AOB third entry point start address |
| AOB_4TH_EP | HDMENU_AOB fourth entry point start address |
| AOB_5TH_EP | HDMENU_AOB fifth entry point start address |

F I G. 57

Other information of FIG. 8

HDVMGM_PGC_CAT

| Bit / Byte | b7 | b6 | b5 | b4 | b3 | b2 | b1 | b0 |
|---|---|---|---|---|---|---|---|---|
| 0 | Entry type | Reserved | Block mode | Block type | Reserved |
| 1 | Menu ID |
| 2 | PTL_ID_FLD (Higher bit) |
| 3 | PTL_ID_FLD (Lower bit) |
| 4 | Voice information selection | Start entry number | End entry number |

Voice information selection
Denoting selection of playback of audio of HDMENU_AOB or playback of audio of HDVMGM_VOBS, and start/end triggers of HDMENU_AOB.
...00b: Audio in VOB designated in PGC is played back (HDMENU_AOB is stopped)
...10b: HDVMGM_VOB is continuously played back (Audio in VOB is ignored)
...11b: HDVMGM_VOB is started to be played back (Audio in VOB is ignored)
Start entry number
Entry number for starting playback in HDMENU_AOB is designated.
End entry number
Entry number for ending playback in HDMENU_AOB is designated.
When value is 000b, HDMENU_AOB end address is shown.

F I G. 5 8

Other information of FIG. 24

HDVMGM_PGC_CAT

| Bit / Byte | b7 | b6 | b5 | b4 | b3 | b2 | b1 | b0 |
|---|---|---|---|---|---|---|---|---|
| 0 | Entry type | RSM permission | Block mode | Block type | VTS_TTN (Higher bit) |
| 1 | VTS_TTN |||||||||
| 2 | PTL_ID_FLD (Higher bit) |||||||||
| 3 | PTL_ID_FLD (Lower bit) |||||||||
| 4 | Voice information selection | Start entry number ||| End entry number ||||

RSM_permission
Denoting whether or not playback resume by RSM command or Resume ( ) function is permitted in PGC.
...0b: Permission (RSM information is updated)
...1b: Prohibition (RSM information is not updated)

Voice information selection
Denoting selection of playback of audio of HDMENU_AOB or playback of audio of HDVMGM_VOBS, and start /end triggers of HDMENU_AOB.
...00b: Audio in VOB designated in PGC is played back (HDMENU_AOB is stopped)
...10b: HDVMGM_VOB is continuously played back (Audio in VOB is ignored)
...11b: HDVMGM_VOB is started to be played back (Audio in VOB is ignored)

Start entry number
Entry number for starting playback in HDMENU_AOB is designated.

End entry number
Entry number for ending playback in HDMENU_AOB is designated.
When value is 000b, HDMENU_AOB end address is shown.

FIG. 59

Other information of FIG. 27

HDVTSM_PGC_CAT

| Byte \ Bit | b7 | b6 | b5 | b4 | b3 | b2 | b1 | b0 |
|---|---|---|---|---|---|---|---|---|
| 0 | Entry type | Reserved | Block mode | Block type | Reserved |
| 1 | Menu ID |
| 2 | PTL_ID_FLD (Higher bit) |
| 3 | PTL_ID_FLD (Lower bit) |
| 4 | Voice information selection | Start entry number | End entry number |

Voice information selection
Denoting selection of playback of audio of HDMENU_AOB or playback of audio of HDVMGM_VOBS,
and start / end triggers of HDMENU_AOB.
...00b: Audio in VOB designated in PGC is played back (HDMENU_AOB is stopped)
...10b: HDVMGM_VOB is continuously played back (Audio in VOB is ignored)
...11b: HDVMGM_VOB is started to be played back (Audio in VOB is ignored)
Start entry number
Entry number for starting playback in HDMENU_AOB is designated.
End entry number
Entry number for ending playback in HDMENU_AOB is designated.
When value is 000b, HDMENU_AOB end address is shown.

FIG. 60

| SPRM | Meaning |
|---|---|
| 0 | Current menu language code (CM_LCD) |
| 1 | TT_DOM audio stream number (ASTN) |
| 2 | TT_DOM sub-picture stream number, ON / OFF flag (SPSTN) |
| 3 | TT_DOM angle number (AGLN) |
| 4 | TT_DOM title number (TTN) |
| 5 | TT_DOM video title number (VTS_TTN) |
| 6 | TT_DOM title PGC number (TT_PGC) |
| 7 | 1 sequential PGC title-oriented title number part (PTTN) |
| 8 | Selection state highlight button number (HL_BTTN) |
| 9 | Navigation timer (NV_TMR) |
| 10 | TT_PGCN for NV_TMR |
| 11 | Karaoke player audio mixing mode (P_AMXMD) |
| 12 | Parental management country code (CTY_CD) |
| 13 | Parental level (PTL_LVL) |
| 14 | Video player configuration (P_CFG) |
| 15 | Audio player configuration (P_CFG) |
| 16 | AST initial language code (INI_LCD) |
| 17 | AST initial language code extension (INI_LCD_EXT) |
| 18 | INI-LCD for SPST |
| 19 | INI-LCD_EXT for SPST |
| 20 | Player region code |
| 21 | Initial menu descriptor code (INI_M_LCD) |
| 22 | Reserved |
| 23 | Reserved (for extension player mode) |
| 24 | Reserved |
| 25 | Reserved |
| 26 | Menu space audio stream number (ASTN) |
| 27 | Menu space sub-picture stream number, ON / OFF flag (SPSTN) |
| 28 | Menu space angel number (AGLN) |
| 29 | FP_DOM audio stream number (ASTN) |
| 30 | FP_DOM sub-picture stream number, ON / OFF flag (SPSTN) |
| 31 | Reserved |

FIG. 62

SetGPRMMD : C#1_FVOBU_SA to GPRM (1)

| Data position in command (byte) | B5 | B4 | B3 | B2 |
|---|---|---|---|---|
| Data example | C#1_FVOBU_SA | | 00h | 01h |

F I G. 6 3

Concrete examples of command information under specific operating conditions (a) Compare SetSystem Command : If GPRM(0)=GPRM(n) then SetGPRMMD GPRM(1) to C#n_FVOBU_SA

| Data structure | Operation Code | SetSystem Instruction Operand | CP1 | CP2 |
|---|---|---|---|---|
| Setting byte | B7 & B6 | B5~B2 | B1 | B0 |
| Setting numerical example | 4320h (Equal) | SetGPRMMD Instruction [SetGPRMMD:GPRM (1) to C#n_FVOBU_SA] | 0(GPRM) | n(GPRM) |

(b) Compare Set Command : If GPRM(4)≧300 then SetAdd 100 to GPRM(4)

| Data structure | Operation Code | CP1 | Reserved | SDG | SS | C2 |
|---|---|---|---|---|---|---|
| Setting byte | B7 & B6 | B5 | B4 | | B3 & B2 | B1 & B0 |
| Setting numerical example | 6340h | 4(GPRM) | 00h | 4(GPRM) | 100(value) | 300(value) |

(c) SetAdd Command : Add 50 to GPRM(4)

| Data structure | Operation Code | Reserved | SDG | SS | Reserved |
|---|---|---|---|---|---|
| Setting byte | B7 & B6 | B5 | B4 | B3 & B2 | B1 & B0 |
| Setting numerical example | 6100h | 000h | 4(GPRM) | 100(value) | 0000h |

(d) SetMove Command : lAssign 100 to GPRM(4)

| Data structure | Operation Code | Reserved | SDG | SS | Reserved |
|---|---|---|---|---|---|
| Setting byte | B7 & B6 | B5 | B4 | B3 & B2 | B1 & B0 |
| Setting numerical example | 6300h | 000h | 4(GPRM) | 50(value) | 0000h |

(e) Nop Command

| Data structure | Operation Code | Reserved | Go To Instruction Operand |
|---|---|---|---|
| Setting byte | B7 & B6 | B5~B2 | B1 & B0 |
| Setting numerical example | 0000h | 00000000h | 0000h |

(f) CallSS Command

| Data structure | Operation Code | Jump Instruction Operand | Reserved |
|---|---|---|---|
| Setting byte | B7 & B6 | B5~B2 | B1 & B0 |
| Setting numerical example | 3008h | CallSS Instruction | 0000h |

(g) Resume

| Data structure | Operation Code | Reserved | Link Instruction Operand |
|---|---|---|---|
| Setting byte | B7 & B6 | B5~B2 | B1 & B0 |
| Setting numerical example | 2008h | 00000000h | 0000h |

(h) SetM_LCD Command : Assign Menu Description Language Code to SPRM(0)

| Data structure | Operation Code | SetSystem Instruction Operand | | Reserved |
|---|---|---|---|---|
| Setting byte | B7 & B6 | B5 & B4 | B3 & B2 | B1 & B0 |
| Setting numerical example | 5800h | 0000h(Reserved) | Menu description language code | 0000h |

FIG. 64

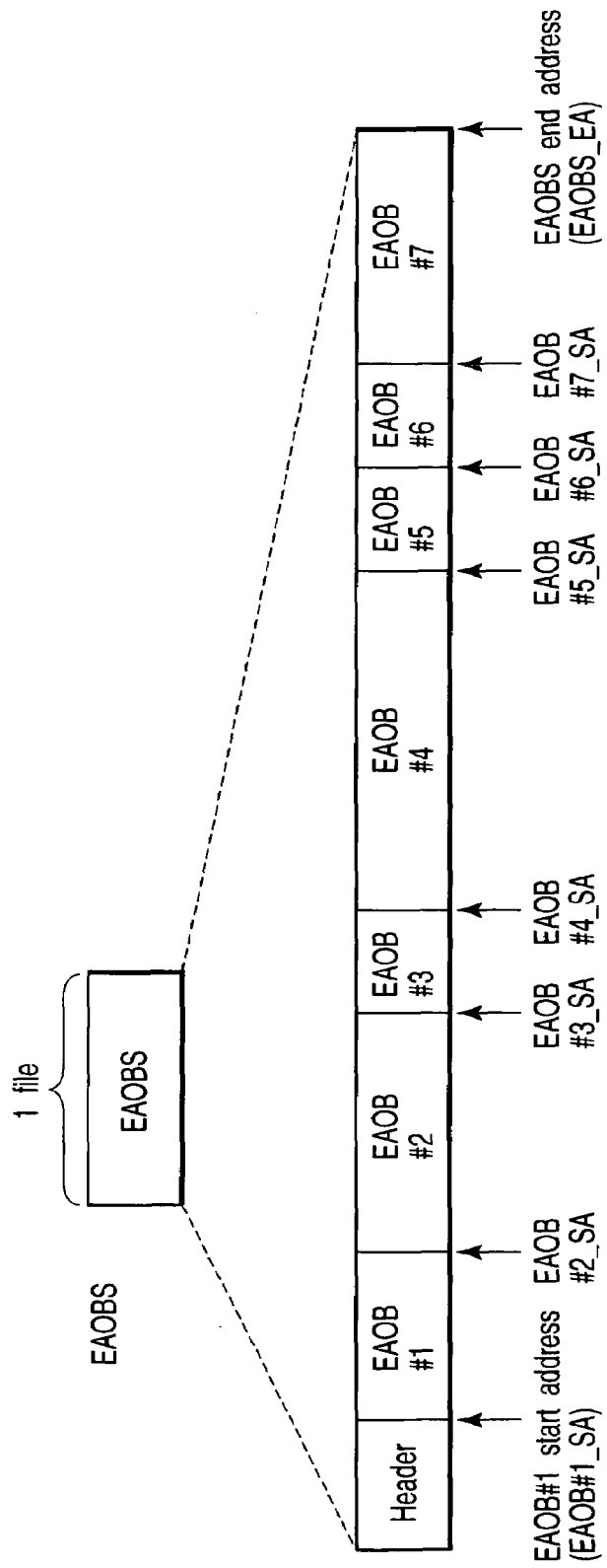
F I G. 6 8

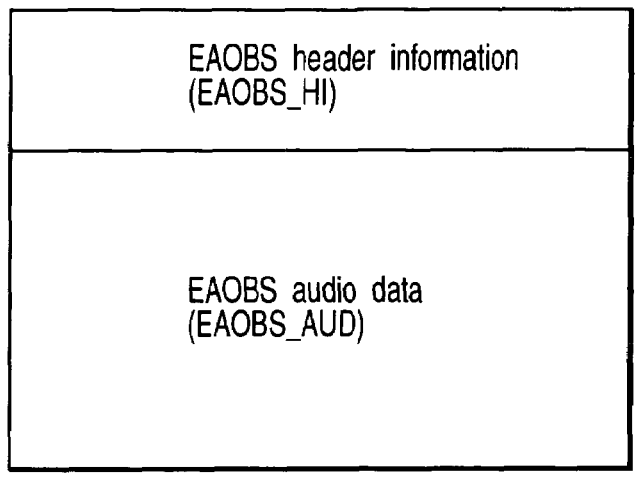

FIG. 70

Header information

| EAOB_Ns | The number of EAOBS |
|---|---|
| EAOB_EA | EAOBS end address |
| EAOB_ATR | EAOBS attribute |
| 1ST_EAOB_SA | First EAOB start address |
| 2ND_EAOB_SA | Second EAOB start address |
| 3RD_EAOB_SA | Third EAOB start address |
| 4TH_EAOB_SA | Fourth EAOB start address |
| 5TH_EAOB_SA | Fifth EAOB start address |
| 6TH_EAOB_SA | Sixth EAOB start address |
| 7TH_EAOB_SA | Seventh EAOB start address |
| reserved | Reserved |

FIG. 71

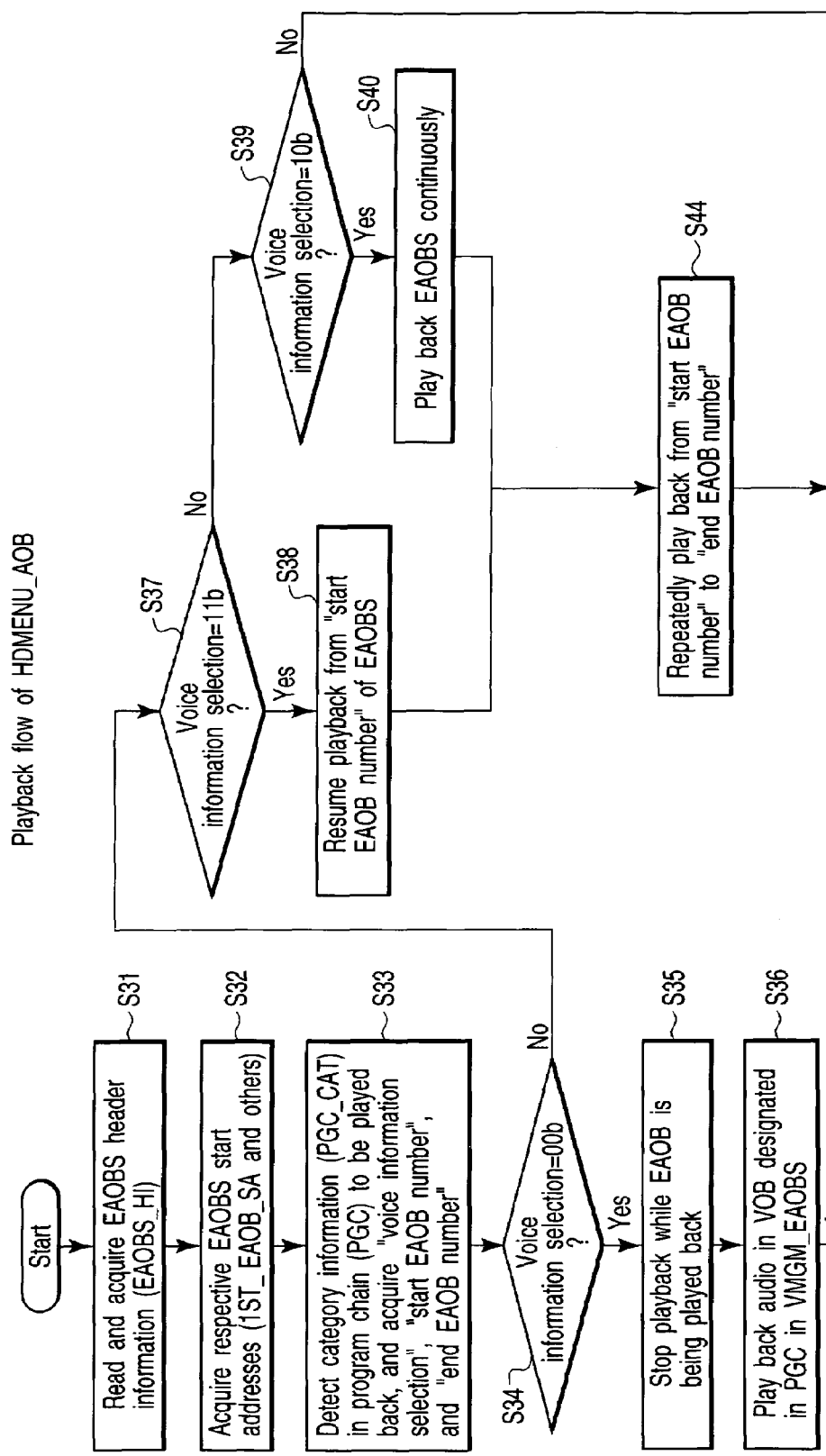
F I G. 75

| Video manager information (VMGI) | Video manager information management table (VMGI_MAT) |
|---|---|
| (essential) | (essential) |

| Elementary audio object set (EAOBS) | Title search pointer table (TT_SRPT) |
|---|---|
| (optional) | (essential) |

| First play PGC menu enhanced video object (FP_PGCM_EVOB) | Video manager menu PGCI unit table (VMGM_PGCI_UT) |
|---|---|
| (optional) | (essential when there are VMGM_EVOBS) |

| Video manager menu enhanced video object set (VMGM_EVOBS) | Parental management information table (PTL_MAIT) |
|---|---|
| (optional) | (optional) |

| Video manager information backup (VMGI_BUP) | Video title set attribute table (VTS_ATRT) |
|---|---|
| (essential) | (essential) |

| | Text data manager (TXTDT_MG) |
|---|---|
| | (optional) |

| | FP_PGC menu cell address table (FP_PGCM_C_ADT) |
|---|---|
| | (essential when there are FP_PGCM_EVOB) |

| | FP_PGC menu EVOBU address map (FP_PGCM_EVOBU_ADMAP) |
|---|---|
| | (essential when there are FP_PGCM_EVOB) |

| | Video manager menu cell address table (VMGM_C_ADT) |
|---|---|
| | (essential when there are VMGM_EVOBS) |

| | Video manger menu EVOBU address map (VMGM_EVOBU_ADMAP) |
|---|---|
| | (essential when there are VMGM_EVOBS) |

FIG. 78

| | Contents |
|---|---|
| VMG_ID | VMG identifier |
| VMG_EA | VMG end address |
| reserved | Reserved |
| VMGI_EA | VMGI end address |
| VERN | DVD video standard version number |
| VMG_CAT | Video manager category |
| VLMS_ID | Volume set identifier |
| ADP_ID | Adaptation identifier |
| reserved | Reserved |
| VTS_Ns | The number of video title sets |
| PVR_ID | Provider characteristic identifier |
| POS_CD | POS code |
| reserved | Reserved |
| VMGI_MAT_EA | VMGI_MAT end address |
| FP_PGCI_SA | FP_PGCI start address |
| reserved | Reserved |
| EAOBS_SA | EAOBS start address |
| FP_PGCM_EVOB_SA | FP_PGCM_EVOB start address |
| VMGM_EVOBS_SA | VMGM_EVOBS start address |
| TT_SRPT_SA | TT_SRPT start address |
| VMGM_PGCI_UT_SA | VMGM_PGCI_UT start address |
| PTL_MAIT_SA | PTL_MAIT start address |
| VTS_ATRT_SA | VTS_ATRT start address |
| TXTDT_MG_SA | TXTDT_MG start address |
| FP_PGCM_C_ADT_SA | FP_PGCM_C_ADT start address |
| FP_PGCM_EVOBU_ADMAP_SA | FP_PGCM_EVOBU_ADMAP start address |
| VMGM_C_ADT_SA | VMGM_C_ADT start address |
| VMGM_EVOBU_ADMAP_SA | VMGM_EVOBU_ADMAP start address |
| reserved | Reserved |
| VMGM_AGL_Ns | The number of VMGM angles |
| VMGM_V_ATR | VMGM video attribute |
| VMGM_AST_Ns | The number of VMGM audio streams |
| VMGM_AST_ATRT | VMGM audio stream attribute table |
| reserved | Reserved |
| VMGM_SPST_Ns | The number of VMGM sub-picture stream |
| VMGM_SPST_ATRT | VMGM sub-picture stream attribute table |
| VMGM_GRST_ATR | VMGM graphic stream attribute |
| reserved | Reserved |
| FP_PGCM_V_ATR | FP_PGCM video attribute |
| FP_PGCM_AST_Ns | The number of FP_PGCM audio streams |
| FP_PGCM_AST_ATRT | FP_PGCM audio stream attribute table |
| FP_PGCM_SPST_Ns | The number of FP_PGCM sub-picture streams |
| FP_PGCM_SPST_ATRT | FP_PGCM sub-picture stream attribute table |
| FP_PGCM_GRST_ATR | FP_PGCM graphic stream attribute |
| EAOB_Ns | The number of EAOBs |
| EAOBS_ATR | EAOB audio data attribute |
| reserved | Reserved |
| FP_PGC_CAT | FP_PGC category |
| reserved | Reserved |
| FP_PGCI | First play PGCI |

FIG. 79

FP_PGCM_C_ADT (VMGI)

| Video manager information management table (VMGI_MAT) |
|---|
| (essential) |

| Title search pointer table (TT_SRPT) |
|---|
| (essential) |

| Video manager menu PGCI unit table (VMGM_PGCI_UT) |
|---|
| (essential when there are VMGM_EVOBS) |

| Parental management information table (PTL_MAIT) |
|---|
| (optional) |

| Video title set attribute table (VTS_ATRT) |
|---|
| (essential) |

| Text data manager (TXTDT_MG) |
|---|
| (optional) |

| FP_PGC menu cell address table (FP_PGCM_C_ADT) |
|---|
| (essential when there are FP_PGCM_EVOB) |

| FP_PGC menu EVOBU address map (FP_PGCM_EVOBU_ADMAP) |
|---|
| (essential when there are FP_PGCM_EVOB) |

| Video manager menu cell address table (VMGM_C_ADT) |
|---|
| (essential when there are VMGM_EVOBS) |

| Video manger menu EVOBU address map (VMGM_EVOBU_ADMAP) |
|---|
| (essential when there are VMGM_EVOBS) |

| FP_PGC menu cell address table information (FP_PGCM_C_ADTI) |
|---|
| FP_PGC menu cell piece #1 information (FP_PGCM_CPI#1) |
| FP_PGC menu cell piece #2 information (FP_PGCM_CPI #2) |
| ⋮ |
| FP_PGC menu cell piece #n information (FP_PGCM_CPI #n) |

F I G. 8 2

FP_PGCM_EVOBU_ADMAP (VMGI)

| |
|---|
| Video manager information management table (VMGI_MAT) (essential) |
| Title search pointer table (TT_SRPT) (essential) |
| Video manager menu PGCI unit table (VMGM_PGCI_UT) (essential when there are VMGM_EVOBS) |
| Parental management information table (PTL_MAIT) (optional) |
| Video title set attribute table (VTS_ATRT) (essential) |
| Text data manager (TXTDT_MG) (optional) |
| FP_PGC menu cell address table (FP_PGCM_C_ADT) (essential when there are FP_PGCM_EVOB) |
| FP_PGC menu EVOBU address map (FP_PGCM_EVOBU_ADMAP) (essential when there are FP_PGCM_EVOB) |
| Video manager menu cell address table (VMGM_C_ADT) (essential when there are VMGM_EVOBS) |
| Video manger menu EVOBU address map (VMGM_EVOBU_ADMAP) (essential when there are VMGM_EVOBS) |

| |
|---|
| FP_PGC menu EVOBU address map information (FP_PGCM_EVOBU_ADMAPI) |
| FP_PGC menu EVOBU #1 address (FP_PGCM_EVOBU_AD #1) |
| FP_PGC menu EVOBU #2 address (FP_PGCM_EVOBU_AD #2) |
| FP_PGC menu EVOBU #3 address (FP_PGCM_EVOBU_AD #3) |
| FP_PGC menu EVOBU #4 address (FP_PGCM_EVOBU_AD #4) |
| : |
| : |
| : |
| : |
| FP_PGC menu EVOBU #n address (FP_PGCM_EVOBU_AD #n) |

FIG. 83

PCI

| PCI_GI | PCI general information |
|---|---|
| NSML_AGLI | Non-seamless angle information |
| reserved | Reserved |
| RECI | Recording information |

FIG. 84

GRUH

| GRU_TY | Graphic unt type |
|---|---|
| reserved | Reserved |
| GRU_SZ | Graphic unt type |
| HLI_SA | Highlighted information start address |
| BTNPDT_SA | Button pattern data table start address |
| GRD_SA | Graphic data start address |

| GRU_PB_S_FRM | GRU playback start video frame |
|---|---|
| GRU_PB_E_FRM | GRU playback end video frame |
| BTN_SL_E_FRM | Button select end video frame |
| BTN_OFN | Button offset number |
| BTN_Ns | The number of buttons |
| NSL_BTN_Ns | The number of numerical select buttons |
| reserved | Reserved |
| FOSL_BTNN | Forced selection button number |
| FOAC_BTNN | Forced definition button number |

|  | d0 | d1 |
|---|---|---|
| (a) | 0 | Pixel data |

|  | d0 | d1 | d2 | d3 |
|---|---|---|---|---|
| (b) | 1 | The number of subsequent pixels | | Pixel data |

|  | d0 | d1 | d2 | d3 | d4 | d5 |
|---|---|---|---|---|---|---|
| (c) | 1 | 0 | The number of subsequent pixels | | | Pixel data |

|  | d0 | d1 | d2 | d3 | d4 | d5 | d6 | d7 |
|---|---|---|---|---|---|---|---|---|
| (d) | 1 | 0 | 0 | The number of subsequent pixels | | | | Pixel data |

|  | d0 | d1 | d2 | d3 | d4 | d5 | d6 | d7 | d8 | d9 |
|---|---|---|---|---|---|---|---|---|---|---|
| (e) | 1 | 0 | 0 | 0 | The number of subsequent pixels | | | | | Pixel data |

|  | d0 | d1 | d2 | d3 | d4 | d5 | d6 | d7 | d8 | d9 | d10 | d11 |
|---|---|---|---|---|---|---|---|---|---|---|---|---|
| (f) | 1 | 0 | 0 | 0 | 0 | The number of subsequent pixels | | | | | | Pixel data |

|  | d0 | d1 | d2 | d3 | d4 | d5 | d6 | d7 | d8 | d9 | d10 | d11 | d12 | d13 |
|---|---|---|---|---|---|---|---|---|---|---|---|---|---|---|
| (g) | 1 | 0 | 0 | 0 | 0 | 0 | The number of subsequent pixels | | | | | | | Pixel data |

|  | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| (h) | 1 | 0 | 0 | 0 | 0 | 0 | 0 | The number of subsequent pixels | | | | | | | | Pixel data |

|  | d0 | d1 | d2 | d3 | d4 | d5 | d6 | d7 | d8 | d9 | d10 | d11 | d12 | d13 | d14 | d15 |
|---|---|---|---|---|---|---|---|---|---|---|---|---|---|---|---|---|
| (i) | 1 | 0 | 0 | 0 | 0 | 0 | 0 | 0 | 0 | 0 | 0 | 0 | 0 | 0 | 0 | Pixel data |

FIG. 88

Structure of sub-picture unit

Sub-picture unit stored in SP pack a7 of FIG. 39C

| Sub-picture unit header (SPUH) | Pixel data (PXD) | | Sub-picture display control sequence table (SP_DCSQT) |
|---|---|---|---|
| | For top field | For bottom field | |

FIG. 89

Sub-picture display control command

SP_DCCMD

| Command name | Contents | Code |
|---|---|---|
| (1) FSTA_DSP | Forcedly set pixel data display start timing | 00h |
| (2) STA_DSP | Set pixel data display start timing | 01h |
| (3) STP_DSP | Set pixel data display stop timing | 02h |
| (4) SET_COLOR | Set pixel data color code | 03h |
| (5) SET_CONTR | Set contrast between pixel data and main image | 04h |
| (6) SET_DAREA | Set display area of pixel data | 05h |
| (7) SET_DSPXA | Set pixel data display start address | 06h |
| (8) CHG_COLCON | Set change in color and contrast of pixel | 07h |
| (9) SET_DAREA2 | Set display area of pixel data 2 | 85h |
| (10) SET_DSPXA2 | Set pixel data display start address 2 | 86h |
| (11) CHG_COLCON2 | Set change in color and contrast of pixel 2 | 87h |
| (12) CMD_END | End display control command | FFh |

FIG. 93

PGC_SPRT_CTL

| b31 | b30 | b29 | b28 | b27 | b26 | b25 | b24 |
|---|---|---|---|---|---|---|---|
| SD availability flag | HD availability flag | Reserved | The number of 4:3 / HD decoding sub-picture streams ||||

| b23 | b22 | b21 | b20 | b19 | b18 | b17 | b16 |
|---|---|---|---|---|---|---|---|
| Reserved ||| The number of SD-Wide decoding sub-picture streams ||||

| b15 | b14 | b13 | b12 | b11 | b10 | b9 | b8 |
|---|---|---|---|---|---|---|---|
| Reserved ||| The number of Letterbox decoding sub-picture streams ||||

| b7 | b6 | b5 | b4 | b3 | b2 | b1 | b0 |
|---|---|---|---|---|---|---|---|
| Reserved ||| The number of Pan-scan decoding sub-picture streams ||||

FIG. 97

PGC_GI

| (1) PGC_CNT | PGC contents |
|---|---|
| (2) PGC_PB_TM | PGC playback time |
| (3) PGC_UOP_CTL | PGC user operating time |
| (4) PGC_AST_CTLT | PGC audio stream control table |
| (5) PGC_SPST_CTLT | PGC sub-picture stream control table |
| (6) PGC_NV_CTL | PGC navigation control |
| reserved | reserved |
| (7) PGC_SDSP_PLT | SD PGC sub-picture pallet |
| (8) PGC_HDSP_PLT | HD PGC sub-picture pallet |
| (9) PGC_CMDT_SA | PGC_CMDT start address |
| (10) PGC_PGMAP_SA | PGC_PGMAP start address |
| (11) C_PBIT_SA | C_PBIT start address |
| (12) C_POSIT_SA | C_POSIT start address |

FIG. 98

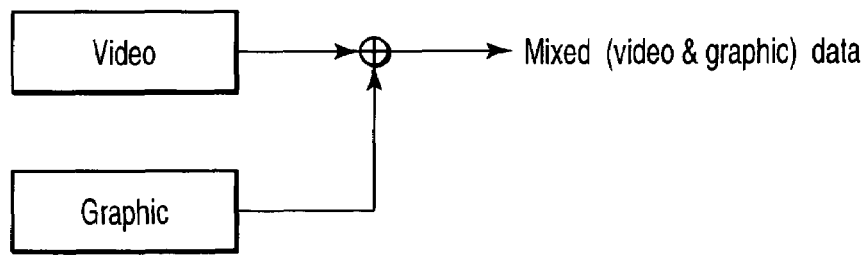

FIG. 99

| Case | Input type | Output type |
|---|---|---|
| 1 | Video : HD<br>Graphic : HD<br>Sub-picture : HD | 1) HD<br>2) SD 16:9 Wide (Down-conversion after mixing)<br>3) SD 4:3 Pan-Scan (Down-conversion after mixing)<br>4) SD 4:3 Letterbox (Down-conversion after mixing) |
| 2 | Video : HD<br>Graphic : HD<br>Subpicture : HD<br>Sub-picture : SD (optional)<br>(SD Wide / SD Pan-Scan / SD Letterbox) | 1) HD<br>2) SD 16:9 Wide (Mixing after down-conversion)<br>3) SD 4:3 Pan-Scan (Mixing after down-conversion & pan-scan)<br>4) SD 4:3 Letterbox (Mixing after down-conversion & letterbox) |
| 3 | Video : SD<br>Graphic : SD<br>Sub-picture : SD<br>(SD Wide / SD Pan-Scan / SD Letterbox) | 1) SD 16:9 Wide (Mixing)<br>2) SD 4:3 Pan-Scan (Mixing after pan-scan)<br>3) SD 4:3 Letterbox (Mixing after letterbox) |
| 3' | Video : SD<br>Graphic : SD<br>Sub-picture : SD<br>(SD Wide) | 1) SD 16:9 Wide (Mixing)<br>2) SD 4:3 Pan-Scan (Pan-scan after mixing)<br>3) SD 4:3 Letterbox (Letterbox after mixing) |
| 4 | Video : SD<br>Sub-picture : SD<br>(SD Wide / SD Pan-Scan / SD Letterbox) | 1) SD 16:9 Wide (Mixing)<br>2) SD 4:3 Pan-Scan (Mixing after pan-scan)<br>3) SD 4:3 Letterbox (Mixing after letterbox) |

FIG. 100

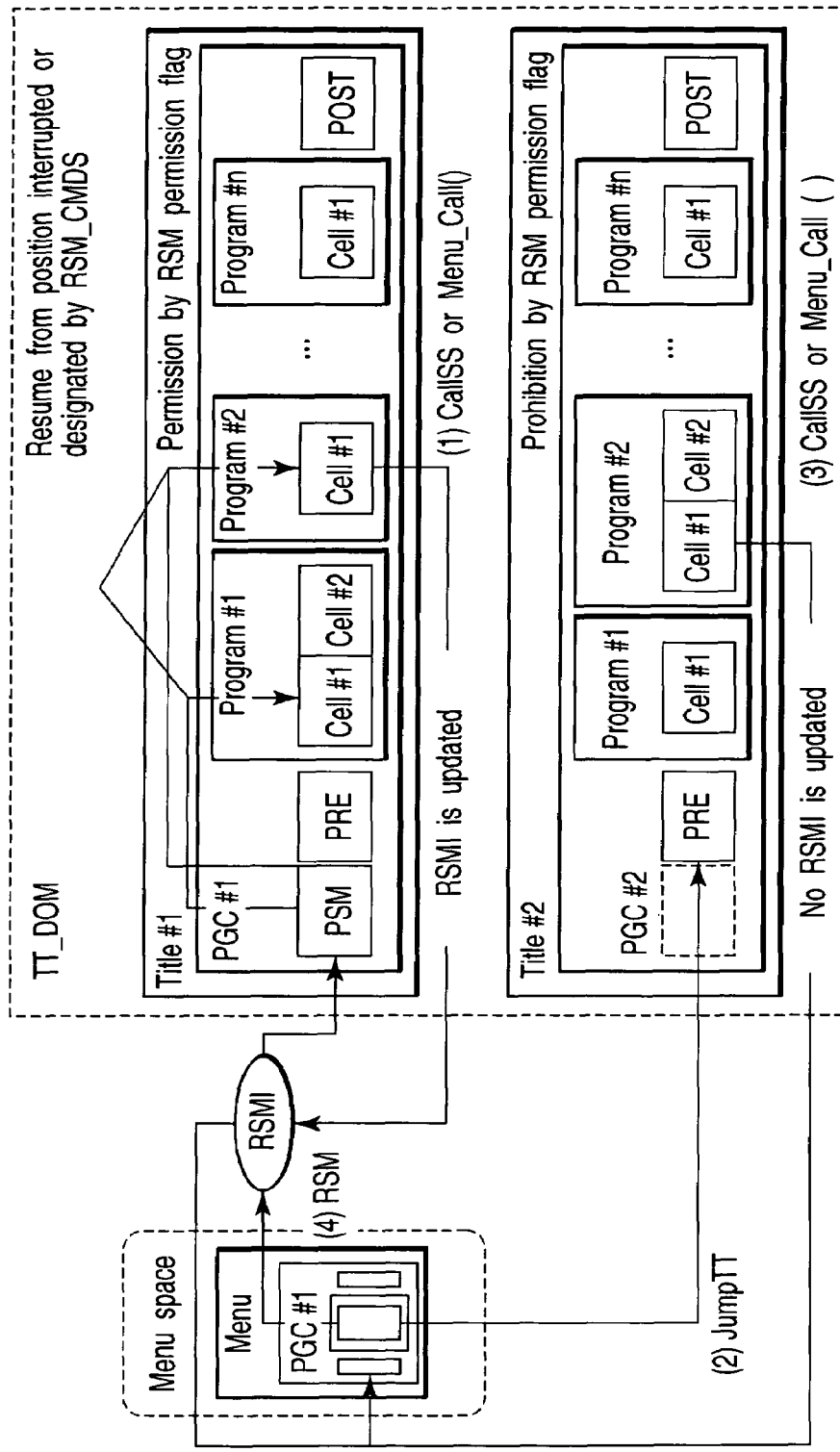
F I G. 106

C_PBI

| (1) C_CAT | Cell category |
|---|---|
| (2) C_PBTM | Cell playback time |
| (3) C_FEVOBU_SA | Cell start EVOBU start address |
| (4) C_FILVU_EA | Cell start ILVU end address |
| (5) C_LEVOBU_SA | Cell last EVOBU start address |
| (6) C_LEVOBU_EA | Cell last ILVU end address |
| (7) C_CMD_SEQ | Cell command sequence |

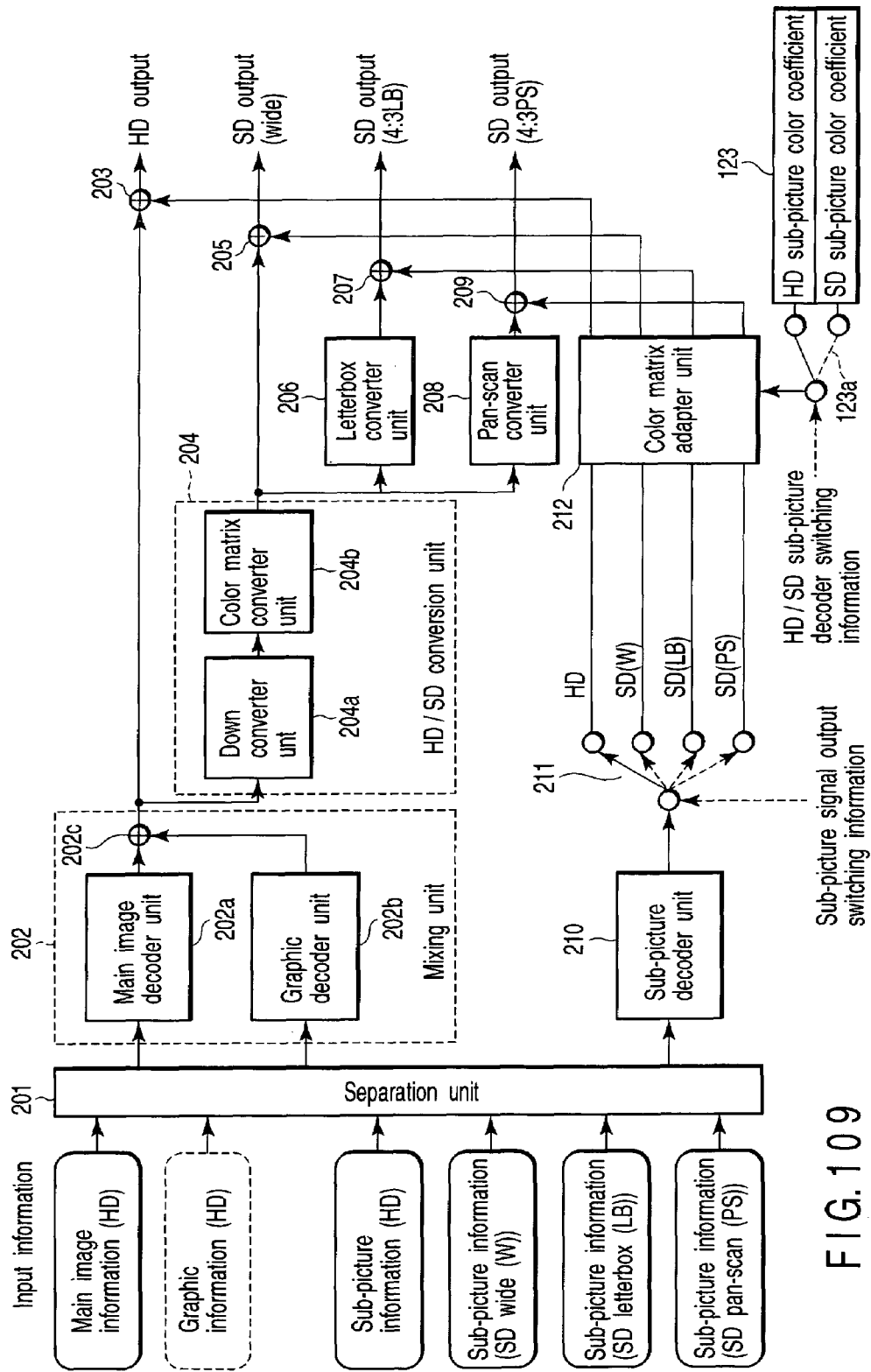
F I G. 109

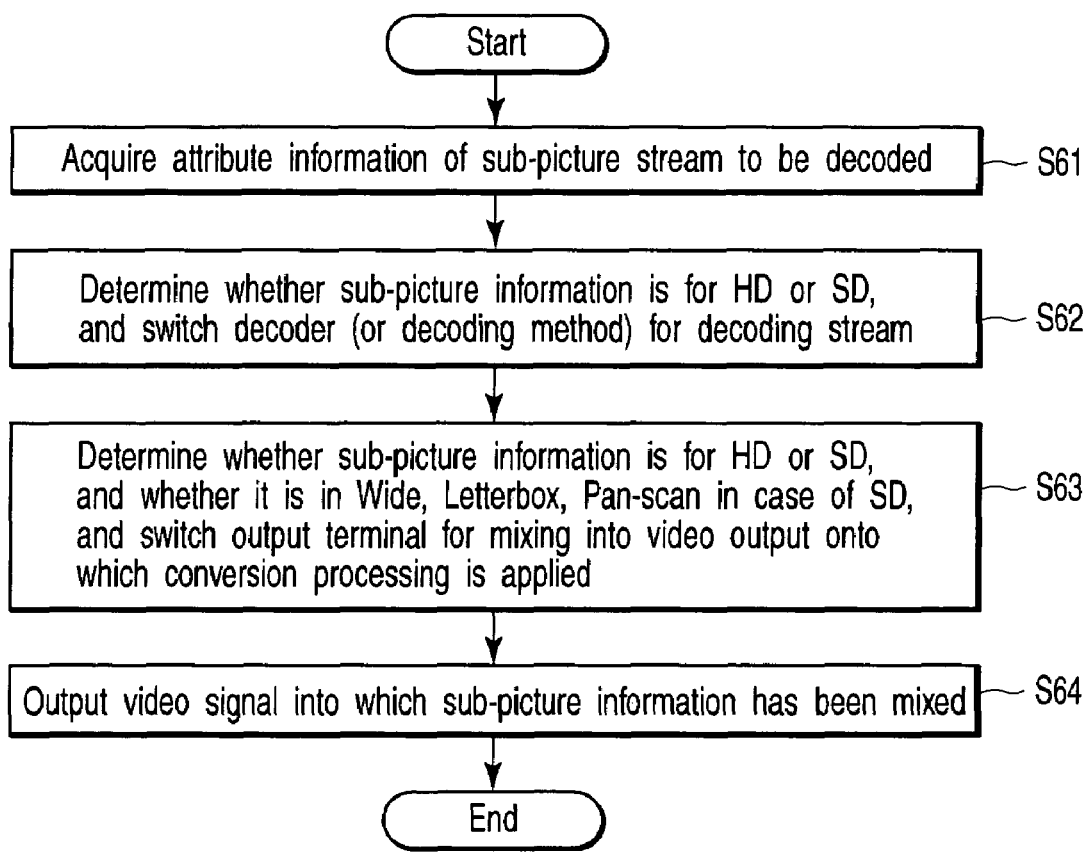
F I G. 110

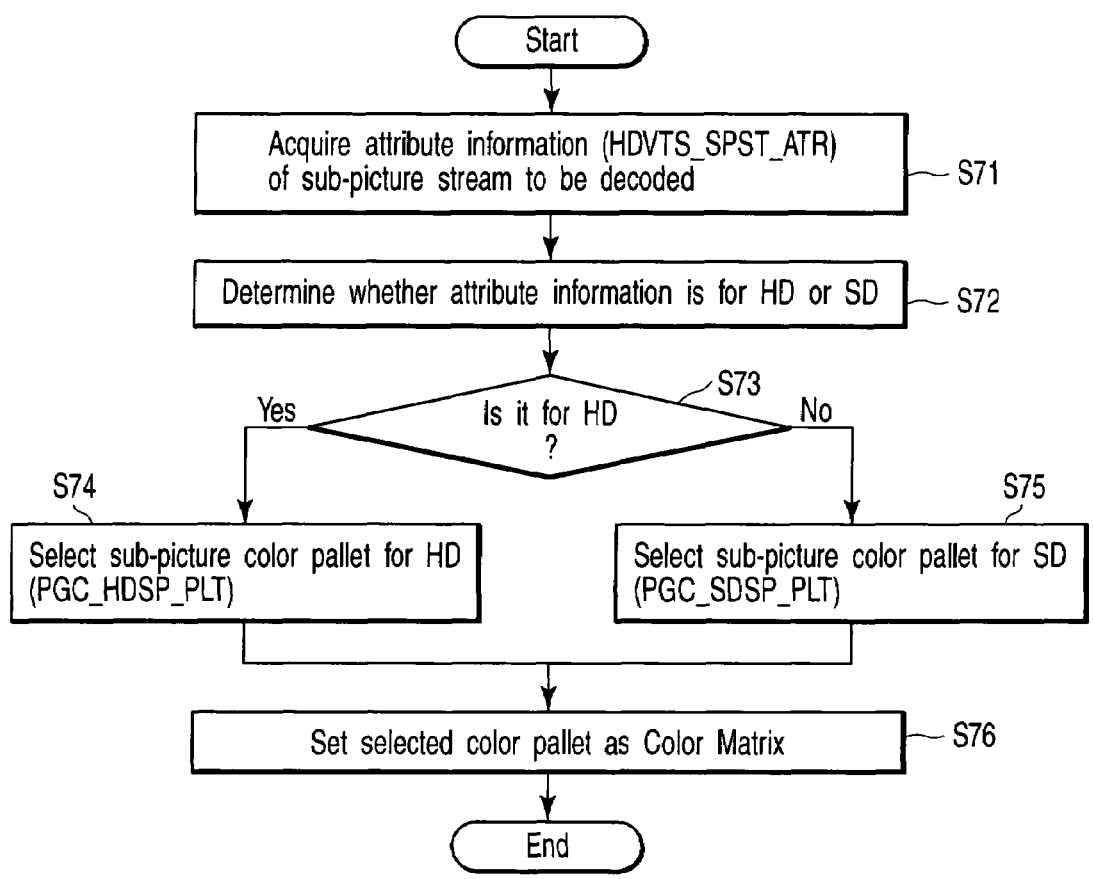
F I G. 111

INFORMATION PLAYBACK APPARATUS AND INFORMATION PLAYBACK METHOD

CROSS-REFERENCE TO RELATED APPLICATIONS

This application is based upon and claims the benefit of priority from prior Japanese Patent Application No. 2004-219019, filed Jul. 27, 2004, the entire contents of which are incorporated herein by reference.

BACKGROUND OF THE INVENTION

1. Field of the Invention

The present invention relates to an information playback apparatus and an information playback method.

2. Description of the Related Art

As is well known, currently, there is an optical disk which is called digital versatile disk (DVD) in which digital information can be played back by using a converging light. As the existing DVD standards, there are a DVD-ROM standard which is a read-only type, a DVD-R standard which is a write-once type, a DVD-RW standard which is a rewritable (about 1000 times) type, and a DVD-RAM standard which is a rewritable (10000 times or more) type. In any standard, there is provided a format standard for providing a data structure of image information [which is an video object the general term for video data, sub-picture data, and voice data] itself recorded on an optical disk (information storage medium), and a data structure of the management data for managing the image information.

The existing DVD video standard which is a read-only type corresponds to multiple languages simultaneously, and is made to be in a format in which not only multi-scene expression such as multi-angle/multi-story or the like is possible, but also a menu screen is satisfactory and it is easy for a user to directly access to a scene which the user wishes to see, and the like which can provide image contents that are easy for a user to use (for example, refer to the specification of U.S. Pat. No. 5,636,200 and the specification of Japanese Patent No. 2,677,775).

As described above, although the existing DVD video standard which is a read-only type is made to be in a format in which image contents that are easy for a user to use can be provided, the improvement with respect to the standard has been required in order to make a user to even more easily use it, and to enrich the contents expressive power with respect to the user.

Further, in order to provide contents that are easy for a user to use, there is the problem that authoring (preparation and editing of a program to be recorded on a DVD video disk) is made complicated.

Points in which the contents expressive power with respect to a user is insufficient, points which are difficult for the user to use, or points in which authoring is made complicated in order to provide contents that are easy for a user to use in the existing DVD video standard will be concretely enumerated.

[1] It is difficult for a user to use. Or, in order to prepare contents that are easy for a user to use, authoring is complicated.

(A) A defective point with respect to a playback start position when the playback is interrupted during a playback of a title, and carrying out some other processings, and thereafter, the process returns to the playback of the title.

(A1) When an image is interrupted to play back, and it is made to return to the playback after switching to display a menu or an image, it is impossible to play back the image from the former position interrupted.

In many cases, after the playback is interrupted during a playback of a specific image title, and the screen is switched to a menu screen, and bonus contents are played back up to the middle or the end thereof, and thereafter, when an attempt is made to play back the image title which has been interrupted during the playback, the contents prepared in accordance with a conventional DVD standard cannot be played back from the other positions except for the top position of the image title. This is because the resume information (playback-interruption positional information) of the specific image title is rewritten to the positional information of the bonus contents at the stage of starting to play back the bonus contents. In order to make the contents be contents which can be stated to play back from a position at which the image title has been interrupted previously after the bonus contents are played back up to the middle or the end thereof, complicated authoring is required.

(A2) In a case of a game or the like, when an attempt is made to play the game again after interrupting a playback thereof, it is impossible to start the playback from a convenient position.

When a "game" (for example, a role playing game) is carried out as a specific title in place of the above-described image, at the time of restarting the game after returning to a menu screen, there is a request to make an attempt to start the game from, not the interrupted position, but a pause of a chapter of the game from the side of a contents provider. However, it is impossible to cope with the request in the existing DVD video standards.

(B) There is a point which is difficult to use with respect to display-oriented language setting.

(B1) It is impossible to change a menu description language code by a command which can be designated in the contents, and the authoring is complicated.

In the existing DVD video, a menu description language code (M_LCD) is set in SPRM(0) (the system parameter of No. 0: 16 bits), and the value thereof is stored in a memory unit 122 of an information playback apparatus of FIG. 48. In the existing DVD video standard, there is no command for changing the value of SPRM(0) in a command list which can be set in the contents, and it is possible to change the value of SPRM(0) by only a user instruction under a special condition. To describe concretely, the value of SPRM(0) can be changed by using a user operational function called Menu_Language_Select( ) among the user functions installed in the information playback apparatus. However, the user operation called Menu_Language_Select( ) has a restriction in which it is possible to set only while the information playback apparatus is stopped to operate. This user operation is set by using a remote controller while a single-purpose screen is being displayed.

In this way, because the value of SPRM(0) cannot be changed by a command which can be set in the contents, it is necessary to prepare a screen on which a menu description language code is respectively selected for a plurality of menu description language codes in the contents (in particular, VOB data on the menu information) so as to cope with a case even if the value of SPRM(0) is set to any value, so that the authoring operation at the time of preparing the contents has been extremely troublesome.

(B2) The risk that the information of the menu description language code set by a user is deleted is brought about.

For example, if a command by which the value of SPRM(0) can be changed in the contents is newly added in order to solve the problem of (B1), there is a risk that the value of SPRM(0) is automatically changed by playing back the contents even if the user sets a specific menu description language code (for example, Japanese to SPRM(0)). When the menu description language code is automatically changed by the command, not only the user is dissatisfied, but also the problem that the need for resetting a menu description language code by the user is brought about, which brings about the problem increasing the burden imposed on the user.

[2] There is a part at which the contents expressive power with respect to a user is insufficient.

(C) A defective point relating to a seamless playback with respect to a still picture content.

(C1) A seamless connection between a movie content and a still picture content is impossible in existing DVD video contents.

In an existing DVD video, a seamless playback of a movie content is guaranteed, and it is possible to seamlessly connect and play back over different VOBs (or different titles) (without the screen of the movie content being disconnected). In contrast thereto, a seamless playback is not guaranteed, for example, when a still picture content displayed by a slide show (one method of display for still picture contents in which still picture contents to be displayed are automatically switched) is switched to a movie content, and there are cases where the image or the voice stands still depending on an information playback apparatus. The reason for that a seamless connection is not guaranteed at a point in time of switching from a still picture content to a movie content in the existing DVD video contents is that:

i) in an extended system target decoder (E-STD) model in which a seamless playback is guaranteed, an access unit is defined in a movie content object, and values of system time clock (STC: clock values to be references) set in a separation unit 103, a video decoder unit 111, a sub-picture decoder unit 112, and an audio decoder unit 114 which are shown in FIG. 48 are switched at a position of the boundary of the access unit. In contrast thereto, in the existing DVD, an access unit cannot be defined for a still picture content.

Namely, a movie content continues to continuously output pictures always in units of fields. In contrast thereto, for example, a still picture content displayed by a slide show outputs pictures intermittently. As a data structure in a still picture content object, a sequence end code (sequence_end_code) is disposed immediately after an Intra picture (I picture) configuring one still picture content in accordance with the standard of MPEG2 (Moving Picture Experts Group 2), and in the video decoder unit 111, the decoding is stopped until the next picture comes when the sequence end code is sensed. Accordingly, in the conventional DVD video, an access unit as that in a case of a movie content cannot be set during a period in timings when a still picture content intermittently outputs.

ii) In the conventional DVD video, switching among common parities has been allowed as the timing of switching among still picture contents. Namely, after a previous still picture content is completed at the top field (or the bottom field), the next still picture content is allowed to start from the top field (or the bottom field). Accordingly, when it is switched from a still picture content to a movie content in the middle of a frame, a seamless connection cannot be carried out, and there is the risk that the screen is disturbed at the switching point.

(C2) A multi-angle playback in which still picture contents are combined, and a multi-angle playback between a movie content and a still picture content are impossible.

In the existing DVD video, a multi-angle playback in which slide shows of still picture contents are combined, and a multi-angle playback in which a slide show of still picture contents and a movie content are combined are difficult. When contents corresponding to a multi-angle playback are compulsorily prepared, a seamless playback with respect to still picture contents is not guaranteed. Therefore, there are cases where still picture contents which have been at multi-angles cannot be continuously played back (a still picture content is stopped due to the still picture contents being not continuously switched), or the screen is stopped during the playback due to a screen of a multi-scene and a screen of a one sequential scene being not switched smoothly at a switching point therebetween. This is because, although an interleaved unit (ILVU) which carries out arrangement to disperse for at each angle in an interleaved block is defined in a movie content, the definition of an ILVU with respect to a still picture content is not made clear in the existing DVD video. Further, in a still picture content, a period up to switching a screen is long (because a same still picture content is continued to play back for a long time), and there is no mechanism under the existing circumstances in which a corresponding still picture content can be immediately displayed immediately after switching the angle. Moreover, as described in (C1), when the sequence end code disposed directly after the I picture corresponding to the still picture content is detected, decoding processing of the video decoder unit 111 is temporarily stopped until the next I picture comes. Therefore, in the existing DVD video standard, disposition of a sequence end code in video data in cells configuring an interleaved block is prohibited.

(D) A seamless playback at a place of VOB into which a command in a cell unit is included is not guaranteed.

In the existing standard definition (SD) DVD video, it is possible to designate a command in a cell unit in a program chain (PGC). The command information is recorded within a cell command area 513 in a program chain information (PGCI) which is an area on which management information of the PGC has been recorded in the same way as in FIG. 35. Because the cell command is executed at a point in time when a playback of the cell in which the cell command 513 is set is completed, a playback of the following cell can be temporarily interrupted. Therefore, in the existing SD DVD video, a seamless playback between cells is not guaranteed at the time of playing back VOB including the cell command 513.

(E) A defective point with respect to highlighted information.

(E1) A gap between the displaying periods (setting periods) occurs between highlighted information and a sub-picture.

A menu of highlighted information is displayed at the time of playing back a video title image, and contents can be prepared so as to allow a user to interactively operate it. In this case, because it is necessary to switch the highlighted information in accordance with the contents of the video title image in process of playback, or to change the contents, the accuracies in a displaying period of the highlighted information and a valid executable period are important. In the conventional SD DVD video contents, buttons displayed on the screen are composed of a combination of two types of separate streams, i.e., a sub-picture stream which provides pictures of the buttons and a video stream including highlighted information necessary for executing a command designated by a button.

The valid executable period of highlighted information is provided in accordance with time information (PTM: Presentation Time) of the start and the end, and is completely coincident with the displaying period of a sub-picture mainly used for a caption or the like, and there is the problem that, when the sub-picture ends, a menu selection as well ends. Therefore, when a contents manufacturer makes an attempt to manufacture contents in which a caption and a menu are simultaneously combined, there is a limitation in preparing the contents, such as it is necessary to cause a user to execute a menu selection within the valid (displaying) period of a sub-picture, and the like. Thus, the contents manufacturer cannot prepare contents as he/she has imagined, the degree of freedom is limited, and a limitation to contents to be provided to a user is unavoidable.

(E2) Pictures of selection items in the menu are not multicolored.

Because a color scheme can be expressed in only 16 colors in the existing SD DVD video contents, the degree of appeal to a user is low, and multicolored color-expression is impossible.

(E3) An area on which highlighted information is designated cannot be set to be a shape except for a rectangle.

In the existing SD DVD video contents, shapes except for a rectangle cannot be set as an area on which highlighted information is designated, and for example, contents full of variety such as, for example, a triangle and a star shape cannot be prepared.

(E4) A same button cannot be set with respect to a plurality of areas separated from one another on the screen.

In the existing SD DVD video contents, a same button can be set only within areas in one place together with one another.

As compared therewith, on a screen of a PC or a screen of a homepage on Internet, it is easy to make a same URL link with a plurality of areas in the screen, and the existing SD DVD video contents have been not as good as a screen of a PC or a screen of a homepage on Internet.

(F) There is the problem that background music skips at the time of switching a menu screen.

In the existing SD DVD video contents, voice information at the time of displaying a menu screen (background music) is made to accompany with each menu. Accordingly, voice information is changed every time of changing the menu screen.

The request of a contents provider to want to play back background music continuously without being disconnected even if a menu is switched cannot be satisfied by the existing SD DVD video contents. Moreover, for example, a request of a contents provider to want to prepare contents cannot be satisfied such that:

i] background music is played back continuously without disconnecting the sound at the time of switching a menu, and a range within which the background music is repeatedly played back is changed in accordance with a menu screen (for example, while "top menu screen" is being displayed, "the first verse of the music" is repeatedly played back, and in contrast thereto, while "specific menu screen A" is being displayed, "the first verse to the third verse of the music" are repeatedly played back, and while "specific menu screen B" is being displayed, only "the most elegant part further in the first verse of the music" is repeatedly played back; or ii] without discontinuously changing background music at the same time of switching the menu screen, the background music corresponding to a menu screen continuously switched is started immediately after the background music corresponding to a menu screen before switching is completed to the end, and thereafter, the background music corresponding to the menu screen after being switched is repeatedly played back.

Further, at the present time, a so-called HD (high definition)-DVD in which it is possible to record information of 4 to 5 times of a DVD by carrying out recording and playing back information by using, for example, a blue laser beam whose wavelength is about 405 nm has been developed, and an HD-DVD video standard for that has been also established.

In the HD-DVD video standard, the main image information is at HD (high definition), and in contrast thereto, there are two types of HD and SD (standard definition) as sub-picture information. Therefore, at the time of displaying an image such that sub-picture information is superimposed onto main image information, the need for matching the definitions between the main image and the sub-picture is brought about.

In Jpn. Pat. Appln. KOKAI Publication No. 2001-320673, there is disclosed a configuration in which mass storage multimedia information including a main image, a sub-picture, voice data, and the like is decoded and played back by a simple hardware configuration. However, in the specification of U.S. Pat. No. 5,636,200, there is no description on the fact that the definitions between the main image and the sub-picture must are matched.

BRIEF SUMMARY OF THE INVENTION

According to one aspect of the present invention, there is provided an information playback apparatus configured to play back an information recording medium on which main image information having first resolution, first sub-picture information having the first resolution, second sub-picture information having second resolution which is lower than the first resolution, and attribute information including information denoting the resolution of the first and second sub-picture information have been recorded, the information playback apparatus comprising:

a first image information output unit configured to overlap the first sub-picture information onto the main image information to be outputted in accordance with a required image output format; and a second image information output unit configured to overlap the second sub-picture information onto information into which the main image information has been converted to have the second resolution to be outputted in accordance with a required image output format.

According to another aspect of the present invention, there is provided an image playback method for playing back an information recording medium on which main image information having first resolution, first sub-picture information having the first resolution, second sub-picture information having second resolution which is lower than the first resolution, and attribute information including information denoting the resolution of the first and second sub-picture information have been recorded, the information playback method comprising:

overlapping the first sub-picture information onto the main image information to be outputted in accordance with a required image output format; and overlapping the second sub-picture information onto information into which the main image information has been converted to have the second resolution (SD) to be outputted in accordance with a required image output format.

BRIEF DESCRIPTION OF THE SEVERAL VIEWS OF THE DRAWING

FIG. 1 is a diagram showing contents of information recorded on a disk type information storage medium 1 in one embodiment of the present invention;

FIG. 2 is a diagram showing a file system of DVD video contents;

FIG. 4 is a diagram showing a data structure in an HD video manager information management table (HDVMGI_MAT) 310 of FIG. 3;

FIG. 8 is a diagram showing a data structure in an HD video manager menu program chain category (HDVMGM_PGC_CAT) recorded in the HD video manager menu language unit #n (HDVMGM_LU #n) 312c (FIG. 6) shown in FIG. 7;

FIG. 20 is a diagram showing a data structure in an HD video title set information area (HDVTSI) 41 shown in (f) of FIG. 1;

FIG. 21 is a diagram showing a data structure in an HD video title set information management table (HDVTSI_MAT) 410;

FIG. 24 is a diagram showing a data structure in an HD video title set program chain category (HDVTS_PGC_CAT) recorded in the HDVTS_PGCI search pointer (HDVTS_PGCI_SPR) shown in FIG. 23;

FIG. 27 is a diagram showing a data structure in HDVTSM_PGC category information (HDVTSM_PGC_CAT) shown in FIG. 26;

FIG. 31 is a diagram showing a data structure in an HD video title set cell address table (HDVTS_C_ADT) 417 shown in FIG. 20;

FIG. 35 is a diagram showing a data structure in a program chain command table PGCI_CMDT in the program chain information PGCI shown in FIG. 34;

FIG. 38 is a diagram showing a data structure in a cell playback information table C_PBIT disposed in the program chain information PGCI;

FIGS. 39A to 39D are diagrams showing a structure in which a graphic unit GU is stored as an MPEG program stream;

FIG. 40 is a diagram showing stream IDs and sub-stream IDs allocated to streams of the graphic unit GU;

FIG. 42 is a diagram showing another example of the data structure of the graphic unit having mask data of FIG. 41;

FIG. 43 is a diagram showing contents of header information b1 and general information b21;

FIG. 46 is a diagram showing one example of a color contrast information table stored in color pallet information b22;

FIG. 49 is a diagram showing a model example A of a video system decoder block on and after a separation unit 103 of FIG. 48;

FIG. 50 is a diagram showing a model example B of the video system decoder block on and after the separation unit 103 of FIG. 48;

FIG. 51 is a diagram showing a model example C of the video system decoder block on and after the separation unit 103 of FIG. 48;

FIG. 57 is a diagram showing contents of header information of the menu audio object area (HDMENU_AOB) shown in FIG. 56;

FIG. 58 is a diagram showing another example of the data structure in the HD video manager menu program chain category (HDVMGM_PGC_CAT);

FIG. 59 is a diagram showing another example of the data structure in the HD video title set program chain category (HDVTS_PGC_CAT);

FIG. 60 is a diagram showing another example of the data structure in the HDVTSM_PGC category information (HDVTSM_PGC_CAT);

FIG. 62 is a diagram showing contents of system parameters SPRM;

FIG. 63 is a diagram showing an example of a data structure of an instruction operand of SetGPRMMD belonging to a SetSystem instruction group described in a data structure in command information;

FIG. 64 is a diagram showing a concrete example of command information in which respective operand numerical values under specific working conditions are set;

FIG. 68 is a diagram showing a structural example of an elementary audio object set EAOBS;

FIG. 70 is a diagram showing contents of the elementary audio object set EAOBS;

FIG. 71 is a diagram showing contents of EAOBS header information;

FIG. 75 is a flowchart of playing back the menu audio object HDMENU_AOB in a case where a range in which audio is repeatedly played back is designated by a start EAOB and an end EAOB in place of a start point and an end point;

FIG. 78 is a diagram showing a structure of video manager information VMGI;

FIG. 79 is a diagram showing a modified example of a detailed data structure in the HD video manager information management table (HDVMGI_MAT) 310;

FIG. 82 is a diagram showing a structure of the FP_PGC menu cell address table (FP_PGCM_C_ADT) in VMGI;

FIG. 83 is a diagram showing a structure of an FP_PGC menu enhanced video object unit address map FP_PGCM_EVOBU_ADMAP in VMGI;

FIG. 84 is a diagram showing contents of playback control information PCI;

FIG. 85 is a diagram showing a modified example of a graphic unit header GRUH;

FIG. 88 is a diagram showing a run-length compression rule of button pattern data;

FIG. 89 is a diagram showing a data structure in a sub-picture unit SPU;

FIG. 93 is a diagram showing contents of sub-picture display control commands SP_DCCMD which can be recorded in the sub-picture display control sequence table SP_DCSQT;

FIG. 97 is a diagram showing contents of one PGC sub-picture stream control information (PGC_SPST_CTL) in the PGC sub-picture stream control table (PGC_SPST_CTLT) shown in FIG. 34;

FIG. 98 is a diagram showing a modified example of the PGC_GI shown in FIG. 33;

FIG. 99 is a diagram showing a basic player standard model;

FIG. 100 is a diagram showing types of player standard models;

FIG. 106 is a diagram showing one example of resume processing;

FIG. 109 is a block diagram for explaining a structure in which sub-picture information at HD and SD are selectively superimposed onto main image information at HD in an information playback apparatus in accordance with an HD-DVD video standard;

FIG. 110 is a flowchart for explaining main operations of the information playback apparatus shown in FIG. 109;

FIG. 111 is a flowchart for explaining operations of selecting color pallets of the information playback apparatus shown in FIG. 109;

DETAILED DESCRIPTION OF THE INVENTION

Hereinafter, one embodiment of an information playback apparatus and an information playback method in accordance with the present invention will be described with reference to the drawings.

First, the entire features in the invention will be surveyed, and the relationship among the respective features will be described. Next, a point relating to "HD menu audio object (AOB) control" which is the central technical contents to be focused on in this specification will be described, and thereafter, concrete description of the embodiment will be carried out.

The invention is implemented due to the following (1) to (3) being appropriately combined.

(1) HDMENU_AOB header information and a menu audio object AOB are provided in a menu audio object HDMENU_AOB, and the HDMENU_AOB header information is composed of AOB_EA which is an end address of HDMENU_AOB, AOB_EP_Ns which is the number of entry points of HDMENU_AOB, AOB_ATR which is an attribute of HDMENU_AOB, and AOB_1ST_EP, AOB_2ND_EP, AOB_3RD_EP, AOB_4TH_EP, and AOB_5TH_EP which are first to fifth start addresses of the entry points of the HDMENU_AOB.

(2) A voice information selection flag (2 bits) is provided in HD program chain PGC category information HDVMGM_PGC_CAT. When the voice information selection flag is '00b', it means that a playback of the menu audio object HDMENU_AOB is stopped, and audio in a menu video object HDVMGM_VOB is played back. When the voice information selection flag is '01', it means that the audio in the menu video object HDVMGM_VOB is ignored, and a playback of the menu audio object HDMENU_AOB is continued. When the voice information selection flag is '11b', it means that a playback of the menu audio object HDMENU_AOB is started.

(3) In the above-described HD PGC category information (HDVMGM_PGC_CAT), start numbers and end numbers of entry points designated in the above-described menu audio object HDMENU_AOB are recorded, a position of repetitive playback of the menu audio object HDMENU_AOB is determined by the start and end numbers.

In this specification, video data, sub-picture data, voice data, and graphic data are generically named a video object, and the general term for a video object and management data of the video object is expressed by the word of contents. Further, in order to make the difference clear, conventional DVD video contents and contents to be objects for the embodiment of the invention which have the following (A) to (G) features are separately used by respectively using the words of SD (standard definition) contents and HD (high definition) contents.

<<Description of Entire Features>>

[1] The problem that it is difficult for a user to use, or authoring is complicated for preparing contents that are easy for a user to use is solved.

(A) Interruption positional information control method during interruption of title

[Point 1]

Figure 48:
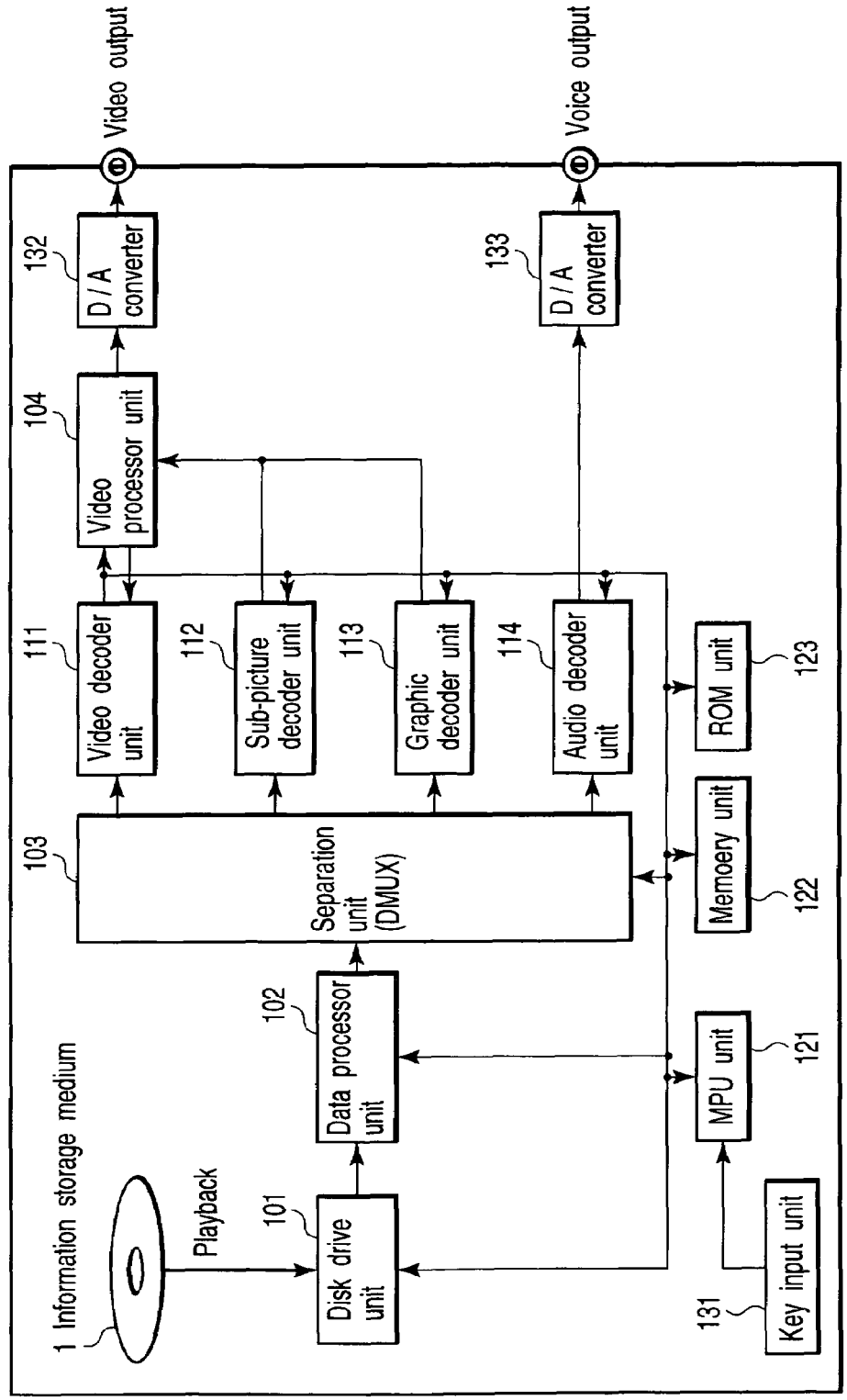
FIG. 48 is a diagram showing an information playback apparatus (player) which reads and plays back information stored in the disk type information storage medium 1.

By changing storage/abandonment rules for resume information with respect to an existing DVD video standard, it is made possible to minutely control the rewriting/prohibition against change/destruction processing for information contents of the resume information recorded in a memory unit 122 of an information playback apparatus shown in FIG. 48.

[Point 2]

When the resume information recorded in the memory unit 122 of the information playback apparatus is rewritten, the resume information is maintained until a next control instruction for the resume information comes. For example, in the conventional DVD video standard, there is a rule that, when a JumpTT, JumpVTS_TT, or JumpVTS_PTT command is executed, the above-described resume information contents are deleted. However, in the invention, the rule is changed, and even after the command has been executed, the contents of the resume information are maintained, which solves a part of the problem shown in (A1).

[Point 3]

As a countermeasure against the problem shown in (A1), as shown in FIG. 24, a resume permission flag (RSM permission flag) is newly set to each PGC, the resume permission flag denoting whether an RSM (Resume) command (a command due to a selection on a screen), or, for example, a resume by a Resume ( ) function (a command which the playback apparatus carries out) which is executed in accordance with a user designation is permitted or not. As the concrete contents, if the RSM permission flag has been set to '0b' at the time of executing a CallSS command which will be described later, the contents of the resume information are updated, and if the RSM permission flag has been set to '1b', an update is prohibited.

For example, in the example described in (A1), the resume information is prohibited from being updated with respect to the PGC including the bonus contents, whereby as the resume information recorded in the memory unit 122 of the information playback apparatus, the resume information on the specific image title interrupted in advance thereof is maintained (the details will be described later).

[Point 4]

As a countermeasure against the problem shown in (A2), as shown in FIG. 35, a program chain command table (PGC_CMDT) 51 is newly set in the program chain information PGCI, and resume sequence information is recorded. The resume sequence information described in the program chain command table (PGC_CMDT) 51 denotes a command string (a continuous connection order of commands) which is executed immediately after the menu screen returns to a PGC corresponding to the title. Before a playback is started on the basis of the resume information after the menu screen returns to the PGC corresponding to the interrupted title, it is necessary to confirm the presence/absence of the resume sequence information.

When there is not resume sequence information, a playback is started from the interrupted position on the basis of the resume information.

If there is resume sequence information, a playback is started from a point designated by the resume sequence information.

For example, as a countermeasure against the problem shown in (A2), there is set a command to rewrite "positional information of a pause in the game" into resume information in the resume sequence information recorded in the program chain command table (PGC_CMDT) 51, whereby a playback can be started from the pause of the game immediately after returning from the menu screen (the details will be described later).

A cell number serving as information denoting a position at which a playback is interrupted, address information of a navigation pack disposed at the head position of the cell, a PGC playback control situation, a VTS (video title set) number, a title number TTN in a title domain (a value of the title number is stored as a value of SPRM(4)), VTS_TTN which is a title number in the VTS in the title domain (this value is stored as a value of SPRM(5)), TT_PGCN (SPRM(6)) which is a PGC number of the title in the title domain, PTTN (SPRM(7)) which is a part of title number with respect to the title of one sequential PGC, and HL_BTNN (SPRM(8)) which is a highlighted button number in a selection state are recorded as the resume information. Not only in a case of returning to a PGC corresponding to the interrupted title from the menu picture as described above, but also in a case of changing the situation in which, for example, the highlighted positional information is changed in accordance with the information on the SPRM(8), such as a case where at least some of the resume information is changed, or the like, it is set such that the processing must be executed up to the end of the resume sequence information.

FIG. 106 shows one example of the resume processing.

The resume processing is basically carried out as follows.

(1) (In the PGC in a state in which the RSM flag is permitted) One of the CallSS command and the Menu_Call( ) operation is executed. The RSMI is updated, and the menu is played back.

(2) The JumpTT command is executed (jumping at the PGC in a state in which the RSM flag is prohibited). The PGC is played back.

(3) (In the PGC in a state in which the RSM flag is prohibited) One of the CallSS command and the Menu_Call( ) operation is executed. The RSMI is not updated, and the menu is played back.

(4) The RSM command is executed. The RSM_CMD is executed by using the RSMI, and the PGM is resumed from the interrupted place or a portion designated by the RSM_CMDs.

PGC Playback Order:

0) A resume command phase (only the PGC in the TT_DOM in which an update of the RSM information is permitted) executes a navigation command within a resume command area when a playback of the PGC is restarted as a resume playback. When a playback of the PGC is restarted as one other than the resume playback, this phase is not executed.

1) Pre-command phase

A navigation command is executed within a pre-command area.

2) Playback initializing phase

A PG playback mode which is one of a sequential playback, a random playback, and a shuffle playback is processed.
  a) A shuffle mode is initialized.
  b) Audio/sub-picture is selected by using the PGC_AST_CTLT and the PGC_SPST_CTLT.

3) Program playback phase

A program is played back in accordance with a PG playback mode.

The following steps are executed for each cell of the program.
  a) Cell playback (including EVOBU still)
  b) Cell still
  c) Cell command 4) Loop count phase A playback is restarted from a phase 3 in accordance with a PG playback mode.

With respect to the PG playback mode, refer to the PGC general information.

5) PGC still phase (only with respect to random and shuffle playbacks)

A PGC still is executed in accordance with a still time value in the PGC.

With respect to the still time value, refer to the PGC general information.

A PGC still is not set in the PGC whose PGC execution mode is a sequential playback.

6) Post-command phase

A navigation command is executed within a post-command area.

7) Next link phase

When Next_PGCN is valid, the routine proceeds to execution of the PGC by the Next_PGCN, and otherwise, the routine proceeds to be in a Stop State.

With respect to the Next_PGCN, refer to the PGC general information.

Annotation 1: The phase 2 to phase 5 configure a playback control block.

Annotation 2: At all the steps of the phases other than the step a) of the phase 3), the step b) of the phase 3), and the phase 5), The execution times except for that at the step c) of the phase 3) are 0. At the step c) of the phase 3), the execution time is less than or equal to 0.5 second.

A navigation timer and general parameters in a counter mode are frozen.

A user operation is not executed. Practically, the operation is postponed until the step a) of the phase 3) or the phase 5).

Annotation 3: The respective phases are executed only when related information are described in the PGCI.

[Management Information Recording Place]

Figure 23:
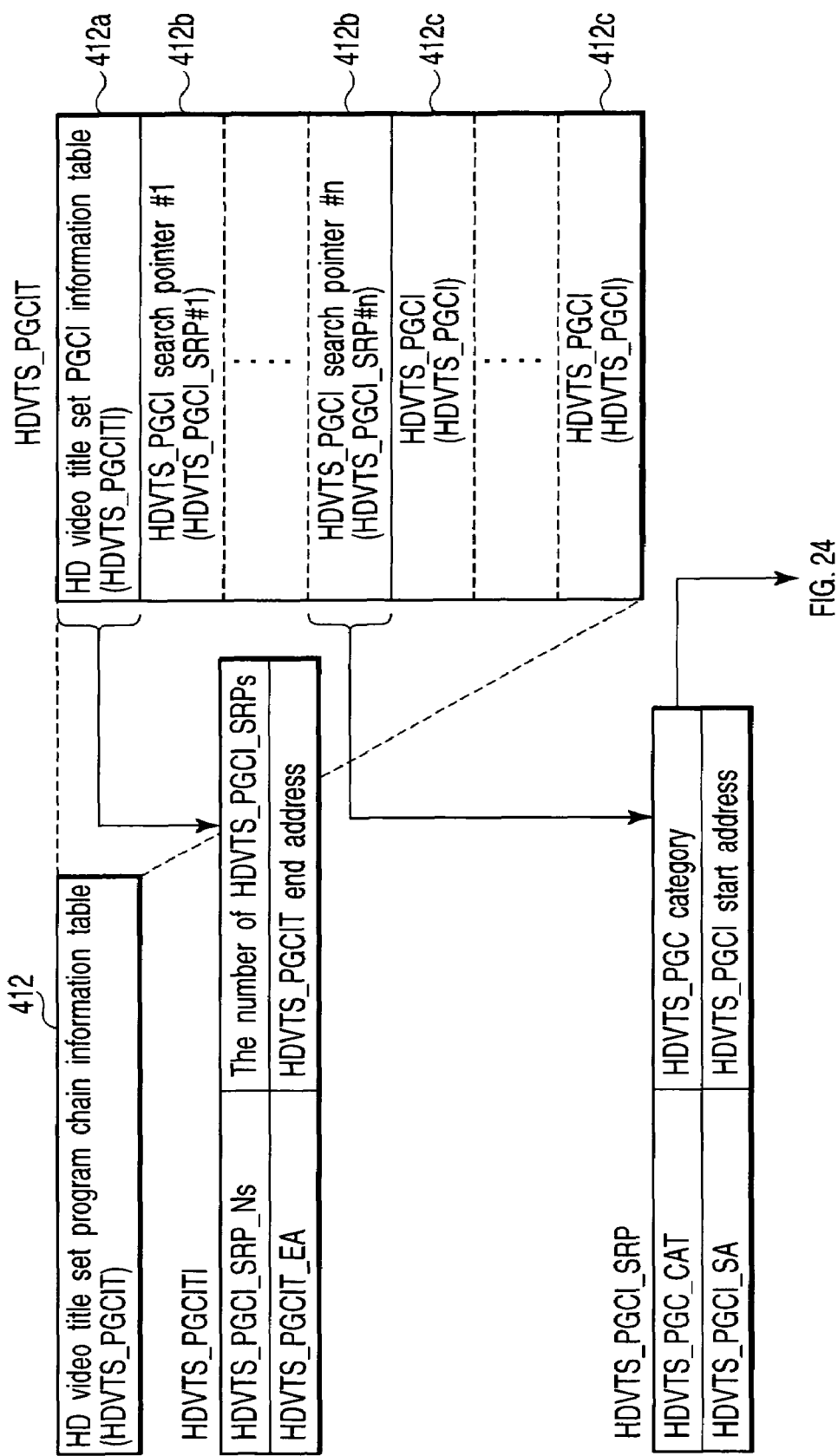
FIG. 23 is a diagram showing a data structure in an HD video title set program chain information table (HDVTS_PGCIT) 412 shown in FIG. 20.

With respect to a place for disposing information which manages the resume information, in the first embodiment, an RSM permission flag (an update permission flag for the resume information) is provided in the HDVTS_PGC category (HDVTS_PGC_CAT) in a HDVTS_PGCI search pointer 412b in the HD video title set program chain information table (HDVTS_PGCIT) 412 as shown in FIG. 23.

Figure 33:
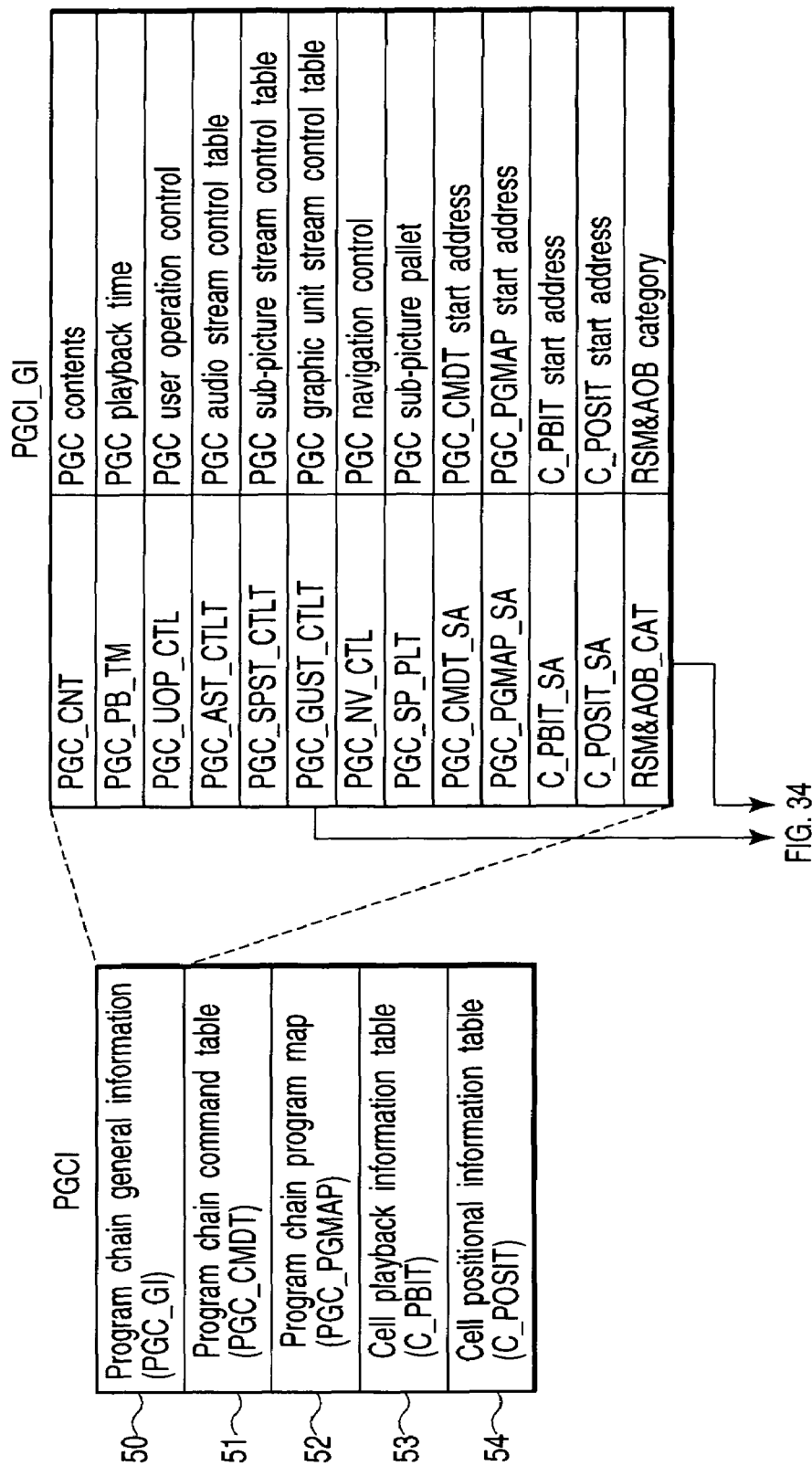
FIG. 33 is a diagram showing a data structure in program chain information PGCI.
Figure 34:
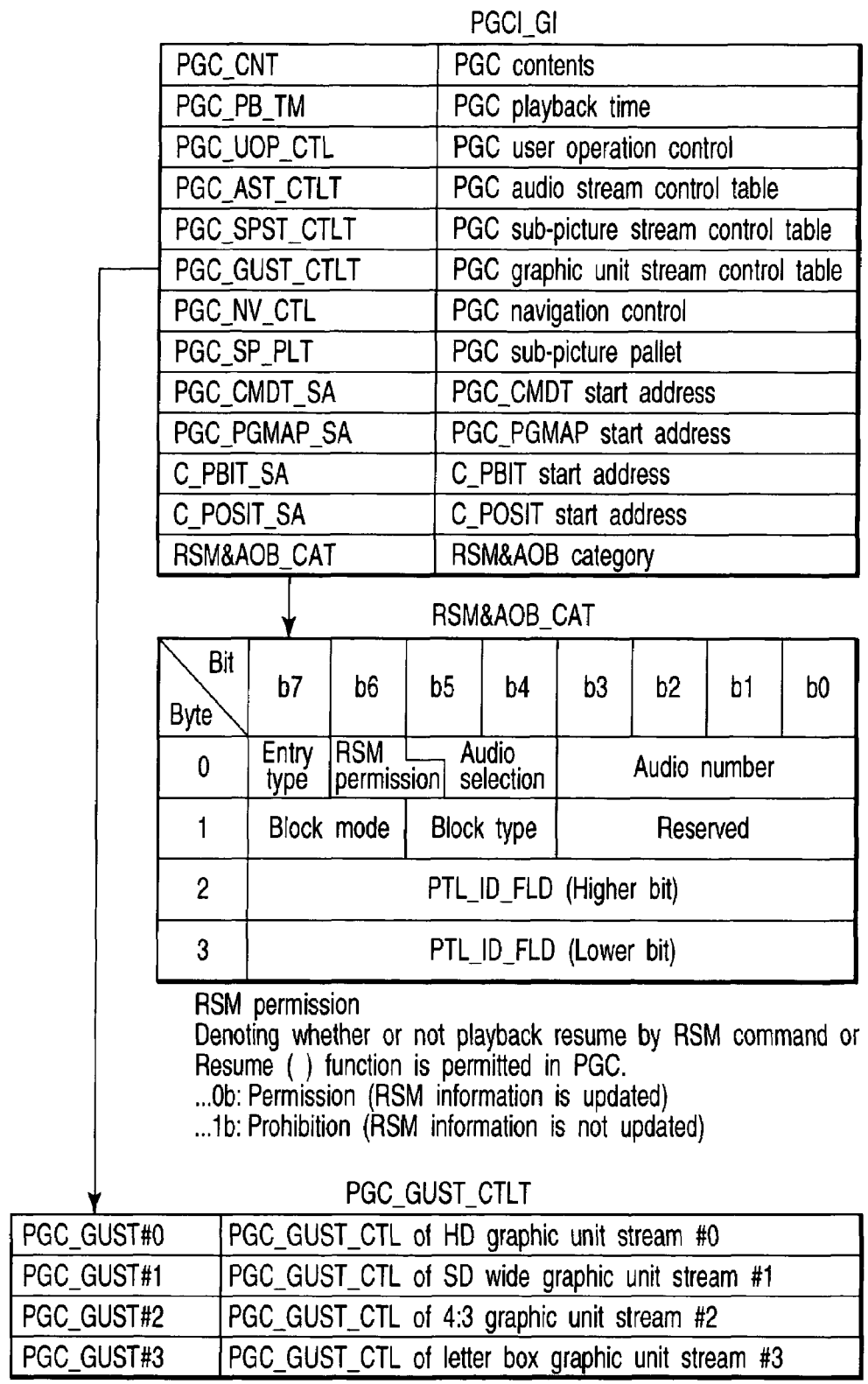
FIG. 34 is a diagram showing a data structure in program chain general information PGCI_GI in the program chain information PGCI.

Further, in another embodiment (second embodiment), as shown in FIGS. 33 and 34, an RSM permission flag (an update permission flag for the resume information) is provided in RSM&AOB category (RSM&AOB_CAT) in program chain general information (PGC_GI) 50.

With respect to the resume sequence information denoting a command string (a continuous connecting order of commands) which is executed immediately after returning to the PGC of the title, which is shown in [Point 4] relating to the feature (A) for solving the problem of (A2), RSM commands (RSM_CMD) 514 are disposed in serial order as a resume (RSM) command sequence in the program chain command table (PGC_CMDT) 51 as shown in FIG. 35. Further, RSM_CMD_Ns which is numerical information on the RSM commands (RSM_CMD) 514 disposed in the program chain command table (PGC_CMDT) 51 are, as shown in FIG. 36, recorded in program chain command table information (PGC_CMDTI) 510.

[Management Information Contents]

An RSM permission flag denotes whether or not the contents of the resume information are updated at the stage of starting a playback of a corresponding HDVTS_PGC (whether or not the resume information is sequentially updated in accordance with a playback situation of a corresponding PGC). Namely, when the above-described flag is '0b', the resume information is updated, and when the flag is '1b', the resume information is not updated, and processing of maintaining the information which has been interrupted to play back of the HDVTS_PGC (corresponding program chain in the video title set of the present invention) which has been played back previously is carried out.

Figure 36:
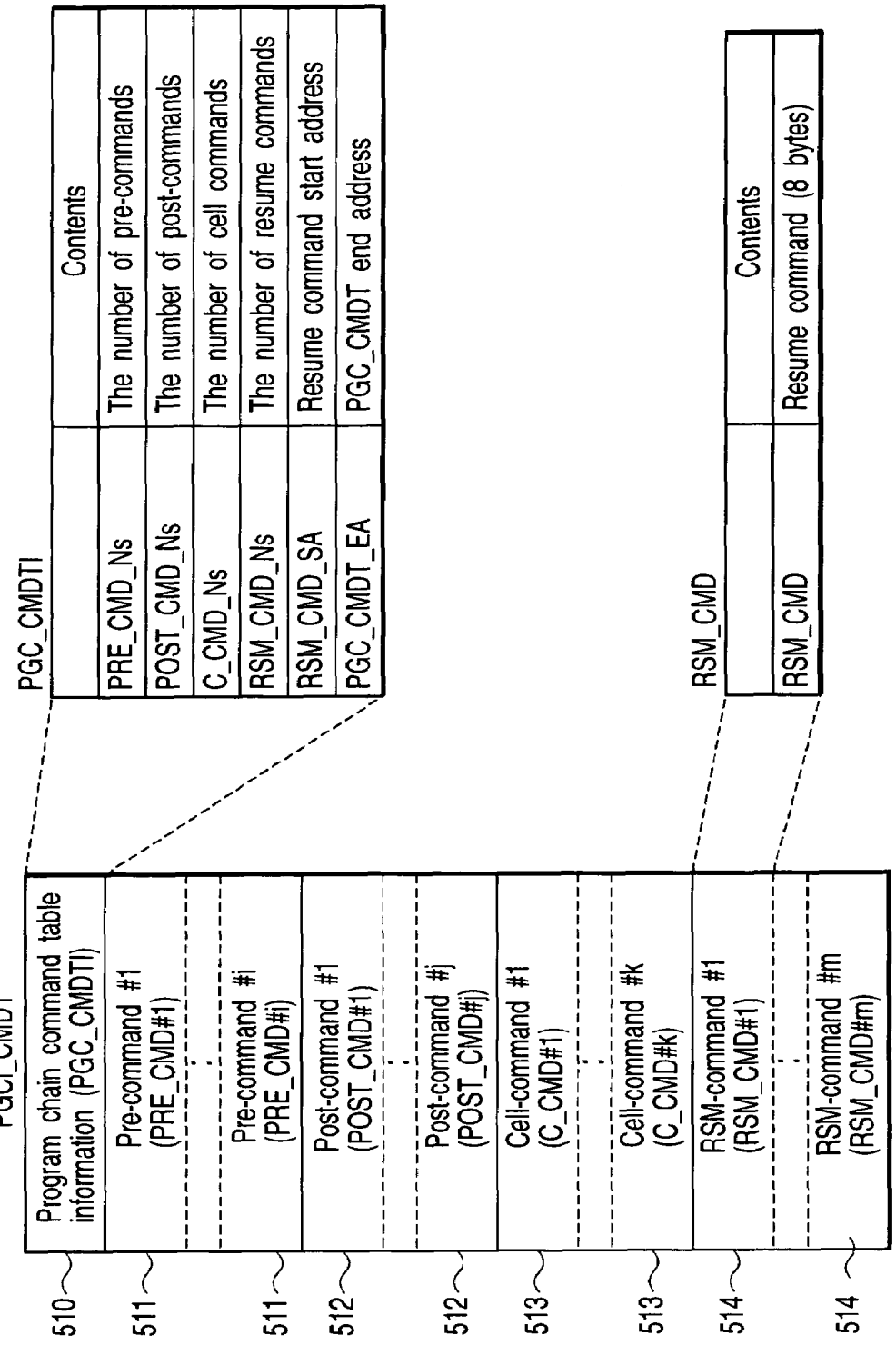
FIG. 36 is a diagram showing data structures in program chain command table information PGC_CMDTI and a resume command RSM_CMD in the program chain command table PGCI_CMDT shown in FIG. 35.

With respect to the concrete data structure in the RSM command (RSM_CMD) 514, an area of "8 bits" is allocated to each command as shown in FIG. 36, and the command contents is recorded in the area of "8 bits".

(B) Display-oriented Language Setting

[Point 1]

In order to solve the problem shown in (B1), the invention is configured such that a screen on which a menu description language code can be set in the contents can be provided. Concretely, it is configured to enable setting of a menu description language code on a first play PGC (FP_PGC) which can be initially displayed immediately after inserting an information storage medium. In order to correspond to the contents in which a menu description language code can be set by a selection on the screen by a user, it is configured that the FP_PGC may have one VOB (Video Object), and the VOB can be used for a language selection menu. When the contents support only one language, or in a case of the contents which automatically inherit a value of the current menu description language code, there are cases where the FP_PGC does not have VOBs for the menu screen. As an example of the contents which automatically inherit a value of a menu description language code, there is an embodiment in which a value of an SPRM(0) which the information playback apparatus has and languages which the HD DVD video contents support are automatically compared, and when the both are coincident, the menu description language code is made to match thereto. In this case, the information on the resume sequence information which is a command processing sequence which automatically compares is recorded in the first play program chain information (FP_PGCI: FIG. 4) which is the management information relating to the FP_PGC.

Moreover, as a restrictive condition for the FP_PGC, it is configured such that one or zero cell can be provided (when there is a VOB, one cell is specified, and in a case of the contents without a screen for selecting a menu description language code, there is no VOB, and thus, no cell is included in the FP_PGC so as to correspond thereto. Further, in this FP_PGC, only a program sequential playback is permitted, and a parental block structure and a multi-scene structure are prohibited. Moreover, the use of only one (one or zero) audio stream is permitted as a stream which can be used in the FP_PGC, and the use of a sub-picture stream is prohibited, and instead, the use of a graphic unit GU which will be described later is introduced.

Therefore, in the embodiment of the invention, there is no need to prepare a screen on which menu description language codes are respectively selected so as to correspond to a plurality of menu description language codes, so that the authoring operation at the time of preparing contents is simplified. As a result, an authoring operation time is shortened, which enables a selling price of the contents to be reduced.

The program chain information (PGCI) is navigation data for controlling a display of the PGC. Although the PGC basically consists of PGCI and EVOBs, there are PGCs consisting of only PGCI without EVOB. A PGC consisting of only PGCI determines a display condition, and is used for transferring the display to another PGC. PGCI numbers are allocated in order from '1' with respect to PGCI search pointers in VMGM_LU, VTSM_LU, and VTS_PGCIT. PGC numbers are the same as those of PGCI. Even if the PGCs have a block structure, PGCNs in the block are coincident with the sequence numbers in the PGCI search pointers.

The PGCs are classified into four types in accordance with domains and purposes. The structure composed of only PGCI and the structure composed of PGCI and EVOB can be applied to a first play PGC (FP_PGC), a video manager menu PGC (VMGM_PGC), a video title set menu PGC (VTSMPGC), and a title PGC (TT_PGC). The PGC described in an FPDOM domain in a VMG space is an FP_PGC, and only one PGC exists. There are following restrictions to the FP_PGC.

1) A case where no cell exists in one EVOB and a case where a plurality of cells exist in one EVOB are permitted.

2) In a PG playback mode, only a "program sequential playback" is permitted.

3) A parental block is not permitted.

4) A language block is not permitted.

An FP_PGCM_EVOB is an enhanced video object EVOB for use in selection of a menu language. A VMGM_EVOBS is a set of enhanced video objects EVOBs used for a menu for supporting a volume access. An EAOBS is a set of elementary audio objects used for background music and the like.

The PGCs are classified into four in accordance with describing places and purposes. Here, a first play PGC (FP_PGC) described in the VMG is automatically executed in order to play back an FP_PGC menu (if it exists) with a set of initial conditions at the time of first access to a disk.

The system menu is classified in accordance with domains to be described, and the language menu described in the FP_DOM selects a language of the menu displayed on the menu in the language unit.

[Point 1-1]

Next, a modified example relating to the menu will be described.

The menu is a display image including selection items (buttons). The system menu is a menu determined in advance with respect to specific user operations. Menus freely prepared by a contents provider are recorded for each title. Buttons for a menu are prepared from graphics, button patterns, or highlighted information in a graphic unit. Commands which are executed at the time of being decided by a user are described on the buttons. The system menus exist in various domains. A system menu existing in an FP_DOM is a language menu, and selects a menu language displayed on the menu in the language unit. There is no function of accessing the language menu in the FP_DOM by user operations. However, this menu is automatically played back at the time of playing back a first play PGC.

The language menu in the FP_DOM has the following features.

1) FP_PGC has a language menu FP_PGCM_EVOB used for only a language selection.

2) When a language is determined by this language menu, languages (codes) are used in order to select language units in a VMG menu and respective VTS menus.

Figure 77:
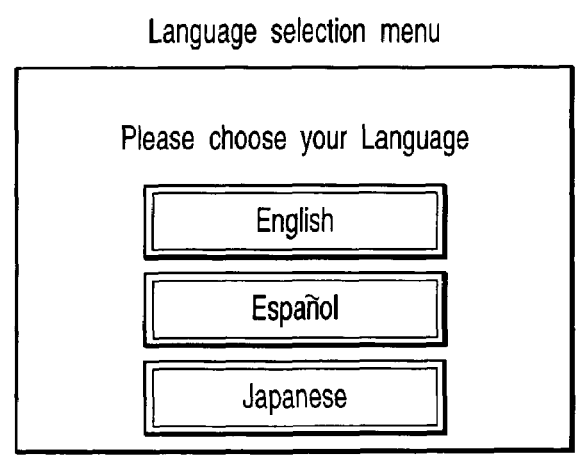
FIG. 77 is a diagram showing a language selection menu.

One example of a menu for language selection is shown in FIG. 77.

[Point 2]

In order to solve the problem shown in (B1), a SetM_LCD command is newly defined as will be described later. The value of the SPRM(0) can be changed by the SetM_LCD command. This SetM_LCD command is included in a command area of a SetSystem as will be described later, and can be used only in an FP_PGC. As the concrete command contents, the value of the SPRM(0) is set as a language code on the basis of general parameters or a specific value which can be designated in the SetM_LCD.

[Point 3]

In order to solve the problem shown in (B2), an SPRM(21) is newly set as a place in which the menu description language codes in which only the user can change the settings, and which are impossible to change by a command are stored so as to maintain menu description language codes set by a user, and the positioning of the SPRM(0) which has conventionally existed is varied to some extent. Namely, the SPRM(21) is newly defined as a storage place for initial menu languages serving as parameters set in the information playback apparatus. This SPRM(21) is a player setting language whose setting can be change only by a user, and it is impossible to change by a command in a program in the contents.

Then, the positioning of the SPRM(0) is changed to a place in which "a current menu language in process of playback" is stored. The SPRM(0) can correspond to the both cases where the settings are changed by a user and the settings are changed by a command in the contents. As a result, even if the SPRM (0) is changed by a command described in (B2), the menu description language code set by the user can be maintained, and unpleasantness and an unnecessary burden onto the user can be avoided.

[Specific Explanation of the Relationship Between SPRM(0) and SPRM(21)]

In order to explain the relationship between the SPRM(0) and the SPRM(21), one example of operations immediately after inserting an information storage medium into the information playback apparatus (player) is shown. Before executing processing of the first play PGC (FP_PGC), first, a value of the initial menu language SPRM(21) which is a menu description language code initially set in the information playback apparatus by the user is copied to the SPRM(0).

When there is a SetM_LCD command in the FP_PGC, the value of the SPRM(0) can be changed according to the command. However, in order to avoid the problem of (B2), the value of the SPRM(0) is desirably maintained to be the value copied from the SPRM(21). If the SPRM(0) is rewritten into a value different from that of the SPRM(21) by a SetM_LCD command in the contents recorded on the information storage medium, the value of the SPRM(21) is maintained. Accordingly, when another information storage medium is mounted next, the value of the SPRM(0) is automatically rewritten into the value of the SPRM(21), and therefore, the problem of (B2) can be avoided after mounting the next information storage medium. For example, when there is no VOB for a menu in the FP_PGC, and there is a menu for language selection in the HD video manager menu language unit (HD-VMGM_LU) 312 shown in FIG. 6, the HD video manager menu language unit (HDVMGM_LU) 312 corresponding to the above-described value of the SPRM(0) is selected. The value of the SPRM(21) can be changed strictly only by the user at a stage where the operation of the information playback apparatus is stopped. However, even when the value of the SPRM(21) is being rewritten by the user, the value of the SPRM(0) is not rewritten simultaneously, and is maintained as the former value is.

[Parameter Information Recording Place in the Information Playback Apparatus]

An area in which the system parameters SPRM from '0' to '21' are stored is allocated to the inside of the memory unit 122 in the system block diagram in the information playback apparatus shown in FIG. 48. Current menu language code information in process of playback is recorded in the SPRM (0), and initial menu language code information is recorded in the SPRM(21).

[Object Information Recording Place]

As shown in (e) of FIG. 1, a screen on which a menu description language code can be set is recorded on an area of a first play PGC language selection menu VOBS (FP_PGC-M_VOBS) 35. Further, this object information (video data) is, as shown in FIG. 2, made to be independent as a separate file named HD_FPPGC.HDV.

[Management Information Recording Place]

As shown in FIG. 4, management information for the menu for language selection by which a menu description code can be set are recorded in the first play PGCI (FP_PGCI) in the HD video manager information management table (HD-VMGI_MAT) 310.

[2] Part where the contents expressive power with respect to a user is insufficient (C) Seamless playback of still picture content

[Point 1]

Seamless connection between movie contents is guaranteed in conventional DVD contents as well. Accordingly, the feature is in the point that, in order to solve the above-described problems shown in (C1) and (C2), the contents of the VOB of a VOBS (Video Object Set) on which a still picture content has been recorded are defined as the image as a VOBS on which a movie content has been recorded, whereby seamless connection from a still picture content and a movie content (C1) and a multi-angle playback of a still picture content (C2) can be guaranteed in the same way as a conventional seamless connection between movie contents.

[Point 2]

A specific method of realizing the concept of [Point 1] will be described hereinafter. The feature is in the point that, in order to apply an extended system target decoder (E-STD) model for guaranteeing a seamless playback, an "imaginary access unit" is set in a period during an I picture on which a still picture content has been recorded. As a method of setting the access unit, time-sharing is imaginarily and minutely carried out at each period of an access unit with respect to an interval between an I picture from which a still picture content is started and the following I picture in unit of period of a video frame, or of period of integer multiples of a video frame, in the embodiment. Then, the information playback apparatus is imaginarily considered that a still picture content is repeatedly played back to display for each imaginary access unit. A decoding time stamp (DTS) denoting timing in which a still picture content is input into a decoder and a presentation time stamp (PTS) denoting timing in which a still picture content is displayed have been set in advance in each still picture content. Because one video frame period is determined in the NTSC (National Television System Committee) system and the PAL (Phase Alternation by Line) system, the timings of boundary positions among "imaginary access units" can be easily calculated. In this way, the problem of (C1) can be solved by setting an access unit to a still picture content as well. Namely, the value of the STC set in the separation unit 103, the video decoder unit 111, the sub-picture decoder unit 112, and the audio decoder unit 114 which are shown in FIG. 48 is switched at the boundary position of the access unit, so that a seamless connection playback from a still picture content to a movie content is made possible.

Provided that a seamless playback connection from a still picture content to a movie content is guaranteed, not only the user can comfortably appreciate the contents, but also the contents provider can improve the expressive power with respect to the user. Further, a seamless connection playback from a still picture content to a movie content is made possible only by imaginarily changing a definition without substantially changing the object structure of the conventional DVD video. Consequently, the authoring tool of the conventional DVD video can be mostly utilized, which can suppress a rise in medium price at the time of manufacturing the invention as products.

[Point 3]

As one of points for solving the problem of (C1), the regulations (restrictions) for the VOBU including a still picture content are amended as follows in accordance with the content of [Point 2]. Namely, the setting is imaginarily carried out such that one VOBU is composed of an integer of the "imaginary access unit". As a result, a display period of a VOBU of each still picture content is integer multiples of a video frame. Because timing of switching from a still picture content to a movie content is always coincident with the boundary timing of a video frame due to the regulations (restrictions) as described above, the screen can be prevented from being disturbed at the time of switching (because the screen is not displayed with interlaced field, but can be displayed with frames whose gaps are filled up), and the screen directly before and immediately after switching can be distinctly displayed.

There is one I picture denoting a still picture content in a video access unit (VAU), and no I picture is included in an imaginary video access unit (IVAU), and thus, there is no video data in the IVAU. Only one I picture exists in a VOBU consisting of VAU1 to IVAU 15, and a VOBU consisting of VAU 16 to IVAU 30. The embodiment of the invention regulates (restricts) to prohibit from providing a plurality of I pictures in a same VOBU, and to always provide one or zero I picture in one VOBU. Further, because a sequence end code is disposed in the rear of an I picture in accordance with the standard of MPEG2, it is regulated (restricted) so as to always provide one sequence end code in a VOBU including an I picture as described above (i.e., such that an I picture and a sequence end code are not divided in separate VOBUs, but the both are always included in a same VOBU).

In addition, it is structured such that a VAU is always (imaginarily) disposed in front of an IVAU in a same VOBU. The (imaginary) structure in which a VAU is disposed at the head position in a VOBU as described above makes it possible to decode an I picture in a VAU at a high speed when switching from a movie content to a still picture content is carried out, and seamless playback from the movie content to the still picture content is made possible.

Video data (I picture) is not included in a VOBU consisting of IVAU30 to IVAU45. It is also possible to define a VOBU without any video data inside.

[Point 4]

As means for solving the problem of (C2), an IVAU is imaginarily defined with respect to a still picture content object, and it is made possible to dispose still picture content data (still picture content object) in an interleaved unit (ILVU) by the following method. Namely, as described in (C2), the restriction of "It is prohibited from disposing a sequence end code at video data in a cell configuring an interleaved block (ILVB)" in the existing DVD video is eased. Then, the restriction is imposed that it is structured such that, when a VOB is used in an ILVU, a playback period in one VOBU is made integer multiples of a video frame with respect to a VOB having one or more sequence end codes, and such that only one I picture is provided or there is no video data in each VOBU. Moreover, one sequence end code is provided in a VOBU including an I picture, and video data (an I picture on which a still picture content has been recorded) is always provided to the first VOBU in an ILVU. An access is always made to the head position of the ILVU immediately after switching an angle by a user instruction or the like. Thus, by always providing video data to the first VOBU in the ILVU, it is possible to shorten a time up to the time of displaying a still picture content at the time of switching an angle.

[Object Information Recording Place]

Still picture content data in which the imaginary access unit is defined is recorded in a title video object area (HDVT-STT_VOBS) 43 in (f) of FIG. 1. Further, this area configures a VTS00102.HDV file.

[Management Information Recording Place]

Management information for managing the still picture content data in which the imaginary access unit is defined exist in an HD video title set information area (HDVTSI) 41 in (f) of FIG. 1, and this area is brought together in a VTGS00100.IFO file in FIG. 2. As described above, because a period of an access unit is imaginarily set by carrying out time-sharing imaginarily and minutely in unit of period of a video frame, or a period of integer multiples of a video frame, an actual boundary position of an imaginary access unit is calculated by computation.

(D) Seamless Playback of Cells including Cell Commands

[Point 1]

In contrast to the fact that a seamless playback between cells having cell commands is not guaranteed in a conventional SD DVD video, the feature is in the point that "a seamless playback between cells is guaranteed also for cells executing cell commands in a case of having no branchpoint such as a multi-angle or the like". Namely, unless the contents have branchpoints such as a multi-angle or the like (in a case of executing a cell command as well) in a video playback, a video playback of the following cell is started as continuous as possible. As means for enabling that, a physical disposition of the contents or the like is contrived so as to start a playback of the following cell within 0.5 seconds after a playback of the former cell is completed.

[Point 2]

Further, with respect to a part at which a seamless playback between cells is guaranteed also for cells executing cell commands, the following is specified in the management information of the object (video data). Although not illustrated, a seamless flag, an interleaved disposition flag, an STC discontinuous flag, and cell playback mode information exist in cell category information C_CAT in cell playback information (C_PBI) 530 shown in FIG. 38.

With respect to a part at which a seamless playback between cells is guaranteed also for cells executing cell commands, "cells must be seamlessly played back" is set with respect to the seamless playback flag; "there exists in a continuous block" is set with respect to the interleaved disposition flag; "there is no need to reset STC" is set with respect to the STC discontinuous flag; and "Continuously play back" is set with respect to the cell playback mode.

[Point 3]

In a conventional SD DVD video, one command is selected from a set of cell commands and is executed at the time of completing a playback of each cell. However, the aforementioned restriction is abolished, and the execution of a cell command is not necessarily carried out at the time of completing a playback of a cell. Further, the cell command execution for one cell is not limited to one command, and a plurality of commands can be sequentially executed. Namely, as shown in FIG. 38, an HD DVD video has cell command start number information (C_CMD_SN) and cell command continuous number information (C_CMD_C_Ns) in the cell playback information. (C_PBI) of the management information for one cell.

As shown in FIG. 35, cell commands (C_CMD) 513 are disposed in the program chain command table (PGC_CMDT) 51. The cell command start number information C_CMD_SN denotes what number cell command from the top among the plurality of disposed cell commands (C_CMD) 513 a command is executed from, and the cell command continuous number information (C_CMD_C_Ns) denotes how many commands are continuously executed from the cell sequentially.

(E) Countermeasure against Unmatched Highlighted Information and Sub-picture

[Point 1]

In order to solve the problem of (E1), an independent stream called a "graphic unit" is newly defined, and both of highlighted information and graphic data (which a "sub-picture" conventionally has had) are provided in the graphic unit, and they are separated from the sub-picture information. Consequently, as described in the above-described (E1), the contents manufacturer can prepare contents as his image is regardless of a display period of the sub-picture information, and the degree of freedom is improved, which can provide a variety of contents to the user.

Further, as a graphic unit, five types respectively corresponding to a 16:9 HD picture, a 16:9 SD picture, a 4:3 SD picture, a letter box SD picture, and a pan-scan SD picture can be set, and five types of sub-stream IDs can be set so as to correspond to the respective types.

In conventional SD DVD video contents, highlighted information is recorded in a PCI recording area in a navigation package, and in contrast thereto, in HD DVD video contents in the embodiment of the invention, the position of recording the above-described highlighted information is moved into the graphic unit GRU, and 24 buttons can be simultaneously set at the maximum in one screen. Further, 256 colors can be designated at the maximum with respect to each button, and a color can be changed by highlighting at the time of selecting. Moreover, mixing in contrast due to the gradations in 256 colors can be expressed at the maximum.

FIG. 84 shows the contents of playback control information PCI. The PCI is navigation data for controlling a playback of an EVOB unit EVOBU, and is composed of three data of PCI_GI: PCI general information, NSML_AGLI: non-seamless angle information, and RECI: recording information. A player does not see reserved. The PCI is described in a PCI packet PCI_PKT in a navigation pack NV_PCK. The contents are updated for each EVOBU. Conventionally, there is an HLI in the navigation pack. In the present embodiment, the HLI is moved into the graphic unit, the HLI in the navigation pack is reserved, and recording of HLI information is prohibited (because the apparatus does not operate normally when there are HLIs in the both, recording of HLI information is prohibited in the PCI). FIG. 84 shows a data structure of the PCI existing in a navigation pack a3 shown in (c) of FIG. 39. In the existing DVD Video standard, HLI exists in a reserved area in FIG. 84. In FIG. 84, however, the area is reserved, and recording of HLI information is prohibited. Accordingly, HLI information can be recorded only in a graphic unit, and the easiness in management/control is ensured.

[Point 2]

In order to solve the problem shown in (E2), in place of increasing the number of color schemes with respect to a conventional sub-picture stream, the number of color schemes which can be used with respect to the graphic data in the above-described "graphic unit" is made to be 256 colors (color expression in 8 bits). As a result, it is possible to display a graphic unit picture with vivid colors to the user, so that the display impact to the user is improved, and it is easy for the user to select a menu.

[Point 3]

In order to solve the problem shown in (E3), graphic data and mask data are provided in the above-described "graphic unit", and the display patterns of the both are made to be set to be bit map forms, so that arbitrary forms can be set. As a result, a star-shaped or an elliptical highlighted information designating area (an arbitrary button shape) can be prepared, and a screen which is more impressive by far than a conventional SD DVD contents can be provided.

[Point 4]

In order to solve the problem shown in (E4), mask data are provided in the above-described "graphic unit", and a plurality of areas (hot spots) separated from one another in the screen can be simultaneously set as the mask data. Namely, it is structured such that the masking data can be set so as to be overlapped with respect to each button of the highlighted information. As a result, the screen is not so bad in comparison with a PC screen on which a same URL can be set to a plurality of areas separated from one another in the screen, or a homepage screen on Internet, so that a menu screen which is easy for the user to use can be provided.

[Point 5]

Graphic Stream

An enhanced video object (EVOB) includes some of playback data and navigation data. The navigation data included in the EVOB is playback control information PCI and data searching information DSI. The playback data is video data, audio data, and sub-picture data. The EVOB is a set of EVOBs. The EVOB is divided into cells consisting of EVOBUs. The EVOBU includes a navigation pack, an audio pack, a video pack, a graphic pack, and a sub-picture pack.

A graphic stream is completed in the EVOB. The last PTM of the last graphic unit (GRU) is less than or equal to a time of describing in EVOB_V_E_PTM. A graphic playback is valid only in a cell in which a GRU has been recorded. The PTM of the initial GRU is greater than or equal to a time of describing in EVOB_V_E_PTM. The PTM in any GRU inside the graphic stream is greater than a PTM of the former GRU. Note that the definition of "being completed" is 1) a start of each stream begins from the initial data of each access unit, and 2) an end of each stream is uniform in each access unit. Accordingly, when a pack length including the last data of each stream is less than or equal to 2048 bits, the length is adjusted.

[Object Information Recording Place]

Graphic units can be recorded in the following four areas.

(1) Being brought together in the HD_FPPGC.HDV file in FIG. 2 in the area of the first play PGC language selection menu VOBS (FP_PGCM_VOBS) 35 in (e) of FIG. 1.

(2) Being brought together in the HD_VMG01.HDV file of FIG. 2 in the area of the menu video object area (HDVMGM_VOBS) 32 in (e) of FIG. 1.

(3) Being brought together in the VTS00100.HDV file of FIG. 2 in the area of the menu video object area (HDVTSM_VOBS) 42 in (f) of FIG. 1.

(4) Being brought together in the VTS00100.HDV file or the VTS00102.HDV file of FIG. 2 in the area of the title video object area (HDVTSTT_VOBS) 43 in (f) of FIG. 1.

[Data Structure in Object Information]

As shown in (d) of FIG. 39, the graphic units are separately recorded in the streams of the five types respectively corresponding to a 16:9 HD picture, a 16:9 SD wide picture, a 4:3 SD picture, a letter box SD picture, and a pan-scan SD picture.

Figure 41:
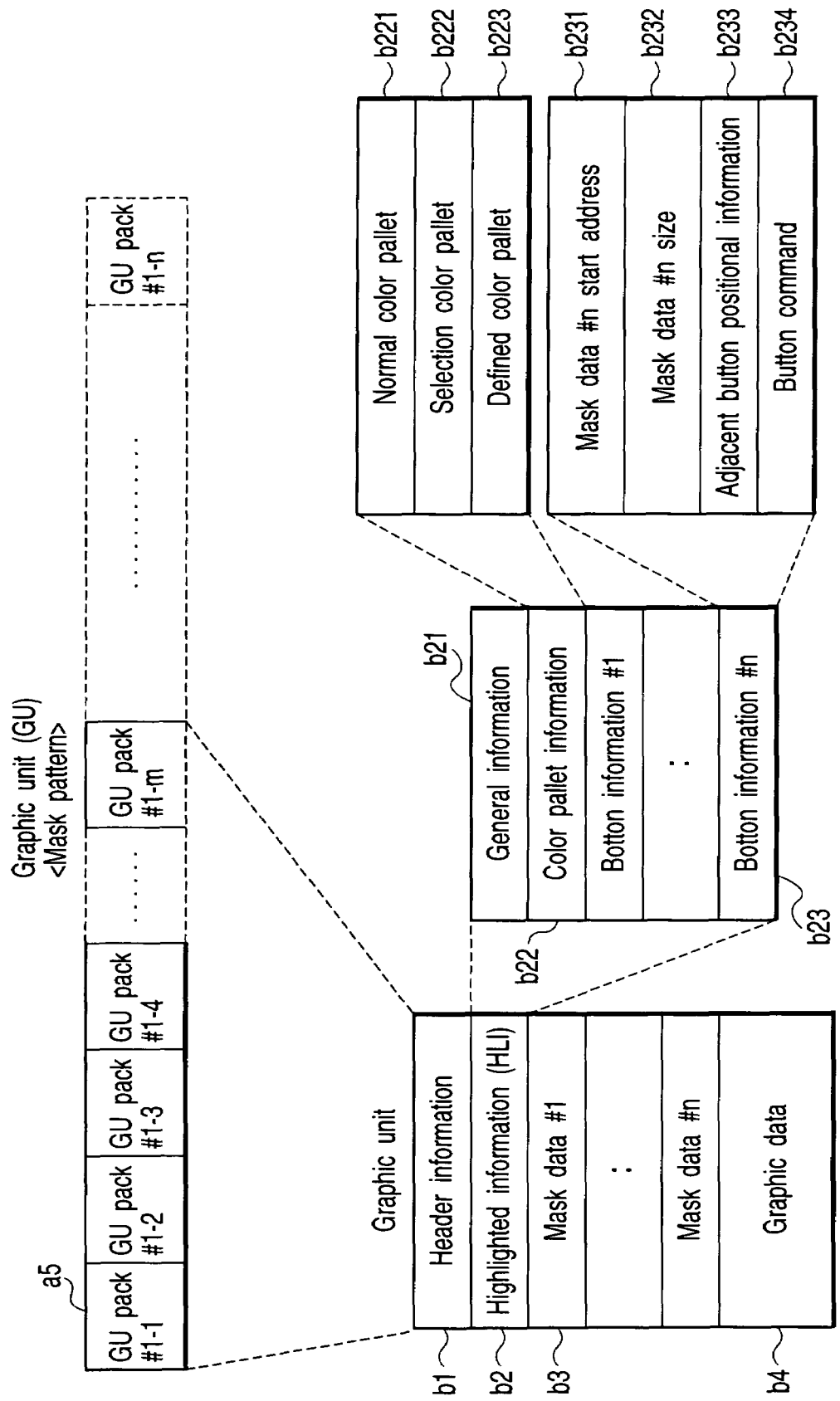
FIG. 41 is a diagram showing one example of a data structure of a graphic unit GU having mask data.

Further, as shown in FIGS. 41 and 42, the inside of the graphic unit GU is composed of highlighted information (HIL) b2, mask data b3, and graphic data b4.

[Management Information Recording Place]

Control information relating to the streams of the graphic units disposed in the PGC are provided in the PGC graphic unit stream control table PGC_GUST_CTLT in FIGS. 33 and 34.

[Management Information Contents]

As management information relating to the graphic units included in the menu of the HD video manager, the information of the number of graphic unit streams HDVMGM_GUST_Ns and the HDVMGM graphic unit stream attribute information HDVMGM_GUST_ATR are provided in the HD video manager information management table (HDVMGI_MAT) 310 as shown in FIG. 4.

Further, as management information relating to the graphic units included in the HDVTS (HD video title set), as shown in FIG. 21, information of the number of graphic unit streams and attribute information are respectively recorded as information of HDVTSM_GUST_Ns, HDVTSM_GUST_ATR, HDVTS_GUST_Ns, and HDVTS_GUST_ATRT so as to be divided into a menu screen and a title (display image) in the HDVTS.

The information in the PGC graphic unit stream control table PGC_GUST_CTLT in which the control information relating to the streams of the graphic units disposed in the PGC are recorded are, as shown in FIGS. 33 and 34, respectively recorded in separate areas so as to correspond to respective pictures of four types (a 16:9 HD picture, a 16:9 SD picture, a 4:3 SD picture, and a letter box SD picture).

(F) Audio data playback at the time of switching the menu screen

[Point 1]

In order to solve the problem shown in (F), a characteristic audio data storage place corresponding to a menu is set. At the same time with a time of starting a playback of a PGC displaying a menu, a playback display of the characteristic audio data is started. Further, at the same time when a playback of a PGC (for example, of a VTS) in which there is no need to play back audio data such that a series of menu displays is completed is started, a playback display of audio data is stopped. The audio data is copied into the memory unit 122 of FIG. 48 in advance of a menu display, and during the period when the user is displaying menus so as to be transferred, the audio data copied in the memory unit 122 are sequentially repeatedly continued to play back. The maximum capacity of audio data which can be copied in the memory unit 122 is set to 8 MB. When a transfer rate of compressed audio data is, for example, 384 Kbps, provided that the maximum capacity is 8 MB, it is possible to store audio data corresponding to 2.5 minutes.

[Point 2]

The feature is in the point that audio data selecting designation information is provided in PGCI which is the management information for a PFC such that it is possible to instruct to select and designate among the audio data recorded in the VOBS for video existing in a conventional SD DVD video and the characteristic audio data as shown above. As a result, the contents provider can designate selection of audio data which is continuously played back even when a menu is switched, and audio data set to the optimum for each menu, and the expressive power of the contents provider with respect to the user is improved.

[Point 3]

Figure 19:
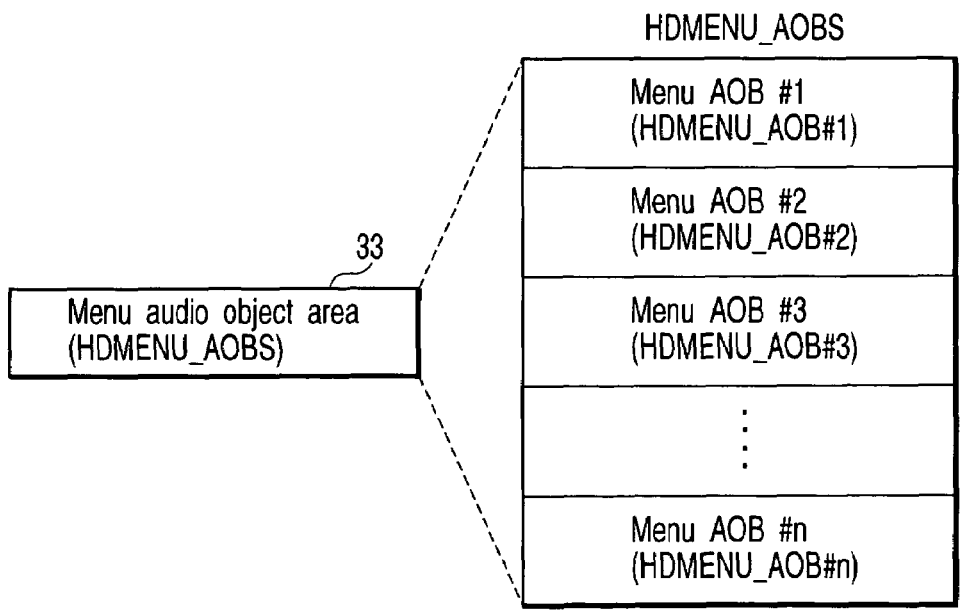
FIG. 19 is a diagram showing a data structure in a menu audio object area (HDMENU_AOBS)
Figure 56:
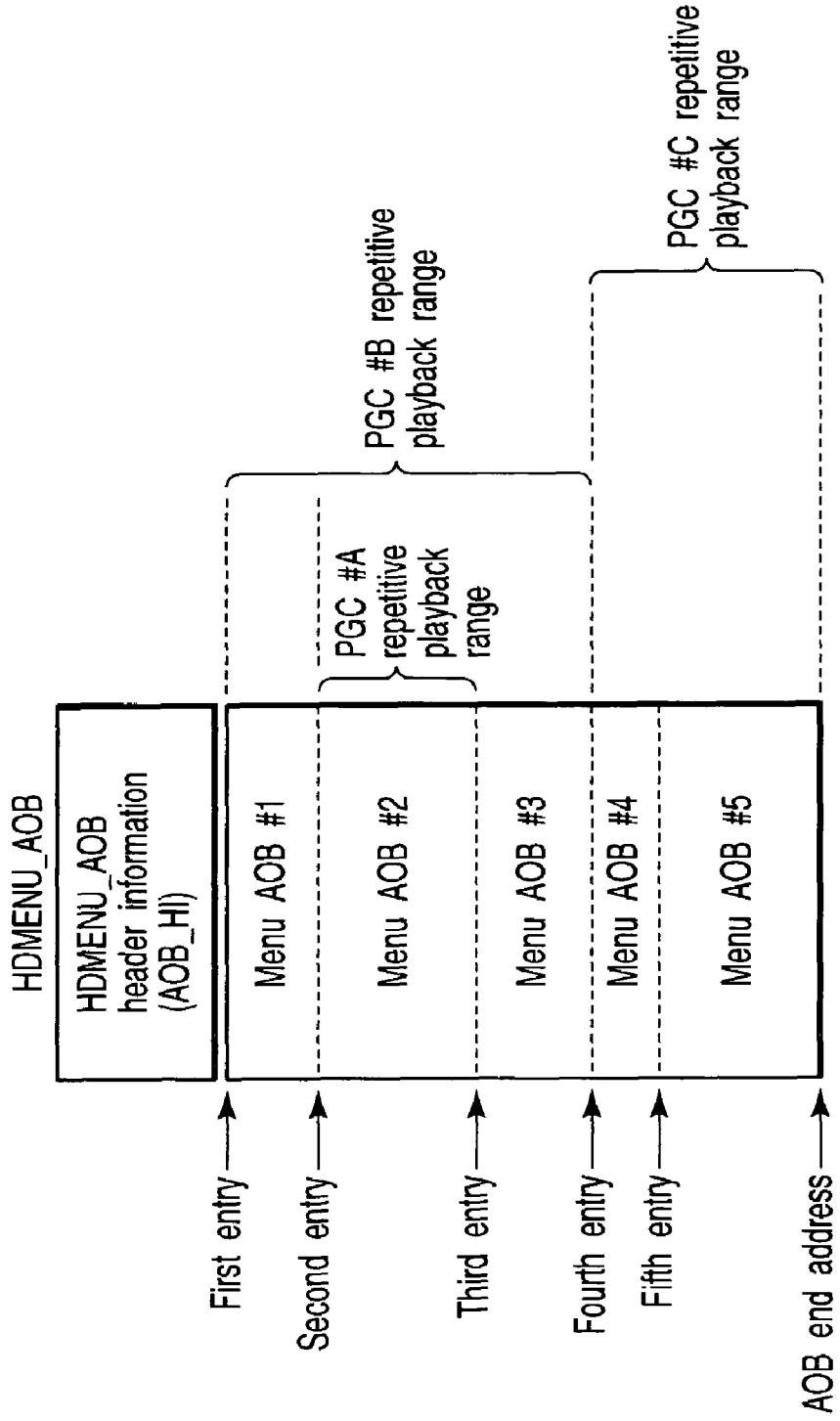
FIG. 56 is a diagram showing another example relating to the data structure in a menu audio object area (HDMENU_AOBS) 33 shown in FIG. 19.

In place of recording a plurality of AOB#1 to #n for menus in a menu audio object area (HDMENU_AOBS) 33 ((e) of FIG. 1) as shown in FIG. 19, the one and only menu audio object (the one and only audio object file HD_MENU0.HDA) is recorded as shown in FIG. 56. Further, in this menu audio object (audio object file HD_MENU0.HDA), voice information continues everywhere (including "silent period" which can be inserted halfway), and is recorded so as not to bring about sound-skipping halfway. Moreover, it is structured such that the inside of the menu audio object (audio object file HD_MENU0.HDA) can be subdivided by n entries (entry points). In accordance therewith, the information on the head (start) number (head (start) entry number) and an end number (end entry number) of the entries set in advance in the menu audio object (audio object file HD_MENU0.HDA) are provided in PGC_CAT information (FIGS. 58 to 60) in which the management information on the respective menu screens have been recorded, so that it is possible to designate a playback range of background music which is played back at the same time when a corresponding menu is displayed.

As a result, characteristic effects such as follows are brought about.

(1) When some background music are used in common in a plurality of different menu screens (for example, as shown in FIG. 56, in a repetitive playback range of PGC#A and in a repetitive playback range of PGC#B, the range from the "second entry" to the "third entry" is used in common), the data amount of the menu audio object recorded in the information storage medium is reduced, and thus, the efficiency in recording information to be recorded onto the information storage medium is improved.

(2) In order to shorten a display starting time until a menu screen and background music are simultaneously displayed immediately after the user designation, there is need to temporarily store the information on the menu audio object (audio object file HD_MENU0.HDA) in advance in the memory unit 122 (FIG. 48). As shown in (1), when the data amount of the menu audio object is reduced, a capacity required for the memory unit 122 is decreased, and an attempt can be made to make the information playback apparatus at a low cost.

(3) For example, when a range in which background music is repeatedly played back is changed in accordance with a menu screen, such as, while "top menu screen" is being displayed, only "the first verse of the music" is repeatedly played back. In contrast thereto, while "specific menu screen A" is being displayed, "the first verse to the third verse of the music" are repeatedly played back; and while "specific menu screen B" is being displayed, only "the most elegant part further in the first verse of the music" is repeatedly played back, and the like, not only the data amount of the menu audio object is reduced as shown in (1), but also an attempt can be made to simplify the management information in the respective menu screens, which makes the playback control of the information playback apparatus simple. By merely providing the information on a head number (head entry number) and an end number (end entry number) of the entries set in advance in PGC_CAT information (FIG. 58 to FIG. 60) in which the management information on the respective menu screens have been recorded, a range which is repeatedly played back can be easily designated, and an intention of the contents manufacturer can be reflected.

(4) Because the inside of the menu audio object continues everywhere, for example, between the end position of the repetitive playback range of PGC#B and the start position of the repetitive playback range of PGC#C in FIG. 56, the continuity of voice is guaranteed. Accordingly, when the user switches the screen from the menu screen correspond to the PGC#B to the menu screen correspond to the PGC#C as shown in [B] describe above, background music corresponding to the menu screen (PGC#C) after switching can be started "sequentially" immediately after the background music corresponding to the screen (PGC#B) before switching is thoroughly completed, which can provide even more comfortable menu display environment (the continuity of background music) to the user.

[Point 4]

At the head position of the one and only menu audio object (the one and only audio object file HD_MENU0.HDA) in the menu audio object area (HDMENU_AOBS) 33 ((e) of FIG. 1), HDMENU_AOB header information (HDMENU_AOB_HI) is recorded as shown in FIG. 56, and the management information relating to the menu audio object such as the start address of the respective entry points and the like are recorded (FIG. 57). In this way, the management information relating to the menu audio object are together recorded in the menu audio object area (HDMENU_AOBS) 33 ((e) of FIG. 1) (the one and only audio object file HD_MENU0.HDA). Therefore, an attempt can be made to simplify authoring of the contents (preparation and editing operations of the contents) such as it is easy to change and exchange the contents of the menu audio object in the entire contents, or the like, which can realize the information storage medium at a low price.

[Object Information Recording Place]

As shown in (e) of FIG. 1, the menu audio object area (HDMENU_AOBS) 33 in which voice information to be output in parallel with the time of displaying a menu are recorded is newly provided in the HD video manager recording area 30. As a recording place in the file structure of the menu audio object area 33, it is recorded in a characteristic file as the HD-MENU0.HDA file in a common directory (folder) in the VIDEO_HD as shown in FIG. 2. In the embodiment of the invention, it is possible to record plural types of menu audio objects (audio data) in the information storage medium. The respective menu audio objects (AOBs) are, as shown in FIG. 19, recorded so as to be disposed in order in the menu audio object area (HDMENU_AOBS) 33. Further, in the embodiment shown in FIG. 56, it is composed of the one and only menu audio object (audio data), and it is structured such that the inside can be subdivided by a plurality of entries.

[Management Information Recording Place]

Figure 3:
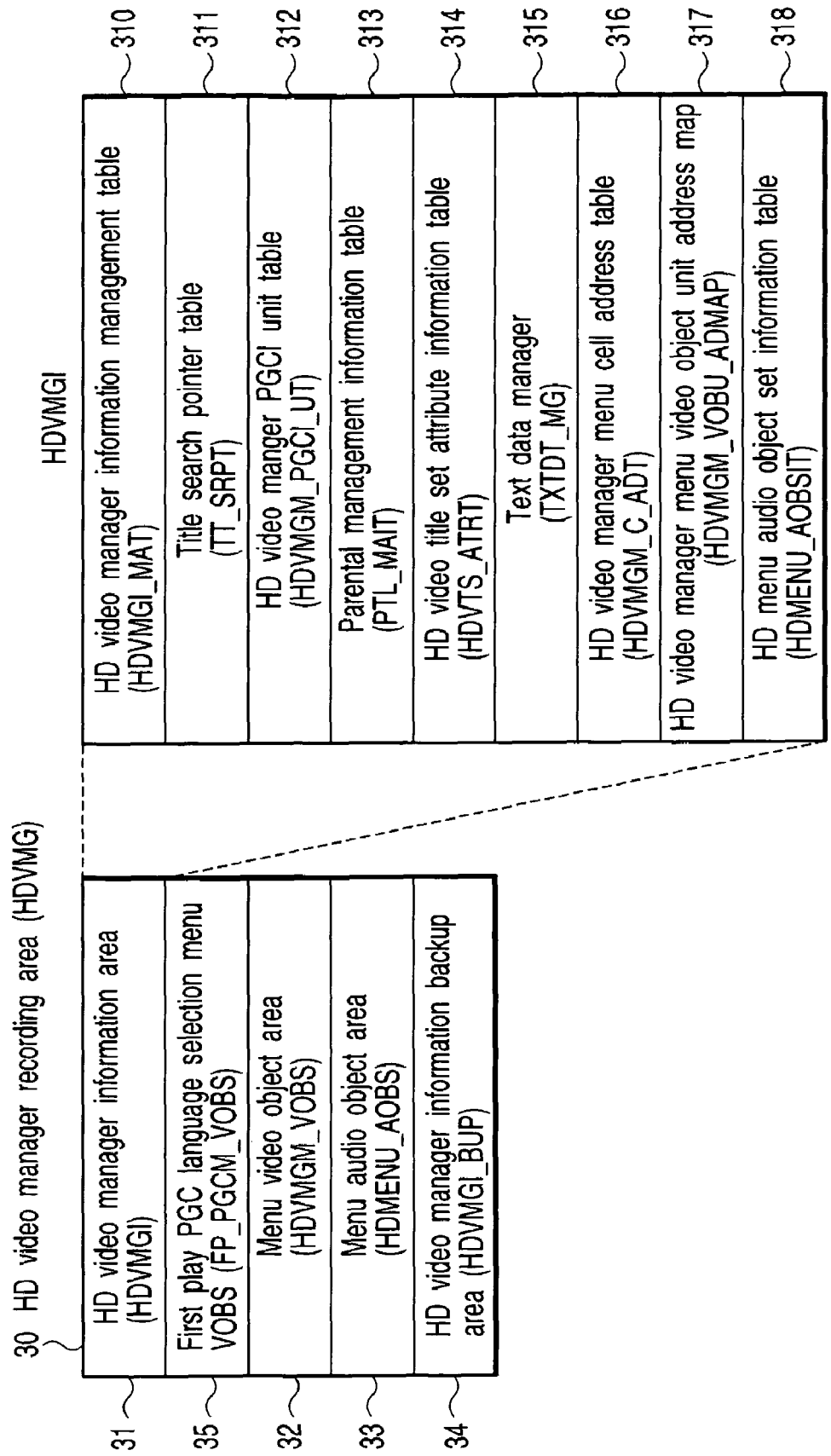
FIG. 3 is a diagram showing a data structure in an HD video manager information area (HDVMGI) 31 shown in (e) of FIG. 1.

The management data for the object in the menu audio object area (HDMENU_AOBS) 33 is, as shown in FIG. 3, recorded in an HD menu audio object set information table (HDMENU_AOBSIT) 318 in the HD video manager information area (HDVMGI) 31. In addition, in the embodiment shown in FIG. 56, a header information recording area HDMENU_AOB_HI is provided at the head position of the one and only menu audio object (audio data) HDMENU_AOB, and as the data structure inside thereof, start address information AOB_nTH_EP of the respective entry points and the like are recorded as shown in FIG. 57.

Moreover, a setting place for information referring to the AOB (HDMENU_AOB) for menus is employed in the embodiment of the invention as follows. With respect to the entire menus, those are disposed in the HDVMGM_PGC category information (HDVMGM_PGC_CAT) in an HDVMGM_PGCI search pointer #n (HDVMGM_PGCI_SRP #n) 312c2 in an HD video manager menu language unit 312c, as shown in FIG. 7; and with respect to menus in HDVTS units, those are disposed in the HDVTSM_PGC category information (HDVTSM_PGC_CAT) in an HDVTS-PGCI search pointer #n (HDVTSM_PGCI_SRP #n) 413c2, as shown in FIG. 26.

In another embodiment of the invention, those are disposed in the RSM&AOB category (RSM&AOB_CAT) in the program chain general information (PGC_GI) 50, as shown in FIGS. 33 and 34.

[Management Information Contents]

Figure 7:
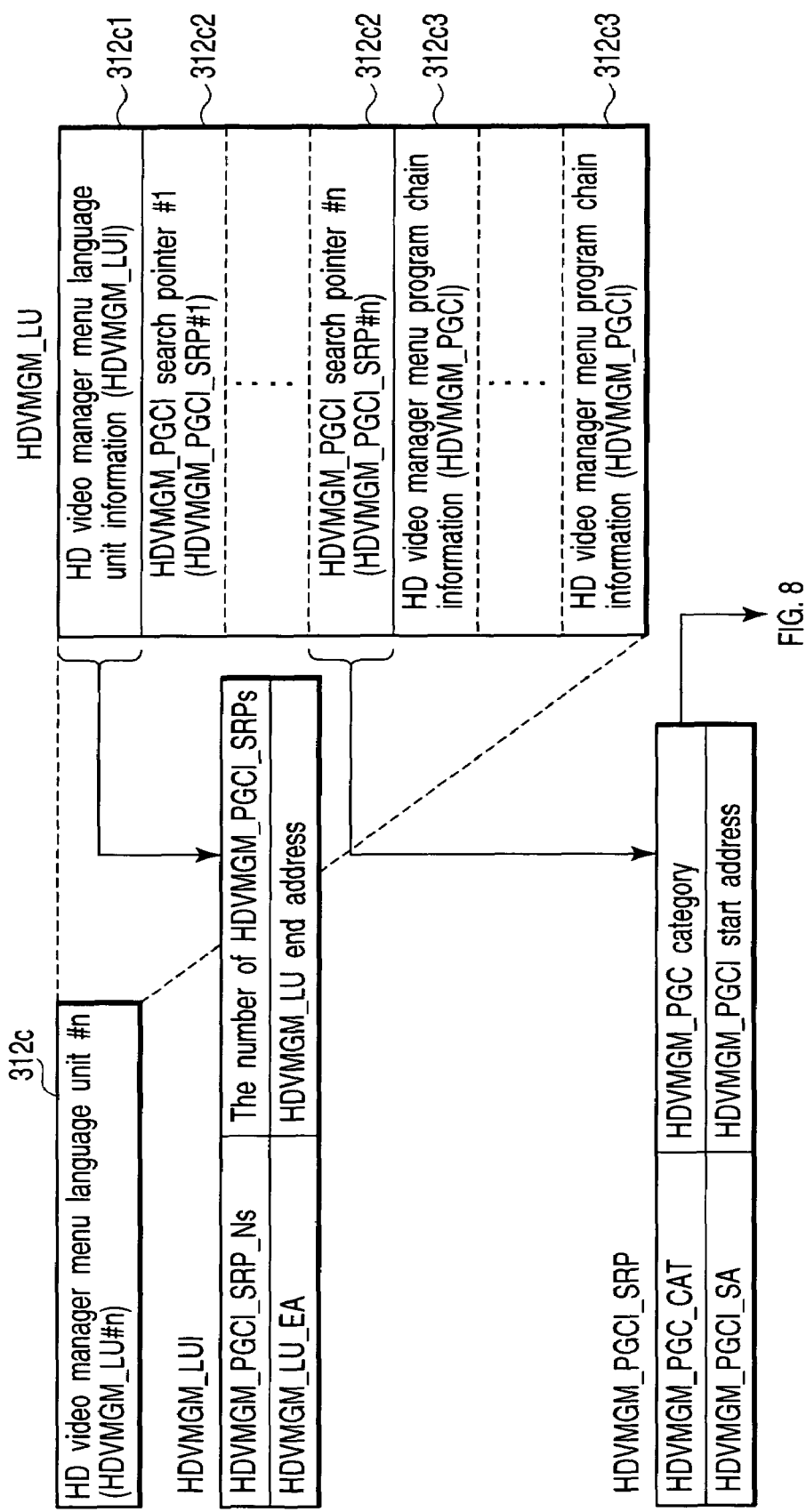
FIG. 7 is a diagram showing a data structure in an HD video manager menu language unit #n (HDVMGM_LU #n) 312c (FIG. 6) recorded in the HD video manager menu PGCI (HDVMGM_PGCI_UT) 312 shown in FIG. 3.
Figure 26:
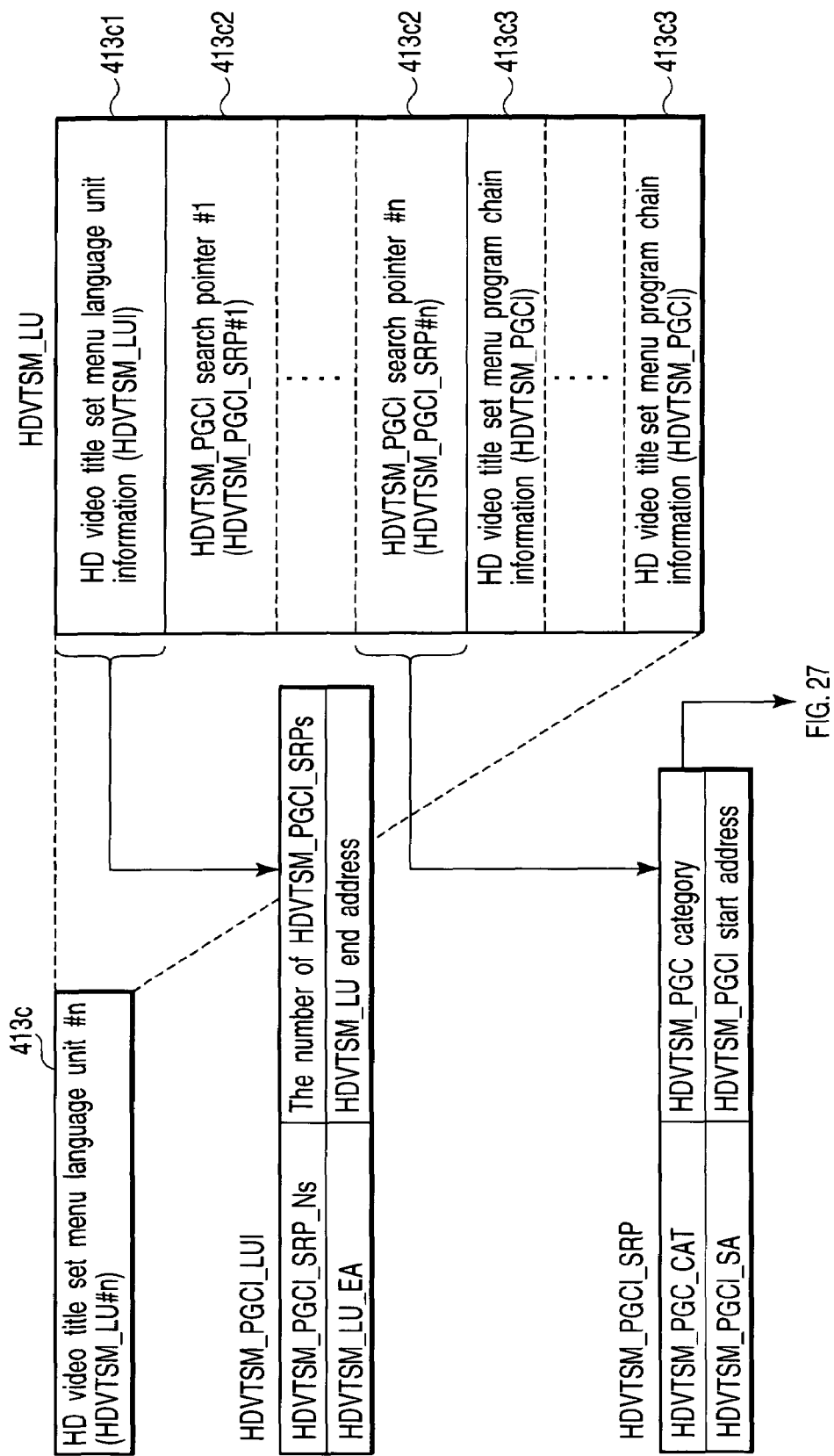
FIG. 26 is a diagram showing a data structure in an HD video title set menu language unit (HDVTSM_LU) 413c shown in FIG. 25.

With respect to the entire menus, as shown in FIG. 7, in the HDVMGM_PGC category information (HDVMGM_PGC_CAT) in the HDVMGM_PGCI search pointer #n (HDVMGM_PGCI_SRP #n) 312c2 in the HD video manager menu language unit 312c; and with respect to menus in HDVTS units, as shown in FIGS. 26 and 27, in the HDVTSM_PGC category information (HDVTSM_PGC_CAT) in the HDVTS_PGCI search pointer #n(HDVTSM_PGCI_SRP #n) 413c2, (1) a voice information number for designating an AOB number #n to be played back in the HDMEMU_AOBS (what number of AOB among the AOB (HDMENU_AOB) for menus arranged in FIG. 19 corresponds to), and (2) selection information on the voice information which is played back at the same time when a menu of the HD contents in the invention is displayed on the screen, and a voice information selection flag denoting the start/continuance/end trigger information on a voice information playback, are recorded.

Figure 17:
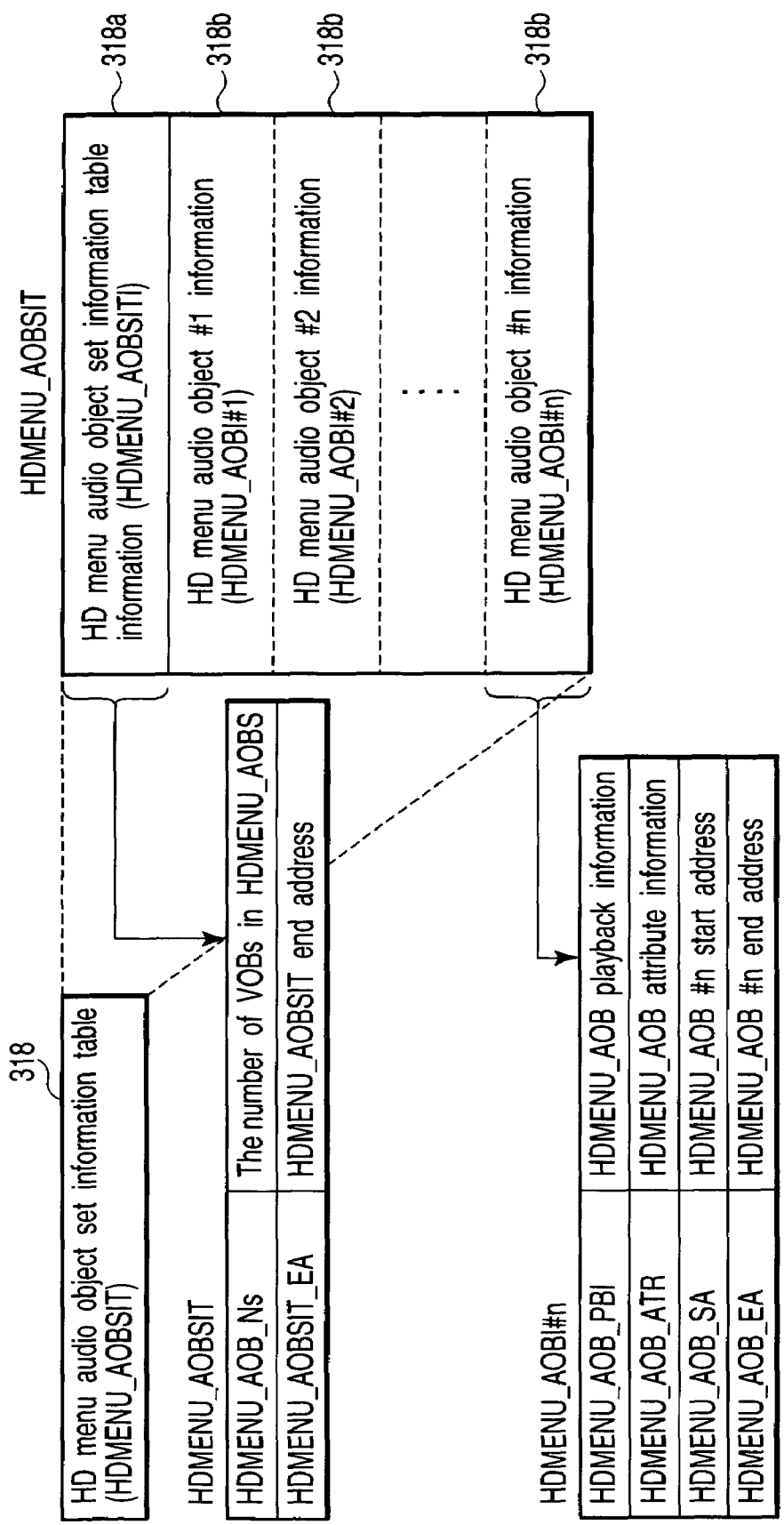
FIG. 17 is a diagram showing contents of management information with respect to HD video contents menu AOB (HDMENU_AOB) themselves.

In FIGS. 7 and 24, or FIGS. 33 and 34, the management information for designating menu audio objects displayed at the same time when a menu is displayed on the screen are shown. In accordance therewith, the contents of the management information for designating menu audio objects themselves are, as shown in FIG. 17, composed of HD menu audio object set information table information (HDMENU_AOBSITI) 318a and the HD menu audio object information (HDMENU_AOBI) 318 which are individual information for each AOB for menus recorded in the information storage medium.

In the HDMENU_AOBI, HDMENU_AOB_PBI denoting the playback information of HDMENU_AOB (a playback time of music), HDMENU_AOB_ATR denoting the attribute of an object (LPCM, AC-3, and the like), and HDMENU_AOB_SA and HDMENU_AOB_EA denoting an start address and an end address of an HDMENU_AOB #n are included. Further, with respect to the head and end addresses, there are cases where absolute or relative sizes of the HDMENO_AOB #n are described.

Further, the information of the above-described (1) and (2) can be expressed by RSM&AOB_CAT in FIG. 33.

[Access Information]

As shown in FIG. 4, the start address information (HDMENU_AOBS_SA) of the HDMENU_AOBS and the start address information (HDMENU_AOBSIT_SA) of the HDVMGM_AOBS information table are recorded in the HD video manager information management table (HDVMGI_MAT) 310. The start address information (HDMENU_AOBS_SA) denotes a place at which the menu audio object area (HDMENU_AOBS) 33 in which audio information output at the same time when a menu is displayed in an information storage medium (an optical disk or an HD DVD disk) is recorded, has been recorded. The start address information (HDMENU_AOBSIT_SA) denotes a place at which the HD menu audio object set information table (HDMENU_AOBSIT) 318 in which the management information for the menu audio object have been recorded, has been recorded.

Further, in accordance with the embodiment shown in FIG. 56, a playback range in the menu audio object HDMENU_AOB at the time of displaying a corresponding menu screen is designated by information of a set of "head entry number" and "end entry number", as shown in FIGS. 58 to 60.

(H) There are provided the above-described features. The expressive power with respect to the user is even more improved, and the contents which are easy for the user to use are, as shown in FIG. 2, managed so as to separate a directory (folder) from the place at which the conventional DVD video contents are recorded. Namely, the conventional video contents are managed such that the image information (video objects which are the general term for video data, sub-picture data, and voice data) and the management data for managing the image information are disposed together under the directory (folder) named VIDEO_TS.

In contrast thereto, images and the management data for managing the image information of the contents having the features of (A) to (G) are managed together in a directory (folder) named VIDEO_HD as shown in FIG. 2, and the convenience of the playback control of the information playback apparatus is made improved.

In the HD contents corresponding to the invention, the HD_MENU0.HDA file exists in which voice information has been recorded, the voice information being output at the same time when a menu is displayed. However, the file does not exist in conventional DVD video contents.

A graphic decoder unit 113 is provided in the information playback apparatus corresponding to the invention, as shown in FIG. 48. However, it is not provided in an information playback apparatus for playing back conventional DVD contents. Accordingly, there is need to switch a circuit used for each content and a control program at the information playback apparatus side in a case where mixed contents of conventional DVD video contents and HD contents of the invention are played back. As shown in FIG. 2, by separate directories (folders) for each content, it is extremely easy to identify contents at the information playback apparatus side. In addition, due to processing of switching the circuit and the control program at the time of accessing to a file, the switching processing can be smoothly carried out at a high speed even at the time of playing back mixed contents of HD and SD contents.

<<Relationship Among Respective Features (Description of the Effects)>>

In the invention, contents which are easy for the user to use with simple authoring by combining the features of (A) and (B), and the contents expressive power with respect to the user is made even more fertile by combining the features of (C) to (F), so that DVD videos can be made more attractive with respect to the user.

Concretely, the effects by combining the features of (A) to (F) will be described by sampling two examples.

[I] An example of a case where the user searches a point which the user wishes to see after selecting an optimum language from a menu After an HD DVD video disk (an information storage medium) is mounted in the information playback apparatus of the invention, a screen for selecting a language for a user is displayed on a screen (FP_PGC) initially displayed (B). At that time, by displaying on the screen (E) a characteristic shape different from the conventional rectangle with respect to highlighted information denoting a language to be selected by the user, it is possible for the user to easily select the language. For example, when languages of respective countries are displayed, the display range of highlighted information is displayed in a shape on a map of a corresponding country, so that the user can designate a desired language by merely distinguishing the shape of the display range of the highlighted information without reading the language to be selected. Further, in many cases, Japan is painted red on a terrestrial globe or a world map. Accordingly, there are provided 256 colors as display colors for the graphic units (E), languages are displayed by a color corresponding to each language (such as Japanese is displayed in red, and the like), and it is possible for the user to distinguish a corresponding language by merely distinguishing a color.

Further, in many cases, a user moves to a list of thumbnails (reduced pictures showing top screens for designating head searching positions) of a title after selecting a language, and searches a point of an image which the user wishes to see. There are many cases where, in a menu of the conventional DVD video as well, texts denoting head searching positions are displayed under thumbnails. At that time, a search of a point that a user wishes to see can be made even more easy by using graphic units (E). Namely, it is possible that, at a point denoting a clear pause where the scene is clearly changed in an image title, the display range of the highlighted information is displayed in a "star shape". Additionally, the inside thereof is expressed with a conspicuous color such as red, and points belonging to a lower hierarchy, which denote a destination to be skipped, are displayed in a "circle mark", are expressed in a light yellow or a pale blue, and are displayed graphically so as to be without clear pauses.

Moreover, by utilizing the feature described in (F), voice information can be continuously output without being interrupted during the period of a series of operations of "a user moves to a list of thumbnails of a title after selecting a language, and searches a point of an image which the user wishes to see" (even at the time of switching from a menu screen for selecting a language to a screen of the title thumbnail list), and the user can comfortably carry out switching the menus. In particular, the structure of the HDMENU_AOB shown in FIG. 56 is utilized as a menu audio object, whereby, by merely recording a little number of audio objects on an information storage medium, those can be used in common among a plurality of menus, and a range of audio objects which is repeatedly played back among the different menus can be delicately adjusted. In addition, effective performance of background music can be provided to the user as follows. That is, when the user switches the screen from a menu screen corresponding to PGC#B to a menu screen corresponding to PGC#C, for some time after switching the menu screens, (1) background music of the menu screen corresponding to PGC#B is played back, and (2) after the background music of the menu screen corresponding to PGC#B is completed, (3) background music of the menu screen corresponding to PGC#C is continuously played back from the top, and (4) thereafter, the background music of the menu screen corresponding to PGC#C is repeatedly played back within a designated range.

A concrete processing method by which the effective performance is made possible in the information playback apparatus shown in FIG. 48 will be described. When an HD DVD video disk (information storage medium 1) is mounted in the information playback apparatus, a disk drive unit 101 reads the video manager information area (HDVMGI) 31 and the HD video title set information area (HDVTSI) 41 which are management information and are shown in (e) of FIG. 1, and reads them into the memory unit 122. For example, next, an MPU unit 121 confirms the presence/absence of audio data AOB which are objects for pre-loading playback by analyzing the contents temporarily stored in the memory unit 122. When the MPU unit 121 determines that there are audio data AOB which are objects for pre-loading playback, the MPU unit 121 controls the disk drive unit 101 to read the menu audio object information (HDMENU_AOBS) 33 shown in (e) of FIG. 1, and temporarily stores it in the memory unit 122. For example, when the structure of FIG. 56 is used in the menu audio data HDMENU_AOB (because a total data amount of audio data AOB is relatively little in many cases), all the menu audio data HDMENU_AOB are temporarily stored in the memory unit 122, and the audio data AOB can be switched and played back at a high speed at the time of switching the menu screens. Next, at the same time when a menu screen for language selection with respect to a user is displayed in accordance with the first play PGCI (FP_PGCI) information shown in FIG. 4, a playback of the audio data AOB temporarily stored in the memory unit 122 is started. Next, at a point in time when the user has switched the screen to a screen showing a title thumbnail list, a voice information number in the HDVTSM_PGC_CAT shown in FIG. 27 is coincident with the AOB number played back at the time of displaying a menu for language selection, and a voice information selection flag is set to '10b' (HDMENU_AOBS is continuously played back). In this case, the audio data are continuously outputted successively without being influenced by switching the menu screens.

[II] An example of a case of returning to the image title after a menu screen and bonus contents on the way of playing back the image title.

A playback of a multi-angle composed of plural types of slide shows in which a still picture content is continuously played back by defining imaginary VAU (IVAU), or a multi-angle composed of a slide show of a still picture content and a movie content can be seamlessly carried out (C). Further, a playback between cells executing cell commands can be seamlessly carried out (D). With a method of setting an RSM permission flag in HDVTS_PGC_CAT (setting of "0b: permission") which is management information for managing the seamless playback, and which is shown in, for example, FIG. 24, the following operation is enabled. That is, after a user accesses to a menu screen on the way of the seamless playback of the multi-angle described above, or on the way of the seamless playback between cells executing cell commands, and when the screen is returned to the former one after, for example, displaying a trailer of a movie, or displaying bonus contents such as filming shooting scenes (however, when an RSM permission flag in the HDVTS_PGC_CAT corresponding to the bonus contents is set to "1b: prohibition"), the seamless playback of the multi-angle or the seamless playback between cells executing cell commands can be successively continued (A). In particular, in the conventional SD DVD video standard, a seamless playback with respect to a multi-angle composed of a slide show and a movie content is not guaranteed. However, by a combination of the features (A) and (C), or a combination of the features of (A) and (D), a variety of expressive forms can be realized such that, the screen is returned to the original multi-angle image composed of a slide show of a still picture content and a movie content after the screen has skipped from "menu screen"→"bonus contents playback" on the way of playing back a multi-angle image, and a seamless playback is successively continued.

Moreover, as examples in which a variety of expressive forms can be shown by combining those features, with respect to a case where processings such as:

(1) during a display of paintings on which a name of a painter is displayed (as a sub-picture), and which are sequentially switched with commentaries due to voice, (2) a voice language for a commentary is switched on the menu screen, and moreover, (3) the display is switched on the menu screen so as to delete a display of the name of the painter displayed simultaneously as a sub-picture, and (4) after playing back a bonus image by which a specific painting is described in detail, (5) a playback is continued from a painting directly before transferring to the menu screen, and the like, the effects due to combination of these features will be described. In the conventional SD DVD video standard, at the time of returning to the operation of (5), "a playback is continued from a painting directly before transferring to the menu screen" is not easy, and at the time of returning to the operation of (5), a user is required to turn over the paintings from the first one. When programming that a playback from a painting directly before transferring to the menu screen can be continued is forcibly carried out, complicated authoring processing is required. Further, it is impossible to continuously play back without interrupting voice data when (2) and (3) are carried out in the conventional DVD video, and it is only possible when the feature (F) has been achieved. By regulating a data structure by which the features (A), (C), (D), and (F) can be simultaneously achieved on standard, setting of a memory capacity of the memory unit 122 and setting of a method of managing the inside of the memory area of the information playback apparatus shown in FIG. 48 are carried out, so that the features (A), (C), (D), and (F) can be simultaneously achieve. Namely, at the time of switching to a menu screen so as to correspond to the feature (A), values of system parameters from 4 (title number) to 8 (highlighted button number) are set. In addition, an area of the memory unit 122 is insured in which corresponding cell number information, address information of a navigation pack disposed at the top of the corresponding cell, and information of the number of VTSs are recorded, and the aforementioned information is managed on the basis of the RSM permission flag information in FIG. 24. Further, in order to execute (C) in parallel, an area at which data of the interleaved unit (ILVU) corresponding to an imaginary video access unit IVAU can be recorded is insured in the memory unit 122. Furthermore, in order to achieve (F), a storage area for voice data which is temporarily stored in advance (pre-loaded) is allocated in the memory unit 122, and the inside of the aforementioned allocated area is managed on the basis of the voice information selection flag and the voice information number shown in FIGS. 8 and 27. In particular, the structure shown in FIG. 56 is utilized as the menu audio object HDMENU_AOB, whereby, by merely recording a little number of audio objects on an information storage medium, those can be used in common among a plurality of menus, and a range of audio objects which is repeatedly played back among the different menus can be delicately adjusted. In the information playback apparatus in the present embodiment, the features (A), (C), (D), and (F) can be simultaneously achieved by managing the inside of the memory unit 122 in this way.

Further, at the stages of the operations of the features (2) and (3), the color-expression in 256 colors is realized for making a user easily see and easily select a selection menu, and a display outline of highlighted information is made to be a characteristic shape (other than a rectangle) by using the feature (E), so that even more comfortableness can be provided to the user by combining with the feature (F).

Further, in the present embodiment, it is regulated that FP_PGC is prohibited from having a sub-picture stream, and a graphic unit is used in place thereof. Therefore, a menu screen for language selection for a user can be expressed in 256 colors regulated by a graphic unit, and an outline shape of a screen area denoting highlighted information can be set variously (so as not limited to a rectangle), which makes a user to still more easily select a menu screen for language selection. For example, at a point to select Japanese, "Japanese" is described and the screen area is made to be a "a shape of a Japanese map", and the inside thereof is painted "red" frequently used on a terrestrial globe and a world map; and at a point to select English (American English), "English" is described, and the screen area is made to be a "star-shape" with being conscious of the Stars and Stripes; and moreover, when it is expressed such that the inside of the star is painted "blue" by utilizing the color of the portion in which there are the stars of the Stars and Stripes, the user can select a language code due to the shape and color without reading characters.

A sub-picture stream (G) corresponding to HD is used at the same time the above-described graphic unit is used, whereby the expressive range of the contents provider with respect to a user can be even more broadened.

In particular, as shown in FIG. 4, there are disposed in the common HD video manager information management table (HDVMGI_MAT) 310: the information of the first play PGCI (FP_PGCI) in which the management information with respect to a menu for language selection for a user have been recorded, and which exhibits the feature of (B), the HDMENU_AOBS start address information HDMENU_AOBS_SA and the HDVMGM_AOBS information table start address information HDMENU_AOBSIT_SA which exhibit the feature of (F), and the information of the number of HDVMGM graphic unit streams HDVMGM_GUST_Ns and the HDVMGM graphic unit stream attribute information HDVMGM_GUST_ATR which exhibit the feature of (E), so that the management thereof is made easy. Further, in a case of using the structure of FIG. 56, all the management information of the menu audio objects are collectively managed in the HDMENU_AOB header information recording area AOB_HI, and thus, an attempt can be made to still more simplify the management. As a result, in the information playback in the embodiment of the invention, an attempt can be made to simplify the processing program in a case of simultaneously or continuously expressing the features of (A) to (G), and not only the reliability and the stability of the information playback apparatus can be improved, but also it is possible to achieve the information playback apparatus at a low price due to the simplification of the program.

In the same way, as shown in FIGS. 33 and 34, there are disposed in the common program chain general information (PGC_GI) 50: the flag information of the RSM permission flag which exhibits the feature of (A), PGC graphic unit stream control table information PGC_GUST_CTLT which exhibits the feature of (E), and the voice information selection flag and voice information number which exhibit the feature of (F), so that the management thereof is made easy. In the information playback in the embodiment of the invention, an attempt can be made to simplify the processing program in a case of simultaneously or continuously expressing the features of (A) to (G), and not only the reliability and the stability of the information playback apparatus can be improved, but also it is possible to achieve the information playback apparatus at a low price due to the simplification of the program.

In FIG. 1, information contents recorded on the disk-type information storage medium 1 ((a) of FIG. 1) in the present embodiment will be described. As shown in (b) of FIG. 1, the information storage medium 1 is composed of a lead-in area 10, a data area 12, and a lead-out area 13 in order from the inner peripheral side thereof.

In the information storage medium 1, a bridge structure of ISO9660 and UDF is used for the file system, and a volume/file structural information area 11 of ISO9660 and UDF is provided to a part of the data area 12. In the data area 12, as shown in (c) of FIG. 1, mixed disposition of a video data recording area 20 and a general computer information recording area 22 is permitted. The inside of video data recording area 20 is, as shown in (d) of FIG. 1, composed of the HD video manager recording area (HDVMG: video manager corresponding to HD) 30 and the HD video title set recording areas (HDVTS: video title set corresponding to HD) 40. The HD video manager recording area 30 has recorded thereon the management information relating to the entire HD DVD video contents recorded in the video data recording area 20. The HD video title set recording areas 40 are arranged in each title, and have recorded thereon the management information and the image information (video objects) on each title together.

The inside of the HD video manager recording area (HDVMG: video manager corresponding to HD) 30 is, as shown in (e) of FIG. 1, composed of the HD video manager information area (HDVMGI: video manager information corresponding to HD) 31 denoting the management information relating to the entire video data recording area 20; an HD video manager information backup area (HDVMGI_BUP) 34 on which the information completely same as the HD video manager information area (HDVMGI: video manager information corresponding to HD) 31 have been recorded for backup; and the menu video object area (HDVMGM_VOBS) 32 on which the top menu screen denoting the entire video data recording region 20 has been recorded. Moreover, in the present embodiment, the menu audio object area (HDMENU_AOBS). 33 on which voice information outputted in parallel with a menu display have been recorded is newly provided in the HD video manager recording area 30. In the embodiment of the invention, a screen on which a menu description language code can be set is recorded on the area of the first play PGC language selection menu VOBS (FP_PGCM_VOBS) 35.

The inside of one HD video title set recording area (HDVTS: video title set corresponding to HD) 40 on which the management information and the image information (video objects) on each title have been recorded together is composed of: the HD video title set information area (HDVTSI) 41 on which the management information for the entire contents in the HD video title set recording area (HDVTS: video title set corresponding to HD) 40; an HD video title set information backup area (HDVTSI_BUP) 44 on which the information which is backup data thereof and completely same as the HD video title set information area (HDVTSI) 41 have been recorded; the menu video object area (HDVTSM_VOBS) 42 on which the information on menu screens in unit of a video title set have been recorded; and the title video object area (HDVTSTT_VOBS) 43 on which the video object (image information on the title) in the video title set have been recorded.

The respective areas respectively configure separate files in a file system having the bridge structure of ISO9660 and UDF. The conventional SD DVD video contents are collectively disposed under the directory named "VIDEO_TS" as shown in FIG. 2. In contrast thereto, the HD DVD video contents shown in the embodiment are collectively disposed under the directory named "VIDEO_HD" which is separated from the directory named "VIDEO_TS".

Namely, as a recording place in the file structure for the menu audio object area 33, it is recorded in a characteristic file serving as HD_MENU0.HDA file in a common directory (folder) of the VIDEO_HD as shown in FIG. 2. Further, screen data (video data) for setting a menu description language code at the top in the area of the first play PGC language selection menu VOBS (FP_PGCM_VOBS) 35 is made to be independent as a single file, and the file name is HD_FP-PGC.HDV. Further, the HD video manager information area (HDVMGI: video manager information corresponding to HD) 31, the HD video manager information backup area (HDVMGI_BUP) 34, the menu video object area (HDVMGM_VOBS) 32, the HD video title set information area (HDVTSI) 41, the HD video title set information backup area (HDVTSI_BUP) 44, the menu video object area (HDVTSM_VOBS) 42, and the title video object area (HDVTSTT_VOBS) 43 are respectively stored in the separate files of HD-VMG00.HDI file, HD_VMG00.BUP file, HD-VMG01.HDV file, VTS00100.IFO file, VTS00100.BUP file, VTS00100.HDV file, and VTS00101.HDV file or VTS00102.HDV file.

The detailed data structure in the HD video manager information area (HDVMGI) 31 shown in (e) of FIG. 1 is shown in FIG. 3.

The management data for the objects of the menu audio object area (HDMENU_AOBS) 33 is, as shown in FIG. 3, recorded in the HD menu audio object set information table (HDMENU_AOBSIT) 318 in the HD video manager information area (HDVMGI) 31. The data structure from the HD video manager information management table (HDVMGI_MAT) 310 to the HD video manager menu video object unit address mad (HDVMGM_VOBU_ADMA) 317 is coincident with the management information of the conventional SD DVD video. In the embodiment of the invention, the HD menu audio object set information table (HDMENU_AOBSIT) 318 which is newly added is separated from the parts coincident with the management information of the conventional DVD video, and is disposed after the parts. In this manner, the conventional control program using the management information of the conventional SD DVD video can be used in common, and an attempt can be made to simplify the control program of the information playback apparatus corresponding to the embodiment of the invention.

In the HD video manager information area (HDVMGI) 31, in addition thereto, there are the HD video manager information management table (HDVMGI_MAT) information 310 on which the management information in common in the entire HD DVD video contents recorded in the video data recording area 20 have been collectively recorded; the title search pointer table (TT_SRPT) information 311 on which the information useful for searching respective titles (head search position detection) existing in the HD DVD video contents have been recorded; the HD video manager menu PGCI unit table (HDVMGM_PGCI_UT) information 312 on which the management information for the menu screens disposed for each menu description language code for displaying a menu have been recorded; the parental management information table (PTL_MAIT) information 313 on which the information for managing images which can be shown for children and images which cannot be shown for children as parental information have been recorded; the HD video title set attribute information table (HDVTS_ATRT) information 314 on which attributes of the title set have been collectively recorded; the text data manager (TXTDT_MG) information 315 on which the text information to be displayed for a user have been collectively recorded; the HD video manager menu cell address table (HDVMGM_C_ADT) information 316 on which the information useful for searching the start addresses of the cells configuring a menu screen have been recorded; and the HD video manager menu video object unit address map (HDVMGM_VOBU_ADMAP) information 317 on which the address information of VOBU denoting a minimum unit of video objects configuring a menu screen have been recorded.

The detailed data structure in the HD video manager information management table (HDVMGI_MAT) 310 of FIG. 3 is shown in FIG. 4.

As shown in FIG. 4, there are disposed in the common HD video manager information management table (HDVMGI_MAT) 310: the information of the first play PGCI (FP_PGCI) in which the management information with respect to a menu for language selection for a user have been recorded, and which exhibits the feature of (B), the HDMENU_AOBS start address information (HDMENU_AOBS_SA) and the HDVMGM_AOBS information table start address information (HDMENU_AOBSIT_SA) which exhibit the feature of (F), and the information of the number of HDVMGM graphic unit streams (HDVMGM_GUST_Ns) and the HDVMGM graphic unit stream attribute information (HDVMGM_GUST_ATR) which exhibit the feature of (E).

Further, in the HD video manager information management table (HDVMGI_MAT) 310, in addition thereto, there are recorded various information including HD video manager identifier (HDVMG_ID), HD video manager end address (HDVMG_EA), HD video manager information end address (HDVMGI_EA), HD-DVD video standard version number (VERN), HD video manager category (HDVMG_CAT), volume set identifier (VLMS_ID), adaptation identifier (ADP_ID), the number of HD video title sets (HDVTS_Ns), provider characteristic identifier (PVR_ID), POS code (POS_CD), HD video manager information management table end address (HDVMGI_MAT_EA), first play program chain information start address (FP_PGCI_SA), HDVMGM_VOBS start address (HDVMGM_VOBS_SA), TT_SRPT start address (TT_SRPT_SA), HDVMGM_PGCI_UT start address (HDVMGM_PGCI_UT_SA), PTL_MAIT start address (PTL_MAIT_SA), HDVTS_ATRT start address (HDVTS_ATRT_SA), TXTDT_MG start address (TXTDT_MG_SA), HDVMGM_C_ADT start address (HDVMGM_C_ADT_SA), HDVMGM_VOBU_ADMAP start address (HDVMGM_VOBU_ADMAP_SA), HDVMGM video attribute (HDVMGM_V_ATR), the number of HDVMGM audio streams (HDVMGM_AST_Ns), HDVMGM audio stream attribute (HDVMGM_AST_ATR), the number of HDVMGM sub-picture streams (HDVMGM_SPST_Ns), HDVMGM sub-picture stream attribute (HDVMGM_SPST_ATR).

The graphic stream attribute (HDVMGM_GUST_ATRT) (for VMGM_EVOBS) shown in FIG. 4 is information of 16 bits, and b15 to b14 are in a graphic compression mode, b13 is a GR_EXST flag, and the others are reserved. In the graphic compression mode, '00b' is set, and the others are reserved in a case of incompression. In the GR_EXST flag, it is described whether or not a graphic stream exists, and when no graphic stream exists, 'ob' is set, and when a graphic stream exists, '1b' is set, and the others are reserved.

A modified example of the detailed data structure in the HD video manager information management table (HDVMGI_MAT) 310 (FIG. 4) is shown in FIG. 79.

FIG. 79 shows the contents of the HD video manager information management table (HDVMGI_MAT) 310.

In this table, the video manager VMG, the sizes of the video manager information VMGI, the start addresses of respective information in the video manager VMG, the attribute information of the enhanced video object set VMGM_EVOBS, and the like are described.

VMG_ID: VMG identifier
VMG_EA: VMG end address
VMGI_EA: VMGI end address
VERN: DVD: version number of video standard
VMG_CAT: video manager category
VLMS_ID: volume set identifier
ADP_ID: adaptation identifier
VTS_Ns: the number of video title sets
PVR_ID: provider characteristic identifier
POS_CD: POS code
VMGI_MAT_EA: VMGI_MAT end address
FP_PGCI_SA: FP_PGCI start address
EAOBS_SA: EAOBS start address
FP_PGCM_EVOB_SA: FP_PGCM_EVOB start address
VMGM_EVOBS_SA: VMGM_EVOBS start address
TT_SRPT_SA: TT_SRPT start address
VMGM_PGCI_UT_SA: VMGM_PGCI_UT start address
PTL_MAIT_SA: PTL_MAIT start address
VTS_ATRT_SA: VTS_ATRT start address
TXTDT_MG_SA: TXTDT_MG start address
FP_PGCM_C_ADT_SA: FP_PGCM_C_ADT start address
FP_PGCM_EVOBU_ADMAP_SA: FP_PGCM_EVOBU_ADMAP start address
VMGM_C_ADT_SA: VMGM_C_ADT start address
VMGM_EVOBU_ADMAP_SA: VMGM_EVOBU_ADMAP start address
VMGM_AGL_Ns: the number of VMGM angles
VMGM_V_ATR: VMGM video attribute
VMGM_AST_Ns: the number of VMGM audio streams
VMGM_AST_ATRT: VMGM audio stream attribute table
VMGM_SPST_Ns: the number of VMGM sub-picture streams
VMGM_SPST_ATRT: VMGM sub-picture stream attribute table
VMGM_GRST_ATR: VMGM graphic stream attribute
FP_PGCM_V_ATR: FP_PGCM video attribute
FP_PGCM_AST_Ns: the number of FP_PGCM audio streams
FP_PGCM_AST_ATRT: FP_PGCM audio stream attribute table
FP_PGCM_SPST_Ns: the number of FP_PGCM sub-picture streams
FP_PGCM_SPST_ATRT: FP_PGCM sub-picture stream attribute table
FP_PGCM_GRST_ATR: FP_PGCM graphic stream attribute
EAOB_Ns: the number of EAOBs
EAOBS_ATR: EAOBS audio data attribute
FP_PGC_CAT: FP_PGC category
FP_PGCI: first play PGCI Here, the number of VMGM sub-picture streams VMGM_SPST_Ns is the same as the HDVMGM_SPST_Ns in FIG. 4. The VMGM sub-picture stream attribute table VMGM_SPST_ATRT corresponds to the HDVMGM_SPST_ATR in FIG. 4. The VMGM graphic stream attribute VMGM_GRST_ATR is the same as the HDVMGM_GUST_ATR in FIG. 4.

Figure 5:
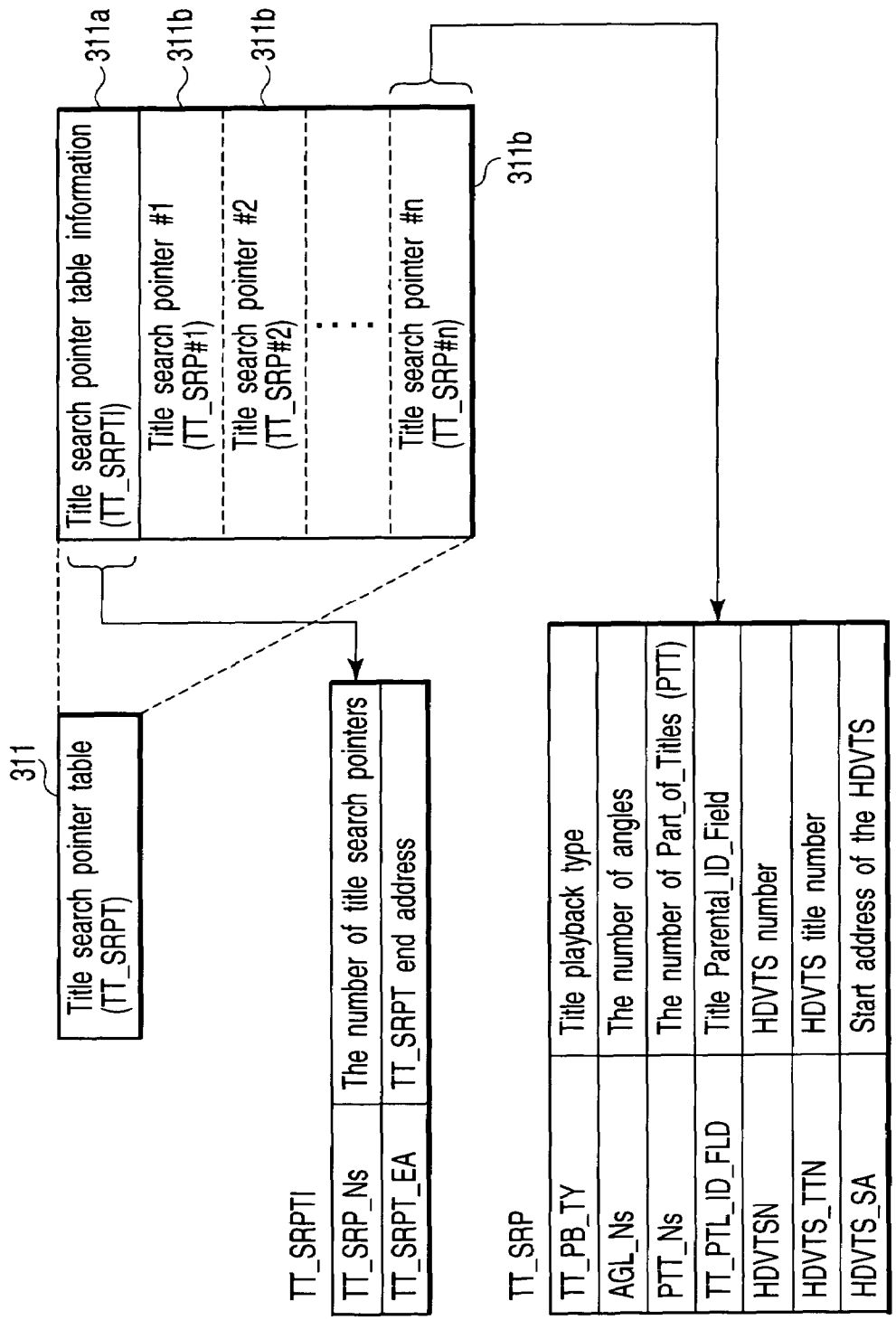
FIG. 5 is a diagram showing a data structure in a title search pointer table (TT_SRPT) 311 shown in FIG. 3.

The data structure in the title search pointer table (TT_SRPT) 311 shown in FIG. 3 is shown in FIG. 5. The title search pointer table (TT_SRPT) 311 is composed of title search pointer table information (TT_SRPTI) 311a and title search pointer (TT_SRP) information 311b. A plurality of the title search pointer (TT_SRP) information 311b in the title search pointer table (TT_SRPT) 311 can be set to be an arbitrary number in accordance with the number of titles included in the HD DVD video contents. In the title search pointer table information (TT_SRPTI) 311a, the common management information of the title search pointer table (TT_SRPT) 311 is recorded, and the information of the number of title search pointers (TT_SRP_Ns) included in the title search pointer table (TT_SRPT) 311 and the end address (TT_SRPT_EA) information of the title search pointer table (TT_SRPT) 311 in the file (HD_VMG00.HDI in FIG. 2) of the HD video manager information area (HDVMGI) are recorded.

Further, there are recorded in one title search pointer (TT_SRP) information 311b: various information including title playback type (TT_PB_TY), the number of angles (AGL_Ns), the number of Part_of_Titles (PTT) (PTT_Ns), title Parental_ID_Field (TT_PTL_ID_FLD) information, HDVTS number (HDVTSN), HDVTS title number (HDVTS_TTN), and start address of the HDVTS (HDVTS_SA).

Figure 6:
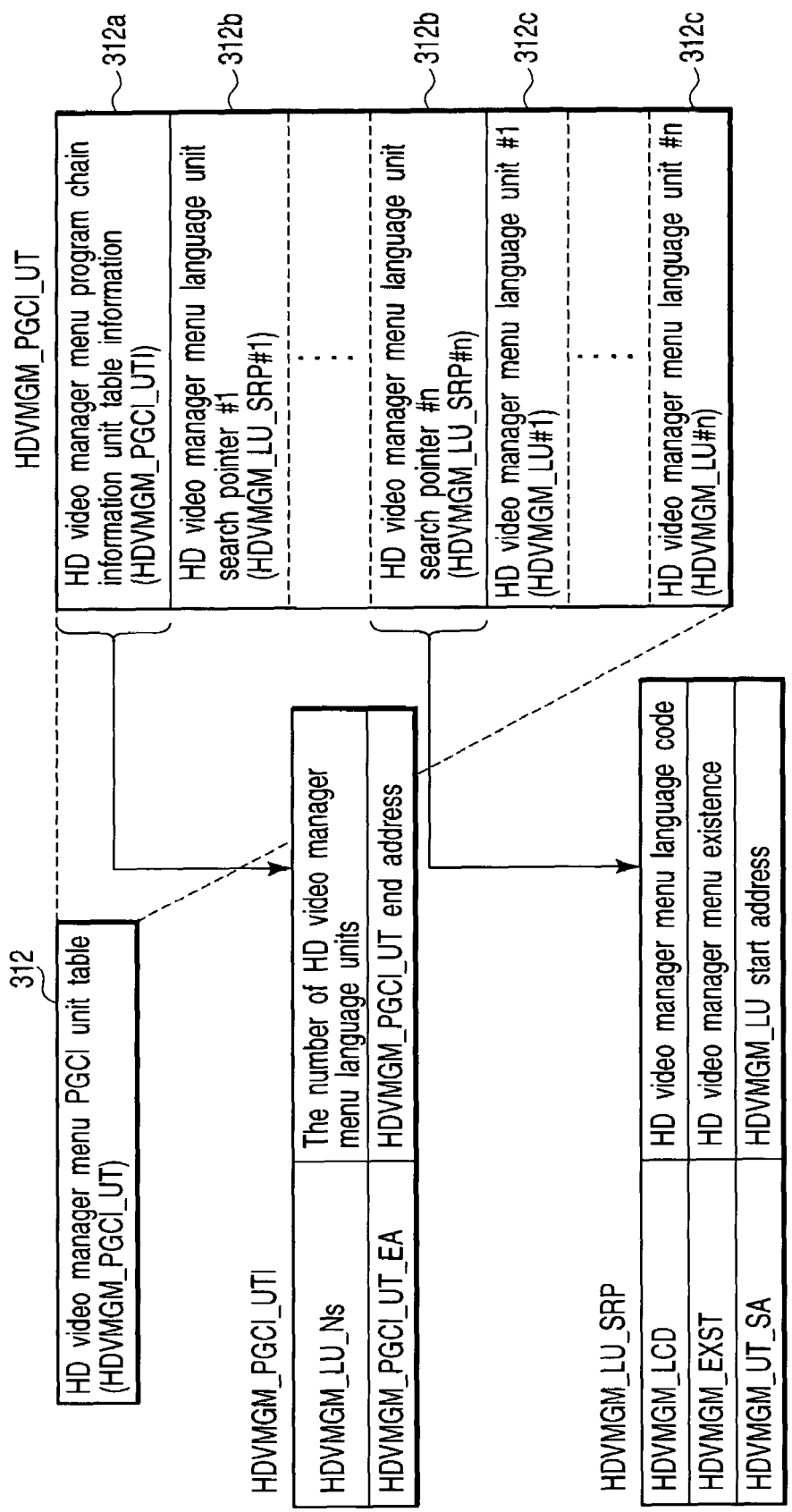
FIG. 6 is a diagram showing a data structure in an HD video manager menu PGCI unit table (HDVMGM_PGCI_UT) 312 shown in FIG. 3.

Next, the data structure in the HD video manager menu PGC unit table (HDVMGM_PGCI_UT) 312 shown in FIG. 3 is shown in FIG. 6. In the HD video manager menu PGC unit table (HDVMGM$_{13}$ PGCI_UT) 312, HD video manager menu program chain information unit table information (HDVMGM_PGCI_UTI) 312a and HD video manager menu language units (HDVMGM_LU) 312c are recorded. The HD video manager menu program chain information unit table information (HDVMGM_PGCI_UTI) 312a has recorded therein the common management information in the HD video manager menu PGC unit table (HDVMGM_PGCI_UT) 312. The HD video manager menu language units (HDVMGM_LU) 312c are arranged for each menu description language code for displaying a menu, and have recorded therein the management information relating to menu information. A plurality of the information of the HD video manager menu language units (HDVMGM_LU) 312c are provided so as to correspond to the number of menu description language codes which are supported by the HD DVD video contents. Further, in the HD video manager menu PGC unit table (HDVMGM_PGCI_UT) 312, in order to make an access to the HD video manager menu language units (HDVMGM_LU) 312c for each menu description language code of each menu easy, a plurality of HD video manager menu language unit search pointer (HDVMGM_LU_SRP) information 312b having the start address information of each HD video manager menu language unit (HDVMGM_LU) 312c are provided so as to correspond to the number of the respective HD video manager menu language units (HDVMGM_LU) 312c.

The HD video manager menu PGC unit table (HDVMGM_PGCI_UT) 312 has the information of the number of HD video manager menu language units (HDVMGM_LU_Ns) and the HD video manager menu PGC unit table (HDVMGM_PGCI_UT) 312 end address (HDVMGM_PGCI_UT_EA) information in the file (HD_VMG00.HDI in FIG. 2) of the HD video manager information area (HDVMGI).

Further, the HD video manager menu language unit search pointer (HDVMGM_LU_SRP) information 312b has, as described above, not only the differential address information (HDVMGM_UT_SA) from the top position of the HD video manager menu PGC unit table (HDVMGM_PGCI_UT) 312 in the file (HD_VMG00.HDI in FIG. 2) of the HD video manager information area (HDVMGI) to the top position of the corresponding HD video manager menu language unit (HDVMGM_LU) 312c, but also the information of the HD video manager menu language code (HDVMGM_LCD) denoting the menu description language codes of the corresponding HD video manager menu language unit (HDVMGM_LU) 312c, and the HD video manager menu existence (HDVMGM_EXST) information denoting whether or not the corresponding HD video manager menu language unit (HDVMGM_LU) 312c has a menu screen for displaying to a user as a VOB.

The detailed data structure in the HD video manager menu language unit #n (HDVMGM_LU #n) 312c (FIG. 6) recorded in the HD video manager menu PGC unit table (HDVMGM_PGCI_UT) 312 shown in FIG. 3 is shown in FIG. 7.

In the HD video manager menu language unit (HDVMGM_LU) 312c, respective information of HD video manager menu language unit information (HDVMGM_LUI) 312c1, HD video manager menu program chain information (HDVMGM_PGCI) 312c3 having the structure shown in FIG. 7, and HDVMGM_PGCI search pointer (HDVMGM_PGCI_SRP #1) information 312c2 are recorded. The HD video manager menu language unit information (HDVMGM_LUI) 312c1 has recorded therein the common management information relating to the menus in the HD video manager menu language unit (HDVMGM_LU) 312c. The HDVMGM_PGCI search pointer (HDVMGM_PGCI_SRP #1) information 312c2 denotes a differential address from the top position of the HD video manager menu language unit (HDVMGM_LU) 312c in the file (HD_VMG00.HDI in FIG. 2) of the HD video manager information area (HDVMGI) to the top position of each HD video manager menu program chain information (HDVMGM_PGCI) 312c3.

In the HD video manager menu language unit information (HDVMGM_LUI) 312c1 disposed the initial area (group) in the HD video manager menu language unit #n (HDVMGM_LU #n) 312c, the information relating to the number of HDVMGM_PGCI_SRPs (HDVMGM_PGCI_SRP_Ns) and the HDVMGM_LU end address (HDVMGM_LU_EA) information are provided. The HDVMGM_PGCI search pointer (HDVMGM_PGCI_SRP #n) information 312c2 has the HDVMGM_PGCI start address (HDVMGM_PGCI_SA) information and the HDVMGM_PGC category (HDVMGM_PGC_CAT) information.

In the HDVMGM_PGC category information (HDVMGM_PGC_CAT) in the HDVMGM_PGCI search pointer #n (HDVMGM_PGCI_SRP #n) information 312c2, there are recorded: the selection information for voice information which are played back at the same time when a menu of the HD contents in the invention is displayed; and the voice information selection flags (voice information selection) denoting the start/end trigger information of a voice information playback. As the voice data which are played back at the same time when a menu of the HD contents in the invention is displayed, one of:

(1) audio data recorded on the menu video object area (HDVMGM_VOBS) 32 shown in (e) of FIG. 1 (although not illustrated, those are recorded so as to be dispersed in an audio pack), and (2) audio data which exist in the menu audio object area (HDMEMU_AOBS) 33 shown in (e) of FIG. 1, and in which one or more menu AOBs (HDMENU_AOB) are arranged in order as shown in FIG. 19 can be selected.

Here, when '00b' of the voice information selection flags (voice information selection) is selected, the audio data of (1) is played back, and the voice playback is interrupted at the time of switching the menu. Further, when '10b' of '11b' of the voice information selection flags (voice information selection) is selected, the audio data shown in (2) of the menu AOB (HDMENU_AOB) existing in the menu audio object area (HDMEMU_AOBS) 33 is played back. In a case of playing back the audio data shown in (2), the audio data is started from the top every time changing a menu screen when '11b' is designated, and a playback of the audio data is continued successively regardless of switching a menu screen when '10b' is designated. In the embodiment, as shown in FIG. 19, plural types of menu AOBs (HDMENU_AOB) can be stored in the menu audio object area (HDMEMU_AOBS) 33. The voice information number shown in FIG. 8 denotes the selection information of the menu AOB (HDMENU_AOB) which is played back at the same time when the corresponding menu display PGC is displayed. As the selection information of the menu AOB, selection is carried out on the basis of the number information on "what number AOB from the top is selected" among the menu AOBs arranged in FIG. 19.

As shown in FIG. 8, in the HDVMGM_PGC category (HDVMGM_PGC_CAT) information, entry type information for determining whether it is an entry PGC or not, menu ID information denoting identification of a menu (for example, whether it is a menu of the title or not), block mode information, block type information, and PTL_ID_FLD information are recorded.

Figure 9:
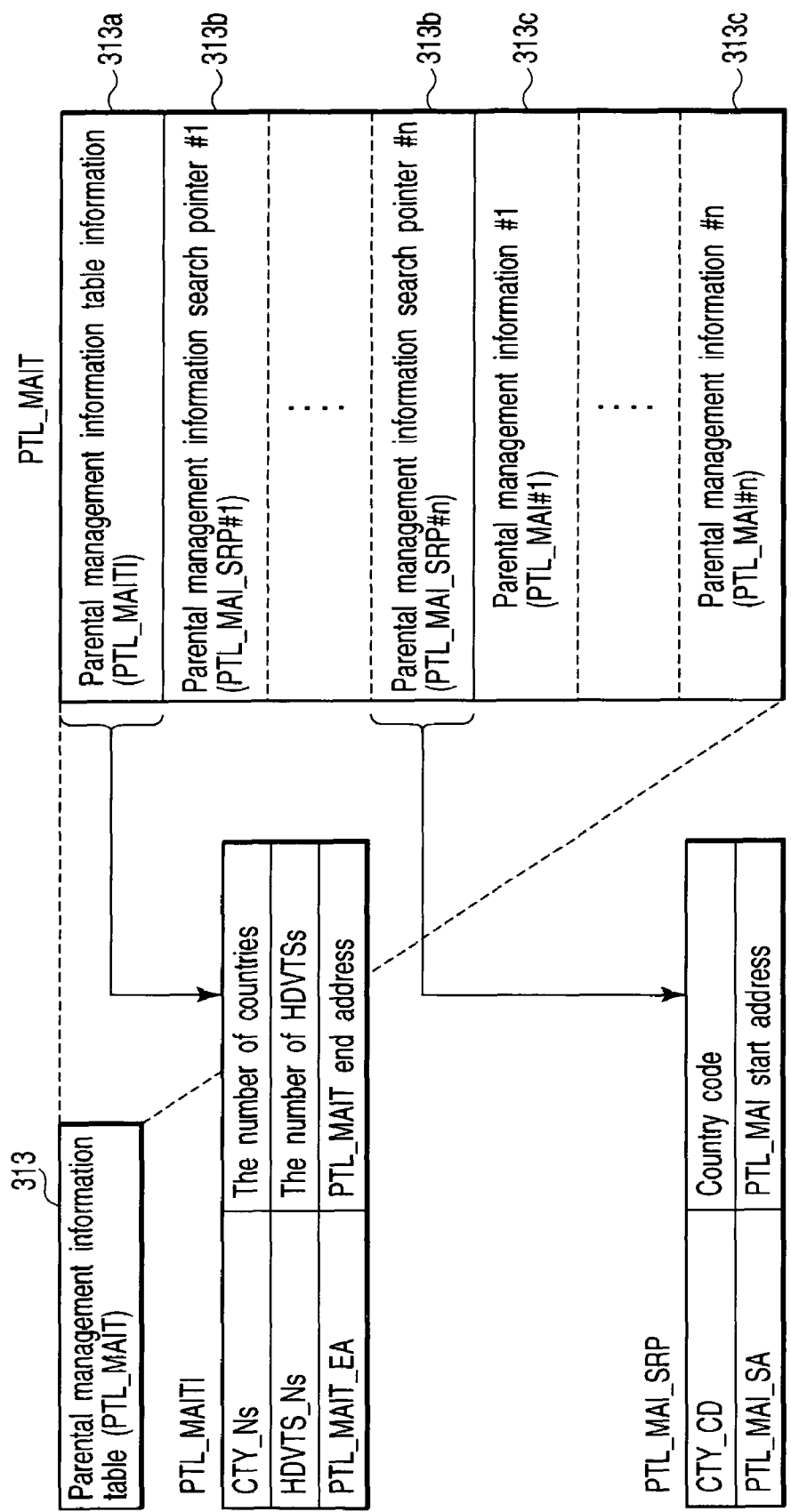
FIG. 9 is a diagram showing a data structure in a parental management information table (PTL_MAIT) 313 shown in FIG. 3.
Figure 10:
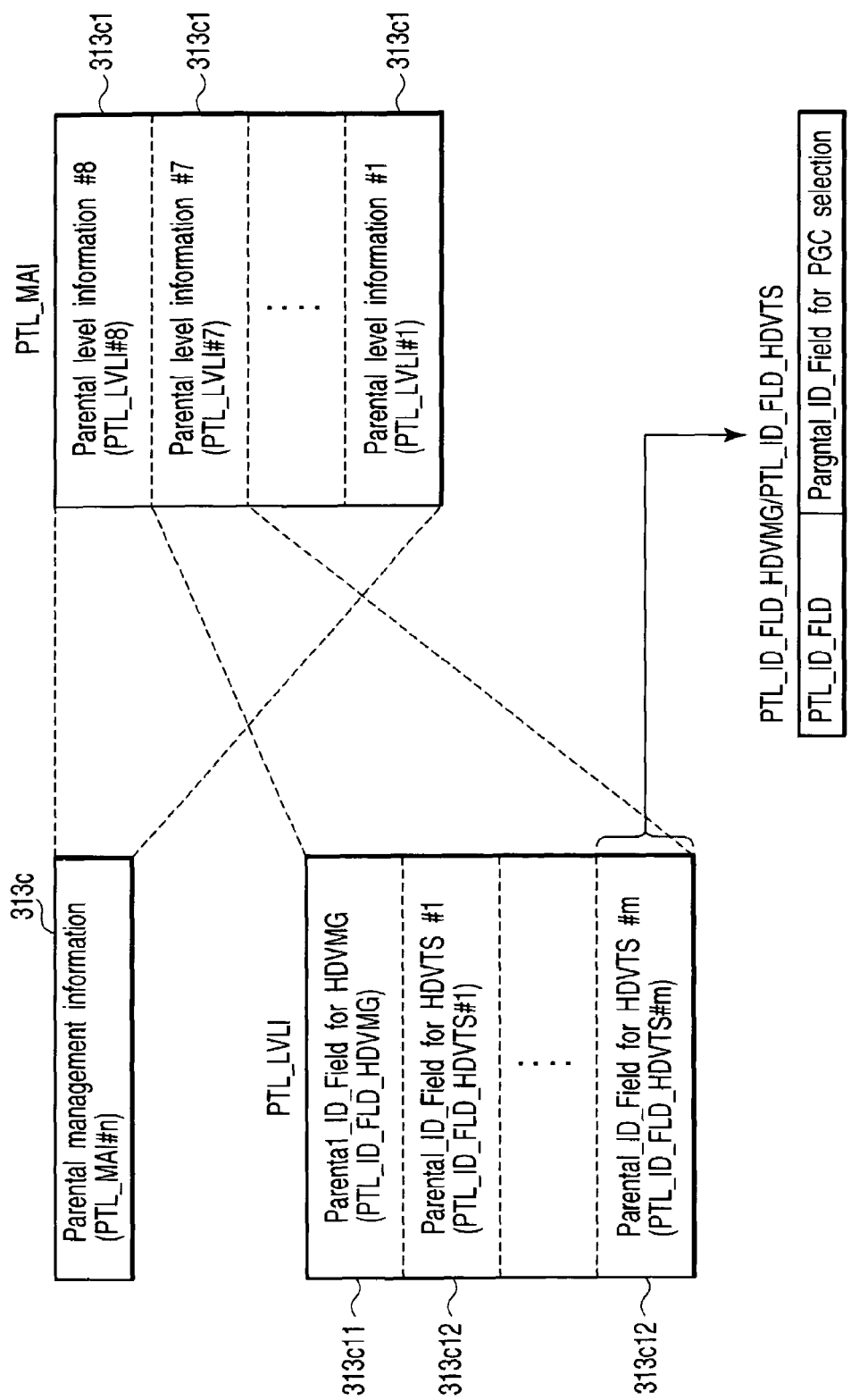
FIG. 10 is a diagram showing a data structure in parental management information (PTL_MAI) 313c shown in FIG. 9.

The data structure in the parental management information table (PTL_MAIT) 313 shown in FIG. 3 is shown in FIG. 9. In parental management information table information (PTL_MAITI) 313*a*, respective information of the number of countries (CTY_Ns), the number of HDVTSs (HDVTS_Ns), and the PTL_MAIT end address (PTL_MAIT_EA) are recorded. A parental management information search pointer (PTL_MAI_SRP) 313*b* has information on the country code (CTY_CD) and the PTL_MAI start address (PTL_MAI_SA).

Further, the data structure in parental management information (PTL_MAI) 313*c* shown in FIG. 9 has parental level information (PTL_LVLI) 313*c*1. In the parental level information (PTL_LVLI) 313*c*1, information on the Parental_ID_Field for HDVMG (PTL_ID_FLD_HDVMG) 313*c*11 and the Parental_ID_Fields for HDVTS (PTL_ID_FLD_HDVTS) 313*c*12 are provided. Moreover, in the information on the Parental_ID_Field for HDVTS (PTL_ID_FLD_HDVTS) 313*c*12, the Pargntal_ID_Field for PGC selection (PTL_ID_FLD) exists.

Figure 11:
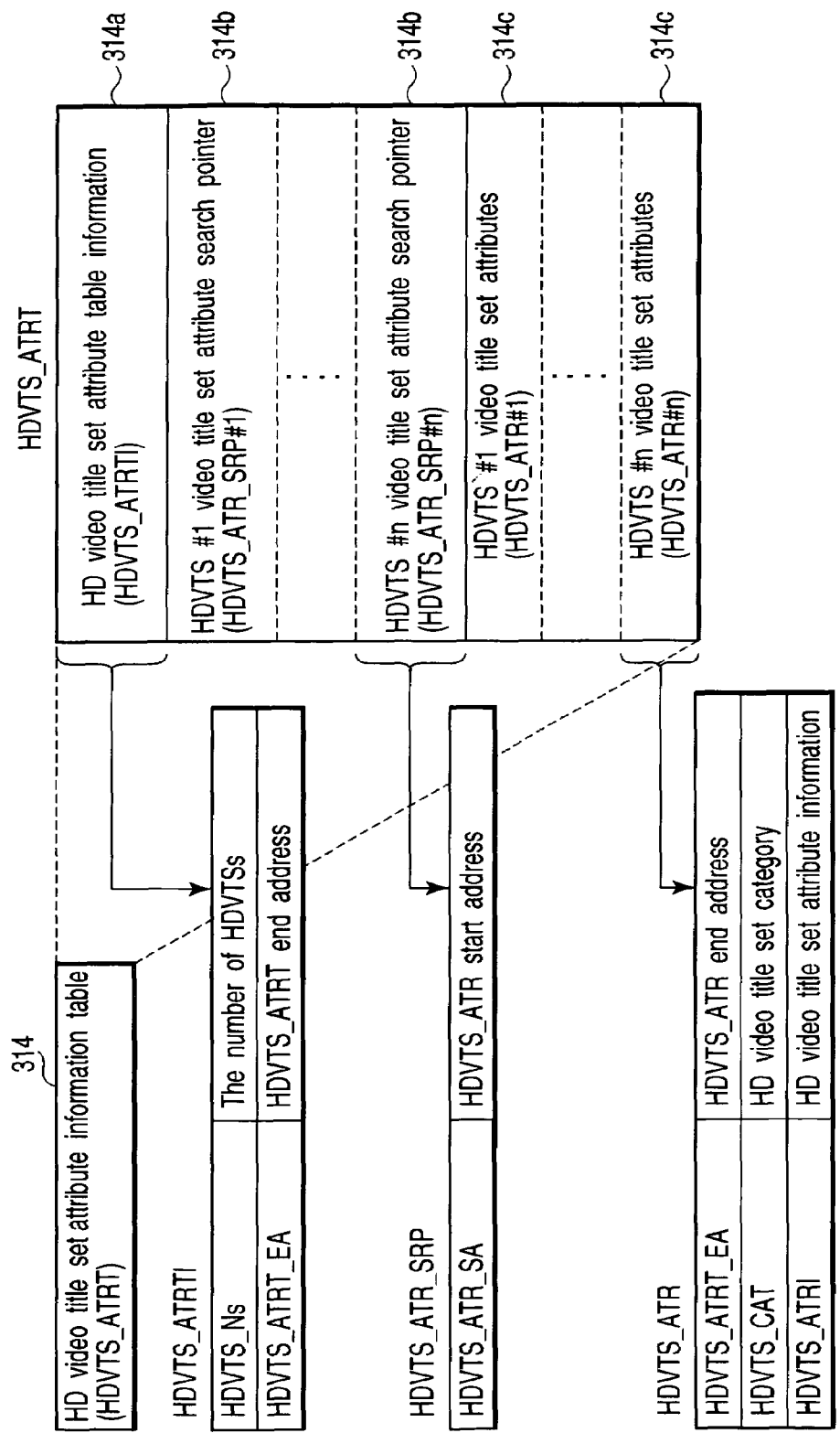
FIG. 11 is a diagram showing a data structure in an HD video title set attribute information table (HDVTS_ATRT) 314 shown in FIG. 3.

The inside of the HD video title set attribute information table (HDVTS_ATRT) 314 shown in FIG. 3 is, as shown in FIG. 11, composed of:

HD video title set attribute table information (HDVTS_ATRTI) 314*a* having information of the number of HDVTSs (HDVTS_Ns) and the HDVTS_ATRT end address (HDVTS_ATRT_EA);

HDVTS video title set attribute search pointers (HDVTS_ATR_SRP) 314*b* on which information of the IHDVTS_ATR start address (HDVTS_ATR_SA) have been recorded; and HDVTS video title set attributes (HDVTS_ATR) 314*c* having respective information of the HDVTS_ATR end address (HDVTS_ATRT_EA), the HD video title set category (HDVTS_CAT), and the HD video title set attribute information (HDVTS_ATRI).

Figure 12:
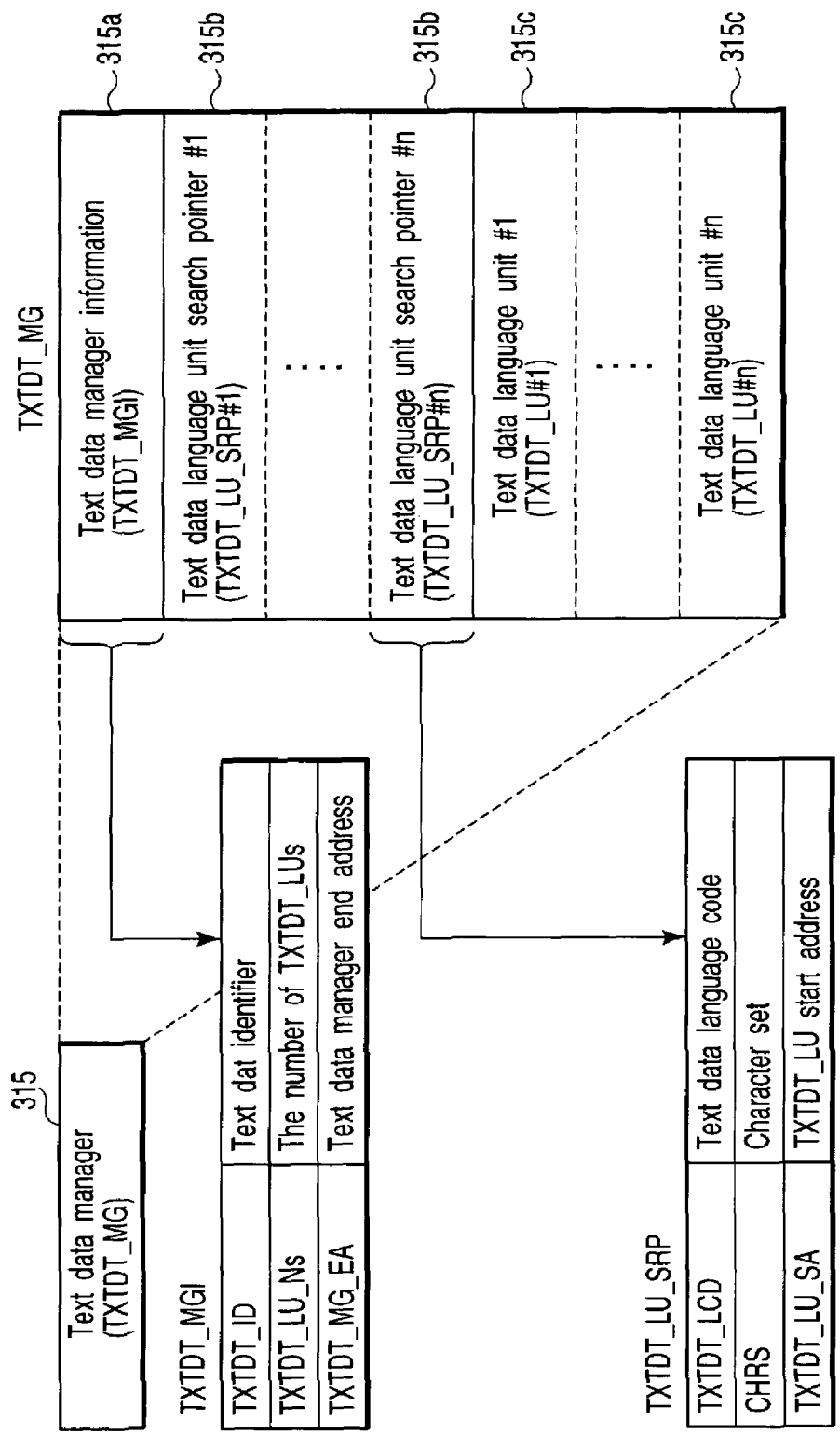
FIG. 12 is a diagram showing a data structure in a text data manager (TXTDT_MG) 315 shown in FIG. 3.

The inside of the text data manager (TXTDT_MG) 315 shown in FIG. 3 is, as shown in FIG. 12, composed of:

text data manager information (TXTDT_MGI) 315*a* having respective information of the text data identifier (TXTDT_ID), the number of TXTDT_LUs (TXTDT_LU_Ns), and the text data manager end address (TXTDT_MG_EA);

text data language unit search pointers (TXTDT_LU_SRP) 315*b* on which respective information of the text data language code (TXTDT_LCD), the character set (CHRS), and the TXTDT_LU start address (TXTDT_LU_SA) have been recorded; and text data language units (TXTDT_LU) 315*c*.

Figure 13:
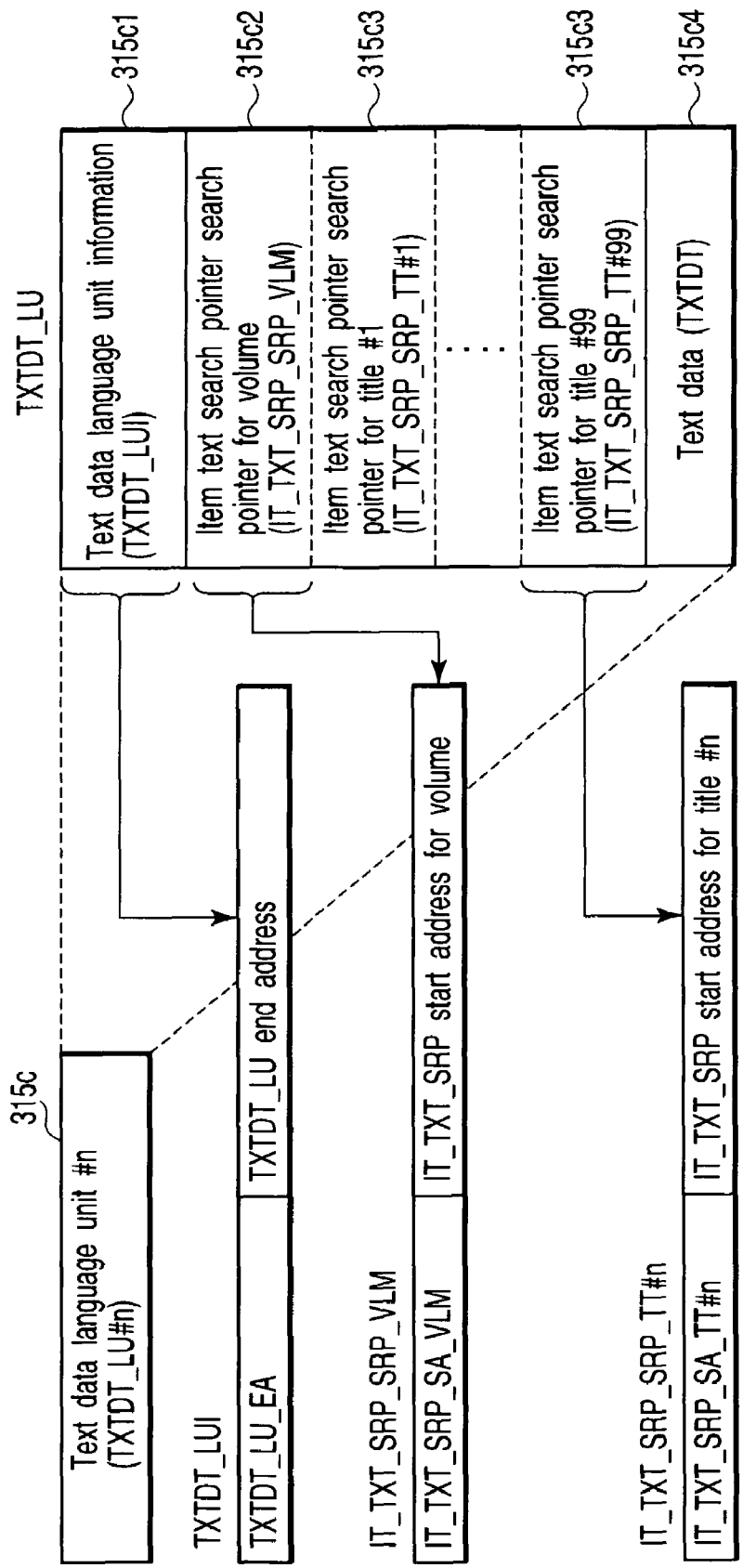
FIG. 13 is a diagram showing a data structure in text data language unit (TXTDT_LU) 315c in the text data manager (TXTDT_MG) 315 shown in FIG. 12.

Moreover, in the text data language unit (TXTDT_LU) 315*c*, as shown in FIG. 13, various information including:

text data language unit information (TXTDT_LUI) 315*c*1 on which information of the TXTDT_LU end address (TXTDT_L_EA) has been recorded;

item text search pointer search pointers for volume (IT_TXT_SRP_SRP_VLM) 315*c*2 on which information of the IT_TXT_SRP start address for volume (IT_TXT_SRP_SA_VLM);

item text search pointer search pointers for title (IT_TXT_SRP_SRP_TT) 315*c*3 having information of the IT_TXT_SRP start address for title (IT_TXT_SRP_SA_TT); and text data (TXTDT) 315*c*4 are provided.

Figure 14:
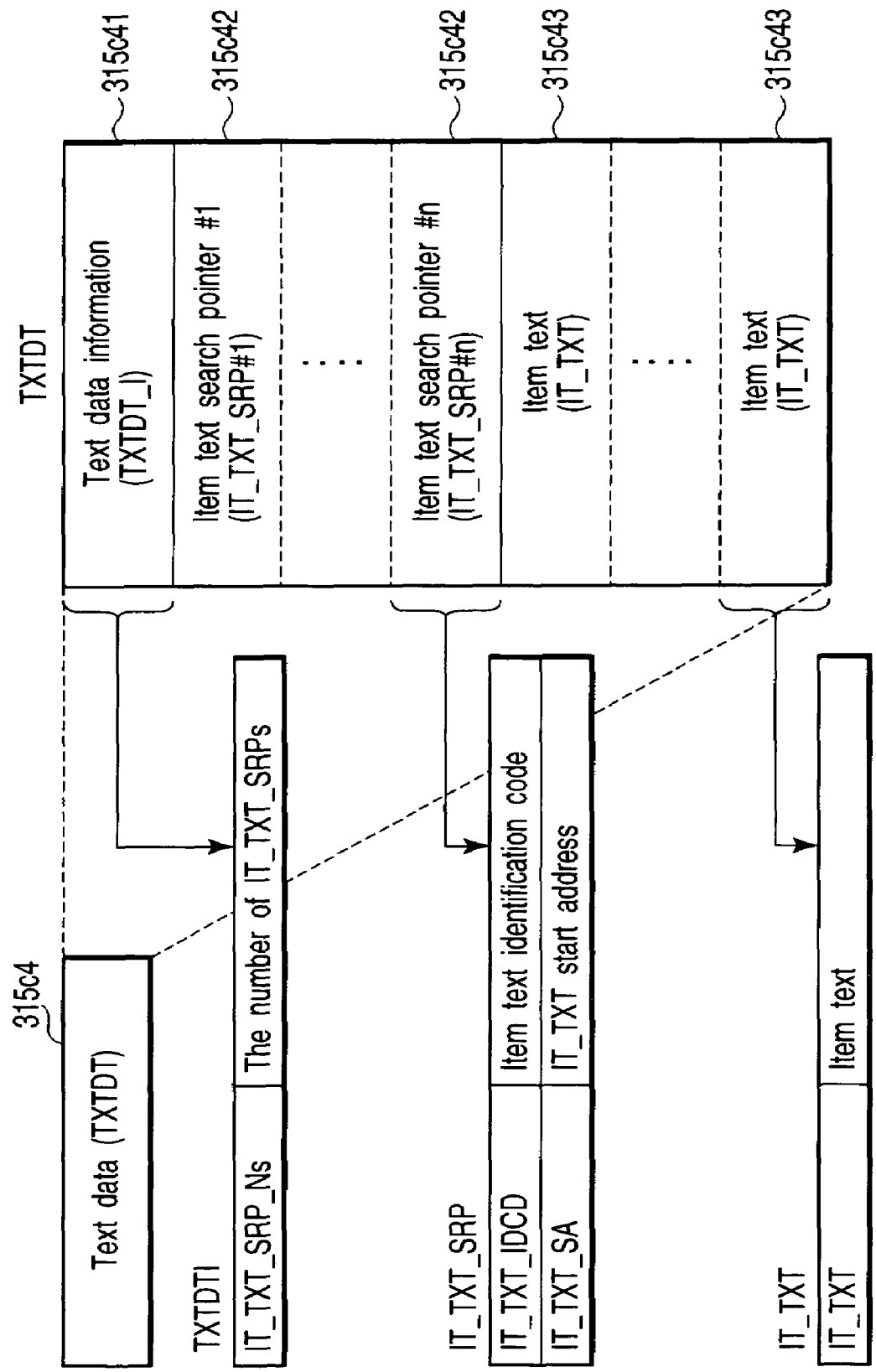
FIG. 14 is a diagram showing a data structure in text data (TXTDT) 315c4 in the text data language unit (TXTDT_LU) 315c shown in FIG. 13.

Further, in the text data (TXTDT) 315*c*4, as shown in FIG. 14, various information including:

text data information (TXTDTI) 315*c*41 having information of the number of IT_TXT_SRPs (IT_TXT_SRP_Ns);

item text search pointers (IT_TXT_SRP) 315*c*42 on which information of the item text identification code (IT_TXT_IDCD) and the IT_TXT start address (IT_TXT_SA) have been recorded; and item texts (IT_TXT) 315*c*43 are recorded.

Figure 15:
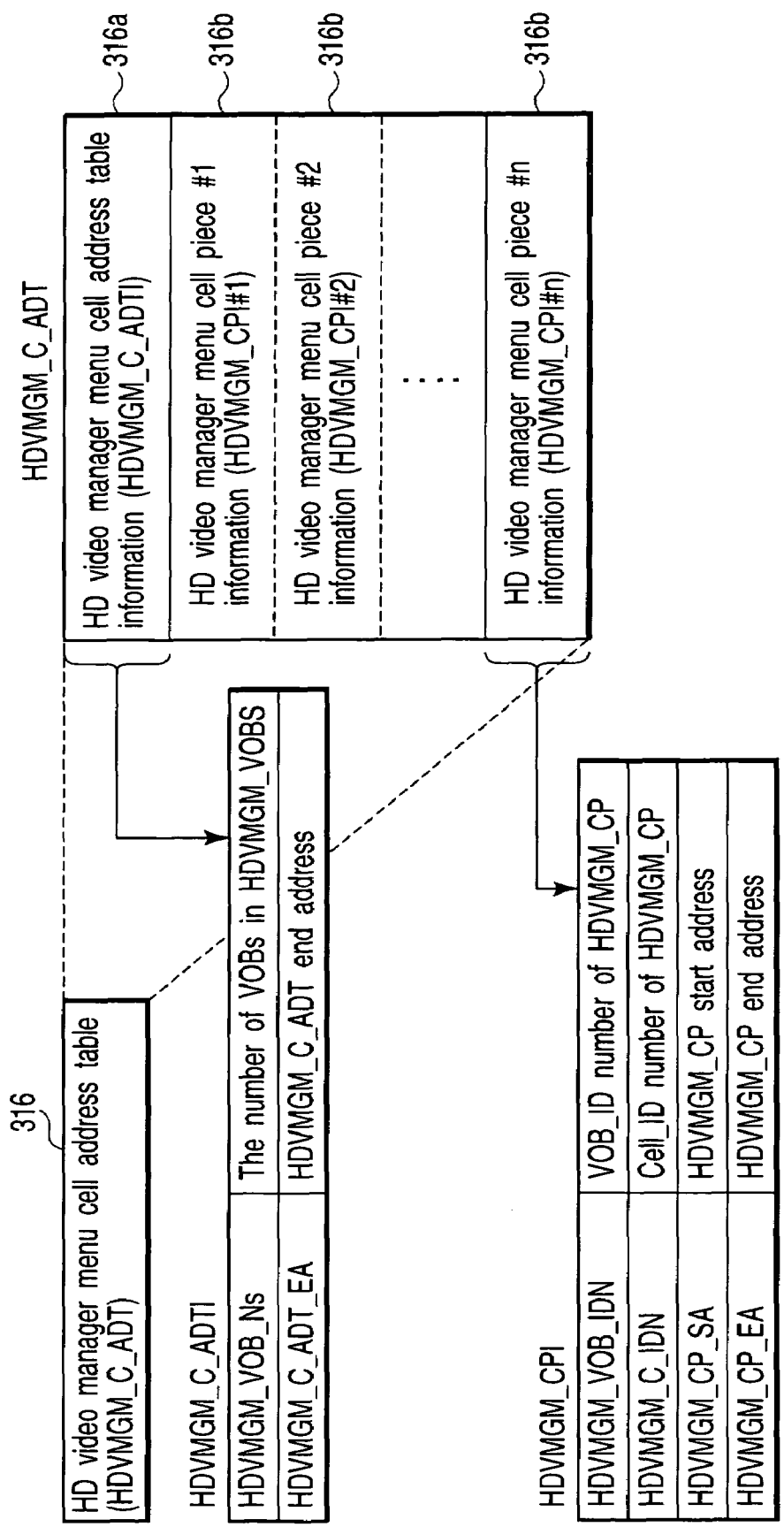
FIG. 15 is a diagram showing a data structure in an HD video manager menu cell address table (HDVMGM_C_ADT) 316 shown in FIG. 13.

In the HD video manager menu cell address table (HDVMGM_C_ADT) 316 shown in FIG. 3, as shown in FIG. 15, various information including:

HD video manager menu cell address table information (HDVMGM_C_ADTI) 316*a* having respective information of the number of VOBs in HDVMGM_VOBS (HDVMGM_VOB_Ns) and the HDVMGM_C_ADT end address (HDVMGM_C_ADT_EA); and HD video manager menu cell piece information (HDVMGM_CPI) 316*b* on which respective information of the VOB_ID number of HDVMGM_CP (HDVMGM_VOB_IDN), Cell_ID number of HDVMGM_CP (HDVMGM_C_IDN), HDVMGM_CP start address (HDVMGM_CP_SA), and HDVMGM_CP end address (HDVMGM_CP_EA)

are recorded.

Figure 16:
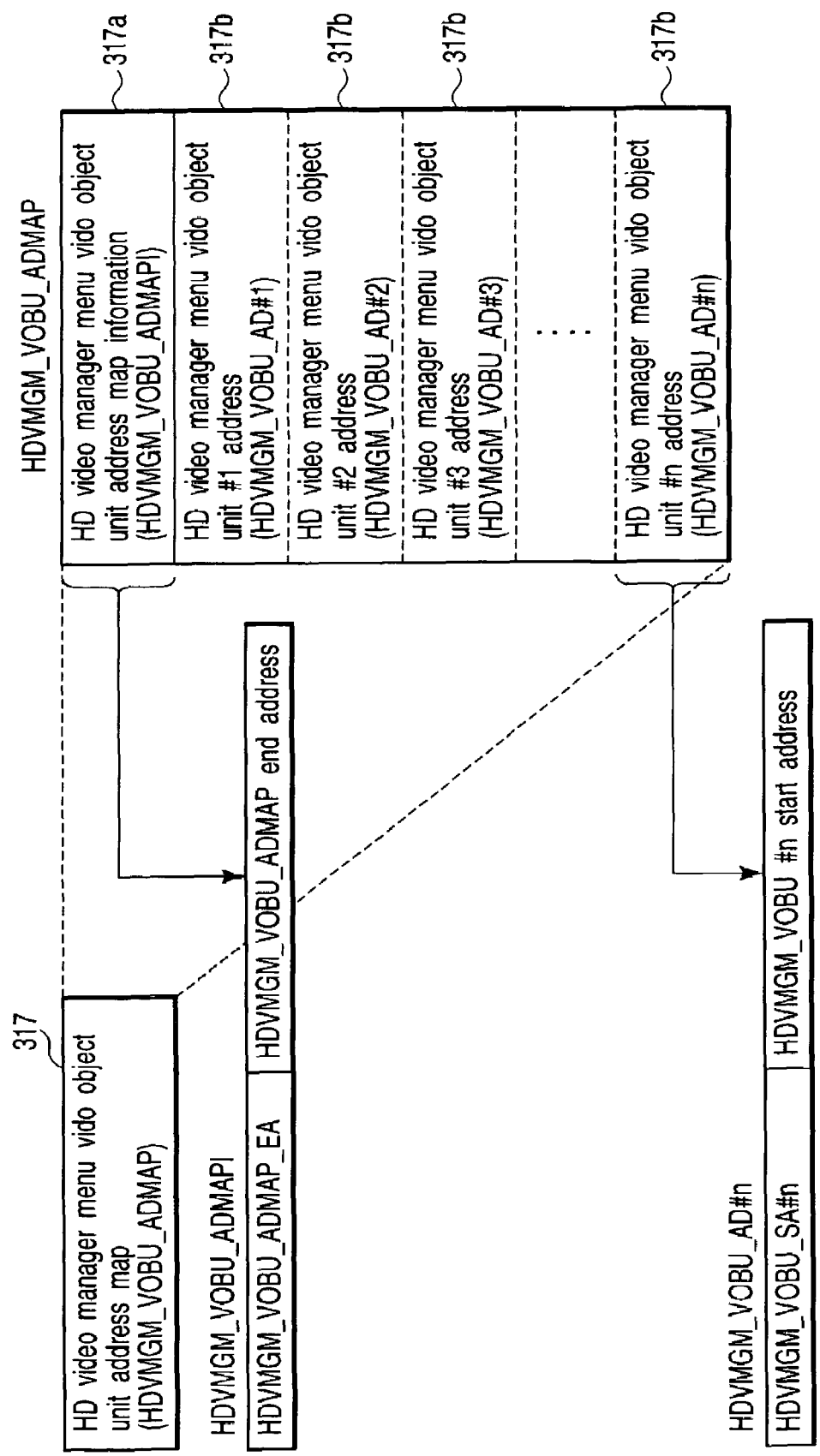
FIG. 16 is a diagram showing a data structure in an HD video manager menu video object unit address map (HDVMGM_VOBU_ADMAP) 317 shown in FIG. 3.

In the HD video manager menu video object unit address map (HDVMGM_VOBU_ADMAP) 317 shown in FIG. 3, as shown in FIG. 16, various information including:

HD video manager menu video object unit address map information (HDVMGM_VOBU_ADMAPI) 317*a* having information of the HDVMGM_VOBU_ADMAP end address (HDVMGM_VOBU_ADMAP_EA); and HDVMGM_VOBU start addresses (HDVMGM_VOBU_SA) are recorded.

FIG. 17 shows the contents of the management information for the menu AOB (HDMENU_AOB) itself, and the inner data structure of the HD menu audio object set information table (HDMENU_AOBSIT) 318 shown in FIG. 3 which exists in the HD video manager information area (HDVMGI) 31 shown in (e) of FIG. 1. In the HD menu audio object set information table information (HDMENU_AOBSITI) 318*a* disposed at the top of the HD menu audio object set information table (HDMENU_AOBSIT) 318, there are HDMENU_AOB_Ns which is information of the number of AOBs in the HDMENU_AOBS and HDMENU_AOBSIT end address information (HDMENU_AOBSIT_EA). In the embodiment of the invention, plural types of menu audio objects (audio data) for menu can be recorded in an information storage medium.

The HD menu audio object information (HDMENU_AOBI) 318*b* denotes each management information for audio object (or audio data) for menu described above, is respectively composed of HDMENU_AOB playback information (HDMENU_AOB_PBI), HDMENU_AOB attribute information (HDMENU_AOB_ATR), HDMENU_AOB #n (corresponding HDMENU_AOB) start address information (HDMENU_AOB_SA), and HDMENU_AOB #n (corresponding HDMENU_AOB) end address information (HDMENU_AOB_EA).

Figure 18:
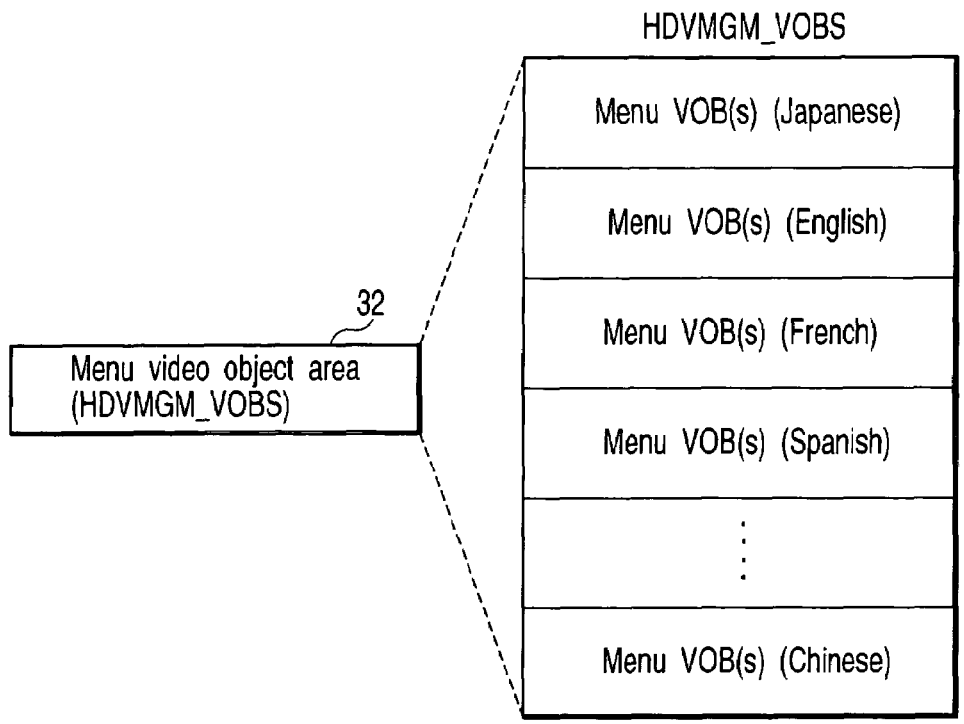
FIG. 18 is a diagram showing a data structure in a menu video object area (HDVMGM_VOBS) 32 shown in (e) of FIG. 1 which is stored together in an HD_VMG01.HDV file of FIG. 2.

The data structure in the menu video object area (HDVMGM_VOBS) 32 shown in (e) of FIG. 1 which have been collectively stored in the HDVMG01.HDV file of FIG. 2 is made such that, as shown in FIG. 18, menu screens (video objects) that same menu screens are respectively recorded in different menu description language codes are arranged in order.

In the present embodiment, plural types of audio objects (audio data) for menu can be recorded in the information storage medium. The recording place for the audio objects (AOB) for menu is, as shown in FIG. 1, in the menu audio object area (HDMENU_AOBS) 33 in the HD video manager recording area (HDVMGI) 30. The menu audio object area (HDMENU_AOBS) 33 configures one file named HD_MENU0.HDA as shown in FIG. 2. The respective audio objects (audio data) for menu are, as shown in FIG. 19, recorded so as to be disposed in order in the menu audio object area (HDMENU_AOBS) 33 configuring one file named HD_MENU0.HDA.

The inside of the HD video title set information area (HDVTSI) 41 shown in (f) of FIG. 1 which is collectively recorded in the VTS00100.IFO file shown in FIG. 2 is, as shown in FIG. 20, divided into the respective areas (management information groups) of an HD video title set information management table (HDVTSI_MAT) 410, an HD video title set PTT search pointer table (HDVTS_PTT_SRPT) 411, an HD video title set program chain information table (HDVTS_PGCIT) 412, an HD video title set menu PGCI unit table (HDVTSM_PGCI_UT) 413, an HD video title set time map table (HDVTS_TMAPT) 414, an HD video title set menu cell address table (HDVTSM_C_ADT) 415, an HD video title set menu video object unit address map (HDVTSM_VOBU_ADMAP) 416, an HD video title set cell address table (HDVTS_C_ADT) 417, and an HD video title set video object unit address map (HDVTS_VOBU_ADMAP) 418.

In the HD video title set information management table (HDVTSI_MAT) 410, the management information in common in corresponding video title sets are recorded. The common management information in the video title sets can be immediately read by disposing the common management information in the initial area (management information group) in the video title set area (HDVTSI) 41. Consequently, an attempt can be made to simplify the playback control processing of the information playback apparatus and to shorten the control processing time.

The management information relating to the graphic units included in the HDVTS (HD video title set of the present invention) are recorded in the HD video title set information management table (HDVTSI_MAT) 410 (refer to FIG. 20) disposed in the initial area (group) in the video title set area (HDVTSI) 41 shown in (f) of FIG. 1. The concrete contents of the management information of the HD video title set information management table (HDVTSI_MAT) 410 are, as shown in FIG. 21, recorded such that the information of the number of graphic unit streams and attribute information are divided into a menu screen in the HDVTS and a title (display image) respectively as information of the number of HDVTSM graphic unit streams (HDVTSM_GUST_Ns), HDVTSM graphic unit stream attribute information (HDVTSM_GUST_ATR), information of the number of HDVTS graphic unit streams (HDVTS_GUST_Ns), and HDVTS graphic unit stream attribute table information (HDVTS_GUST_ATRT).

Further, in the HD video title set information management table (HDVTSI_MAT) 410, as shown in FIG. 21, in addition to the common management information in the video title set, there are recorded various information including an HD video title set identifier (HDVTS_ID), an HDVTS end address (HDVTS_EA), an HDVTSI end address (HDVTSI_EA), a version number of the HD-DVD video standard (VERN), an HDVTS category (HDVTS_CAT), an HDVTSI_MAT end address (HDVTSI_MAT_EA), an HDVTSM_VOBS start address (HDVTSM_VOBS_SA), an HDVTSTT_VOBS start address (HDVTSTT_VOBS_SA), an HDVTS_PTT_SRPT start address (HDVTS_PTT_SRPT_SA), an HDVTS_PGCIT start address (HDVTS_PGCIT_SA), an HDVTSM_PGCI_UT start address (HDVTSM_PGCI_UT_SA), an HDVTS_TMAP start address (HDVTS_TMAP_SA), an HDVTSM_C_ADT start address (HDVTSM_C_ADT_SA), an HDVTSM_VOBU_ADMAP start address (HDVTSM_VOBU_ADMAP_SA), an HDVTS_C_ADT start address (HDVTS_C_ADT_SA), an HDVTS_VOBU_ADMAP start address (HDVTS_VOBU_ADMAP_SA), an HDVTSM video attribute (HDVTSM_V_ATR), the number of HDVTSM audio streams (HDVTSM_AST_Ns), an HDVTSM audio stream attribute (HDVTSM_AST_ATR), a start address of the number of HDVTSM sub-picture streams (HDVTSM_SPST_Ns), an HDVTSM sub-picture stream attribute (HDVTSM_SPST_ATR), an HDVTS video attribute (HDVTS_V_ATR), the number of HDVTS audio streams (HDVTS_AST_Ns), an HDVTS audio stream attribute table (HDVTS_AST_ATRT), the number of HDVTS sub-picture streams (HDVTS_SPST_Ns), an HDVTS sub-picture stream attribute table (HDVTS_SPST_ATR), and an HDVTS multi-channel audio stream attribute table (HDVTS_MU_AST_ATRT).

The graphic stream attribute (for VTSM_EVOBS) (HDVTSM_GUST_ATRT) shown in FIG. 21 consists of a plurality of HDVTSM_GUST_ATR, and the graphic stream attribute (HDVTSM_GUST_ATRT) is information of 16 bits. b15 to b14 are in the graphic compression mode, b13 is a GR_EXST flag, and the others are reserved. In the graphic compression mode, '00b' is set, and the others are reserved in a case of incompression. The GR_EXST flag descries whether or not a graphic stream exists, and when no graphic stream exists in the VTSM_EVOBS, '0b' is set, and when a graphic stream exists in the VTSM_EVOBS, '1b' is set, and the others are reserved.

The graphic stream attribute (for VTSTT_EVOBS) (HDVTS_GUST_ATRT) shown in FIG. 21 consists of a plurality of HDVTS_GUST_ATR, and the graphic stream attribute (for VTSTT_EVOBS) (HDVTS_GUST_ATRT) is information of 16 bits. b15 to b14 are in the graphic compression mode, b13 is a GR_EXST flag, and the others are reserved. In the graphic compression mode, '00b' is set, and the others are reserved in a case of incompression. The GR_EXST flag describes whether or not a graphic stream exists, and when no graphic stream exists in the VTSTT_EVOBS, '0b' is set, and when a graphic stream exists in the VTSTT_EVOBS, '1b' is set, and the others are reserved.

Figure 22:
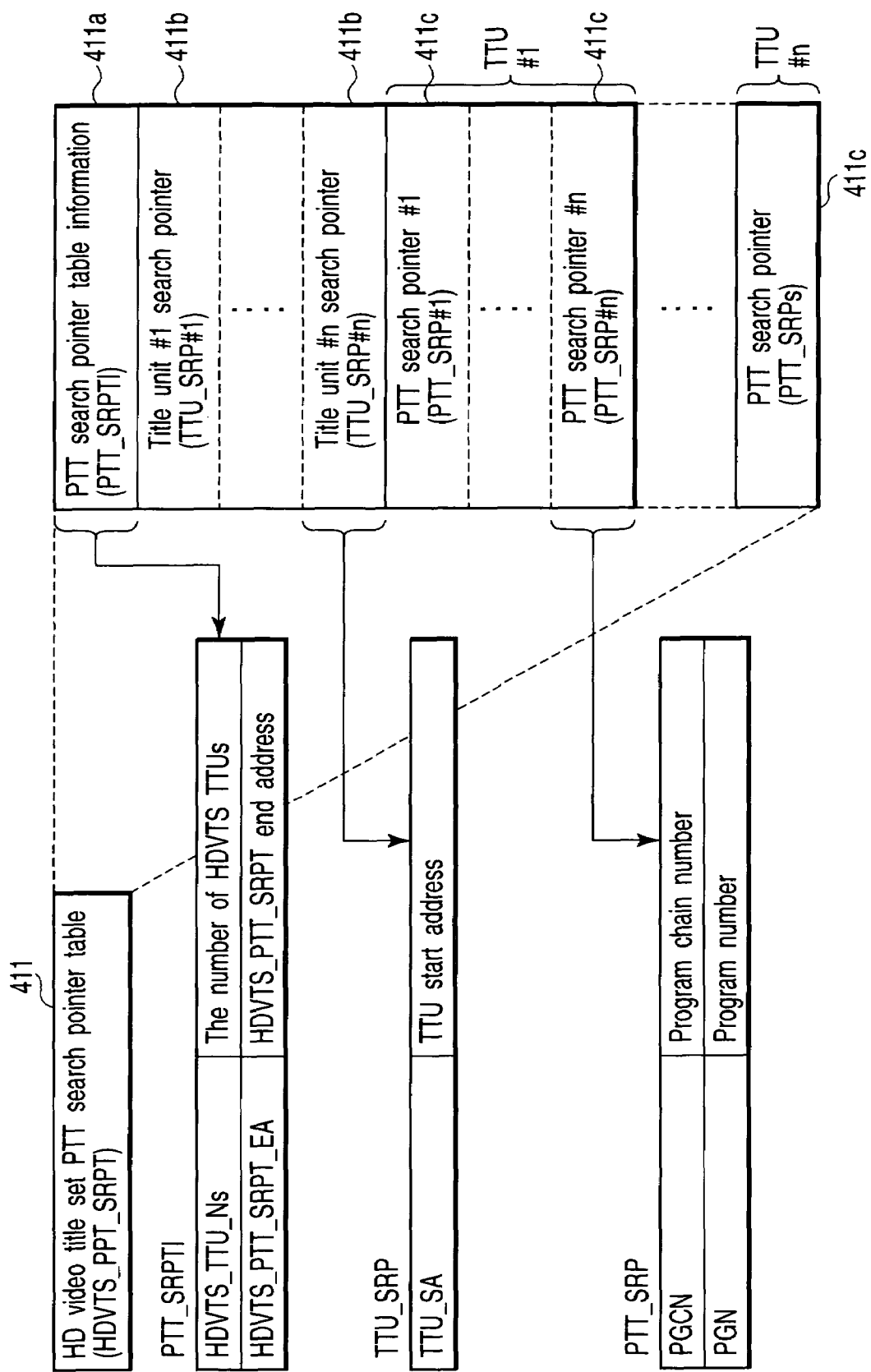
FIG. 22 is a diagram showing a data structure in an HD video title set PTT search pointer table (HDVTS_PPT_SRPT) 411 shown in FIG. 20.

The data structure in the HD video title set PTT search pointer table (HDVTS_PTT_SRPT) 411 shown in FIG. 20 is shown in FIG. 22. The HD video title set PTT search pointer table (HDVTS_PTT_SRPT) 411 is composed of various information including:

PTT search pointer table information (PTT_SRPTI) 411*a* having information of the number of HDVTS TTUs (HDVTS_TTU_Ns) and HDVTS_PTT_SRPT end address (HDVTS_PTT_SRPT_EA);

title unit search pointers (TTU_SRP) 411*b* on which information of the TTU start address (TTU_SA) have been recorded; and PTT search pointers (PTT_SRP) 411*c* having information of the program chain number (PGCN) and the program number (PGN).

With respect to a place for disposing the information for managing resume information, in the first embodiment of the present invention, an RSM flag (an update permission flag for resume information) is provided in the HDVTS_PGC category in the HDVTSP_GCI search pointer 412, as shown in FIGS. 23 and 24. The information of the HDVTSP_GCI search pointer 412 is disposed in the HD video title set program chain information table (HDVTS_PGCIT) 412 shown in FIG. 20, which exists in the HD video title set information area (HDVTSI) 41 shown in (f) of FIG. 1. In addition thereto, the HD video title set program chain information table (HDVTS_PGCIT) 412 has recorded therein, as shown in FIG. 23, information of the HD video title set PGI information table (HDVTS_PGCITI) 412*a* including the information of the number of HDVTS_PGCI_SRPs (HDVTS_PGCI_SRP_Ns) and the HDVTS_PGCIT end address (HDVTS_PGCIT_EA). Further, in addition to the HDVTS_PGC category (HDVTS_PGC_CAT) described above, information of the HDVTS_PGCI start address (HDVTS_PGCI_SA) is recorded in the HDVTS_PGCI search pointer (HDVTS_PGCI_SRP) 412*b*.

The RSM permission flag (update permission flag for resume information) shown in FIG. 24 is to designate whether or not the contents of the resume information are updated at the stage when a playback of corresponding HDVTS_PGC is started (the resume information is sequentially updated in accordance with a playback situation of corresponding PGC). Namely, processing is carried out in which:

when the flag is '0b', the resume information is updated; and when the flag is '1b', the resume information is not updated, and the information which has been interrupted to play back of the HDVTS_PGC (a corresponding program chain in the HD video title set of the invention) which has been previously played back is maintained.

Further, in addition thereto, there are recorded in the HDVTS_PGC category (HDVTS_PGC_CAT): entry type information for determining whether it is an entry PGC or not; title number information in a VTS (video title set) denoted by the corresponding PGC; block mode information; block type information; and PTL_ID_FLD information.

Figure 25:
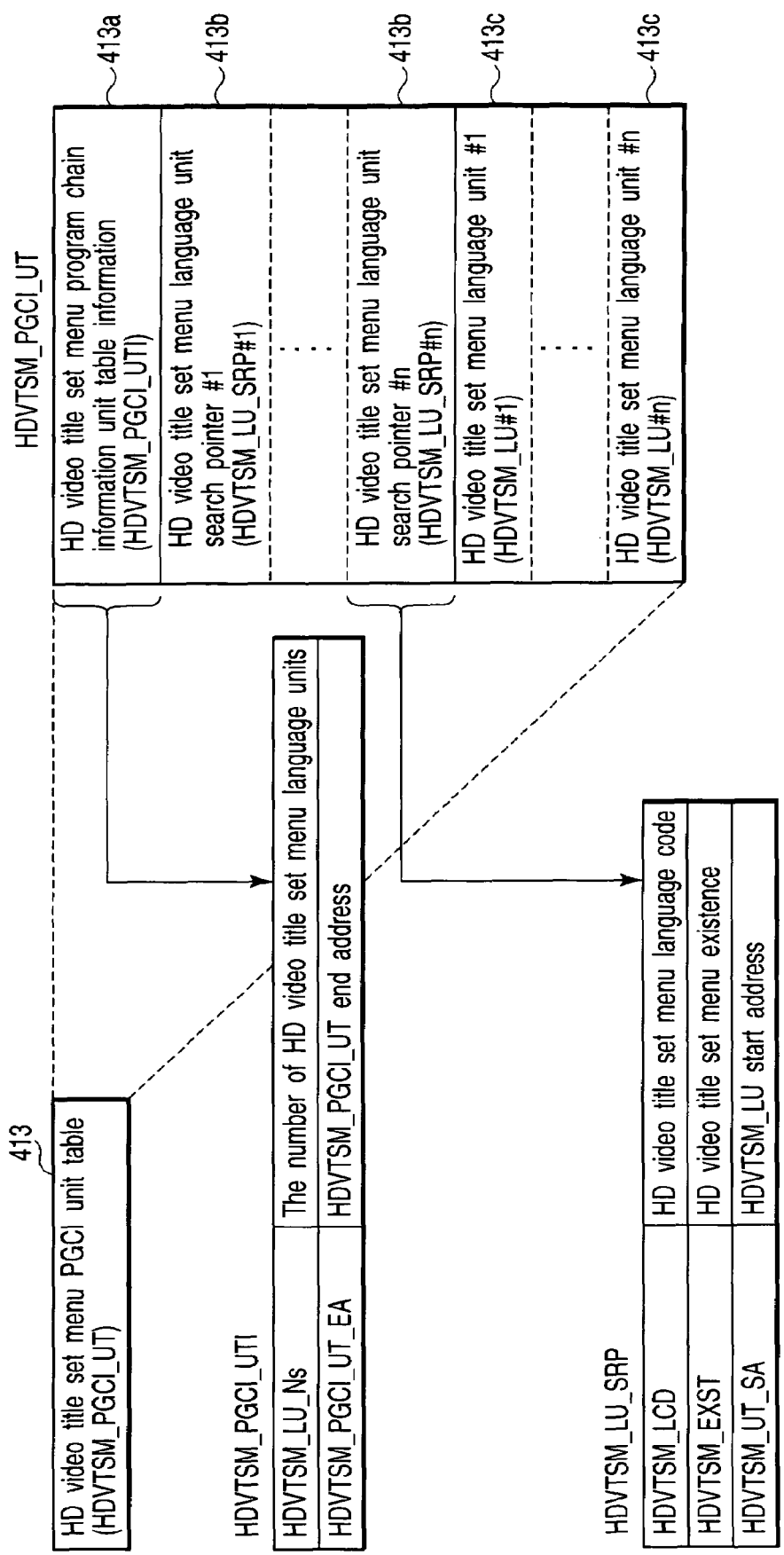
FIG. 25 is a diagram showing a data structure in an HD video title set menu PGCI unit table (HDVTSM_PGCI_UT) 413 shown in FIG. 20.

The data structure in the HD video title set menu PGCI unit table (HDVTSM_PGCI_UT) 413 shown in FIG. 20 is shown in FIG. 25. The inside of the HD video title set menu PGCI unit table (HDVTSM_PGCI_UT) 413 is composed of various information including:

HD video title set menu program chain information unit table (HDVTSM_PGCI_UT) 413*a* having information of the number of HD video title set menu language units (HDVTSM_LU_Ns) and the HDVTSM_PGCI_UT end address (HDVTSM_PGCI_UT_EA);

HD video title set menu language unit search pointers (HDVTSM_LU_SRP) 413*b* on which information of the HD video title set menu language code (HDVTSM_LCD), the HD video title set menu existence (HDVTSM_EXST), and the HDVTSM_LU start address (HDVTSM_UT_SA) have been recorded; and HD video title set menu language units (HDVTSM_LU) 413*c*.

Further, the data structure of the HD video title set menu language unit (HDVTSM_LU) 413*c* is, as shown in FIG. 26, composed of:

HD video title set menu language unit information (HDVTSM_LUI) 413*c*1 having information of the number of HDVTSM_PGCI_SRPs (HDVTSM_PGCI_SRP_Ns) and the HDVTSM_LU end address (HDVTSM_LU_EA);

HD video title set menu program chain information (HDVTSM_PGCI) 413*c*3 having the data structure which is completely the same as those in FIGS. 33 and 34; and HDVTSM_PGCI search pointers (HDVTSM_PGCI_SRP) 413*c*2 on which information of the HDVTSM_PGC category (HDVTSM_PGC_CAT) and the HDVTSM_PGCI start address (HDVTSM_PGCI_SA) have been recorded.

As a setting place for information referring to the AOB (HDMENU_AOB) for menu, with respect to the menus in unit of HDVTS in the first embodiment of the invention, those are disposed in the HDVMGM_PGC category information (HDVMGM_PGC_CAT) in the HDVMGM_PGCI search pointer #n (HDVMGM_PGCI_SRP #n) 413*c*2, as shown in FIG. 26. The voice information number in the HDVTSM_PGC category information (HDVTSM_PGC_CAT) shown in FIG. 27 denotes a voice information number (AOB number) for designating an AOB number #n to played back in the HDMEMU_AOBS (what number AOB corresponds thereto among the menu AOBs (HDMENU_AOB) arranged as shown in FIG. 19). The voice information selection flag denotes selection information of the voice information which is played back at the time of displaying a menu of the HD contents in the invention on the screen, and a voice information selection flag (voice information selection) denoting the start/end trigger information of a voice information playback.

Here, when '00b' of the voice information selection flags (voice information selection) is selected, the audio data recorded in respective menu video objects are played back, and the voice playback is interrupted at the time of switching a menu. In addition, when '10b' of '11b' of the voice information selection flags (voice information selection) is selected, the audio data of the AOB for menu (HDMENU_AOB) existing in the menu audio object area (HDMEMU_VOBS) 33 is played back. In a case of playing back the audio data for menu (AOB), the audio data is started from the top every time changing a menu screen when '11b' is designated, and a playback of the audio data is continued successively regardless of switching a menu screen when '10b' is designated. In the embodiment, as shown in FIG. 19, plural types of menu AOBs (HDMENU_AOB) can be stored in the menu audio object area (HDMEMU_AOBS) 33. The voice information number shown in FIG. 27 denotes the selection information of the menu AOB (HDMENU_AOB) which is played back at the same time when the corresponding menu display PGC is displayed. As the selection information of the menu AOB, selection is carried out on the basis of the number information on "what number AOB from the top is selected" among the menu AOBs arranged in FIG. 19. Further, in the HDVMGM_PGC category (HDVMGM_PGC_CAT), entry type information for determining whether it is an entry PGC or not, menu ID information denoting identification of a menu (for example, whether it is a menu of the title or not), block mode information, block type information, and PTL_ID_FLD information are additionally recorded.

Figure 28:
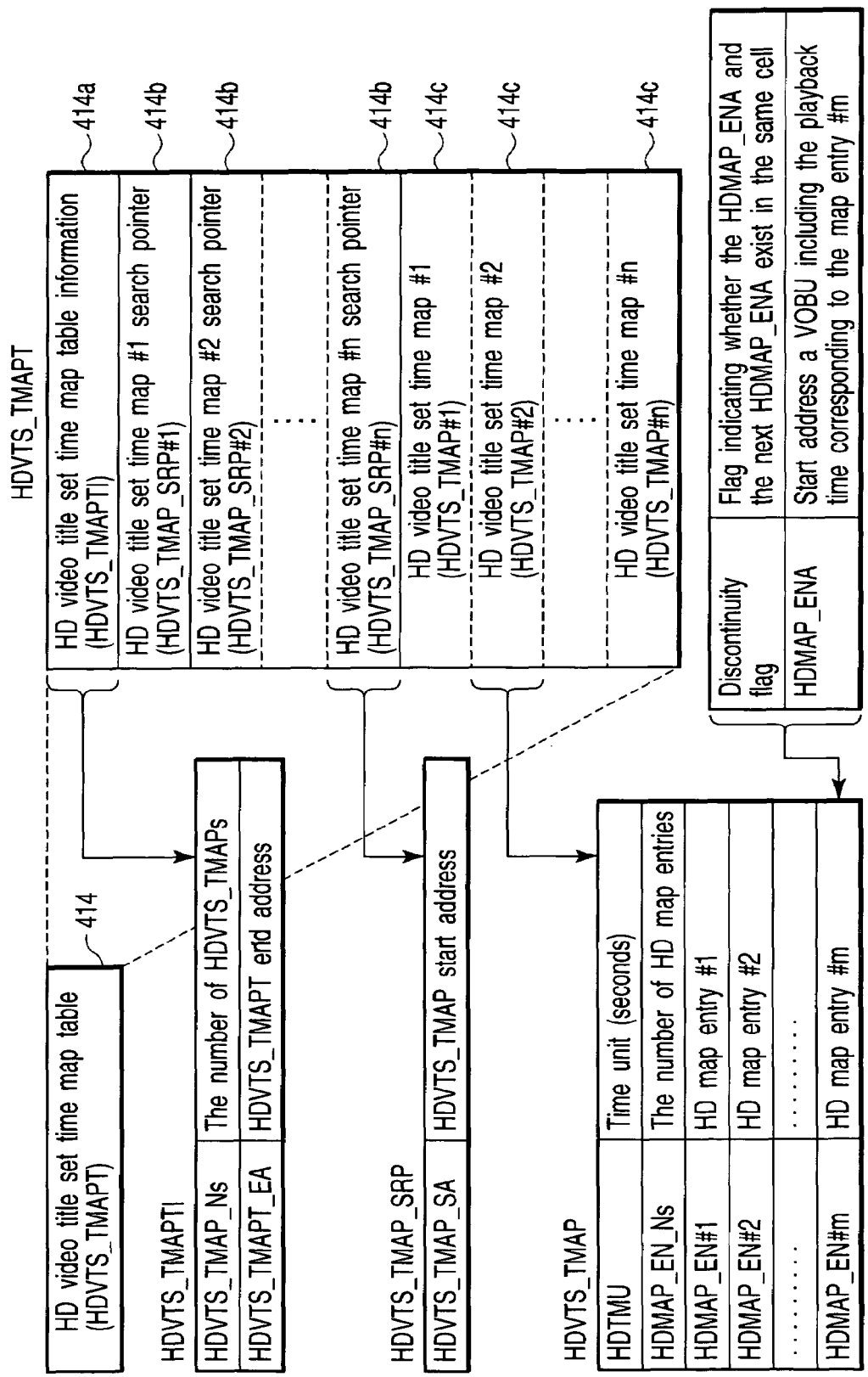
FIG. 28 is a diagram showing a data structure in an HD video title set time map table (HDVTS_TMAPT) 414 shown in FIG. 20.

The data structure in the HD video title set time map table (HDVTS_TMAPT) 414 shown in FIG. 20 is shown in FIG. 28. The inside of the HD video title set time map table (HDVTS_TMAPT) 414 is composed of various information including:

HD video title set time map table information (HDVTS_TMAPTI) 414*a* on which various information including the number of HDVTS_TMAPs (HDVTS_TMAP_Ns) and the HDVTS_TMAPT end address (HDVTS_TMAPT_EA) have been described;

HD video title set time map search pointers (HDVTS_TMAP_SRP) 414*b* having information of the HDVTS_TMAP start address (HDVTS_TMAP_SA); and HD video title set/time maps (HDVTS_TMAP) 414*c* on which a length (TMU) of a time unit (seconds) as the basis for a map entry, and various information including the number of map entries (MAP_EN_Ns) and the map entry (MAP_EN) have been recorded.

The inside of the above-described HD map entry (HDMAP_EN) is composed of: "discontinuous flag" denoting a flag for determining whether or not a corresponding HDMAP_ENA and the following HDMAP_ENA exist in a same cell; and VOBU start address information (HDMAP_ENA) including a playback time corresponding to the corresponding HD map entry (HDMAP_EN).

Figure 29:
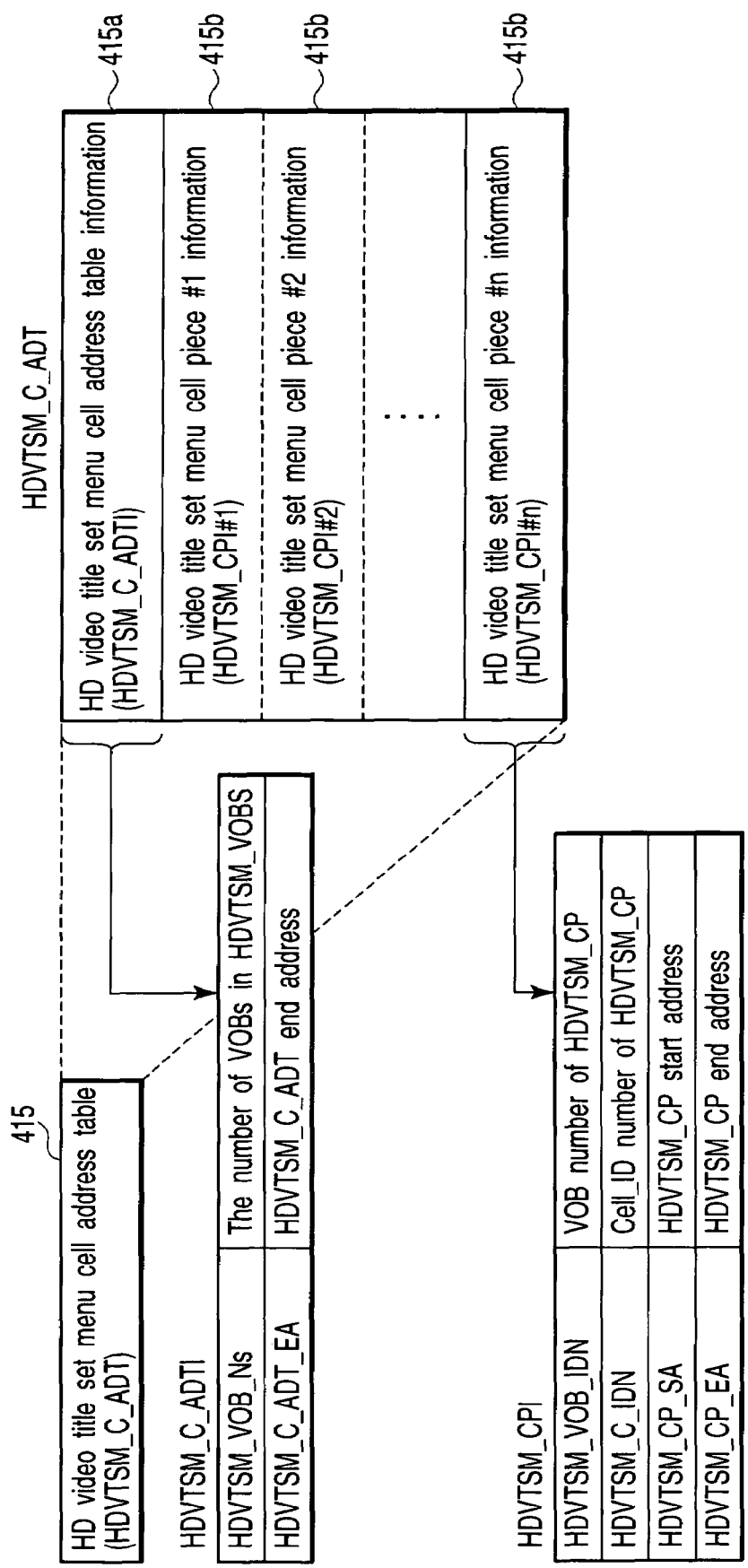
FIG. 29 is a diagram showing a data structure in an HD video title set menu cell address table (HDVTSM_C_ADT) 415 shown in FIG. 20.

Further, the data structure in the HD video title set menu cell address table (HDVTSM_C_ADT) 415 shown in FIG. 20 is, as shown in FIG. 29, composed of various information including:

HD video title set menu cell address table information (HDVTSM_C_ADTI) 415*a* having information of the number of VOBs in HDVTSM_VOBS (HDVTSM_VOB_Ns) and HDVTSM_C_ADT end address (HDVTSM_C_ADT_EA); and HD video title set menu/cell piece information (HDVTSM_ CPI) 415*b* on which various information including the VOB_ID number of the HDVTSM_CP (HDVTSM_VOB_IDN), the Cell_ID number of the HDVTSM_CP (HDVTSM_C_IDN), the HDVTSM_CP start address (HDVTSM_CP_SA), and the HDVTSM_CP end address (HDVTSM_CP_EA).

Figure 30:
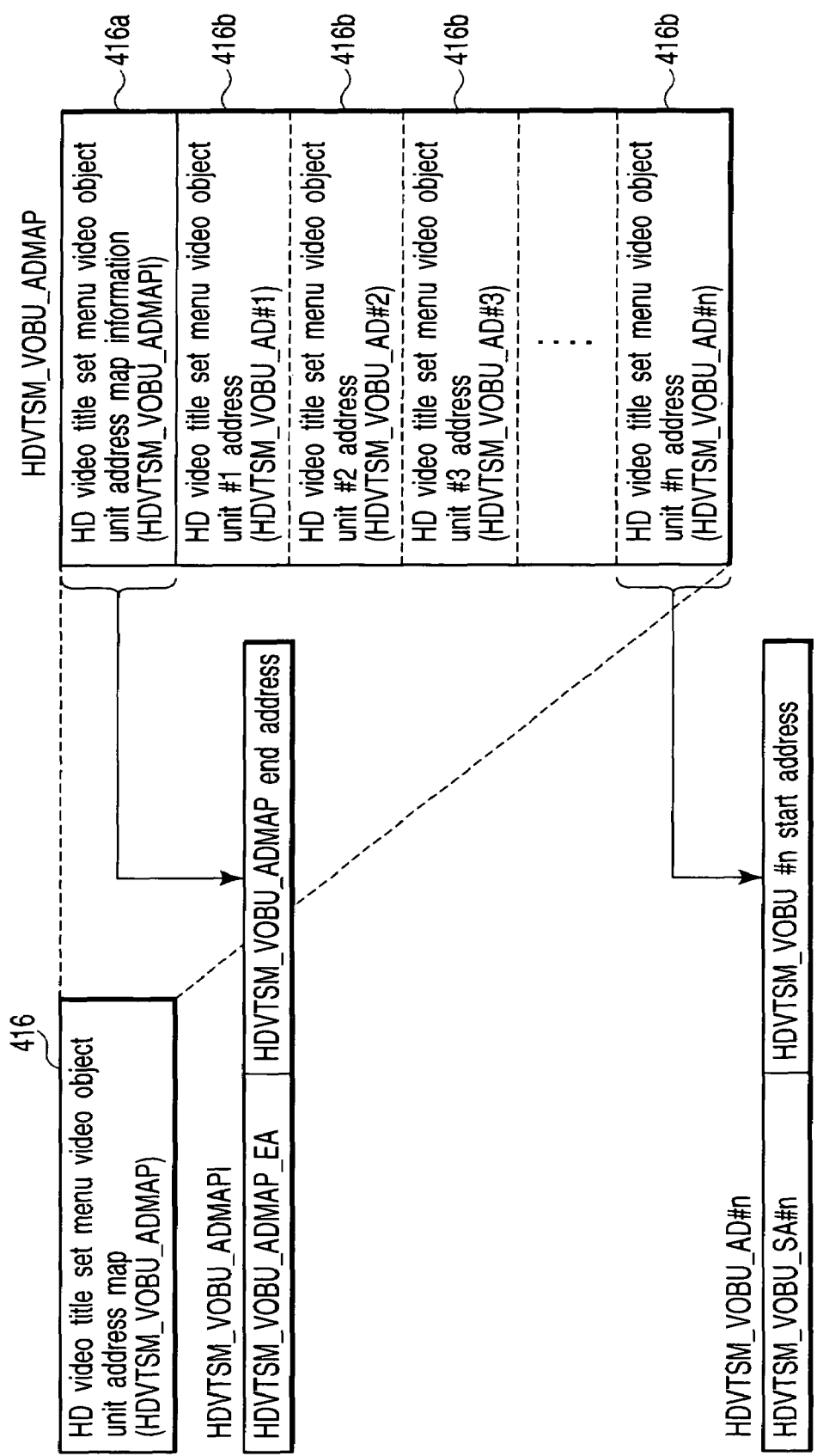
FIG. 30 is a diagram showing a data structure in an HD video title set menu video object unit address map (HDVTSM_VOBU_ADMAP) 416 shown in FIG. 20.

The HD video title set menu video object unit address map (HDVTSM_VOBU_ADMAP) 416 shown in FIG. 20 is, as shown in FIG. 30, composed of information including:

HD video title set menu video object unit address map information (HDVTSM_VOBU_ADMAPI) 416*a* on which information of the HDVTSM_VOBU_ADMAP end address (HDVTSM_VOBU_ADMAP_EA) have been recorded; and HD video title set menu video object unit addresses (HDVTSM_VOBU_AD) 416*b* having information of the HDVTSM_VOBU start address (HDVTSM_VOBU_SA).

Further, the data structure in the HD video title set cell address table (HDVTS_C_ADT) 417 shown in FIG. 20 is shown in FIG. 31. The inside of the HD video title set cell address table (HDVTS_C_ADT) 417 is composed of various information including:

HD video title set cell address table information (HDVTS_C_ADTI) 417*a* having information of the number of VOBs in HDVTS_VOBS (HDVTS_VOB_Ns) and HDVTS_C_ADT end address (HDVTM_C_ADT_EA); and HD video title set cell piece information (HDVTS_CPI) 417*b* consisting of various information including the VOB_ID number of the HDVTS_CP (HDVTS_VOB_IDN), the Cell_ID number of the HDVTS_CP (HDVTS_C_IDN), the HDVTS_CP start address (HDVTS_CP_SA), and the HDVTS_CP end address (HDVTS_CP_EA).

Figure 32:
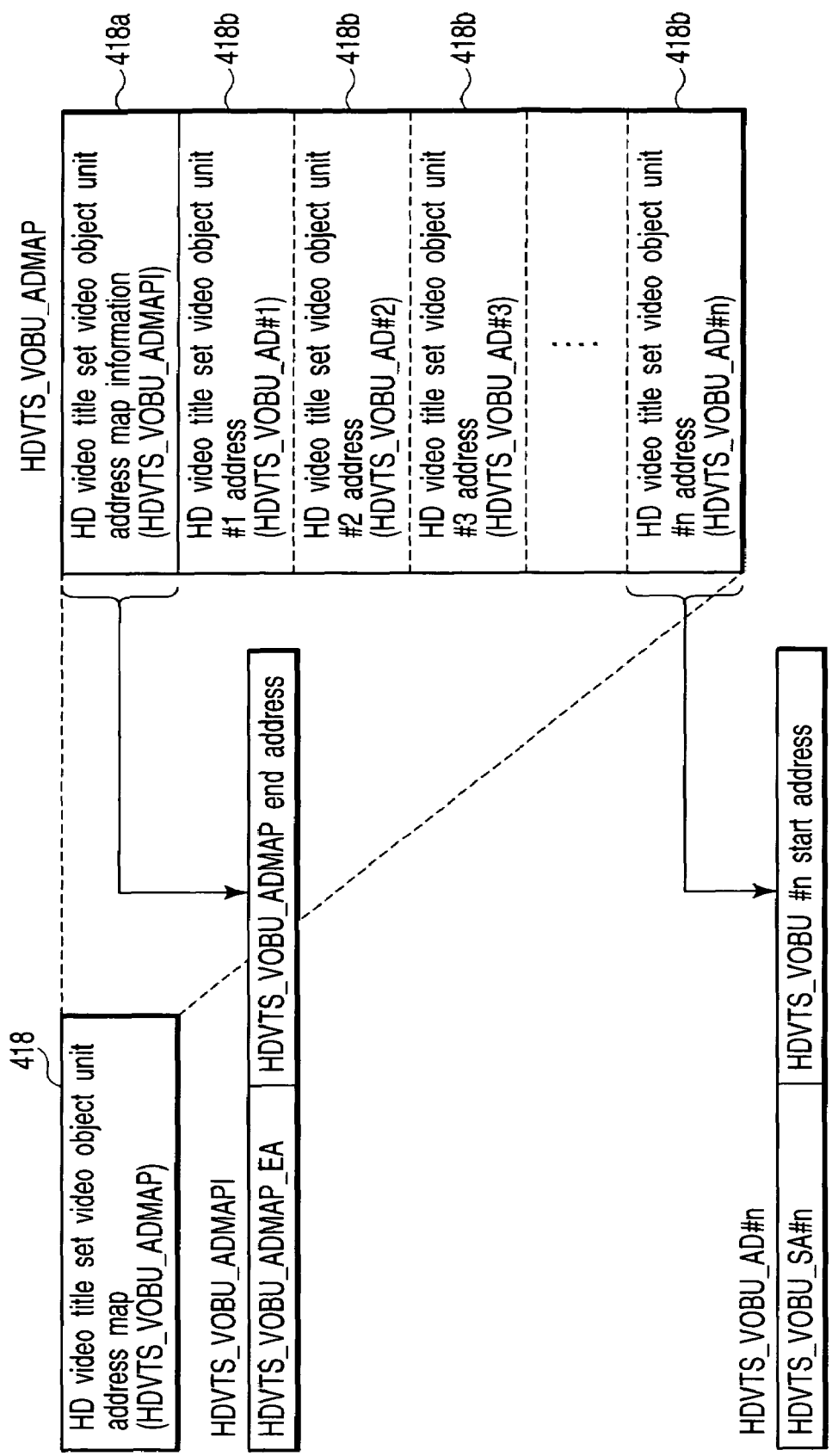
FIG. 32 is a diagram showing a data structure in the HD video title set cell address table (HDVTS_C_ADT) 417 shown in FIG. 20.

Moreover, the data structure in the HD video title set video object unit address map (HDVTS_VOBU_ADMAP) 418 shown in FIG. 20 is shown in FIG. 32. The HD video title set video object unit address map (HDVTS_VOBU_ADMAP) 418 is composed of various information including:

HD video title set video object unit address map information (HDVTS_VOBU_ADMAPI) 418*a* having information of the HDVTS_VOBU_ADMAP end address (HDVTS_VOBU_ADMAP_EA); and HD video title set video object unit addresses (HDVTS_VOBU_AD) 418*b* on which information of the HDVTS_VOBU start address (HDVTS_VOBU_SA) have been recorded.

The RSM permission flag information for realizing the feature (A) and the voice information selection flag/voice information number for realizing the feature (F) are, as the first embodiment of the invention, provided in the search pointer information of the program chain information PGCI as shown in FIGS. 22, 7, and 24. The invention is not limited to the present embodiment, and those can be provided in the PGCI itself. Another embodiment (a second embodiment) of the invention will be described in FIGS. 33 and 34. The PGCI information shown in FIGS. 33 and 34 respectively correspond to:

[A] the HD video manager menu program chain information (HDVMGM_PGCI) 312*c*3 shown in FIG. 7 relating to the HD video manager menu language unit (HDVMGM_LU) 312 in FIG. 6 which exists in the HD video manager menu PGCI unit table (HDVMGM_PGCI_UT) 312 (FIG. 3) in the HD video manager information area (HDVMGI) 31 in (e) of FIG. 1;

[B] the HD video title set menu program chain information (HDVTSM_PGCI) 413*c*3 shown in FIG. 26 which have been disposed in the HD video title set menu language unit (HDVTSM_LU) 413*c* in FIG. 25 in the HD video title set menu PGCI unit table (HDVTSM_PGCI_UT) 413 in FIG. 20 showing the data structure in the HD video title set information area (HDVTSI) 41 in (f) of FIG. 1; and

[C] the HDVTS_PGCI 412*c* (FIG. 23) in the HD video title set program chain information table (HDVTS_PGCIT) 412 in FIG. 20 showing the data structure in the HD video title set information area (HDVTSI) 41 in (f) of FIG. 1 (the PGCI information shown in FIGS. 33 and 34 can be disposed at the three points of [A] to [C]).

As shown in FIGS. 33 and 34, the program chain information (PGCI) is composed of five areas (five management information groups) which are program chain general information (PGC_GI) 50, a program chain command table (PGC_CMDT) 51, a program chain program map (PGC_PGMAP) 52, a cell playback information table (C_PBIT) 53, and a cell positional information table (C_POSIT) 54.

As shown in FIGS. 33 and 34, RSM&AOB category information (RSM&AOB_CAT) is recorded at the end in the program chain general information (PGC_GI) 50 disposed at the initial area (management information group) in the PGCI. In the RSM&AOB category information (RSM&AOB_CAT), the RSM flag information, voice information selection flag, and voice information number exist. This RSM flag information denotes the contents which are completely the same as the contents described in FIG. 24. The contents of the voice information selection flag and voice information number are coincident with the contents described in FIGS. 8 or 27. Moreover, in the RSM&AOB category information (RSM&AOB_CAT), entry type information for determining whether or not it is an entry PGC, block mode information, block type information, and PTL_ID_FLD information are recorded.

The information in the PGC graphic unit stream control table (PGC_GUST_CTLT) in which the control information relating to the streams of the graphic unit disposed in the PGC are recorded are, as shown in FIGS. 33 and 34, separately recorded in a PGC_GUST_CTL of the HD graphic unit stream #0 (PGC_GUST #0) area, a PGC_GUST_CTL of SD wide graphic unit stream #1 (PGC_GUST #1) area, a PGC_GUST_CTL of the 4:3 (SD) graphic unit stream #2 (PGC_GUST #2) area, and a PGC_GUST_CTL of the letter box (SD) graphic unit stream #3 (PGC_GUST #3) area which are respectively separate areas so as to correspond to four type of the respective pictures (a 16:9 HD image, a 16:9 SD image, a 4:3 SD image, and a letter box SD image).

In addition to the above-described information, the program chain general information (PGC_GI) 50 has recorded therein various information including PGC contents (PGC_CNT), a PGC playback time (PGC_PB_TM), PGC user operation control (PGC_UOP_CTL), a PGC audio stream control table (PGC_AST_CTLT), a PGC sub-picture stream control table (PGC_SPST_CTLT), PGC navigation control (PGC_NV_CTL), a PGC sub-picture pallet (PGC_SP_PLT), a PGC_CMDT start address (PGC_CMDT_SA), a PGC_PGMAP start address (PGC_PGMAP_SA), a C_PBIT start address (C_PBIT_SA), and a C_POSIT start address (C_POSIT_SA).

The command information applied to the respective PGCs are collectively disposed in the program chain command table (PGC_CMDT) 51 as shown in FIG. 35. The places where the PGCI information are disposed can be disposed at the three points [A] to [C] as described in the descriptions of FIGS. 33 and 34. The resume sequence information shown in [Point 4] described in the feature (A) are recorded in the program chain command table (PGC_CMDT) 51 as shown in FIG. 35. The contents of the information of the resume sequence information (the resume (RSM) command sequence specified in FIG. 35) in the embodiment of the invention are written in a form in which the RSM commands (RSM_CMD) 514 disposed in this area are successively disposed in order. One RSM command (RSM_CMD) 514 written in one column in FIG. 35 denotes one command which can be designated in the HD DVD video contents in the invention, and the RSM commands (RSM_CMD) 514 disposed in the resume (RSM) command sequence are sequentially executed in order from the top.

In the embodiment of the invention, the arrangement of the cell commands (C_CMD) 513 described in FIG. 35 also means sequential command series. Namely, command processing is successively executed from the top in order of the arrangement of the cell commands (C_CMD) 513 shown in FIG. 35. As described in FIG. 36, it is structured such that a part of the cell command processing procedure (an initial cell command number from which the cell command sequential processing is started, and an execution range of the cell command sequential processing, for each cell) can be designated from a series of cell command processing procedures in which the cell command #1 (C_CMD #1) 513 to the cell command #k (C_CMD #k) 513 have been designated.

The RSM command (RSM_CMD) 514 means a part of the command procedures in which the routine returns to a corresponding PGC (for example, from a menu screen), and is executed "directly before playing back from the middle of the PGC" which has been interrupted previously. In contrast thereto, a pre-command (PRE_CMD) 511 means a command which is executed "directly before playing back from the top of the PGC" which corresponds thereto. Further, a command executed after playing back a corresponding PGC is a post-command (POST_CMD) 512. In FIG. 35, the number of the pre-commands (PRE_CMD) 511, the number of the post-commands (POST_CMD) 512, the number of the cell commands (C_CMD) 513, and the number of the RSM commands (RSM_CMD) 514 which can be disposed in one program chain command table (PGC_CMDT) 51 can be respectively set freely (the number of any commands to be written may be '0'). However, in the present embodiment, it is regulated that the upper limit of the grand total value in which the number of the pre-commands (PRE_CMD) 511, the number of the post-commands (POST_CMD) 512, the number of the cell commands (C_CMD) 513, and the number of the RSM commands (RSM_CMD) 514 which can be disposed in one program chain command table (PGC_CMDT) 51 are respectively added up is 1023. Accordingly, when all of the number of the pre-commands (PRE_CMD) 511, the number of the post-commands (POST_CMD) 512, and the number of the RSM commands (RSM_CMD) 514 are 0, the number of the cell commands (C_CMD) 513 can be set to 1023 at the maximum.

PRE_CMD_Ns which is information of the number of the pre-commands (PRE_CMD) 511, POST_CMD_Ns which is information of the number of the post-commands (POST_CMD) 512, C_CMD_Ns which is information of the number of the cell commands (C_CMD) 513, and RSM_CMD_Ns which is information of the number of the RSM commands (RSM_CMD) 514 which can be disposed in one program chain command table (PGC_CMDT) 51 are recorded in the program chain command table information (PGC_CMDTI) 510 as shown in FIG. 36.

The concrete data structure in the RSM command (RSM_CMD) 514 recorded in the program chain command table (PGC_CMDT) 51 will be described hereinafter. Here, the concrete data structure in the RSM command (RSM_CMD) 514 will be described. However, the data structures in the pre-command (PRE_CMD) 511, the post-command (POST_CMD) 512, and the cell command (C_CMD) 513 as well are made to be completely the same as the concrete data structure in the RSM command (RSM_CMD) 514. The concrete data structure in the RSM command (RSM_CMD) 514 is, as shown in FIG. 36, made such that an area of 8 bits is merely allocated per one command. The command contents are recorded in the area of 8 bytes. In any of the commands, data of "command ID-1" are written into the uppermost bit through the third bit in the 8 bits. The data contents of the bits thereafter are different in accordance with a value of "a command type", information of "I-flag for comparison", "Compare Field", or the like are provided in common regardless of a command type.

Figure 37:
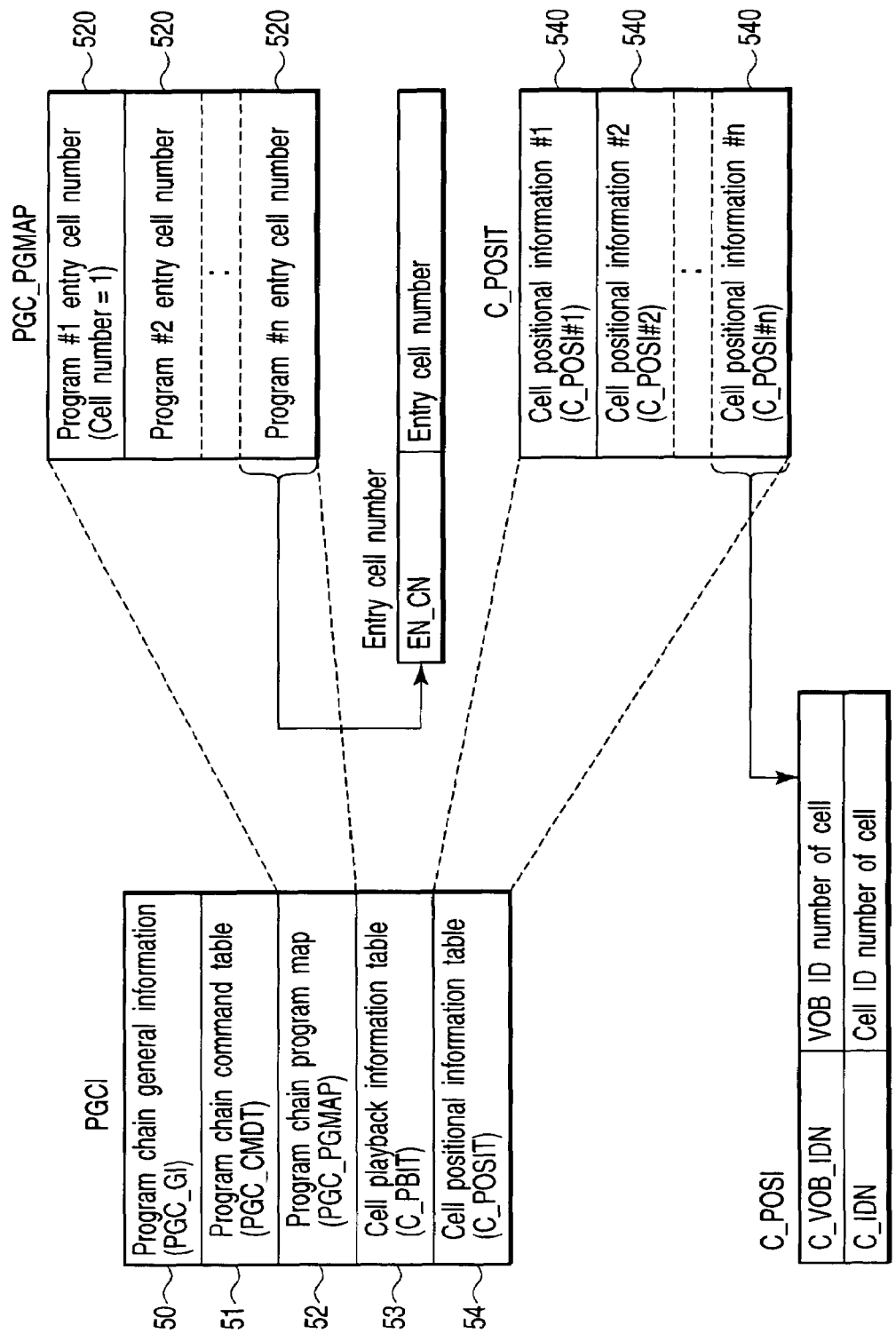
FIG. 37 is a diagram showing data structures in a program chain map (PGC_PGMAP) and a cell positional information table (C_POSIT) 54 which are disposed in the program chain information PGCI.

The detailed structures in the program chain program map (PGC_PGMAP) 52 and the cell positional information table (C_POSIT) 54 which are disposed in the program chain information (PGCI) are shown in FIG. 37.

In the program chain program map (PGC_PGMAP) 52, the number of entries of program entry cell number 520 information on which an entry cell number (EN_CN) denoting a cell number corresponding to each entry has been recorded are disposed. Further, the cell positional information table (C_POSIT) 54 is structured such that cell positional information (C_POSI) 540 configured by a set of information of a cell VOBID number (C_VOB_IDN) and a cell ID number of the cell (C_IDN) are arranged in order.

In the description of FIG. 35, it is structured such that a part of the cell command processing procedure (an initial cell command number from which the cell command sequential processing is started, and an execution range of the cell command sequential processing, for each cell) can be designated from a series of cell command processing procedures in which the cell command #1 (C_CMD #1) 513 to the cell command #k (C_CMD #k) 513 have been designated. The information in the execution range of the cell command sequential processing which can be designated for each cell are shown in FIG. 38. The places where the PGCI information are disposed can be disposed at the three points [A] to [C] as described in the descriptions of FIGS. 33 and 34. The management information relating to individual cells configuring the PGC are, as shown in FIG. 38, recorded on the cell playback information (C_PBI) 530 in the cell playback information table (C_PBIT) 53 in the PGCI which is the management information of the PGC.

There is recorded in the cell command top number information (C_CMD_SN) in the cell playback information (C_PBI) 530 as shown in FIG. 38 the information relating to the initial cell command number from which sequential processing of a cell command specified for each cell among a series of cell command processing procedures in which the cell command #1 (C_CMD #1) 513 to the cell command #k (C_CMD #k) 513 have been designated which are shown in FIG. 35 is started. Further, at the same time, cell command continuous number information (C_CMD_C_Ns) denoting the number of commands, including the cell commands (C_CMD) 513 designated by the cell command top number information (C_CMD_SN), for continuously executing command processings is recorded in the cell playback information (C_PBI) 530, and an execution range of cell command sequential processing executed by corresponding cells is specified on the basis of the both information. In the present embodiment, after a playback of the corresponding cells is completed, a series of command procedures (command sequence) in a range designated by the cell command top number information (C_CMD_SN) and the cell command continuous number information (C_CMD_C_Ns) is executed.

Further, when the corresponding cells configure an interleaved block corresponding to multi-angle, or are some of a general continuous block, or configure some of an interleaved block corresponding to multi-angle, there are recorded in the cell playback information (C_PBI) 530: a cell category (C_CAT) showing whether it corresponds to the top cell or the last cell of the interleaved block; a cell playback time (C_PBTM) 1 showing a playback time needed at the time of playing back the entire corresponding cells; cell first VOBU start address positional information (C_FVOBU_SA); cell first ILVU end address positional information (C_FILVU_EA); cell last VOBU start address positional information (C_LVOBU_SA); cell last VOBU end address positional information (C_LVOBU_EA); and the like.

FIG. 39 shows a structure in which the graphic unit GU of the invention is stored as an MPEG program stream. As shown in (a) of FIG. 39, a video object (VOB) a1 is, as shown in (b) of FIG. 39, composed of a plurality of video object units (VOBU) a2, and one VOBU is, as shown in (c) of FIG. 39, composed of an MPEG program stream having a plurality of different data packs of a navigation pack a3, a video pack a4, a graphic unit (GU) pack a5, an audio pack a6, and a subpicture (SP) pack a7. Further, as shown in (d) of FIG. 39, the GU pack a5 is stored as streams of an HD graphic unit stream #1 (a51), an SD wide graphic unit stream #2 (a52), a 4:3 graphic unit stream #3 (a53), a letter box graphic unit stream #4 (a54), and a pan-scan graphic unit stream #5 (a55) in accordance with a difference among five display types (HD, SD wide, 4:3, latter box, and pan-scan). These streams are appropriately selected to switch so as to correspond to a display type of a main image or a display conversion with respect to a display device serving as an output destination, and there is no need for a user to directly switch the streams.

Next, a graphic pack GR_PCK will be described. The graphic pack GR_PCK consists of a pack header and a graphic packet GR_PKT. The graphic data are arranged in a line on the boundary of a logical block LB in the graphic unit GRU. The GR_PCK may include a padding packet or a stuffing packet only in a case of a last packet. The GR_PKT is composed of a packet header, a graphic stream number, and graphic data.

FIG. 40 shows sub-stream IDs and graphic stream numbers allocated to respective streams of the graphic units GU. The respective streams have the stream ID of a private stream (1011 1101b), and have the sub-stream IDs of (0101 0xxxb) for being determined as graphic unit streams. Moreover, for determining a display type thereof, a type for HD (0101 0001b), a type for SD wide (0101 0010b), a type for 4:3 (0101 0011b), a type for Letterbox (0101 0010b), and a type for Pan-scan (0101 0101b) are defined.

FIG. 41 shows one example of the data structure of a graphic unit GU having mask data. As shown in the drawing, one graphic unit is configured by connecting pay load data of a plurality of GU packs a5. In FIG. 41, additional data such as pack headers and padding packets are not described. Graphic unit GU is broadly composed of header information b1, highlighted information (HLI) b2, one or more mask data b3 described later and corresponding to one or more button information b23, and graphic data b4. Here, the detailed contents of the highlighted information (HLI) b2 will be described (the rest thereof will be described later). The highlighted information b2 is composed of general information b21, color pallet information b22, and one or more button information 23. The color pallet information b22 is to provide colors of the buttons on a menu, and has: a normal color pallet b221 in which button colors which are not highlighted are designated; a selection color pallet b222 in which a button color selected to be highlighted is designated by a section of input of a key or the like by a user; and a defined color pallet b223 in which a defined color is designated from the selection color when the user determines a selected button to be highlighted. Further, the button information b23 has: a mask data start address b231 imitating button shapes; a mask data size b232; adjacent button positional information b233 as information for moving a button to the adjacent buttons around due to input by a user; and a button command b234 executed at the time of defining a button. In this button command, a command sequence in which one or more commands are continuously disposed can be configured, and in the invention, it is configured such that 8 commands can be disposed at the maximum. When a button is defined, commands of 1 to 8 are sequentially executed, which can simultaneously execute composite processing such as setting and branching.

FIG. 42 shows another example of the data structure of the graphic unit having mask data of FIG. 41. As shown in FIG. 42, the highlighted information b2 is different from FIG. 41, and is composed of the general information b21, the color pallet information b22, and one or more mask data information search information b24 and one or more button information 23 corresponding to one or more button information which will be described later. The color pallet information b22 is to provide colors of buttons on a menu, and has: the normal color pallet b221 in which button colors which are not highlighted are designated; the selection color pallet b222 in which a button color selected to be highlighted is designated by a input section of a key or the like by a user; and the defined color pallet b223 in which a defined color is designated from the selection color when the user determines a selected button to be highlighted. Further, the mask data information search information b24 has a mask data start address b241 and a mask data size b242. Moreover, the button information b23 has the adjacent button positional information b233 as information for moving a button to the adjacent buttons around, and the button command b234 executed at the time of defining a button. In this button command, a command sequence in which one or more commands are continuously disposed can be configured, and in the invention, it is configured such that 8 commands can be disposed at the maximum. When a button is defined, commands of 1 to 8 are sequentially executed, which can simultaneously execute complex processing such as setting and branching.

FIG. 43 shows the contents of the header information b1 and the general information b21. The header information b1 has: a graphic unit size (GU_SZ) showing a size of the entire graphic unit; graphic unit attribute information (GU_ATRI) such as graphic data stored in the graphic unit, mask pattern resolution (1920×1080, 1440×1080, 1280×720), aspect ratios (16:9, 4:3) and display types (HD, SD wide, 4:3, Pan-scan, Letterbox); a highlighted information (HLI) start address (HLI_SA); and a graphic data start address (GD_SA).

Further, in the general information b21, there are provided a graphic unit playback start time (GU_PB_S_PTM) having a value which is the same as a PTS(Presentation Time Stamp) included in the header of the graphic unit (GU) pack a5, and a graphic unit playback end time (GU_PB_E_PTM) which is a playback end time thereof. By using the PTS information, the graphic unit playback start time (GU_PB_S_PTM), and the graphic unit playback end time (GU_PB_E_PTM), a display time of the graphic unit and an available time in which execution (of a command) is possible (the start/end times of the both are completely coincident with one another) are set. Further, because PTS_PTM are used as the start/end time information, the time range can be extremely precisely set. Furthermore, when a menu extends over a plurality of screens, there are provided a button offset number (BTN_OFN) providing a button start number in the menu screen, the number of buttons (BTN-Ns) in the menu screen, the number of numerical selection buttons (NSL_BTN_Ns) denoting the number of buttons which can be selected by inputting numerals, a forced selection button number (FOSL_BTNN) for causing an arbitrary button number to be in a selection state on purpose at the time of displaying the menu screen, and a forced decision button number (FOAC_BTNN) denoting a button number forcedly decided.

Next, a modified example of a graphic unit will be described.

A modified example of the graphic unit header GRUH shown in FIG. 85 includes the address information of the respective data of the graphic unit GRU. The graphic unit header GRUH includes the following contents.

GRU_TY: Graphic unit type
GRU_SZ: Graphic unit size
HLI_SA: Highlighted information start address
BTNPDT_SA: Button pattern data table start address
GRD_SA: Graphic data start address The graphic unit type GRU_TY includes GRU_SS and a display resolution, and the GRU_SS is described as follows.

00b: Graphic data exists
01b, 10b: Reserved
11b: There are no graphic data, and previous graphic data are used.

Annotation: HLI and BTNPDT may be changed from those in the previous GRU.

A display resolution of graphic data is the same as a video resolution.

The graphic unit size GRU_SZ describes a size of GRU in the number of bytes.

The highlighted information start address HLI_SA describes an HLI start address in a relative byte number from the first byte of GRU.

The button pattern data table start address BTNPDT_SA_ describes a BTNPDT start address in a relative byte number from the first byte of GRU.

The graphic data start address GRD_SA describes a GRD start address in a relative byte number from the first byte of GRU.

Figures 86, 87:
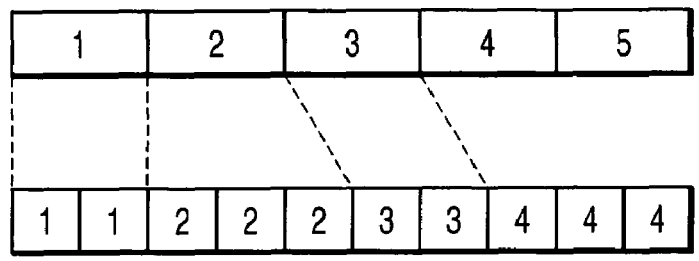
FIG. 86 is a diagram showing contents of highlighted general information HL_GI.
FIG. 87 is a diagram sowing 32 pull-down processing for converting a movie frame into an NTSC video frame.

FIG. 86 shows the contents of the highlighted general information HL_GI. The HL_GI is information of HLI.
GRU_PB_S_FRM: GRU playback start video frame
GRU_PB_E_FRM: GRU playback end video frame
BTN_SL_E_FRM: Button selection end video frame
BTN_OFN: Button offset number
BTN-Ns: the number of buttons
NSL_BTN-Ns: the number of numerical selection buttons
FOSL_BTNN: Forced selection button number
FOAC_BTNN: Forced definition button number The GRU playback start video frame GRU_PB_S_FRM describes a playback start video frame of the graphic unit in a relative video frame number from a video frame having a PTS which is the same as the PTS described in the GR_PKT when the HLI is made available.

The GRU playback end video frame GRU_PB_F_FRM describes a playback end video frame of the graphic unit in a relative video frame number from a video frame having a PTS which is the same as the PTS described in the GR_PKT when the HLI is made available.

An end video frame is less than or equal to a start video frame having a PTS which is the same as the PTS described in a graphic pack including the following GRU.

The button selection end video frame BTN_SL_E_FRM describes a playback end video frame for a button selection valid period in a relative video frame number from a video frame having a PTS which is the same as the PTS described in the GR_PKT.

The button selection end video frame is less than or equal to an end video frame of the graphic unit.

The button offset number BTN_OFN describes a button offset number for a user button number U_BTNN.

The number of buttons BTN_Ns describes the number of available buttons.

The number of numerical selection buttons NSL_BTN_Ns describes the number of buttons which can be selected by the U_BTNN.

The forced selection button number FOSL_BTNN describes a button number which is forcedly selected by the GRU_PB_S_FRM video frame.

The forced definition button number FOAC_BTNN describes a button number which is forcedly defined by the GRU_PB_E-FRM video frame.

When there is no button number forcedly defined, a button number 0 is described.

When a selected button number is forcedly defined, a button number 63 is described.

Figure 44:
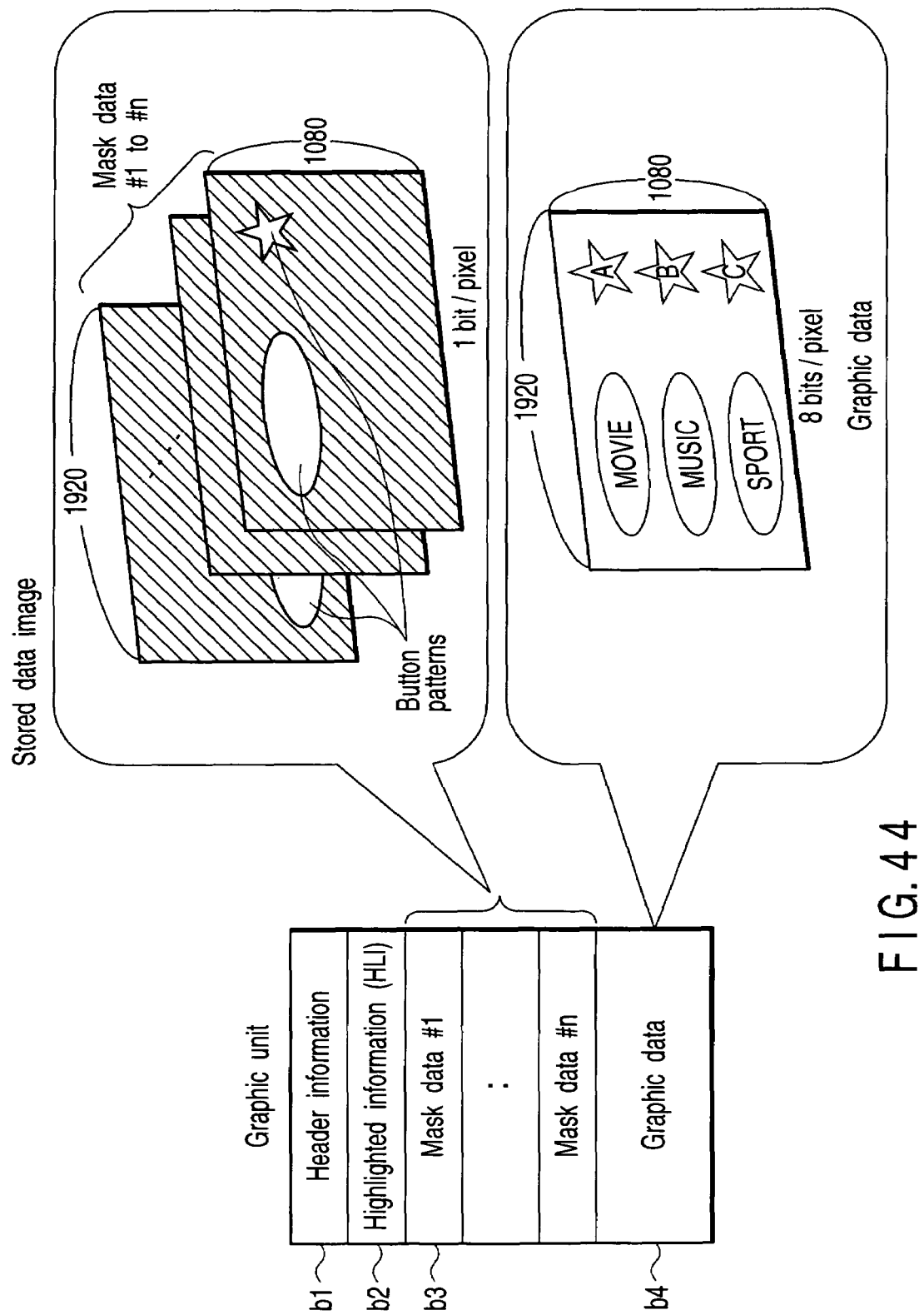
FIG. 44 is a diagram showing data images to be stored in the graphic unit.

FIG. 44 shows data images stored in a graphic unit. In the upper right, an image stored in the mask data b3 is shown, and the mask data is a mask (button) pattern composed of 1 bits/pixel. Respective mask data correspond to buttons on a menu screen. In the lower right, data stored in graphic data is shown, and the graphic data is a graphic pattern of 256 colors composed of 8 bits/pixel.

Figure 45:
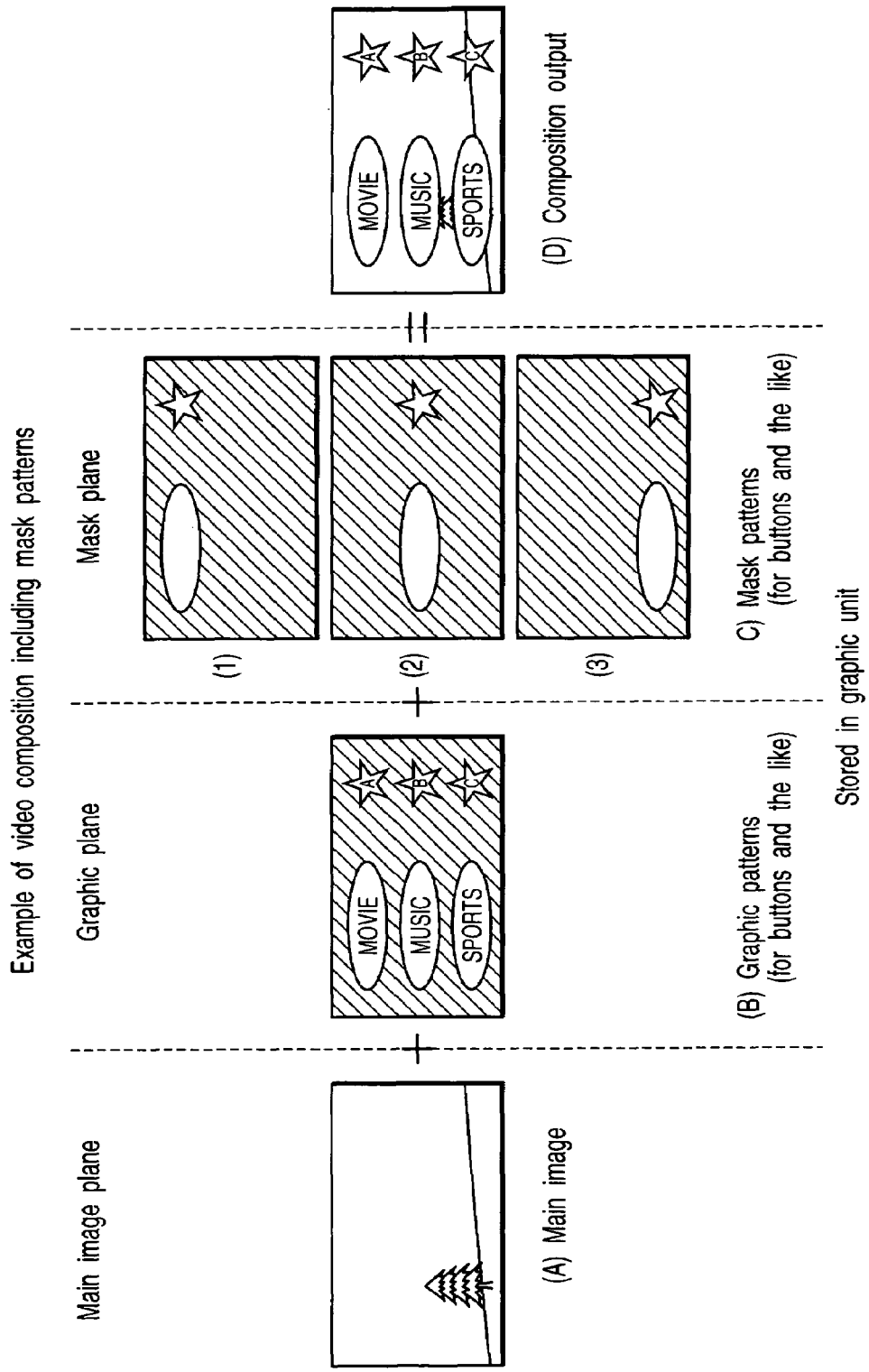
FIG. 45 is a diagram showing one example of video composition including a mask pattern.

FIG. 45 shows one example of video composition including mask patterns. In FIG. 45, a video composition output (D) is composed of a main image (A), a graphic pattern (B), and mask patterns (C), and the video composition is achieved by overlapping the data of the main image (A)+the graphic pattern (B)+the mask patterns (C). In the mask plane, a button selected from the buttons of (1) to (3) is overlapped. In FIG. 45, the video composition output (D) shows a state in which the mask (button) pattern of (1) has been selected. Further, the data of the graphic pattern (B) and the mask (button) patterns (C) are stored in a graphic unit GU.

FIG. 46 shows one example of a color/contrast information table stored in the color pallet information b22. The normal color pallet b221 is shown in the left end, the selection color pallet b222 is shown in the center, and the defined color pallet b223 is shown in the right end. The pallets are composed of color contrast tables of 256 colors '00h' to 'FFh', and are expressed by a total of 4 bytes of the color data of R (Red), G (Green), B (Blue) respectively having 8 bits, and the contrast data having 8 bits. In the example of FIG. 46, the elliptic button portion of the graphic data is '80h', the star-shaped button portion is 'C7h', and the background portion is 'FFh'. As the button pixel portion of '80h', red (R: 'FFh', G: '00h', B: '00h'), and semitransparency ('80h') are allocated in the normal color pallet b221; blue (R: '00h', G: '00h', B: 'FFh'), and semitransparency ('80h') are allocated in the selection color pallet b222; and green (R: '00h', G: 'FFh', B: '00h'), and semitransparency ('80h') are allocated in the defined color pallet b223. The respective background portions are composed of white (R: 'FFh', G: 'FFh', B: 'FFh') and transparency ('FFh').

FIG. 46 shows the example in which a place corresponding to the 'button portion' on which the mask pattern has been overlapped is varied from red to blue by the selection color pallet, and is further varied from red to green by a button decision operation of a user. In this manner, a button highlight is executed by a selection operation of the user on the menu screen, which allows the user to grasp the selected button, and a button highlight is executed by a decision operation of the user, which enables the user to grasp the defined button.

Figure 47:
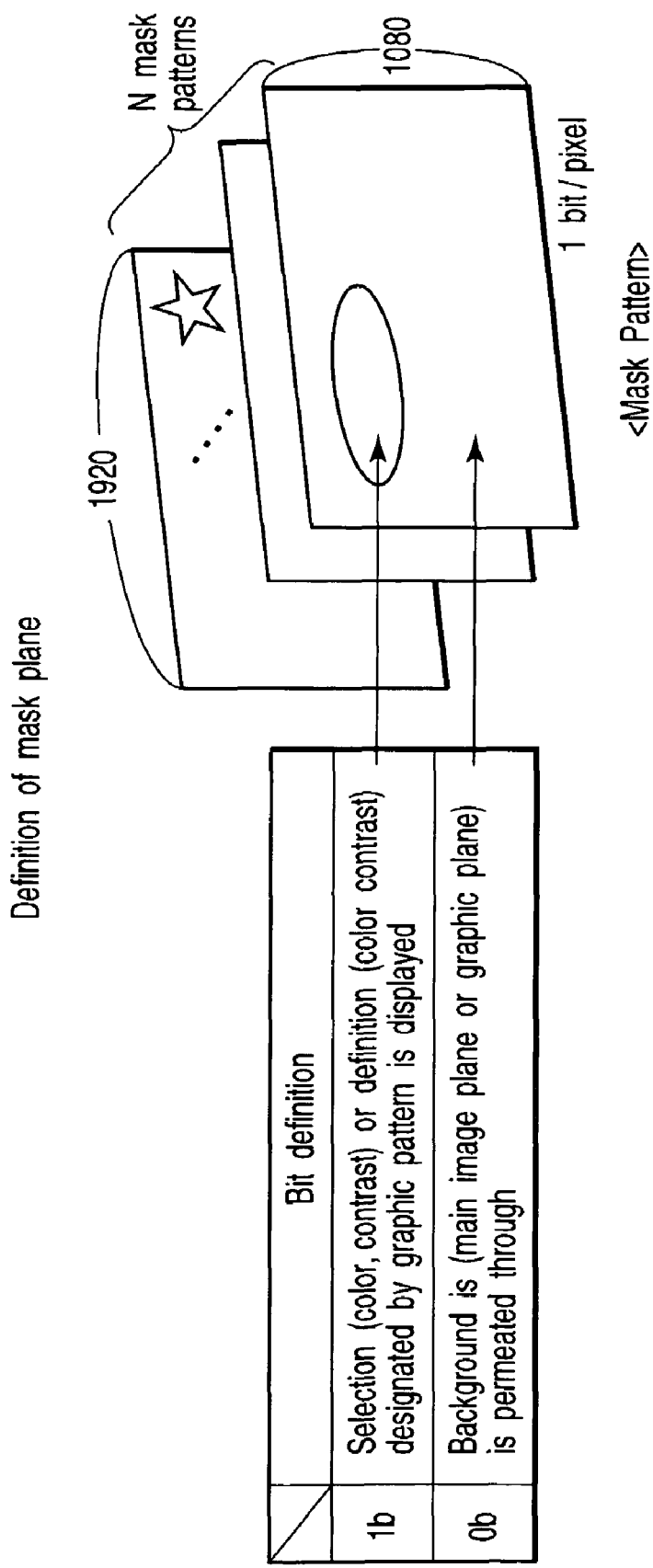
FIG. 47 is a diagram showing bit definition of mask data b3 of 1 bits/pixel stored in the graphic unit GU.

FIG. 47 shows the bit definition of the mask data b3 of 1 bits/pixel stored in a graphic unit GU. When a value of the bit is '1b', selection (color, contrast) or definition (color, contrast) designated by the graphic pattern is displayed. When a value of the bit is '0b', the background (normal (color, contrast) of the main image plane or the graphic plane is displayed) is permeated through.

FIG. 48 shows an information playback apparatus (player) which reads and plays back the information stored in the disk-type information storage medium 1. Namely, the information storage medium 1 is mounted in the disk drive unit 101. The disk drive unit 101 drives the mounted information storage medium 1 to rotate, and reads the information stored in the information storage medium 1 by using an optical pickup (not shown).

The information read by the disk drive unit 101 is supplied to a data processor 102, is subjected to correction processing, and is stored in a track buffer (not shown) in the data processor 102. Then, among the information stored in the track buffer, the management information at the HD video manager information area 31 and the HD video title set information area 41 are recorded in the memory unit 122, and are utilized for playback control, data management, and the like. Among the information stored in the track buffer, the information at the video object areas, 32, 42, and 43 are transferred to the separation unit 103, and are separated into each video pack a4, graphic unit pack a5, audio pack a6, and sub-picture pack a7. The information in the video pack a4, the information in the sub-picture pack a7, the information in the graphic unit pack a5, and the information in the audio pack a6 are respectively supplied to the video decoder unit 111, the sub-picture decoder unit 112, the graphic decoder unit 113, and the audio decoder unit 114, and decoding processings are carried out.

The main image information on which decoding processing has been carried out at the video decoder 111, the sub-picture information on which decoding processing has been carried out at the sub-picture decoder unit 112, and the graphic information on which decoding processing has been carried out at the graphic decoder 113 are supplied to the video processor unit 104, and are subjected to overlapping processing. Thereafter, those information are made to be analog at a digital/analog (D/A) conversion unit 132, and are outputted as an image signal to an unillustrated image display apparatus (for example, a cathode ray tube (CRT) or the like). The voice information on which decoding processing has been carried out at the audio decoder unit 114 is made to be analog at a D/A conversion unit 133, and is outputted as a sound signal to an unillustrated voice display apparatus (for example, a speaker or the like).

A series of playback operations with respect to the information storage medium 1 as described above are entirely controlled by the micro processing unit (MPU) unit 121. The MPU unit 121 receives operational information from a key input unit 131, and controls the respective units on the basis of a program stored in a read-only memory (ROM) unit 123.

FIGS. 49, 50 and 51 are diagrams for explanation of model examples A, B, and C of a video system decoder block on and after the separation unit 103 of FIG. 48. The video decoder unit 111 includes a video input buffer, a video decoder, and a video decoder buffer, and video data decoded at the video decoder is transmitted to the following video processor unit 104. The sub-picture decoder unit 112 includes a sub-picture unit input buffer, a sub-picture decoder, and a sub-picture decoder buffer, and sub-picture data decoded at the sub-picture decoder is transmitted to the following video processor unit 104. The graphic decoder unit 113 is composed of a graphic unit input buffer 113a, a highlight decoder 113b, a highlight buffer 113c, a graphic decoder 113e, and a graphic buffer 113f. The graphic unit input buffer 113a buffers the graphic unit pack a5 separated at the separation unit 103, and can store therein at least one graphic unit. The highlight decoder 113b decodes the highlighted information b2 and the mask data b3 of the graphic unit stored in the input buffer 113a, and the highlight buffer 113c buffers the decoded highlighted information and mask data. The graphic decoder 113e decodes the graphic data b4 of the graphic unit stored in the input buffer 113a, and the graphic buffer 113f buffers the decoded graphic data. Moreover, the button patterns decoded at the highlight decoder 113b are mixed with the graphic data decoded at the graphic decoder 113e by a following mixer 113d, and after pallet selection 113g and highlight processing 113h are applied thereto, the data is transmitted to the video processor unit 104.

FIG. 49 shows an example of the decoder model A having a graphic decoder. In the decoder model A, with respect to the data decoded at the respective decoders described above, the video data, the sub-picture data, and the graphic data are mixed and overlapped by the mixer 104a at the video processor unit 104. Moreover, when a display device to be connected is a standard television (SDTV), a down converter 104*b* applies down-conversion processing to the data by, and the data is outputted as video.

FIG. 50 shows an example of the decoder model B having a graphic decoder. In the decoder model B, with respect to the data decoded at the respective decoders described above, first, the video data and the graphic data are mixed and overlapped by the first mixer 104*a* at the video processor unit 104. Thereafter, when a display device to be connected is a standard television (SDTV), the down converter 104*b* applies down-conversion processing to the data. Further, when an aspect ratio of the display device to be connected is 4:3, Letterbox or Pan-scan conversion processing is applied to the data by a Letterbox (LB)/Pan-scan (PS) conversion unit 104*c*. Thereafter, the data is mixed with and overlapped on sub-picture data corresponding to a display type (HD, SD wide, 4:3, Pan-scan, Letterbox) at a second mixer 104*d*, and is outputted as video.

FIG. 51 shows an example of the decoder model C having a graphic decoder. In the decoder model C, with respect to the data decoded at the respective decoders described above, first, when a display device to be connected is a standard television (SDTV), down-conversion processing is applied to the data by the down converter 104*b* at the video processor unit 104. Further, when an aspect ratio of the display device to be connected is 4:3, Letterbox or Pan-scan processing is applied to the data by a Letterbox (LB)/Pan-scan (PS) conversion unit 104*c*. Thereafter, the data is mixed with and overlapped on sub-picture data and graphic data corresponding to a display type (HD, SD wide, 4:3, Pan-scan, Letterbox) at the following mixer 104*a*, and is outputted as video.

Figure 52:
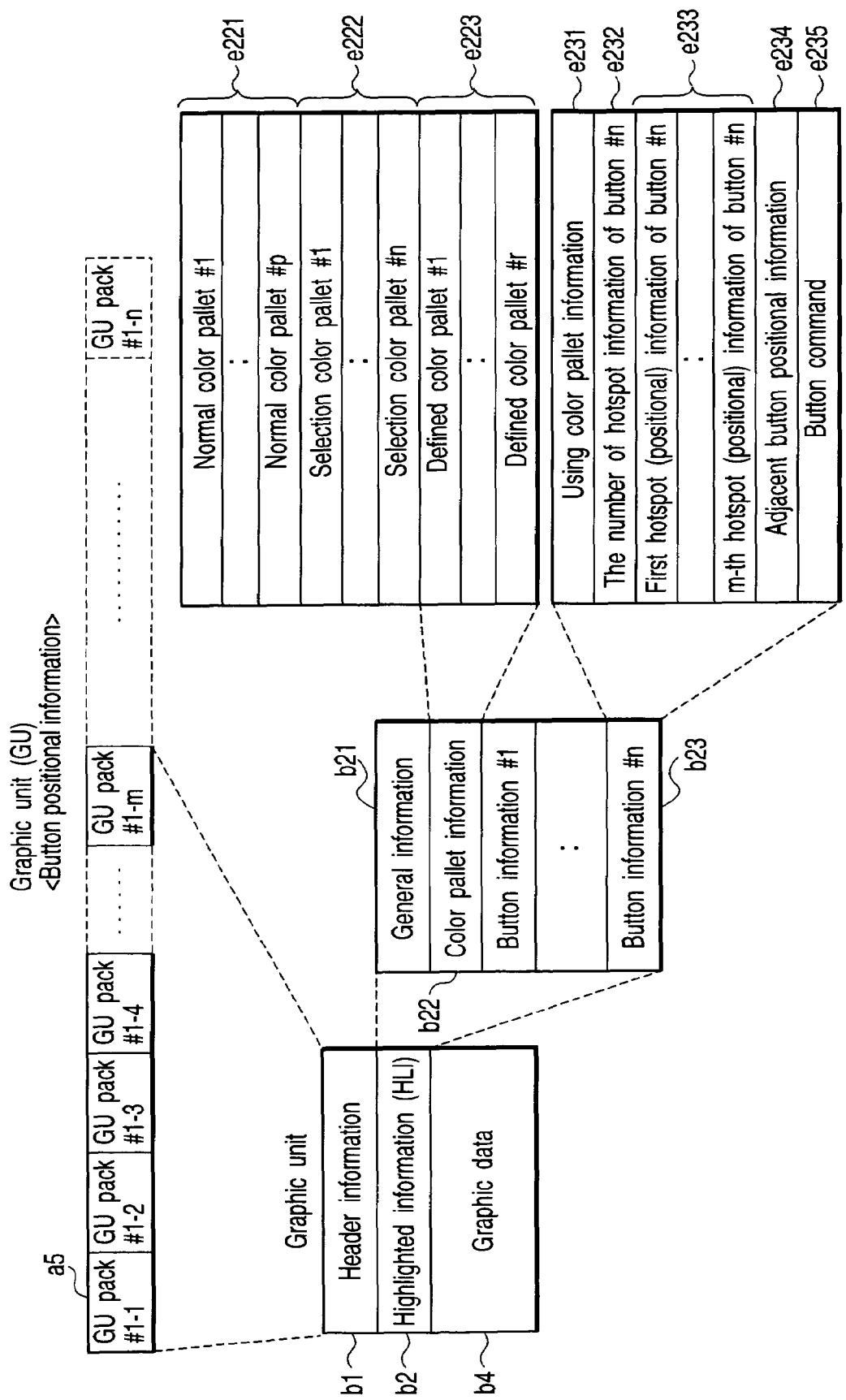
FIG. 52 is a diagram showing another example of the data structure of the graphic unit GU shown in FIGS. 41 and 42 in which button positional information are provided.

FIG. 52 shows another example of the data structure of the graphic unit GU shown in FIGS. 41 and 42, in which button positional information is provided. As shown in FIG. 52, one graphic unit GU is configured by connecting pay load data of a plurality of GU packs a5. In the drawing, additional data such as pack headers and padding packets are not described. The graphic unit GU is broadly composed of the header information b1, the highlighted information (HLI) b2, and the graphic data b4, and has no mask data b3. Here, the detailed contents of the highlighted information (HLI) b2 will be described (the header information b1 and the general information b21 are the same as in FIGS. 41 and 42).

The highlighted information b2 is composed of the general information b21, the color pallet information b22, and one or more button information b23. The color pallet information b22 is to provide colors of the buttons on a menu, and has: a plurality of normal color pallets e221 in which button colors which are not highlighted are designated; a plurality of selection color pallets e222 in which a button color selected to be highlighted is designated by a section of input of a key or the like by a user; and a plurality of defined color pallets e223 in which a defined color is designated from the selection color when the user determines a selected button to be highlighted.

The button information e23 has: using color pallet information e231 for respectively designating the numbers of the normal, selection, and defined color pallets described above; the number of items of hotspot information e232 of the buttons for providing a plurality of selectable positions (hotspots) by one button information on the menu screen; respective hotspots information e233 of the buttons corresponding to the number; adjacent button positional information e234 as information for moving a button to the adjacent buttons around due to input by the user; and a button command e235 executed at the time of defining a button. In this button command, a command sequence in which one or more commands are continuously disposed can be configured, and in the invention, it is configured such that 8 commands can be disposed at the maximum. When a button is defined, commands of 1 to 8 are sequentially executed, which can simultaneously execute complex processing such as setting and branching.

Figure 53:
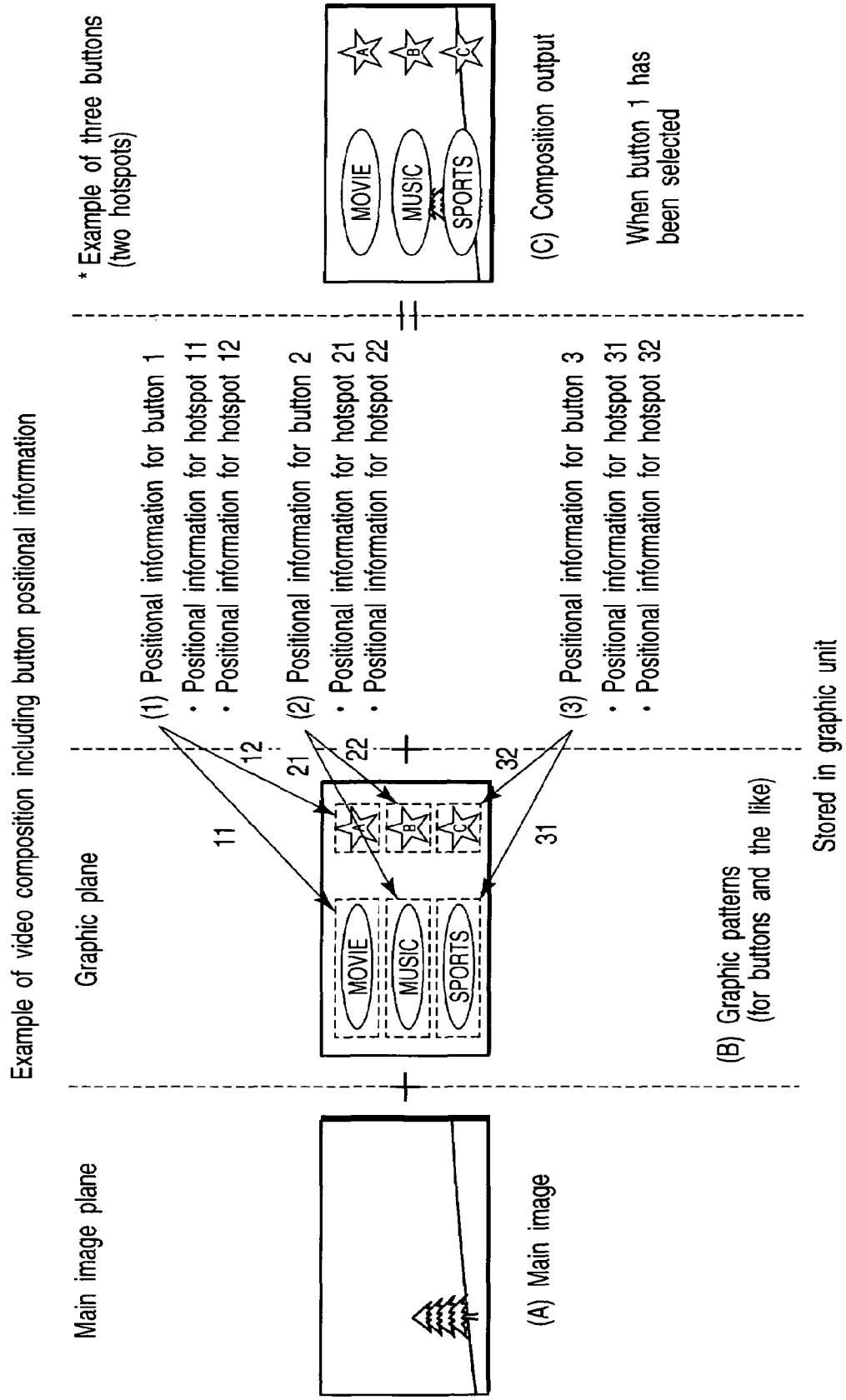
FIG. 53 is a diagram showing one example of video composition including the graphic unit having the button positional information shown in FIG. 52.

FIG. 53 shows one example of video composition including a graphic unit having button positional information shown in FIG. 52. In FIG. 53, a video composition output (C) is composed of two planes of a main image (A) and a graphic pattern (B), and the button positional information e233 of the respective buttons (which are the same as button commands in which a plurality of hotspots which can be pointed by a user can be designated with respect to one button information, and are executed on the menu screen). The video composition is achieved by overlapping the main image (A)+the graphic pattern (B)+the button positional information of (1) to (3). In FIG. 53, the video composition output (C) shows a state in which the button positional information of (1) has been selected. Further, the graphic pattern (B) and the respective button positional information are stored in the graphic unit. In the example of FIG. 53, two hotspots are designated for each button positional information. The button 1 button positional of (1) has the button positional information of hotspots 11 and 12, and they respectively correspond to the buttons in an ellipse and a star-shape at the upper portion of the graphic pattern. Even when any of those buttons is selected/defined, the same button command e235 is issued, and the menu selecting/defining operation is the same. In the same way, the button 2 button positional of (2) has the button positional information of hotspots 21 and 22, and they respectively correspond to the buttons in an ellipse and a star-shape at the central portion of the graphic pattern. The button 3 button positional of (3) has the button positional information of hotspots 31 and 32, and they respectively correspond to the buttons in an ellipse and a star-shape at the lower portion of the graphic pattern.

Figure 54:
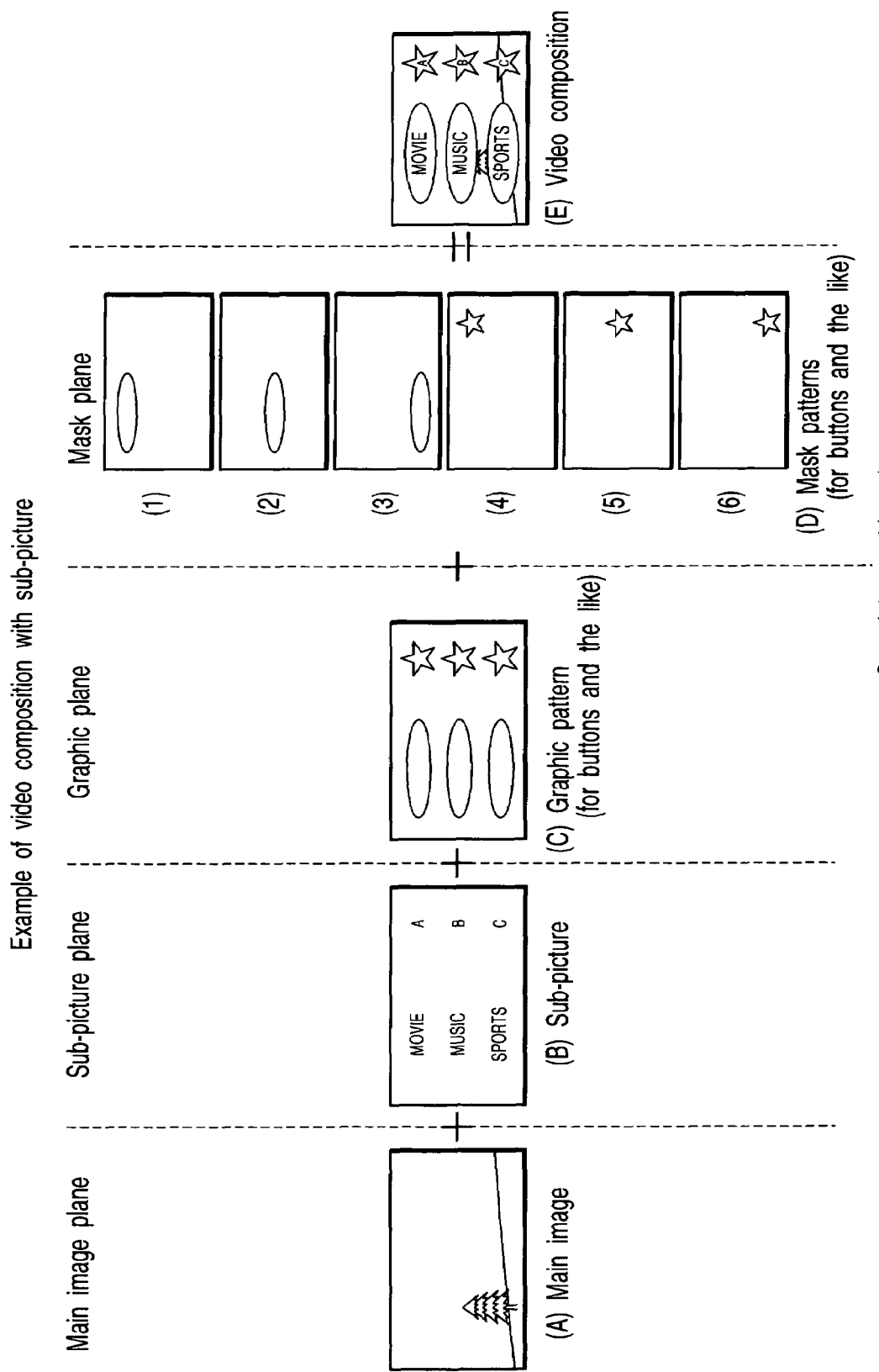
FIG. 54 is a diagram showing one example of video composition further including sub-picture data in addition to the video composition shown in FIG. 45.

FIG. 54 shows one example of video composition including sub-picture data further in addition to the video composition shown in FIG. 45. In FIG. 54, a video composition output (E) is composed of four planes of a main image (A), a sub-picture (B), a graphic pattern (C), and mask patterns (D), and the video composition is achieved by overlapping the data of the main image (A)+the graphic pattern (B)+the mask patterns (D). In the mask plane, a button selected from the buttons of (1) to (6) is overlapped. In FIG. 54, the video composition output (E) shows a state in which the mask (button) pattern of (1) has been selected. In addition, the data of the graphic pattern (C) and the mask (button) pattern (D) are stored in the graphic unit GU.

Figure 55:
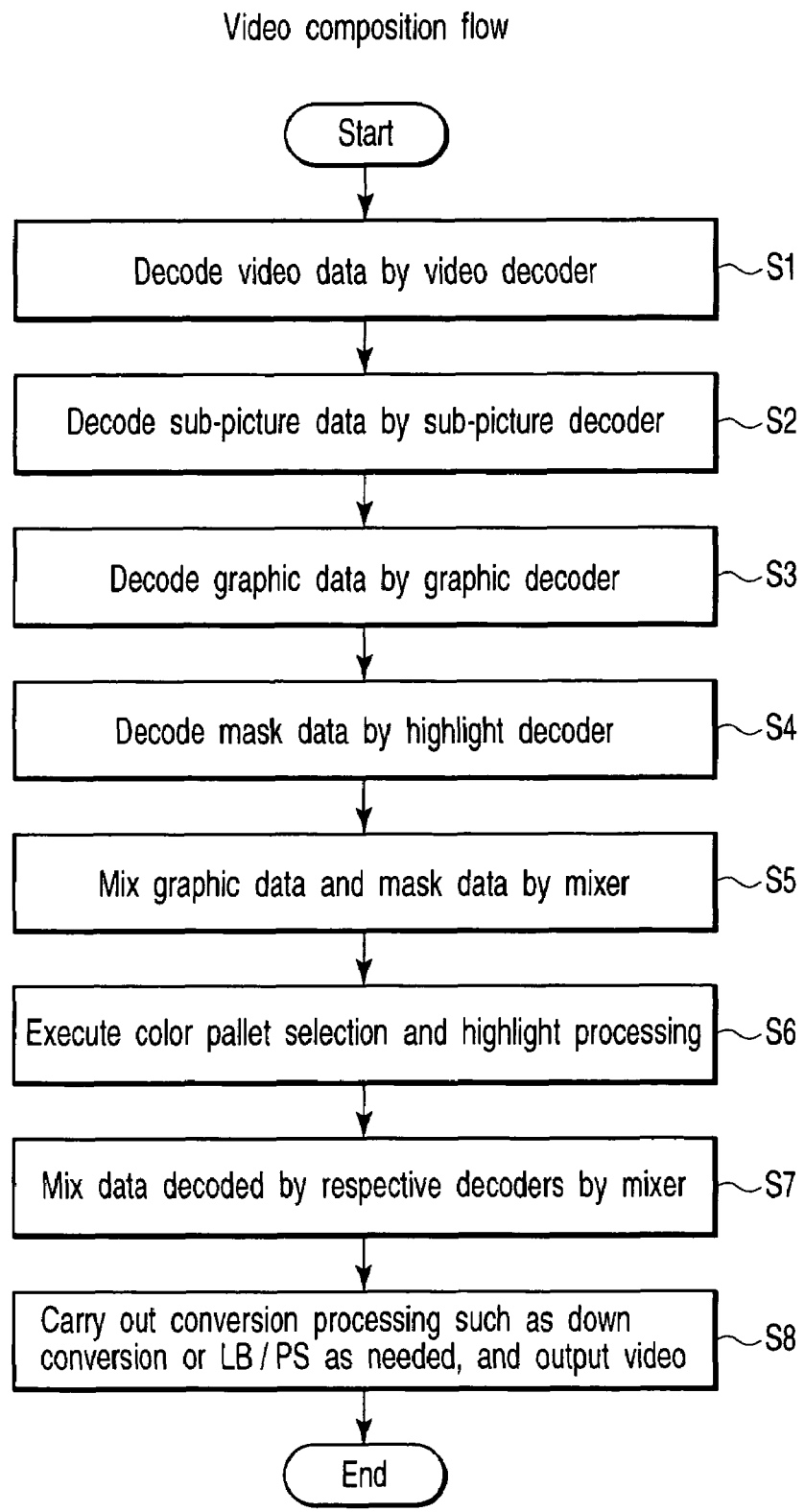
FIG. 55 is a flowchart of video composition related with a video decoder including a graphic decoder.

FIG. 55 shows a video composition flow related to video decoders including a graphic decoder. In FIG. 55, the video composition includes the following steps:

(1) Decode video data by a video decoder (step S1);

(2) Decode sub-picture data by a sub-picture decoder (step S2);

(3) Decode graphic data by a graphic decoder (step S3);

(4) Decode mask data by a highlight decoder (step S4);

(5) Mix graphic data and mask data by a mixer (step S5);

(6) Execute color pallet selection and highlight processing (step S6);

(7) Mix the respective data decoded by the video, sub-picture, graphic decoders by means of the mixer (step S7); and (8) Carry out conversion processing such as down conversion, Letterbox (LB), Pan-scan (PS), or the like as needed, and output video (step S8).

As described above, in a system in which an information storage medium unit having graphic units GU recorded thereon and the graphic units can be decoded, not only conventional rectangle buttons, but also complicated button shapes such as an ellipse and a star-shape can be structured in graphics in 256 colors at the maximum, and a variety of menu screens can be provided to a user. Moreover, because a graphic unit GU is configured to be separated from a sub-picture stream used for a caption or the like, a menu selecting period can be set in accordance with the time information of the graphic unit GU regardless of a display period of a sub-picture as in a conventional SD DVD menu, which broadens the degree of freedom of a contents manufacturer, so that an even more variety of contents can be provided to a user.

Another example of the data structure in the menu audio object area (HDMENU_AOBS) 33 shown in FIG. 19 is shown in FIG. 56. Differently from FIG. 19, FIG. 56 shows a structure in which only the one menu audio object HDMENU_AOB can be recorded in the menu audio object area (HDMENU_AOBS) 33. The inside of the menu audio object HDMENU_AOB can be subdivided by one or a plurality of entries (entry points) which can be set at arbitrary positions. It is structured such that a playback range of background music to be played back at the same time when each menu screen is displayed is repeatedly played back with the start boundary position or the end boundary position (AOB end address) on which the audio data in the menu audio object HDMENU_AOB has been recorded, or entry positions set in advance being as a boundary range. Namely, in the example shown in FIG. 56, when a menu screen corresponding to PGC #A is being displayed, a repeated playback is carried out in a range from the second entry position to the third entry position. When a menu screen corresponding to PGC #B is being displayed, a repeated playback is carried out in a range from the first entry position which is the start boundary position on which the audio data in the menu audio object HDMENU_AOB has been recorded, to the fourth entry position. When a menu screen corresponding to PGC #C is being displayed, a repeated playback is carried out in a range from the fourth entry position to the end boundary position of the menu audio object HDMENU_AOB (AOB end address). The positions of the respective entries are provided in the HDMENU_AOB header information recording area AOB_HI which has been disposed at the former position in the menu audio object HDMENU_AOB.

The data structure in the above-described HDMENU_AOB header information recording area AOB_HI is shown in FIG. 57. A data size of the entire menu audio object HDMENU_AOB can be known on the basis of the HDMENU_AOB end address AOB_EA, and the number of the entries (entry points) set in FIG. 56 can be known on the basis of the information of the number of HDMENU_AOB entry points AOB_EP_Ns.

The start address information AOB_1ST_EP to AOB_5TH_EP of the respective entry points of HDMENU_AOB are regulated by relative addresses (address differential information) from the start position of the header information recording area AOB_HI in the menu audio object HDMENU_AOB (HDMENU_AOB start position). Here, because the audio data in the HDMENU_AOB is recorded elementarily, the address information are expressed in units of bytes. Further, the audio data in the HDMENU_AOB can be recorded in pack unit configured by 2048 bytes. At that time, because logical block numbers (LBN) are set in units of 2048 bytes, the above-described address information can be described by relative logical block numbers (RLBN). In the embodiment shown in FIG. 56, the start boundary position on which the audio data in the menu audio object HDMENU_AOB has been recorded is coincident with the initial entry position (first entry position). Therefore, the data size in the HDMENU_AOB header information recording area AOB_HI can be known on the basis of the HDMENU_AOB first entry point start address information AOB_1ST_EP. The inside of the menu audio data is, as shown in FIG. 56, structured such that 5 entries at the maximum from the first entry to the fifth entry can be set. Accordingly, as shown in FIG. 57, the information of the HDMENU_AOB second entry point start address information AOB_2ND_EP to the HDMENU_AOB fifth entry point start address information AOB_5TH_EP are always recorded. If the number of entries set in the menu audio data is three or less (for example, n), an entry point start address AOB_(n+1 or more)TH_EP on or after the 'n+1'th entry point is set to '00000000h'. In accordance with such a setting method, the inside of the menu audio data can be subdivided by entries (entry points) of an arbitrary number which is less than or equal to 5. In the example of FIG. 56, the maximum number of entries is set to 5. However, entries more than 5 can be set.

In accordance with the example shown in FIG. 56, another example of FIG. 8 is shown in FIG. 58, another example of FIG. 24 is shown in FIG. 59, and another example of FIG. 27 is shown in FIG. 60.

As shown in FIG. 58, in the video manager program chain category HDVMGM_PGC category (HDVMGM_PGC_CAT) information, there are recorded entry type information for determining whether it is an entry PGC or not, block mode information, block type information, menu ID information denoting identification of a menu (for example, whether it is a menu of the title or not), PTL_ID_FLD information, a voice information selection flag, a start entry number, and an end entry number. The voice information selection flag denotes whether playback of the menu audio object HDMENU_AOB or playback of the audio in the menu video object HDVMGM_VOB is selected, and denotes the start/end trigger of the HDMENU_AOB. When the voice information selection flag is '00', the audio in the HDVMGM_VOB designated in the PGC is played back (the playback of the HDMENU_AOB is stopped). When the voice information selection flag is '10', the audio in the HDMENU_AOB is continuously played back (the audio in the HDVMGM_VOB is ignored). When the voice information selection flag is '11', the audio in the HDMENU_AOB is continuously played back (the audio in the HDVMGM_VOB is ignored). The start entry number designates an entry number from which playback of the audio in the HDMENU_AOB is started. The end entry number designates an entry number at which playback of the audio in the HDMENU_AOB is stopped. When a value is '000', the value denotes the HDMENU_AOB end address.

As shown in FIG. 59, in the HDVTS_PGC category (HDVTS_PGC_CAT) in the HDVTS_PGCI search pointer 412, entry type information, there are recorded entry type information, an RMS permission flag, block mode information, block type information, menu ID information, PTL_ID_FLD information, a voice information selection flag, a start entry number, and an end entry number. The RSM permission flag denotes whether a resume by an RSM command or a Resume ( ) function is permitted or not in the PGC. When the RSM permission flag has been set to '0', update of the RSM information is permitted, and when the RSM permission flag is '1', update of the RSM information is prohibited.

In the HDVTSM_PGC category information (HDVTSM_PGC_CAT) shown in FIG. 60, entry type information, block mode information, block type information, menu ID information, PTL_ID_FLD information, a voice information selection flag, a start entry number, and an end entry number are recorded.

In FIGS. 58 to 60, the playback range in the menu audio data shown in FIG. 56 is regulated by a start entry number and an end entry number. When the end position of the repeated playback range is coincident with the AOB end address shown in FIG. 56, the end entry number is set to '000b'. For example, as shown in FIG. 56, as a repeated playback range of background music played back when a menu screen corresponding to PGC #B is being displayed, the start entry number is '1' because the start position is coincident with the menu audio data start position (first entry), and the end entry number is '4' because the end position is coincident with the fourth entry position. Further, as a repeated playback range of background music played back when a menu screen corresponding to PGC #C is being displayed, the start entry number is '4' because the start position is coincident with the fourth entry position, and the end entry number is '000b' because the end position is coincident with the AOB end address. The voice information selection flag denotes whether playback of the audio in the HDMENU_AOB or playback of the audio in the VOBS (HDVMGM-VOBS, HDVTSM_VOBS, or HDVTS_VOBS) is selected, and denotes the start/end trigger of the HDMENU_AOB. Namely, when the above-described voice information selection flag is '00b', it means that the audio in the VOB designated in the PGC is played back (HDMENU_AOB is stopped); when the voice information selection flag is '10b', it means that the HDMENU_AOB is continuously played back (the audio in the VOB is ignored); and when the voice information selection flag is '11b', it means that playback of the HDMENU_AOB is started (the audio in the VOB is ignored).

Figure 61:
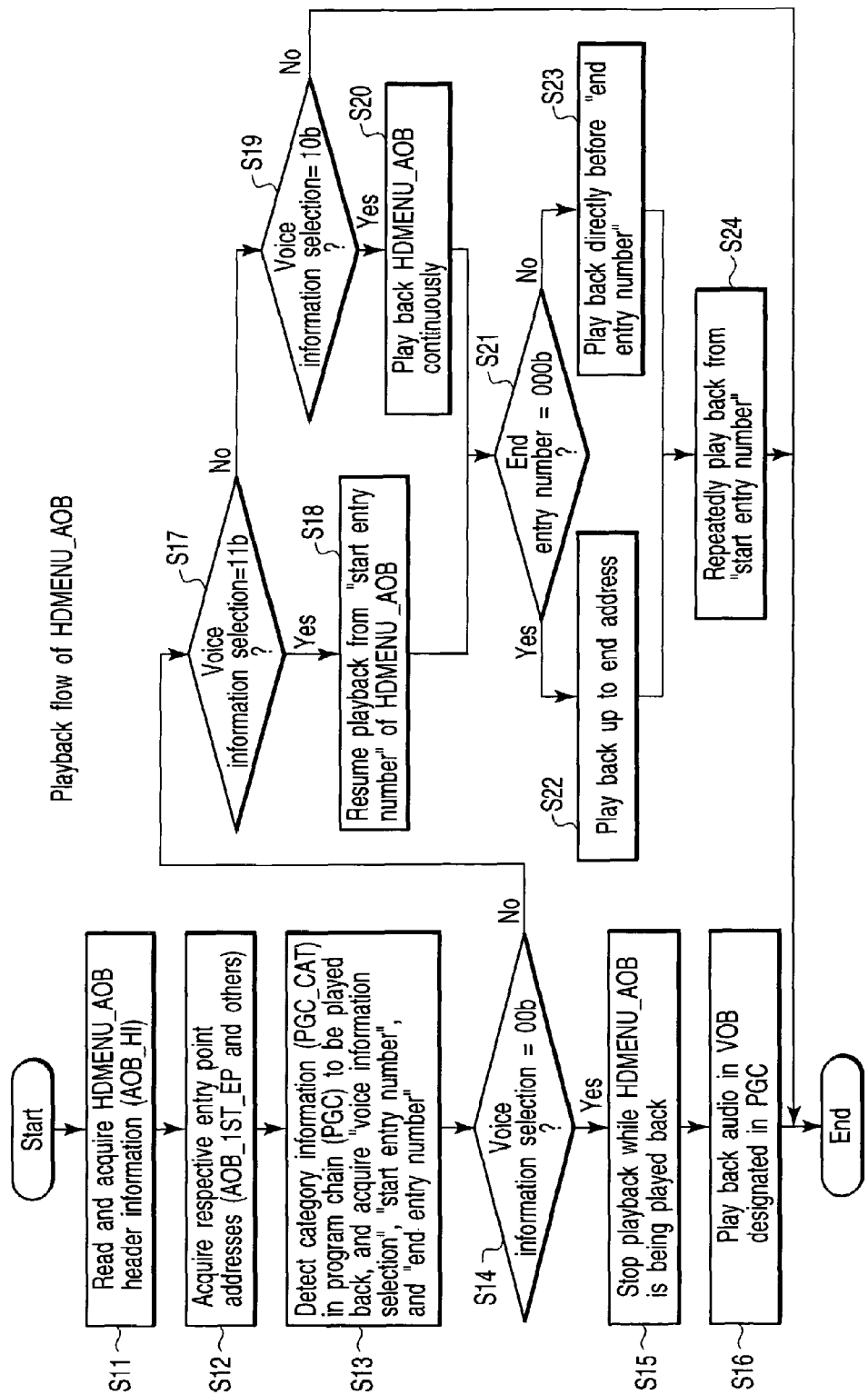
FIG. 61 is a flowchart showing processing for playing back a menu audio object HDMENU_AOB.

A playback flowchart of the menu audio object HDMENU_ AOB is shown in FIG. 61. First, HDMENU_ AOB header information (AOB_HI) is read and acquired (S11). Thereafter, the addresses (AOB_1ST_EP and others) of the respective entry points are acquired (S12), and the category information (PGC_CAT) in the program chain (PGC) to be played back is detected, and "voice information flag", "start entry number", and "end entry number" are acquired (S13). It is determined whether or not the acquired "voice information flag" is '00b' (S14). When the HDMENU_ AOB is being played back in a case of '00b', the playback is stopped (S15), and the audio in the VOB designated by the PGC is played back (S16).

If the "voice information flag" is not '00b', it is further determined whether or not the "voice information flag" is '11b' (S17). When the "voice information flag" is '11b', playback of the HDMENU_AOB is started from the "start entry number" (S18), and it is determined whether or not the "end entry number" is '000b' (S21). When the "end entry number" is '000b', the HDMENU_AOB is played back up to the AOB end address (S22), and when the "end entry number" is not '000b', the HDMENU_AOB is played back up to the point directly before the "end entry number" (S23), and thereafter, a repeated playback from the "start entry number" (S24) is carried out. In addition, when the "voice information flag" is not '11b', it is determined whether or not the "voice information flag" is '10b' (S19), and when it is '10b', the HDMENU_AOB is continuously played back (S20).

Next, the commands and the system parameters in the above-described embodiment will be described. The commands are contents for designating interactive processing operational methods when a user interactively plays back a DVD-video. For example, there is a command by which a chapter menu is played back on a menu screen, and playback is started from the point by clicking the chapter menu. The system parameters are parameters in which various information for controlling the player are set.

In the system block diagram in the information playback apparatus shown in FIG. 48, areas for storing the system parameters SPRM(0) to SPRM(31) in which various information as shown in FIG. 62 are stored are allocated in the memory unit 122. A current menu language code CM_LCD is stored in SPRM(0); an audio stream number ASTN in a title domain (TT_DOM) is stored in SPRM(1); a sub-picture stream number SPSTN in a TT_DOM, and an ON/OFF flag are stored in SPRM(2); an angle number in a TT_DOM is stored in SPRM(3); a title number in a TT_DOM is stored in SPRM(4); a video title number in a TT_DOM is stored in SPRM(5); a title PGC number in a TT_DOM is stored in SPRM(6); a 1 sequential PGC title-oriented title number part PTTN is stored in SPRM(7); a selection state highlight button number HL_BTTN is stored in SPRM(8); and a navigation timer NV_TMR is stored in SPRM(9); a NV_TMR TT_PGCN is stored in SPRM(10); a Karaoke player audio mixing mode P_AMXMD is stored in SPRM(11); and a parental management country code CTY_CD is stored in SPRM(12); a parental level PTL_LVL is stored in SPRM(13); a video player configuration P_CFG is stored in SPRM(14); an audio player configuration P_CFG is stored in SPRM(15); an AST initial language code INI_LCD is stored in SPRM (16); an AST initial language code extension INI_LCD_EXT is stored in SPRM(17); an SPST INI_LCD is stored in SPRM (18); an SPST INI_LCD_EXT is stored in SPRM(19); a player region code is stored in SPRM(20); an initial menu descriptor code INI_M_LCD is stored in SPRM(21); a menu space audio stream number ASTN is stored in SPRM(26); and a menu space sub-picture stream number SPSTN and an ON/OFF flag are stored in SPRM(27); a menu space angel number AGLN is stored in SPRM(28); an FP_DOM audio stream number ASTN is stored in SPRM(29); an FP_DOM sub-picture stream number SPSTN and an ON/OFF flag are stored in SPRM(30); and SPRM(22) to SPRM(25), and SPRM(31) are reserved.

SPRM(21) is to designate a menu initial menu description code INI_M_LCD, and a read-only navigation command.

At the time of an initial access, this parameter is set, and the value thereof is copied to SPRM(0).

In a stopped state, this parameter can be changed by only a user operation. The value thereof is copied to SPRM(0) every time when SPRM(21) is changed.

This parameter is not changed in other domains.

SPRM(26) is a parameter for designating ASTN currently selected for a menu space.

The value of SPRM(26) is changed by a user operation, a navigation command, or an algorithm 3 for selecting audio and a sub-picture stream in a menu space.

a) In menu space

When the value of SPRM(26) is changed, an audio stream to be played back is changed.

b) In FP_DOM or TT_DOM

The value of SPRM(26) set in the menu space is maintained.

The value of SPRM(26) cannot be changed by a user operation.

When the value of SPRM(26) is changed in FP_DOM or TT_DOM, it is made valid in the menu space.

This parameter does not designate a current decoding audio stream number.

SPRM(27) is to designate a SPSTN currently selected for a menu space, and whether or not a sub-picture is displayed.

The value of SPRM(27) is changed by a user operation, a navigation command, or an algorithm 3 for selecting audio and a sub-picture stream in a menu space.

a) In menu space

When the value of SPRM(27) is changed, a sub-picture stream to be played back and an image playback state are changed.

b) In FP_DOM or TT_DOM

The value of SPRM(27) set in the menu space is maintained.

The value of SPRM(27) cannot be changed by a user operation.

When the value of SPRM(27) is changed by a navigation command in FP_DOM or TT_DOM, it is made valid in the menu space.

c) Image display state is defined as follow.

c-1) In case where a valid SPSTN is selected

When a value of SP_disp_flag is '1b', a designated sub-picture is displayed during the display period.

When a value of SP_disp_flag is '0b', a sub-picture which is forcedly displayed in the system space is referred to.

c-2) In case where an invalid SPSTN is selected

A sub-picture is not displayed.

This parameter does not designate a current decoding sub-picture stream number.

When the value of SPRM(27) is changed in the menu space, the current sub-picture playback is cancelled.

SPRM(28) is a parameter for designating a current angle number AGLN for a menu space.

The value of SPRM(28) is changed by a user operation or a navigation command.

a) In FP-DOM

When the value of SPRM(28) is changed in FR_DOM by a navigation command, it is made valid in a menu space.

b) In menu space

When the value of SPRM(28) is changed, a playback angle is changed.

c) In TT_DOM

The value of SPRM(28) set in the menu space is maintained.

The value of SPRM(28) is not changed by a user operation.

When the value of SPRM(28) is changed in TT_DOM by a navigation command, it is made valid in the menu space.

SPRM(29) is a parameter for designating an audio stream number ASTN currently selected for FP_DOM.

The value of SPRM(29) is changed by a user operation, a navigation command, or an algorithm 4 for selecting audio and a sub-picture stream in FP_DOM.

a) In FP_DOM

The value of SPRM(29) is changed, an audio stream to be played back is changed.

b) In menu space or TT_DOM

The value of SPRM(29) set in FP_DOM is maintained.

The value of SPRM(29) is not changed by a user operation.

When the value of SPRM(29) is changed in the menu space or TT-POM by a navigation command, it is made valid in FP_DOM.

This parameter does not designate a current decoding audio stream number.

SPRM(30) is a parameter for designating a sub-picture stream number currently selected for FP_DOM, and whether or not a sub-picture is displayed.

The value of SPRM(30) is changed by a user operation, a navigation command, or an algorithm 4 for selecting audio and a sub-picture stream in FP_DOM.

a) In FP_DOM

When the value of SPRM(30) is changed, a sub-picture stream to be played back and an image playback state are changed.

b) In menu space or TT_DOM

The value of SPRM(30) set in FP_DOM is maintained.

The value of SPRM(30) cannot be changed by a user operation.

When the value of SPRM(30) is changed in the menu space or TT_DOM by a navigation command, it is made valid in the FP_DOM.

c) Image display state is defined as follow.

c-1) In case where a valid SPSTN is selected

When a value of SP_disp_flag is '1b', a designated sub-picture is displayed during the display period.

When a value of SP_disp_flag is '0b', a sub-picture which is forcedly displayed in the system space is referred to.

c-2) In case where an invalid SPSTN is selected

A sub-picture is not displayed.

The parameter does not designate does not designate a current decoding sub-picture stream number.

When the value of SPRM(30) is changed in FP_DOM, the current sub-stream playback is cancelled.

A current menu language code CM_LCD in process of playback can be changed and set by both of a user and a command. However, an initial menu description code INI_N_LCD can be changed and set by only a user.

There are following examples of commands used in the HD DVD video contents in the present embodiment.

Go To command group: commands to change an order of executing commands

Link command group: commands to start playback from a specific place in a same domain Jump command group: commands to start playback from specific places in different domains Compare Go To command group: commands to change an order of executing commands when a compared result is correct Compare Link command group: commands to start playback from a specific place in a same domain when a compared result is correct Compare Jump command group: commands to start playback from specific places in different domains when a compared result is correct SetSystem command group: commands to change the values of the management parameters Set command group: commands to calculate the values of general parameters Compare SetSystem command group: commands to change the values of the management parameters when a compared result is correct Compare Set command group: commands to calculate the values of general parameters when a compared result is correct SetSystem Link command group: commands to start playback from a specific place in a same domain after changing the values of the management parameters Set Link command group: commands to start playback from a specific place in a same domain after calculating the values of general parameters Set Go To command group: commands to change an order of executing commands after calculating the values of general parameters Set Jump command group: commands to start playback from specific places in different domains after calculating the values of general parameters As concrete command examples, a SetGPRMMD command to change a value of a general parameter or a mode, and a SetM_LCD command to set a menu description language code in SPRM(0) are included in the SetSystem command group, and a SetMove command to set a value of a general parameter to a specific value, and a Set Add command to add a specific value to a value of a general parameter are included in the Set command group.

Further, a Nop command without any execution is included in the Go To command group; a CallSS command to start playback of PGC designated by a domain ID, and to record resume information is included in the Jump command group; and a Resum command to record resume information is included in the Link command group.

JumpTT, JumpVTS_TT, and JumpVTS_PTT commands are included in the Jump command group. The commands are used for starting playback from a position designated in a separate domain. When those commands are processed, a player must maintain all the GPRM values.

JumpTT is a command to start playback of a designated title. The details of the processing are as follows.

(1) The current playback is stopped.
(2) Resume information (if any), a value of a navigation timer, and TT_PGC (SPRM(6)) for the navigation timer in the system parameter are cancelled. In order to stop the navigation timer, '0' is substituted for SPRM(9).
(3) SPRM(1) and SPRM(2) are set.
(4) Playback of a designated tile is started from a pre-command phase.

JumpVTS_TT is a command to start playback of a designated title in a current VTS space. The details of the processing are as follows.

(1) The current playback is stopped.
(2) Resume information (if any), a value of a navigation timer, and TT_PGC (SPRM(6)) for the navigation timer in the system parameter are cancelled. In order to stop the navigation timer, '0' is substituted for SPRM(9).
(3) SPRM(1) and SPRM(2) are set.
(4) Playback of a tile designated by VTS_TTN is started in a current VTS space.

JumpVTS_PTT is a command to start playback of a designated PTT in a current VTS space. The details of the processing are as follows.

(1) The current playback is stopped.
(2) Resume information (if any), a value of a navigation timer, and TT_PGC (SPRM(6)) for the navigation timer in the system parameter are cancelled. In order to stop the navigation timer, '0' is substituted for SPRM(9).
(3) SPRM(1) and SPRM(2) are set.
(4) The designated PTTN executes a command of a pre-command area of a PGC.
(5) Playback of a tile designated by VTS_TTN and PTTN is started in a current VTS space.

The contents of the commands used in a resume command sequence or a cell command sequence in the present embodiment, and the concrete contents in the command data will be described. As parameters used at the time of playing back HD-DVD video contents in the information playback apparatus (player) in the embodiment, as shown in FIG. 62, there are two types of a system parameter (SPRM) in which data contents to be recorded are determined to each parameter number, and a general parameter (GPRM) in which data contents to be recorded can be arbitrarily set.

A command data size per navigation command is set to 8 bytes, and is disposed in:
(1) a button command area in PCI;
(2) a cell command area in PGCI (FIG. 35);
(3) a pre-command area in PGCI (FIG. 35);
(4) a post-command area in PGCI (FIG. 35); and
(5) an RSM command area in PGCI (FIG. 35).

Navigation commands include two types of a single instruction command composed of one instruction (minimum unit of a command) and a composite instruction command composed of two or three instructions.

In the description of FIG. 36, it is described that the pre-commands (PRE_CMD) 511, the post-commands (POST_CMD) 512, the cell commands (C_CMD) 513, and the resume commands (RSM_CMD) 514 are set (recorded) in the program chain command table (PGC_CMDT) 51 in the PGCI, and that an area of 8 bytes is set to each information of one command. The data structure inside a command to which 8 bytes are allocated will be described hereinafter. Of the 8-byte area, in a command of type 1 or type 2, the most significant bit up to the $16^{th}$ bit are set in a recording area for an operation code, and in a command of type 3, the most significant bit up to the $12^{th}$ bit are set in a recording area on an operation code. It is possible to identify a command by merely reading the information of the operation code.

In the operation code, in order from the most significant bit, information such as a command ID-1, a command ID-2, a setting flag (I-flag for Set), a comparing I-flag (I-flag for Comp), and the like are recorded. A value of the same command ID-1 is used in common with commands having similar contents, and the value of the command ID-1 is set in an area from the most significant bit to the third bit. In the embodiment of the invention, the contents of the operation code can be decoded by merely playing back at least 16 bits from the most significant bit of the command information, and it is possible to identify the command. Moreover, the command ID-1 and the command ID-2 can be decoded by merely reading several bits from the most significant bit of the command information, and it is possible to grasp the approximate contents of the command. In the embodiment of the invention, the contents of the command information are structured as described above, whereby an attempt can be made to make decoding of the command and processing corresponding to the command at a high speed. Further, setting places in the command are designated as variable operands to setting values and variable values such as a value in Compare Field, a value in Branch Field, or a value in Set Field in each command.

The data structure in the command information of each command used in the HD-DVD video contents of the invention has, as shown hereinafter, the features in the point of using the structures in which:

(1) when one of a Go To instruction, a Link instruction operand, a Link sub-instruction is included in the command information, those instructions (or sub-instruction) are set to be forms of instruction operands composed of 2 bytes, and the instruction operands (or sub-instruction operand) are disposed at the position of the least significant 2 bytes in the command information;

(2) when a Jump instruction or a SetSystem instruction is included in the command, the instruction is set to be a form of an instruction operand composed of 4 bytes, and the instruction operand is disposed in central bytes which do not belong to the most significant byte and the least significant (from the $47^{th}$ bit to the $16^{th}$ bit) in the command information;

(3) when a Compare instruction or a Set instruction is included in the command, an instruction operand characteristic of the instruction is not formed;

(4) the contents of a composite instruction command enters in a higher bit in the command information as an operation code; and (5) the places at which variable values and variables needed at the time of executing commands are shown, and variable operands are disposed at positions of bits lower than that of the operation code.

In the present embodiment, due to regularities in the disposition methods as shown in the above-described (1) to (5) being provided to the data structures in all the command information, there are the effects that an attempt of simplification when the information playback apparatus decodes the command information can be made, and an attempt of high-speed decoding of a command/processing of executing the corresponding command can be made. Namely, by designating an operation code at a higher bit position as described above, the command contents can be immediately understood. In addition, information relating to one instruction configuring a composite instruction command are collectively disposed as an "instruction operand" in the rear thereof (at a lower bit area), and consequently, it is easy to identify the contents of a corresponding instruction.

Moreover, for example, in a composite instruction command (a command in which one command is formed by combining a plurality of command processings) as a "Compare SetSystem" command for carrying out "SetSystem" after "Compare", in addition to the deposition methods shown in the above-described (1) to (5), the structures are in which:

(6) when an instruction operand (or a sub-instruction) corresponding to one instruction operand is disposed in the command information, a variable operand or an instruction operand relating to the other instruction operand is disposed in the other portion in the command information; and (7) in particular, when a Jump instruction operand or a SetSystem instruction operand is included, a variable operand or an instruction operand relating to the other instruction operand is disposed in the lower 2 bytes.

Therefore, it is easy to identify the command contents at a high speed, and an attempt can be made to make processing for identifying the command contents and processing for executing the corresponding command at a high speed and simple.

As one example of the concrete data structure in an instruction operand described in the data structure in the command information, the data structure of an instruction operand of SetGPRMMD belonging to the SetSystem instruction group is shown in FIG. 63. This SetGPRMMD instruction is an instruction (command) to change a value of a general parameter and a mode of a general parameter. Further, as the concrete contents, "a value of a VOBU start address (C_FVOBU_SA) disposed at the top of the n-th cell shown in FIG. 38 is set to a value of the first general parameter (GPRM(1)) [SetGPRMMD: C#n_FVOBU_SA to GPRM(1)]" is used as an example. In this case, because Mode=0b (Register Mode), and a general parameter number to be set is '1', a value of 'B2' (a byte third from the least significant byte) is '01h' in a hexagonal display.

On the basis of the above-described contents, a concrete example of the command information respective operand numeric values are set under specific operating conditions is shown in FIG. 64. FIGS. 63 and 64 are expressed in units of bytes of 'B7' to 'B0'.

(a) of FIG. 64 shows an example of a case where a command that "when a value of the $0^{th}$ general parameter GPRM (0) is coincident with a value of the n-th general parameter GPRM(n), a value of the first general parameter GPRM(1) is set to a value of C#n_FVOBU_SA [If GPRM(0)=GPRM(n) then SetSystem GPRM(1) to C#n_FVOBU_SA]" is set.

(b) of FIG. 64 shows an example of a case where a command that "when a value of the $4^{th}$ general parameter GPRM (4) is greater than or equal to 300, 100 is further added to the value of the GPRM(4) [If GPRM(4)≧300 then SetAdd 100 to GPRM(4)]" is set.

(c) of FIG. 64 shows an example of a case where a command that "100 is assigned to the $4^{th}$ general parameter GPRM(4) [Assign 100 to GPRM(4)]" is set.

(d) of FIG. 64 shows an example of a case where a command that "50 is further added to a current value of the $4^{th}$ general parameter GPRM(4) [Add 50 to GPRM(4)]" is set.

(e) of FIG. 64 shows an example of a case where a command that "No processing is carried out [Not Operation]" is set.

(f) of FIG. 64 shows an example of a case where a command that "to return to a menu screen, a value of resume information showing a place of interrupting a title (image) which has been played back is stored [CallSS]" is set.

(g) of FIG. 64 shows an example of a case where a command that "a value of resume information showing a place of interrupting a title (image) which has been played back is stored [Resume]" is set.

(h) of FIG. 64 shows an example of a case where a command that "a specific menu description language code is set to the $0^{th}$ system parameter SPRM(0) [Assign Menu Description Language Code to SPRM(0)]" is set.

Next, an elementary audio object set EAOBS will be described.

A DVD video disk has a logical structure consisting of a volume space, a video manager (VMG), a video title set (VTS), an enhanced video object set (EVOBS), and an elementary audio object set (EAOBS).

The video manager VMG is composed of control data called video manager information VMGI, an elementary audio object set EAOBS, a first play PGC menu enhanced video object FP_PGCM_EVOB, VMG menu enhanced video objects VMGM_EVOBS, and control data backup VMGI_BUP.

The FP_PGCM_EVOB is an enhanced video object EVOB used for selecting a menu language. The VMGM-EVOBS is a set of enhanced video objects EVOBs used for a menu supporting a volume access. The EAOBS is a set of elementary audio objects used for background music or the like.

The EAOB is one file less than or equal to 8 MB. The FP_PGCM_EVOB is one file less than or equal to 1 GB. The VMGM_EVOBS is divided into files of 98 at the maximum which are respectively less than or equal to 1 GB. Because the video manager information VMGI, the EAOBS (if any), the FP_PGCM_EVOB (if any), the VMGM_EVOBS (if any), and the VMGI_BUP are disposed in this order, the video manager information VMGI can be pre-loaded before a menu PGC. Therefore, playback of audio can be prepared in advance, and the audio can be played back without waiting time. Files including the VMGM_EVOBS are sequentially disposed.

In some cases, there are gaps in the boundaries among the video manager information VMGI, the EAOBS (if any), the FP_PGCM_EVOB (if any), the VMGM_EVOBS (if any), and the VMGI_BUP. In the VMGM_EAOBS (if any), the EVOB are sequentially disposed.

The video title set VTS is composed of control data called video title set information VTSI, a VTS menu enhanced video object set VTSM_EVOBS, a VTS title enhanced video object set VTSTT_EVOBS, and control data backup VTSI_BUP. The VMGM_EVOBS and EVOBS for the title of the VTSTT_EVOBS are divided into files of 99 at the maximum which are respectively less than or equal to 1 GB. Files including the VTSM_EVOBS are sequentially disposed. In the respective VTS, in some cases, there are gaps in the boundaries among the VTSI, the VTSM_EAOBS (if any), the VTSTT_EVOBS (if any), and the VTSI_BUP. In the respective VTSM_EAOBS (if any), the EVOB are sequentially disposed. In the respective VTSTT_EAOBS, the EVOB are sequentially disposed.

The EVOBS is a set of enhanced video objects consisting of data of video, graphics, audio, sub-pictures and the like. In the EVOBS, the EVOBs are recorded in sequential blocks and interleaved blocks. One EVOBS is composed of one or more EVOBs. EVOB_ID numbers are allocated to the EVOBs from an EVOB having a minimum logical sector number LSN among the EVOBS in ascending order from 1. One EVOB is composed of one or more cells. C_ID numbers are allocated to cells from a cell having a minimum logical sector number LSN among the EVOB in ascending order from 1. The cells in the EVOBS are identified on the basis of the EVOB_ID numbers and the C_ID numbers.

Figure 65:
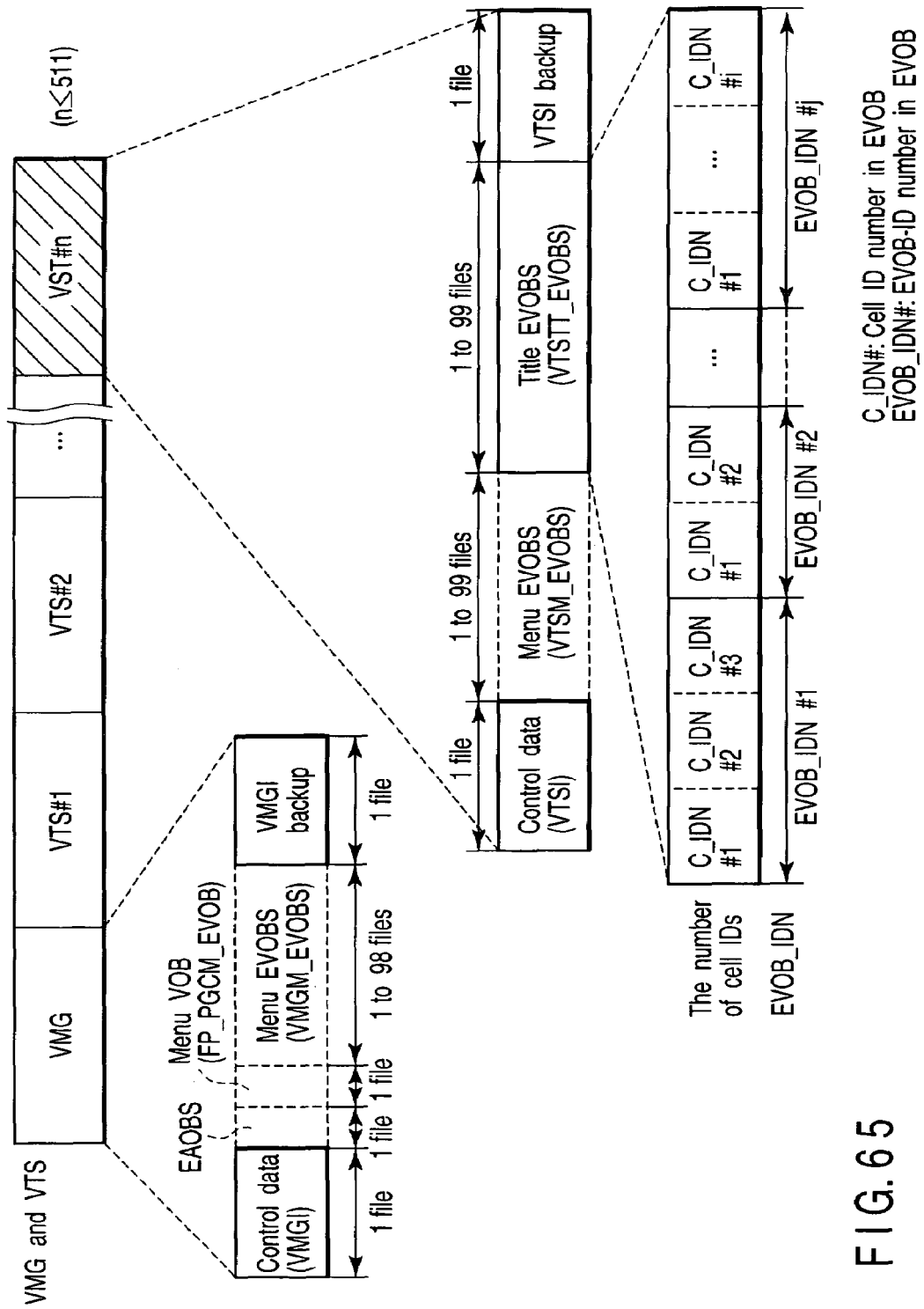
FIG. 65 is a diagram showing structures of a video manager VMG and a video title set VTS in a case where all elementary audio objects EVOBs are recorded on successive blocks.

The structures of the video manager VMG and the video title set VTS when all the EVOBs are recorded in sequential blocks are shown in FIG. 65. FIG. 65 is a modified example of the volume structure shown in FIG. 1, and is structured such that the data of the elementary audio object set EAOBS can be fetched rapidly at the time of pre-loading.

The VMG is composed of control data VMGI, EAOBS, menu EVOB (FP_PGCM_EBOV), menu EVOBS (VMG-M_EBOVS), and a VMGI backup file. In this way, the EAOBS are recorded directly after the control data, so that pre-loading thereof can be immediately carried out. The VTS is composed of control data VTSI, menu EVOBS (VTSM_EBOVS), title EVOBS (VTSTTE_EBOVS), and a VTSI backup file. The title EVOBS (VTSTT_EBOVS) consists of cells. A C_IDN# is a cell ID number in the EVOB, and an EVOB_IDN# is an EVOB_ID number in the EVOB.

Figure 66:
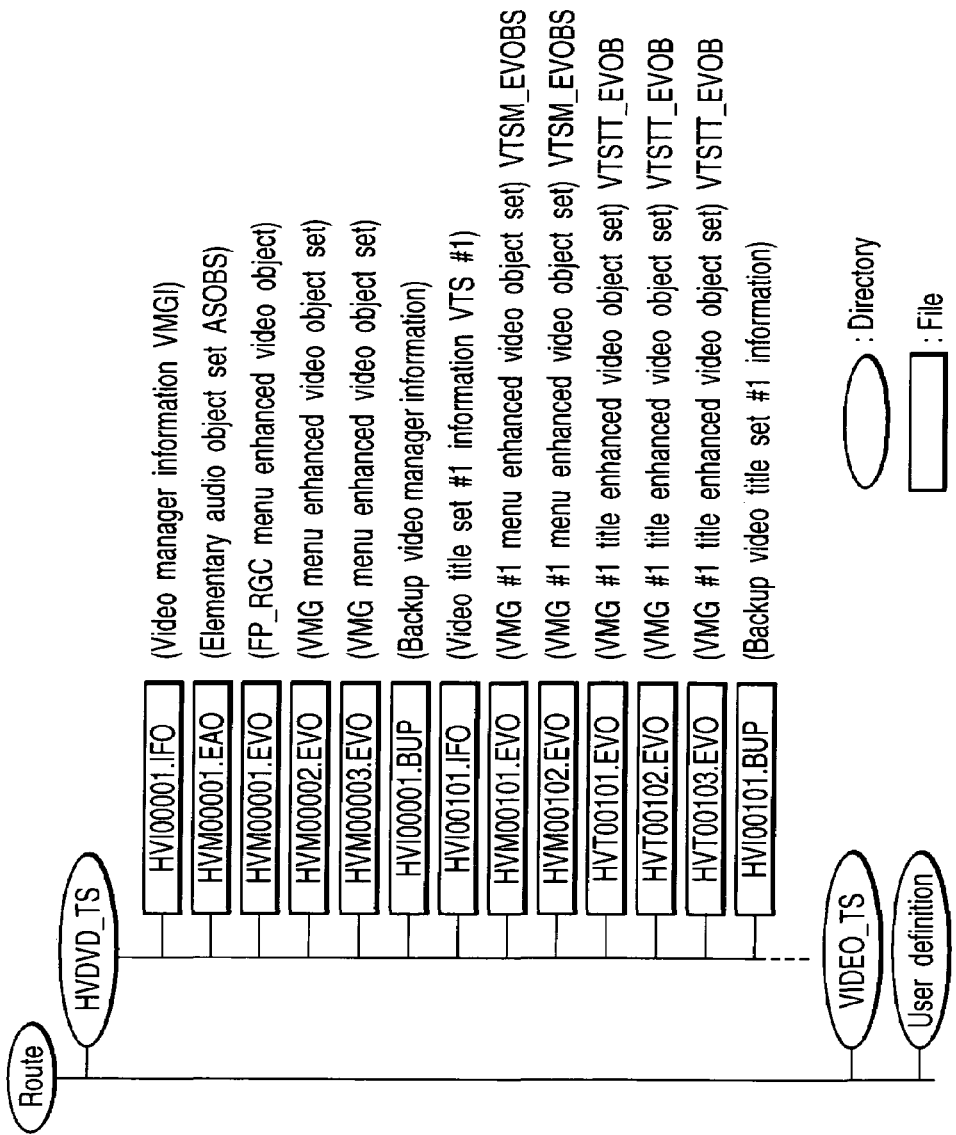
FIG. 66 is a diagram showing a modified example of the file system (directory structure) of the DVD video contents shown in FIG. 2.

FIG. 66 is a modified example of the directory structure shown in FIG. 2, and a sub-directory which is HVDVD_TS for HD-DVD is provided under the route directory separately from the sub-directory VIDEO_TS for the conventional ROM-video.

Video manager information VMGI, an elementary audio object set EOBS, an FP_RGC menu enhanced video object FP_PGCM_EVOB, backup video manager information VMGI_BUP, video title set information VTSI, and backup video title set information VTSI_BUP are recorded in the data space of the component file of the HVDVD_TS directory. VMGM_EVOBS whose size is greater than or equal to 1 GB (=2³⁰ bytes) is divided into 98 objects at the maximum. VTSM_EVOBS and VTSTT_VOBS whose sizes are greater than or equal to 1 GB (=2³⁰ bytes) are divided into 99 objects at the maximum. Therefore, a size of each file is less than or equal to 1 GB. Those files are made to be component files of the HVDVD_TS directory. The respective files of the VMGM_EVOBS, VTSM_EVOBS, and VTSTT_EVOBS are sequentially recorded.

The following regulations are applied to the file name of the video manager VMG.

1) Directory name

The directory name of a DVD video is "HVDVD_TS".

2) File name of video manager VMG

The file name of the video manager VMG is "HVI00001.IFO".

The file name of the elementary audio object set is "HVM00001.EAO".

The file name of the FP_PGC menu enhanced video object is "HVM00001.EVO".

The file name of the VMG menu enhanced video object set is "HVM000%%.EVO".

The file name of the backup video manager information is "HVI00001.BUP".

Here, %% varies sequentially from '02' to '99' at each VMG menu enhanced video object set.

3) File name of video title set VTS

The file name of the video title set information is "HVI@@@##.IFO".

The file name of the VTS menu enhanced video object is "HVM@@@##.EVO".

The file name of the title enhanced video object set is "HVT@@@##.EVO".

The file name of the backup video object set information is "HVI@@@01.BUP".

Here, @@@ is a three-digit number from '000' to '511' which are allocated to the files of the video title set numbers. ## varies sequentially from '01' to '99' at each VTS menu enhanced video object set or each title enhanced video object set.

Figure 67:
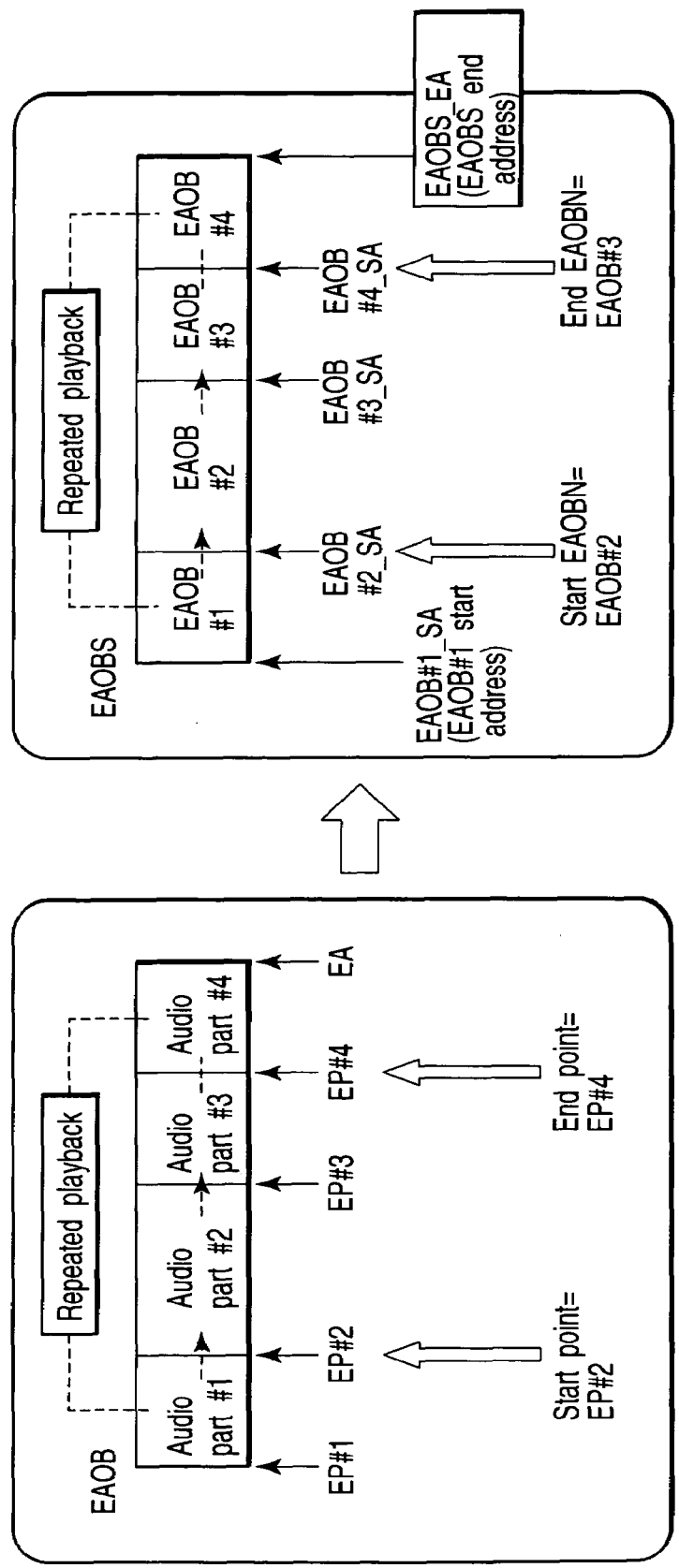
FIG. 67 is a diagram for explanation of an operation for designating a range at which audio data is repeatedly played back by elementary audio object EAOB numbers.

In the above-described embodiment, as shown in FIG. 56, the structure is described in which a playback range of background music to be played back at the same time when each menu screen is displayed is repeatedly played back with the start boundary position or the end boundary position (AOB end address) on which the audio data in the menu audio object HDMENU_AOB has been recorded, or entry positions set in advance being as a boundary range. As a modified example thereof, the example in which a repeated playback range of audio is designated in EVOB unit will be described with reference to FIG. 67. The left side of FIG. 67 shows the concept of FIG. 56, and a part to be repeatedly played back in the EVOB is defined by a start point and an end point. Therefore, it is necessary to grasp the start points and the end points of the respective parts. In contrast thereto, in the modified example shown in the right side, a playback range is designated by an elementary audio object EAOB. Entry points EP are repealed, and EAOB numbers EAOBN are introduced. Playback start/end entry points EP are repealed, and playback start/end EAOB numbers EAOBN are introduced. The number EAOB_EP_Ns of entry points EP is replaced with the number EAOB-Ns of EAOB numbers EAOBN. The start addresses of the respective entry points are replaced with the start addresses of the respective elementary audio objects EAOB. Namely, EAOB_1ST-EP is replaced with 1ST_EAOB start address.

As shown in the left side of FIG. 67, in order to designate a playback range by entry points, it is necessary to designate a start point and an end point, points to be designated are double. Moreover, there is an image at a start position in entry points, and it is difficult to see an end position. However, when a playback range is designated by an elementary audio object EAOB number, it can be achieved by merely designating a block, and parameters to be designated are half thereof. Because it is easy to designate, it is easy to fetch the data into a buffer in advance.

An object of the elementary audio object set is to realize a seamless audio playback even if video expression is changed among PGCs (regardless of any change in a menu). An EAOBS is pre-loaded into an elementary audio buffer of 8 MB at the time of inserting a disk. A PGC can express any of audio streams in EVOB(s) and EAOB by switching the respective audio buffers. A designation of audio to be expressed is determined by PGCI search pointers (VMG-M_PGCI_SRP, VTSM_PGCI_SRP, or VTS_PGCI_SRP), and a voice information flag in the FP_PGC-CAT in the video manager information management table VMGI_MAT.

A voice information flag comes to be in three states.

1) The audio in the EVOB(s) designated in the PGC is played back (the audio in the EVOB is selected).

2) Asynchronous audio EAOBS is continuously played back (the audio in the EVOBS is selected, and the audio in the EVOB is ignored).

3) Playback of the synchronous audio EAOBS is started (the audio in the EVOB is selected, and the audio in the EVOBS is ignored).

Accordingly, when the EAOBS is selected, a seamless playback of the audio is possible among PGC.

FIG. 68 shows a structural example of an elementary audio object set EAOBS. The EAOBS is, as shown in FIG. 68, divided into sequential EAOBs of two or more (seven at the maximum). The start addresses (EAOB#n_SA) of the respective EAOBs are described in the header of the EAOBS. Each EAOB is designated from the top of the audio frame.

Figure 69:
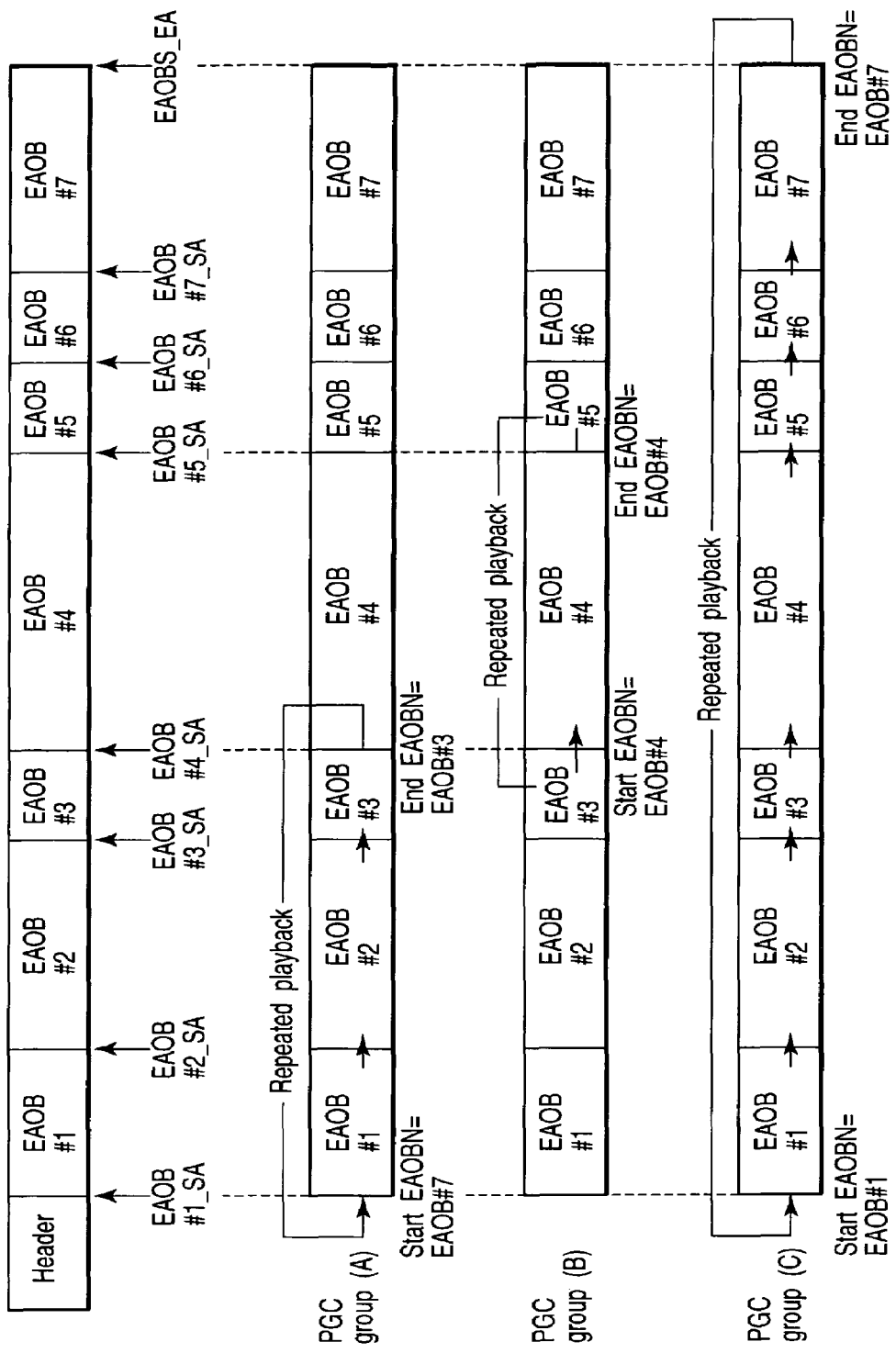
FIG. 69 is a diagram for explanation of an operation for playing back two or more successive EAOBs in a PGC group including one or more PGCs by using a head EAOBN and an end EAOBN in a PGCI search pointer.

It is possible to access to sequential EAOBs of two or more by using a start EAOBN and an end EAOBN in the PGCI search pointer. It is also possible to play back the EAOB without being interrupted in a PGC group consisting of one or a plurality of PGCs. The outline of a playback order is shown in FIG. 69. Three examples are shown in FIG. 69.

In the PGC included in a PGC group (A), the start EAOBN is equal to EAOB #1, and the end EAOBN is equal to EAOB #3. The PGC belonging to this group plays back the EAOBs from #1 to #3 in this order, and repeats the playback between EAOB #1 to EAOB #3 even when a change arises among the PGCs.

In the PGC included in a PGC group (B), the start EAOBN is equal to EAOB #4, and the end EAOBN is equal to EAOB #4. The PGC belonging to this group plays back only the EAOB #4, and repeats the playback of the EAOB #4 even when a change arises among the PGCs.

In the PGC included in a PGC group (C), the start EAOBN is equal to EAOB #1, and the end EAOBN is equal to EAOB #7. The PGC belonging to this group plays back the EAOBs from #1 to #7 (all the EAOBs) in this order, and repeats the playback between EAOB #1 to EAOB #7 even when a change arises among the PGCs.

FIG. 70 shows the contents of the elementary audio object set EAOBS. The EAOBS includes header information EAOBS_HI and EAOBS audio data EAOBS_AUD. The EAOBS audio data EAOBS_AUD consists of EAOBs of seven at the maximum. Each EAOB is composed of elementary audio data, and is disposed from the top of the audio frame.

FIG. 71 shows the contents of the EAOBS header information. EAOB_Ns denotes the number of EAOBs, EAOBS_EA denotes an EAOBS end address, EAOBS_ATR denotes an EAOBS attribute, 1ST_EAOB_SA denotes a first EAOB start address, 2ND_EAOB_SA denotes a second EAOB start address, 3RD_EAOB_SA denotes a third EAOB start address, 4TH_EAOB_SA denotes a fourth EAOB start address, 5TH_EAOB_SA denotes a fifth EAOB start address, 6TH_EAOB_SA denotes a sixth EAOB start address, and 7TH_EAOB_SA denotes a seventh EAOB start address.

EAOB_Ns denotes the number of EAOBs in the EAOBS, and values of '1' to '7'.

The EAOBS_EA describes the end addresses of the EAOBS in relative byte numbers RBN from the first byte of the EAOBS.

The EAOBS_ATR is used in common with the respective EAOBs.

The 1ST_EAOB_SA describes the first EAOB start address in a relative byte number RBN from the first byte of the EAOBS. The first EAOB always exists. The 2ND_EAOB_SA describes the second EAOB start address in a relative byte number RBN from the first byte of the EAOBS. When there is no second EAOB, '0000 0000h' is input. The 3RD_EAOB_SA describes the third EAOB start address in a relative byte number RBN from the first byte of the EAOBS. When there is no third EAOB, '0000 0000h' is input. The 4TH_EAOB_SA describes the fourth EAOB start address in a relative byte number RBN from the first byte of the EAOBS. When there is no fourth EAOB, '0000 0000h' is inputted. The 5TH_EAOB_SA describes the fifth EAOB start address in a relative byte number RBN from the first byte of the EAOBS. When there is no fifth EAOB, '0000 0000h' is input. The 6TH_EAOB_A describes the sixth EAOB start address in a relative byte number RBN from the first byte of the EAOBS. When there is no sixth EAOB, '0000 0000h' is input. The 7TH_EAOB_SA describes the seventh EAOB start address in a relative byte number RBN from the first byte of the EAOBS. When there is no seventh EAOB, '0000 0000h' is inputted. The maximum size of an EAOBS is limited to 8 MB including the EAOBS header information EAOBS_HI. The end address of n-th EAOB is (n+1)-th EAOB start address −1, or the end address of the EAOBS. The respective EAOBs in the EAOBS are continuously disposed without any gap.

Next, a navigation data structure will be described.

Figure 72:
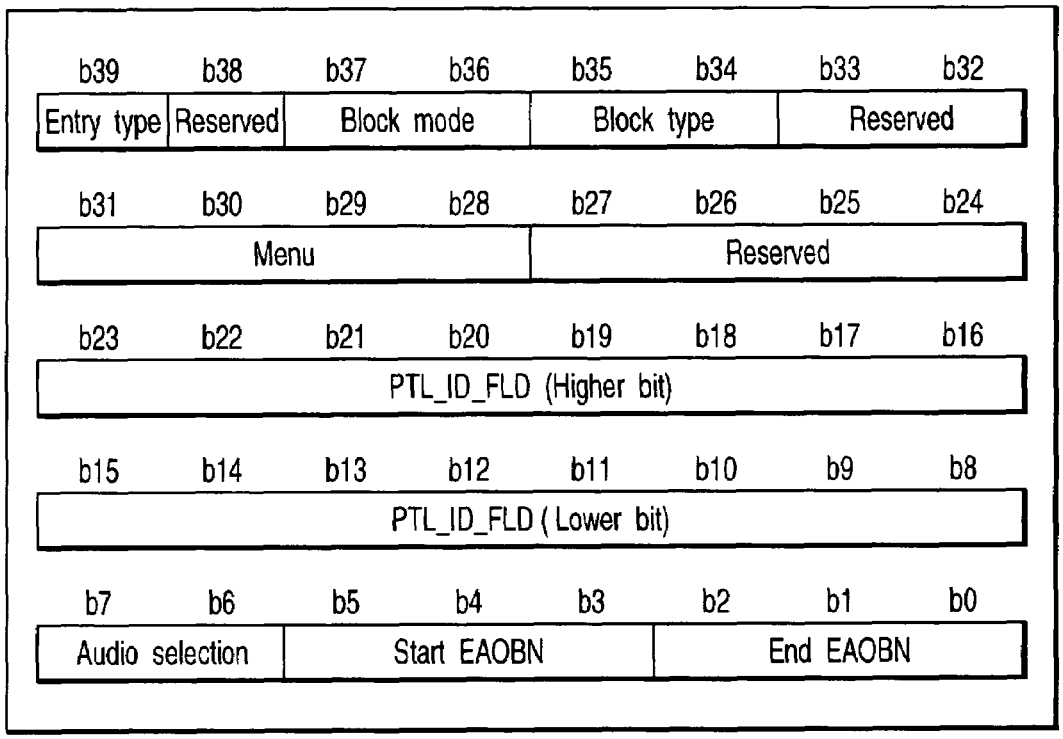
FIG. 72 is a diagram showing contents of VMGM_PGC_CAT in VMGM_PGCI_SRP in VGMV_PGCI_UT in VMGI.

FIG. 72 shows the contents of the VMGM_FGC-CAT in the VMGM_PGCI_SRP in the VMGM_PGCI_UT.

Entry type (b39)
0b: Non-entry PGC
1b: Entry PGC
Block mode (b38)
00b: Non-PGC in the block
01b: Initial PGC in the block
10b: PGCs in the block (except for the initial and last PGCs)
11b: Last PGC in the block
Block type (b37, b36)
00b: Not the part in the block
01b: Parental block
The others: Reserved
Audio selection (b7, b6)
00b: Audio in the EVOB designated in the PGC is played back
01b: Reserved
10b: Asynchronous audio EAOB designated in the start EAOBN is continuously played back (Audio in the EVOB is ignored even if it exists)
11b: Asynchronous audio EAOB designated in the start EAOBN is started (Audio in the EVOB is ignored even if it exists)
Start EAOBN (b5 to b3)
When audio selection is '00b', the start EAOBN is meaningless.
When audio selection is '10b' or '11b', the start EAOBN is defined as follows.
000b: Reserved
001b to 111b: Start EAOBN number
Annotation: The start EAOBN is less than or equal to the end EAOBN.
End EAOBN (b2 to b0)
When audio selection is '00b', the end EAOBN is meaningless.
When audio selection is '10b' or '11b', the end EAOBN is defined as follows.
000b: Reserved
001b to 111b: End EAOBN number Annotation 1: When audio selection is '00b', asynchronous audio is continuously played back between the start EAOBN and the end EAOBN.
Annotation 2: When audio selection is '10b', the start EAOBN and the end EAOBN are the same as the previous one. Asynchronous audio is seamlessly played back between the PGCs.
Annotation 3: When a change in domains arises, a seamless playback is not guaranteed.

Figure 73:
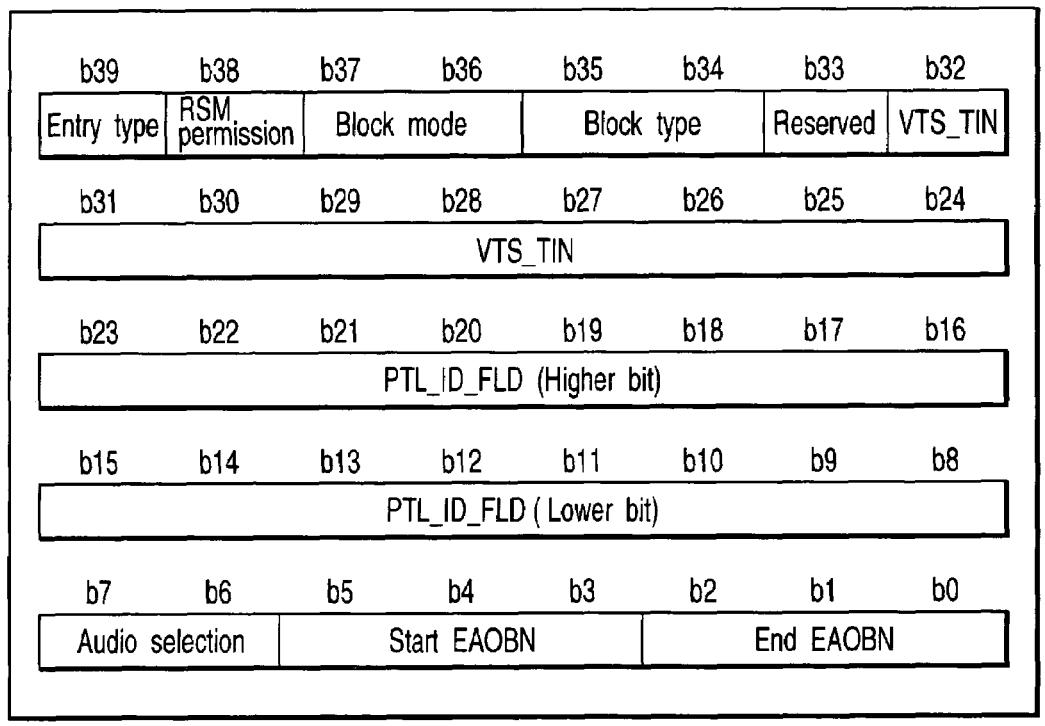
FIG. 73 is a diagram showing contents of VTS_PGC_CAT in VTS_PGCI_SRP in VTS_PGCIT in VTSI.

FIG. 73 shows the contents of the VTS_PGC_CAT in the VTS_PGCI_SRP in the VTS_PGCIT in the VTSI.
Entry type (b39)
0b: Non-entry PGC
1b: Entry PGC
RSM permission (b38)
It is described whether or not a playback resume by an RSM instruction or a resume function ( ) is permitted in the PGC.
0b: Permission (The RSM information is updated)
1b: No permission (The RSM information is not updated)
Block mode (b37 to b36)
00b: No PGC in the block
01b: Initial PGC in the block
10b: PGCs in the block (except for the initial and last PGCS)
11b: Last PGC in the block
Block type (b35, b34)
00b: Not the part in the block
01b: Parental block
The others: Reserved
VTS_TIN (b32 to b24)
VTS title number value
Audio selection (b7, b6)
00b: Audio in the EVOB designated in the PGC is played back
01b: Reserved
10b: Asynchronous audio EAOB designated in the start EAOBN is continuously played back (Audio in the EVOB is ignored even if it exists)
11b: Asynchronous audio EAOB designated in the start EAOBN is started (Audio in the EVOB is ignored even if it exists)
Start EAOBN (b5 to b3)
When audio selection is '00b', the start EAOBN is meaningless.
When audio selection is '10b' or '11b', the start EAOBN is defined as follows.
000b: Reserved
001b to 111b: Start EAOBN number
Annotation: The start EAOBN is less than or equal to the end EAOBN.
End EAOBN (b2 to b0)
When audio selection is '00b', the end EAOBN is meaningless.
When audio selection is '10b' or '11b', the end EAOBN is defined as follows.
000b: Reserved
001b to 111b: End EAOBN number
Annotation 1: When audio selection is '00b', asynchronous audio is continuously played back between the start EAOBN and the end EAOBN.
Annotation 2: When audio selection is '10b', the start EAOBN and the end EAOBN are the same as the previous one. Asynchronous audio is seamlessly played back between the PGCs.
Annotation 3: When a change in domains arises, a seamless playback is not guaranteed.

Figure 74:
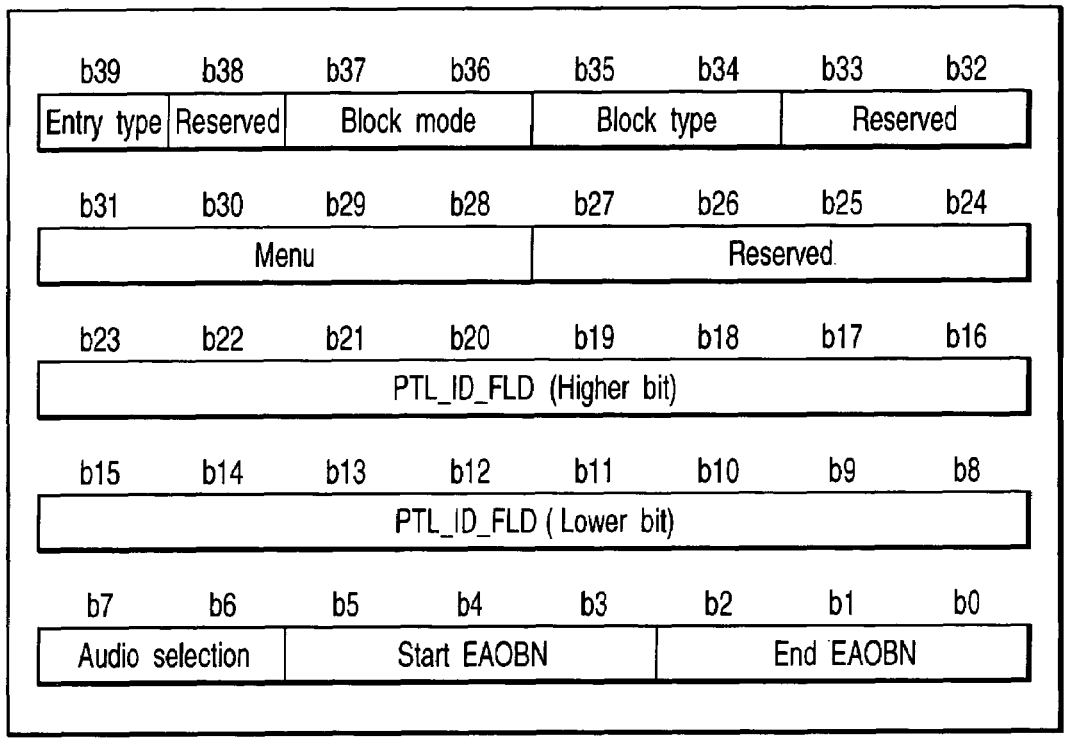
FIG. 74 is a diagram showing contents of VTSM_PGC_CAT in VTSM_PGCI_SRP in VTSM_LU in VTS.

FIG. 74 shows the contents of the VTSM-PGC_CAT in the VTSM_PGCI_SRP in the VTSM_LU in the VTS.
Entry type (b39)
0b: Non-entry PGC
1b: Entry PGC
Block mode (b37, b36)
00b: Non-PGC in the block
01b: Initial PGC in the block
10b: PGCs in the block (except for the initial and last PGCs)
11b: Last PGC in the block
Block type (b35, b34)
00b: Not the part in the block
01b: Parental block
The others: Reserved
Menu ID (b31 to b28)
0011b: Route menu
0100b: Sub-picture menu
0101b: Audio menu
0110b: Angle menu
0111b: PTT menu
The others: Reserved
Audio selection (b7, b6)
00b: Audio in the EVOB designated in the PGC is played back
01b: Reserved
10b: Asynchronous audio EAOB designated in the start EAOBN is continuously played back (Audio in the EVOB is ignored even if it exists)
11b: Asynchronous audio EAOB designated in the start EAOBN is started (Audio in the EVOB is ignored even if it exists)
Start EAOBN (b5 to b3)
When audio selection is '00b', the start EAOBN is meaningless.
When audio selection is '10b' or '11b', the start EAOBN is defined as follows.
000b: Reserved
001b to 111b: Start EAOBN number
Annotation: The start EAOBN is less than or equal to the end EAOBN.
End EAOBN (b2 to b0)
When audio selection is '00b', the end EAOBN is meaningless.
When audio selection is '10b' or '11b', the end EAOBN is defined as follows.
000b: Reserved
001b to 111b: End EAOBN number
Annotation 1: When audio selection is '00b', asynchronous audio is continuously played back between the start EAOBN and the end EAOBN.
Annotation 2: When audio selection is '10b', the start EAOBN and the end EAOBN are the same as the previous one. Asynchronous audio is seamlessly played back between the PGCs.
Annotation 3: When a change in domains arises, a seamless playback is not guaranteed.

FIG. 75 is a modified example of FIG. 61, and shows a playback flowchart of a menu audio object HDMENU_AOB in a case of designating an audio repeated playback range by a start EAOB and an end EAOB, in place of a start point and an endpoint.

First, the header information of the elementary audio object set EAOBS (EAOB_HI) is read and acquired (S31), and thereafter, the start addresses of the respective EAOBs (1ST_EAOB_SA) are acquired (S32), and the category information (PGC_CAT) in the program chain (PGC) to be played back is detected, and a 'voice information selection flag', a 'start EAOB number', and an 'end EAOB number' are acquired (S33). It is determined whether or not the acquired 'voice information selection flag' is '00b' (S34). When the HDMENU_AOB is being played back in case of '00b', the playback is stopped (S35), and the audio in the VOB designated in the PGC is played back (S36).

If the 'voice information selection flag' is not '00b', moreover, it is determined whether or not the 'voice information selection flag' is '11b'. When the 'voice information selection flag' is '11b', the EAOBS is started to play back from the 'start EAOB number' (S38). When the 'voice information selection flag' is not '11b', moreover, it is determined whether or not the 'voice information selection flag' is '10b' (S39), and when it is '10b', the EAOB is continuously played back (S40). After steps S38 and S40, a repeated playback (S44) from the 'start EAOB number' to the 'end EAOB number' is carried out.

Figure 76:
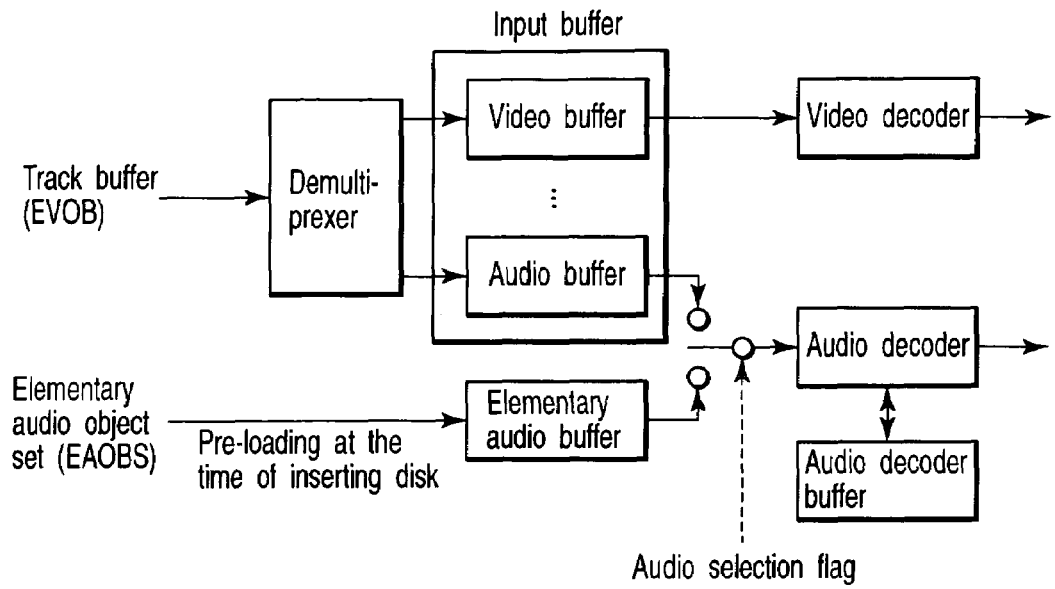
FIG. 76 is a diagram showing a standard player model which carries out playback of asynchronous audio EAOBS.

FIG. 76 shows a standard player model for carrying out playback of asynchronous audio EAOBS. The EVOB input from the track buffer is separated into video and audio at the multiplexer, and they are stored in the respective input buffers. The video data is output via the video decoder. The elementary audio object set EAOBS is stored in the elementary audio buffer at the time of inserting a disk. One of the outputs from the audio input buffer and the elementary audio buffer is selected by the voice information selection flag, and is outputted via the audio decoder.

In this way, it is on the assumption that the elementary audio object set EAOBS is pre-loaded in the buffer in advance of playback of the menu screen. Due to the pre-loading, it is possible to seamlessly play back the EAOBS without any interruption during the time the menu screen is switched. It is switched in accordance with the information of audio selection (voice information selection) described the respective FIGS. 8, 58., 71, 24, 59, 89, 27, 60, and 96 whether the audio information recorded in the VMGM_EVOBS is played back, or the audio information recorded in the EAOBS is played back, as the audio to be played back at the same time of displaying a menu. Branching processing as shown in steps S14, S17 and S19 in FIG. 60, and steps S34, S37 and S39 in FIG. 75 is carried out.

Next, the navigation data structure will be described.

The navigation data is an attribute of playback data, and information on playback control, and consists of four types of information of video manager information VMGI, video title set information VTSI, presentation control information PCI, and data search information DSI. The VMGI are described at the top and the end of a VMG, and the VTSI are described at the top and the end of a VTS. The PCI and the DSI are disposed so as to disperse in the enhanced video object set EVOBS along playback data.

FIG. 78 shows the structure of the video manager information VMGI.

The video manager information VMGI describes the information of the related HVDVD_TS directory, the information for searching, for example, a title, FP_PGC, the information for playing back VMGM, and moreover, the information of parental management, respective VTS_ATR, and TXTDT.

The top of the video manager information VMGI is a video manager information management table VMGI_MAT (essential), and hereinafter, there follow: a title search pointer table TT_SRPT (essential), a video manager menu PGCI unit table VMGM_PGCI_UT (essential when there are VMGM_EVOBS), a parental management information table PTL_MAIT (optional), a video title set attribute table VTS_ATRT (essential), a text data manager TXTDT_MG (optional), an FP_PGC menu cell address table FP_PGCM_C_ADT (essential when there are FP_PGCM_EVOB), an FP_PGC menu EVOBU address map FP_PGCM_EVOBU_ADMAP (essential when there are FP_PGCM_EVOB), a video manager menu cell address table VMGM_C_ADT (essential when there are VMGM_EVOBS), and a video manager menu enhanced video object unit address map VMGM_EVOBU_ADMAP (essential when there are VMGM_EVOBS). The respective tables are arranged in line on the boundary between the logical blocks. For this object, the respective tables continue up to 2047 bytes (including '00h') at the maximum.

Figure 80:
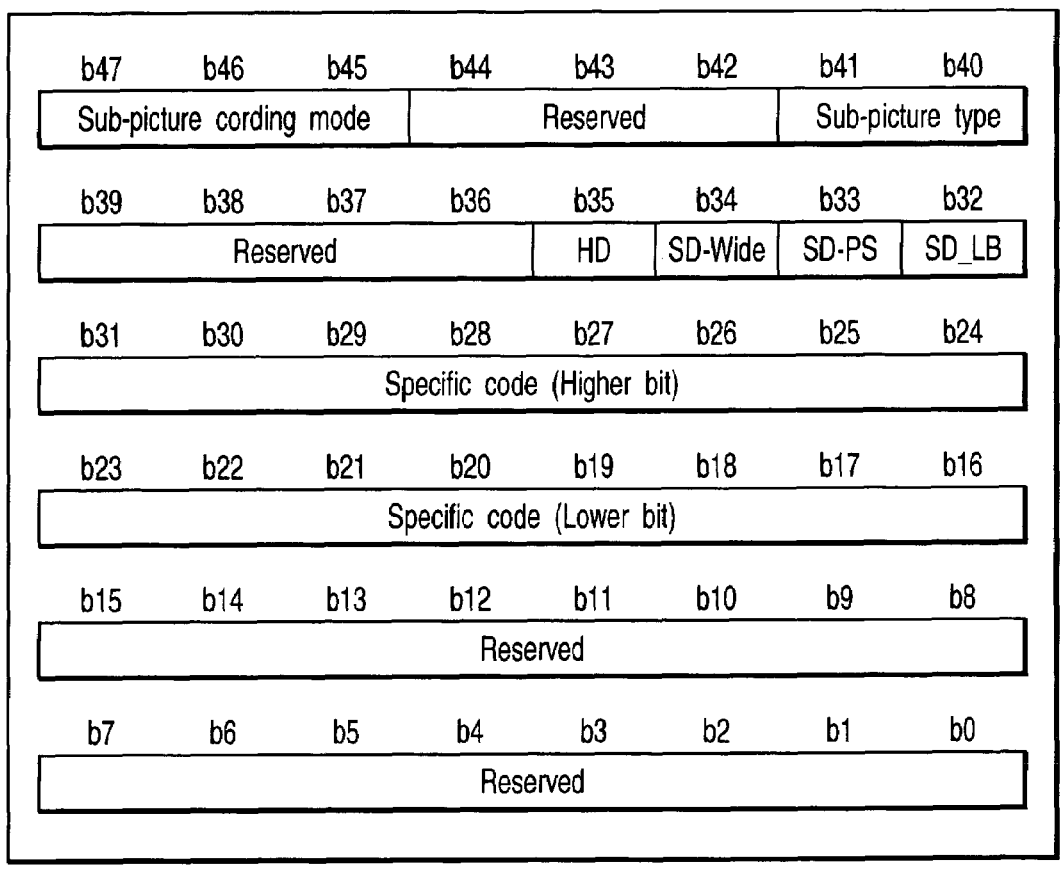
FIG. 80 is a diagram showing contents of FP_PGCM sub-picture stream attribute (FP_PGCM_SPST_ATR) of FIG. 79.

FIG. 80 shows the contents of an FP_PGCM sub-picture stream attribute (FP_PGCM_SPST_ATR) of FIG. 79.

Figure 81:
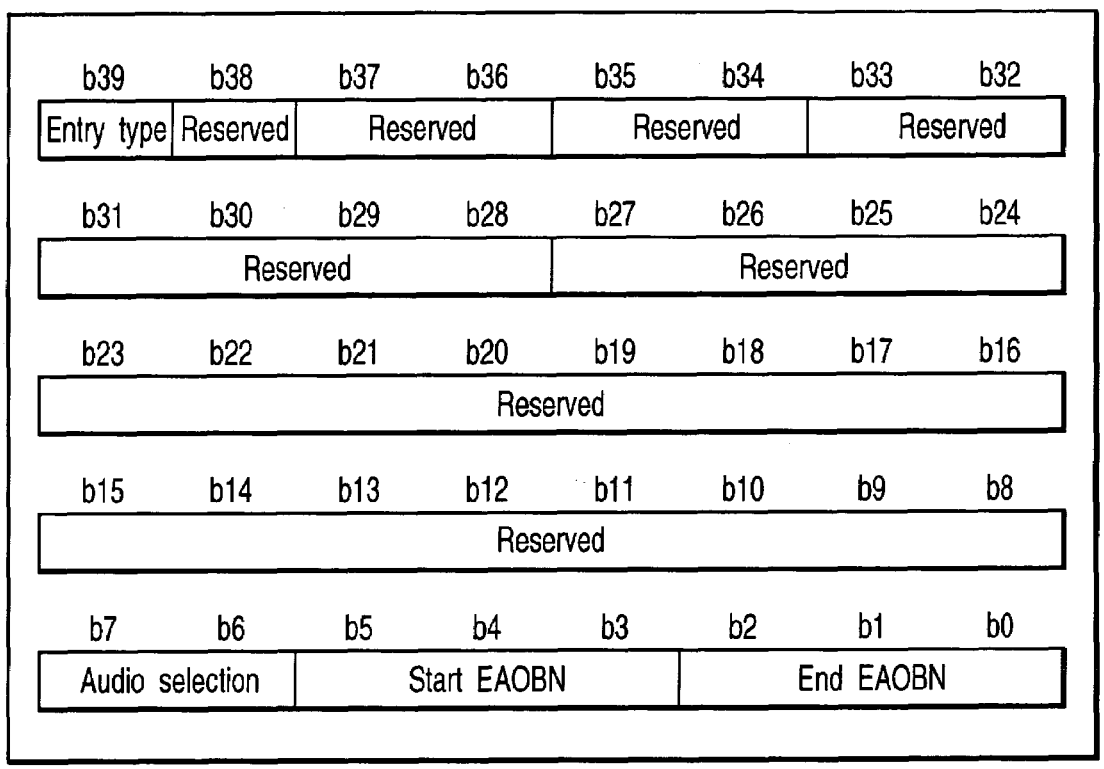
FIG. 81 is a diagram showing contents of FP_PGC category (FP_PGC_CAT) of FIG. 79.

Sub-picture coding mode (b47 to b45)
000b: in Run length of 2 bits/1 pixel.
The value of PRE_HEAD is other than '0000h'.
001b: in Run length of 2 bits/1 pixel.
The value of PRE_HEAD is '0000h'.
Sub-picture type (b41 to b40)
01b: Language
HD (b35)
When a sub-picture coding mode is '001b', this flag denotes whether or not an HD stream exists.
0b: There is no HD stream
1b: There is an HD stream
SD-Wide (SD-Wide) (b35)
When a sub-picture coding mode is '001b', this flag denotes whether or not an SD-Wide (16:9) stream exists.
0b: There is no SD-Wide stream
1b: There is an SD-Wide stream
SD-Pan-scan (SD-PS) (b33)
When a sub-picture coding mode is '001b', this flag denotes whether or not an SD-Pan-scan (4:3) stream exists.
0b: There is no SD-PS stream
1b: There is an SD-PS stream
SD-Letterbox (SD-LB) (b32)
When a sub-picture coding mode is '001b', this flag denotes whether or not an SD-Letterbox (4:3) stream exists.
0b: There is no SD-LB stream
1b: There is an SD-LB stream
FIG. 81 shows the contents of the FP_PGC category (FP_PGC_CAT) of FIG. 79.
Entry type (b39)
0b: Non-entry PGC
1b: Entry PGC
Audio selection (b7, b6)
00b: Audio in the EVOB designated in the PGC is played back
01b: Reserved
10b: Asynchronous audio EAOB designated in the start EAOBN is continuously played back (Audio in the EVOB is ignored even if it exists)
11b: Asynchronous audio EAOB designated in the start EAOBN is started (Audio in the EVOB is ignored even if it exists)
Start EAOBN (b5 to b3)
When audio selection is '00b', the start EAOBN is meaningless.
When audio selection is '10b' or '11b', the start EAOBN is defined as follows.
000b: Reserved
001b to 111b: Start EAOBN number
Annotation: The start EAOBN is less than or equal to the end EAOBN.
End EAOBN (b2 to b0)
When audio selection is '00b', the end EAOBN is meaningless.

When audio selection is '10b' or '11b', the end EAOBN is defined as follows.

000b: Reserved 001b to 111b: End EAOBN number

Annotation 1: When audio selection is '00b', asynchronous audio is continuously played back between the start EAOBN and the end EAOBN.

Annotation 2: When audio selection is '10b', the start EAOBN and the end EAOBN are the same as the previous one. Asynchronous audio is seamlessly played back between the PGCs.

Annotation 3: When a change in domains arises, a seamless playback is not guaranteed.

FIG. 82 shows the structure of an FP_PGC menu cell address table (FP_PGCM_C_ADT) in the VMG.

This table describes the start/end addresses of all the cells in the FP_PGCM_EVOB. The top of the FP_PGCM_C_ADT is the FP_PGC menu cell address table information FP_PGCM_C_ADTI, and hereinafter, FP_PGC menu cell piece information FP_PGCM_CPI on the respective cell pieces follow. In some cases, a sequential block exists such that the cell pieces are made equal to a cell. Those are not interleaved. In an FP_PGCM_CPI of each cell piece, there follow first, an EVOB_IDN, and next, a C_IDN, and third, a playback order of cell pieces in the cell. EVOB-IDN and C_IDN are those for a cell to which a cell piece belongs.

The video manager information VMGI is composed of a video manager information management table VMGI_MAT (essential), a title search pointer table TT_SRPT (essential), a video manager menu PGCI unit table VMGM_PGCI_UT (essential when there are VMGM_EVOBS), a parental management information table PTL_MAIT (optional), a video title set attribute table VTS_ATRT (essential), a text data manager TXTDT_MG (optional), an FP_PGC menu cell address table FP_PGCM_C_ADT (essential when there are FP_PGCM_EVOB), an FP_PGC menu EVOBU address map FP_PGCM_EVOBU_ADMAP (essential when there are FP_PGCM_EVOB), a video manager menu cell address table VMGM_C_ADT (essential when there are VMGM_EVOBS), and a video manager menu EVOBU address map VMGM_EVOBU_ADMAP (essential when there are VMGM_EVOBS).

The FP_PGC menu cell address table FP_PGCM_C_ADT consists of FP_PGC menu cell address table information FP_PGCM_C_ADTI, FP_PGC menu cell piece #1 information FP_PGCM_CPI #1, FP_PGC menu cell piece #2 information FP_PGCM_CPI #2, and FP_PGC menu cell piece #n information FP_PGCM_CPI #n.

FIG. 83 shows the structure of an FP_PGC menu enhanced video object unit address map FP_PGCM_EVOBU_ADMAP in the VMGI.

On this map, the start addresses of all the EVOBUs in the FP_PGCM_EVOB are described in ascending order of LBN (logical block numbers). The top of the FP_PGCM_EVOBU_ADMAP is FP_PGC menu enhanced video object unit address map information FP_PGCM_EVOBU_ADMAPI, and hereinafter, an FP_PGC menu enhanced video object unit #n address FP_PGCM_EVOBU_AD #n at each EVOBU follows.

Next, a modified example of the graphic unit will be described.

When DVD contents are manufactured from a motion picture, the number of frames (24 frames) in a motion picture and the number of frames per second in a television system are different from one another, and thus, frame conversion must be carried out. The number of frames in an NTSC television system is 30 frames/second, and as shown in FIG. 87, two frames in a film are converted into five fields of NTSC (3:2 pull-down system).

Playback start/end positions in the contents are defined by a playback time presentation time (PTM). However, because the PTMs in NTSC/PAL systems are different from one another even in the same contents, it is necessary to rewrite the PTMs for the NTSC/PAL contents. However, it may be changed such that the playback start/end positions are designated by frame numbers in a motion picture in place of the PTMs. In this way, although 3:2 pull-down is necessary, there is the advantage that processing can be carried out by merely rewriting only the PTMs at the tops in the NTSC/PAL systems.

FIG. 88 shows run length encoding rules of button pattern data.

(a) When a same value does not continue, '0' is input to the first bit, and pixel data is input to the following one bit. The two bits configure one unit.

(b) When 2 to 3 pixels having a same value continue, '1' is input to the first bit, the number of subsequent pixels is input to the following two bits, and pixel data is input to the following one bit. The four bits configure one unit.

(c) When 4 to 7 pixels having a same value continue, '1' is input to the first bit, '0' is input to the following one bit, the number of subsequent pixels is input to the following three bits, and pixel data is input to the following one bit. The six bits configure one unit.

(d) When 8 to 15 pixels having a same value continue, '1' is input to the first bit, '0' is input to the following two bits, the number of subsequent pixels is input to the following four bits, and pixel data is input to the following one bit. The eight bits configure one unit.

(e) When 16 to 31 pixels having a same value continue, '1' is input to the first bit, '0' is input to the following three bits, the number of subsequent pixels is input to the following five bits, and pixel data is input to the following one bit. The ten bits configure one unit.

(f) When 32 to 63 pixels having a same value continue, '1' is input to the first bit, '0' is input to the following four bits, the number of subsequent pixels is input to the following six bits, and pixel data is input to the following one bit. The twelve bits configure one unit.

(g) When 64 to 127 pixels having a same value continue, '1' is input to the first bit, '0' is input to the following five bits, the number of subsequent pixels is input to the following seven bits, and pixel data is input to the following one bit. The fourteen bits configure one unit.

(h) When 128 to 255 pixels having a same value continue, '1' is input to the first bit, '0' is input to the following six bits, the number of subsequent pixels is input to the following eight bits, and pixel data is input to the following one bit. The sixteen bits configure one unit.

(i) When pixels having a same value continue up to the end of one line, '1' is input to the first bit, '0' is input to the following fourteen bits, and pixel data is input to the following one bit. The sixteen bits configure one unit.

If a byte alignment is not achieved when description of pixels in one line is completed, 2-bit data '00b', 4-bit data '0000b', or 6-bit data '000000b' is inserted in the data in order to adjust. A size of each BTNPD (compressed data) is less than or equal to 128 kb.

Next, a modified example of the sub-picture will be described.

FIG. 89 shows the data structure in a sub-picture unit SPU. After the sub-picture unit header SPUH, a bitmap screen of a sub-picture is run-length encoded (one of data encoding technology), and is recorded in a pixel data area PXD. Moreover, after the PXD, there is recorded a sub-picture display control sequence table SP_DCSQT in which the information on a display position, a display size, a display timing, and the like with respect to a main screen on the bitmap screen of the sub-picture before the run-length encoding recorded in the pixel data area PXD have been recorded. The data structure in the sub-picture unit header SPUH used for the existing SD DVD contents is, as shown in (a) of FIG. 91, composed of the size information SPU_SZ of the sub-picture unit and the sub-picture display control sequence table start address information SP_DCSQT_SA, and the respective information are respectively expressed by 2 bytes.

Figure 90:
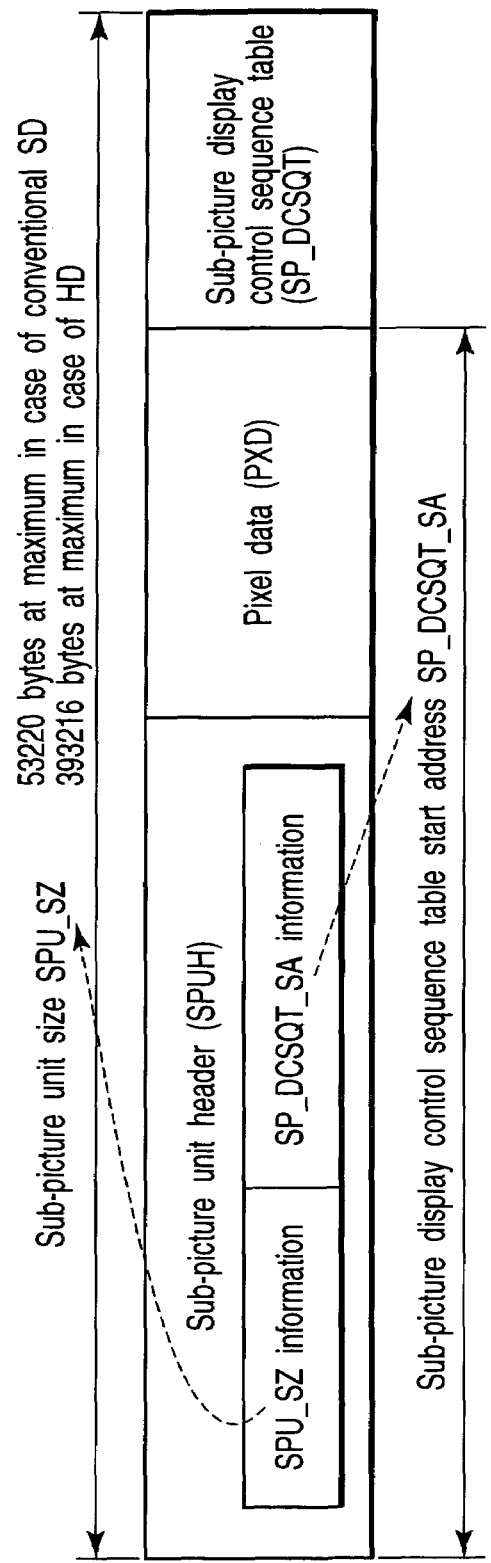
FIG. 90 is a diagram showing definitions of sub-picture unit size information SPU_SZ and sub-picture display control sequence table start address information SP_DCSQT_SA.

The definitions of the size information SPU_SZ of the sub-picture unit and the sub-picture display control sequence table start address information SP_DCSQT_SA described above are shown in FIG. 90. The sub-picture display control sequence table start address information SP_DCSQT_SA shows a relative address (data size) from the top position of the sub-picture unit header SPHU up to the sub-picture display control sequence table start position. Further, the size information SPU_SZ of the sub-picture unit shows a size of the entire sub-picture unit SPU, and it is necessary to set the value to be less than or equal to 53,220 bytes in the existing SD DVD. In the existing DVD video standard, for example, in NTSC (National Television System Committee), only a SD image with resolution of 480 lines×720 pixels at the maximum is supported. In contrast thereto, the problem that, even if, for example, an HD image having high resolution of 1,080 lines×1,920 pixels is made to correspond to NTSC, and an attempt is made to record a sub-picture stream having high resolution corresponding thereto, the sub-picture stream cannot be inserted into an existing sub-picture unit SPU whose upper limit is provided as 53,220 bytes is brought about. Further, in the same way, it is necessary to extend the size of the sub-picture display control sequence table SP_DCSQT in which information such as a display position of a sub-picture screen and the like are recorded. Accordingly, in the sub-picture unit header SPUH corresponding to HD, as shown in (c) of FIG. 91, the size information of the sub-picture unit SPU_SZ is extended from the conventional 2-byte expression to 4-byte expression, and 393,216 bytes at the maximum can be set thereto. Furthermore, the sub-picture display control sequence table start address information SP_DCSQT_SA as well is extended from the conventional 2-byte expression to 4-byte expression. Moreover, the structure is made such that an attempt is made to insure the compatibility in data structures with the existing SD DVD contents. Namely, the structure is made such that it is possible to identify an SD sub-picture unit header SPUH or an HD sub-picture unit header SPUH on the basis of information of two bytes from the top of the sub-picture unit header. When information other than '0000h' is recorded as the information of two bytes from the top of the sub-picture unit header, it is identified as an SD sub-picture unit header SPUH, and it is identified that the information of 2 bytes denotes information of the size information of the sub-picture unit SPU_SZ. In contrast thereto, when the information of 2 bytes is '0000h', it is identified as an HD sub-picture unit header SPUH, and it is identified that the information of 2 bytes is the HD sub-picture unit ID information SPU_ID recorded in the pre-header PRE_HEAD of the sub-picture unit. In the sub-picture unit header SPUH for HD, the size information of the sub-picture unit SPU_SZ and the sub-picture display control sequence table start address information SP_DCSQT_SA are recorded in the post hear POST_HEAD of the sub-picture unit.

A flowchart in which playback of a sub-picture unit is carried out in accordance with a determined type on the basis of the above-described description.

First, a previous header (PRE_HEAD) of two bytes in the sub-picture unit header (SPUH) is acquired (S31), and in is determined whether or not the data in the PRE_HEAD is '0000h' (S32). When the data is other than '0000h', the PRE_HEAD of two bytes is processed as a sub-picture unit size (SPU_SZ) (S33), and a subsequent header (POST_HEAD) of two bytes is processed as a sub-picture display control sequence table start address (SP_DCSQT_SA) (S34).

When the data in the PRE_HEAD is '0000h', the PRE_HEAD of two bytes is processed as sub-picture unit identification data (SPU_ID) (S37), and a subsequent header (POST_HEAD) of eight bytes is processed as a sub-picture unit size (SPU_SZ) of four bytes and a sub-picture display control sequence table start address (SP_DCSQT_SA) of four bytes (S38).

In any case, thereafter, subsequence pixel data (PXD) is acquired (S35), and a subsequence sub-picture display control sequence table (SP_DCSQT) is acquired (S36).

Figure 91:
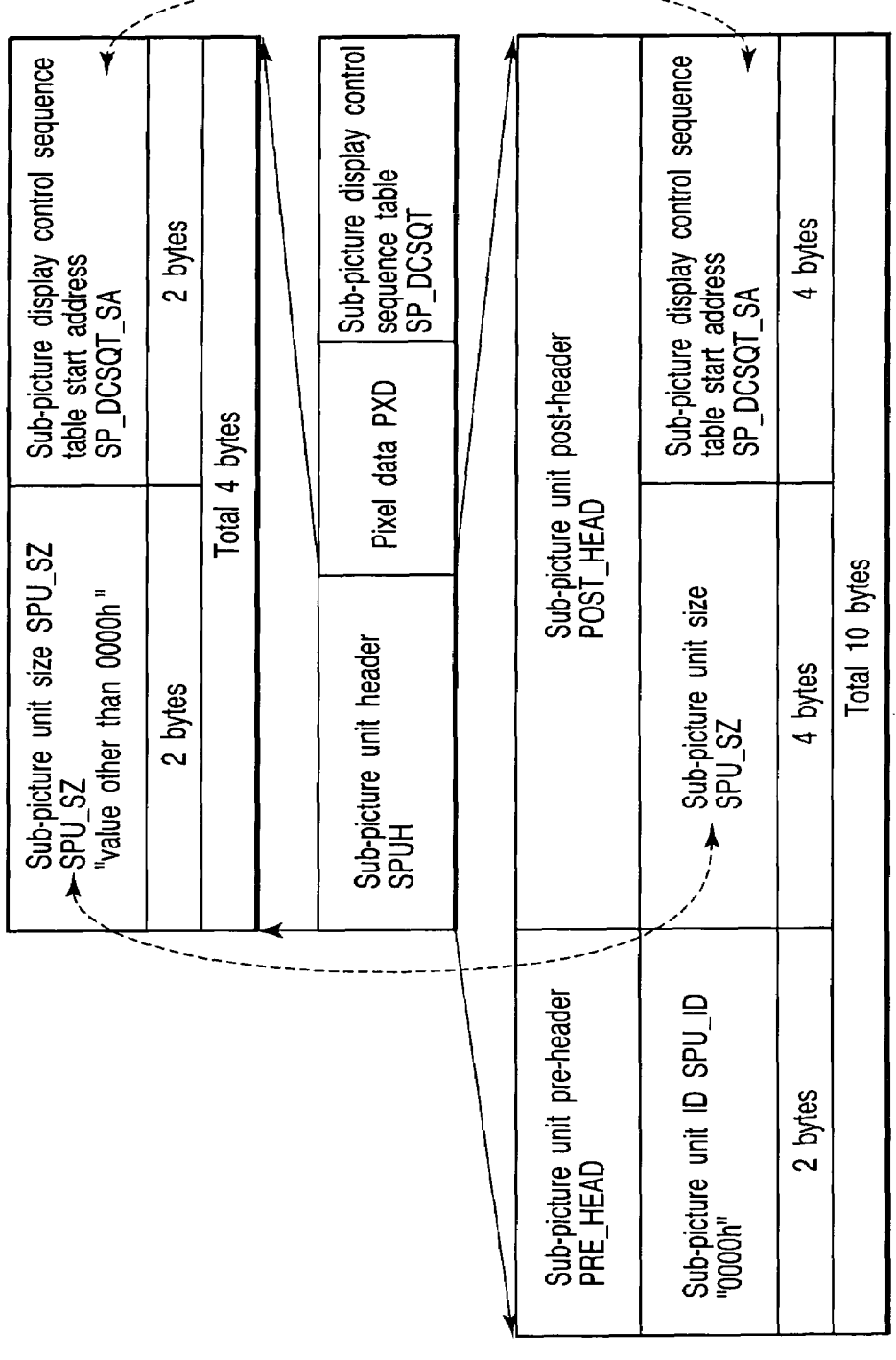
FIG. 91 is a diagram showing data structures in sub-picture unit headers corresponding to SD and HD.
Figure 92:
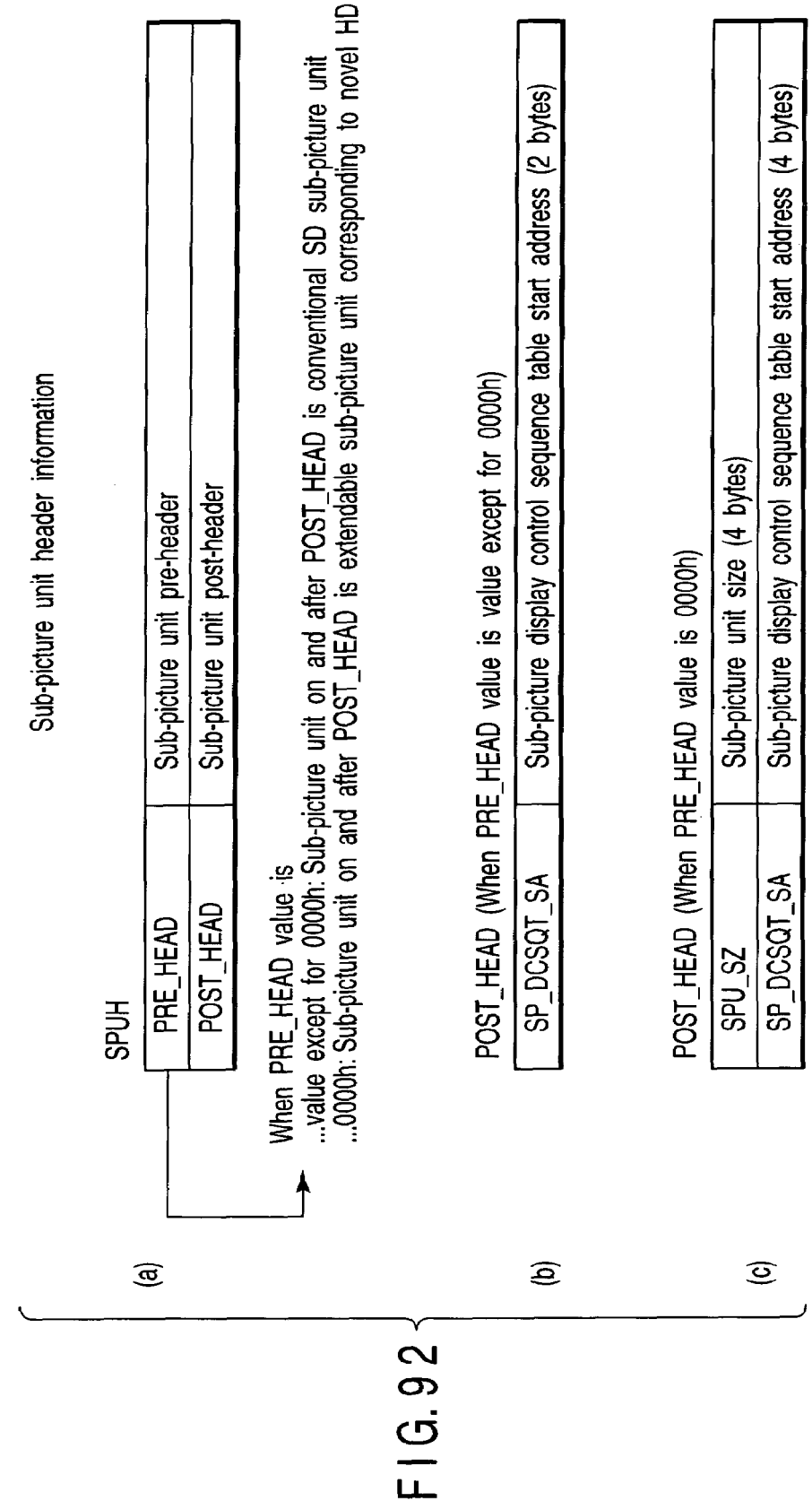
FIG. 92 is a diagram in which the data structure in the sub-picture unit header SPUH for HD shown in FIG. 91 has been drawn from another standpoint.
Figure 94:
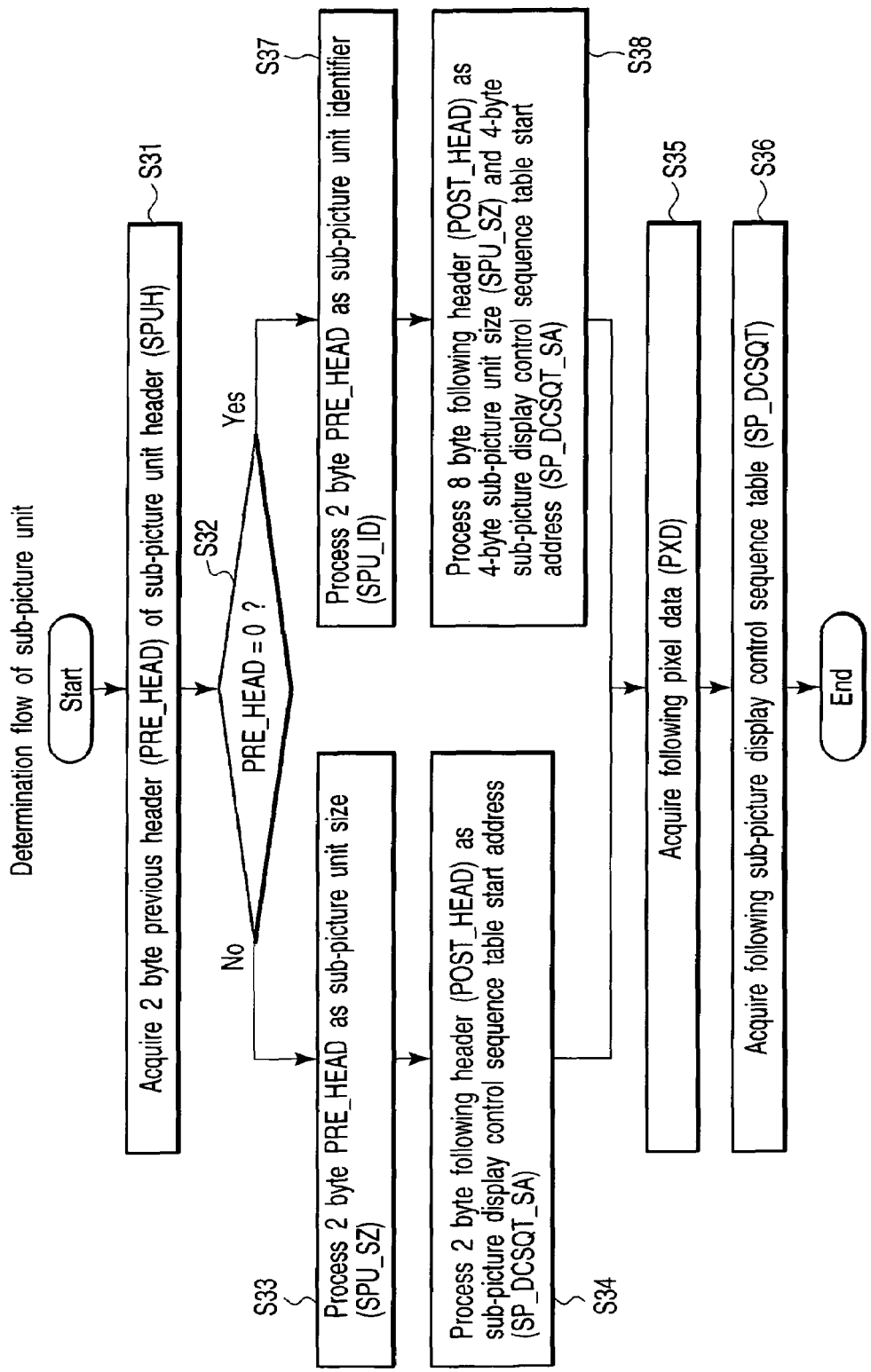
FIG. 94 is a flowchart for playing back a sub-picture unit in accordance with contents of an advance header in the sub-picture unit header SPUH.

FIG. 92 is a diagram in which the data structure in the sub-picture unit header SPUH for HD shown in (c) of FIG. 91 is rewritten from a different standpoint.

With respect to the list of sub-picture display control commands SP_DCCMD which can be recorded in the sub-picture display control sequence table SP_DCSQT, as shown in FIG. 93, setting of the display area of pixel data 2 (SET_DAREA2), setting of pixel data display start address 2 (SET_DSPXA2), and setting of change in color and contrast of pixel 2 CHG_COLCON2) which are respectively commands with respect to a high resolution sub-picture corresponding to HD contents are added. The SET_DAREA2 serving as setting of the display area of pixel data 2 is a command to designate a display range in a main image screen on a sub-picture bitmap screen in the same way as the SET_DAREA, and a condition for an HD image is, in addition to that of a conventional SD image, added to the designated value setting conditions for a display range. The SET_DSPXA2 serving as setting of pixel data display start address 2 is a command to designate a display start address in a main image screen in a sub-picture bitmap screen in the same way as the SET_DSPXA, and is extended from 5-byte expression (of the SET_DSPXA) to 8-byte expression such that a display start position of PXD data can be designated as an address in accordance with a high resolution in HD. The CHG_COLCON2 to set changes in color and contrast of pixel 2 is a command to designate changes in a color and a contrast on a sub-picture bitmap screen in the same way as CHG_COLCON.

Figure 95:
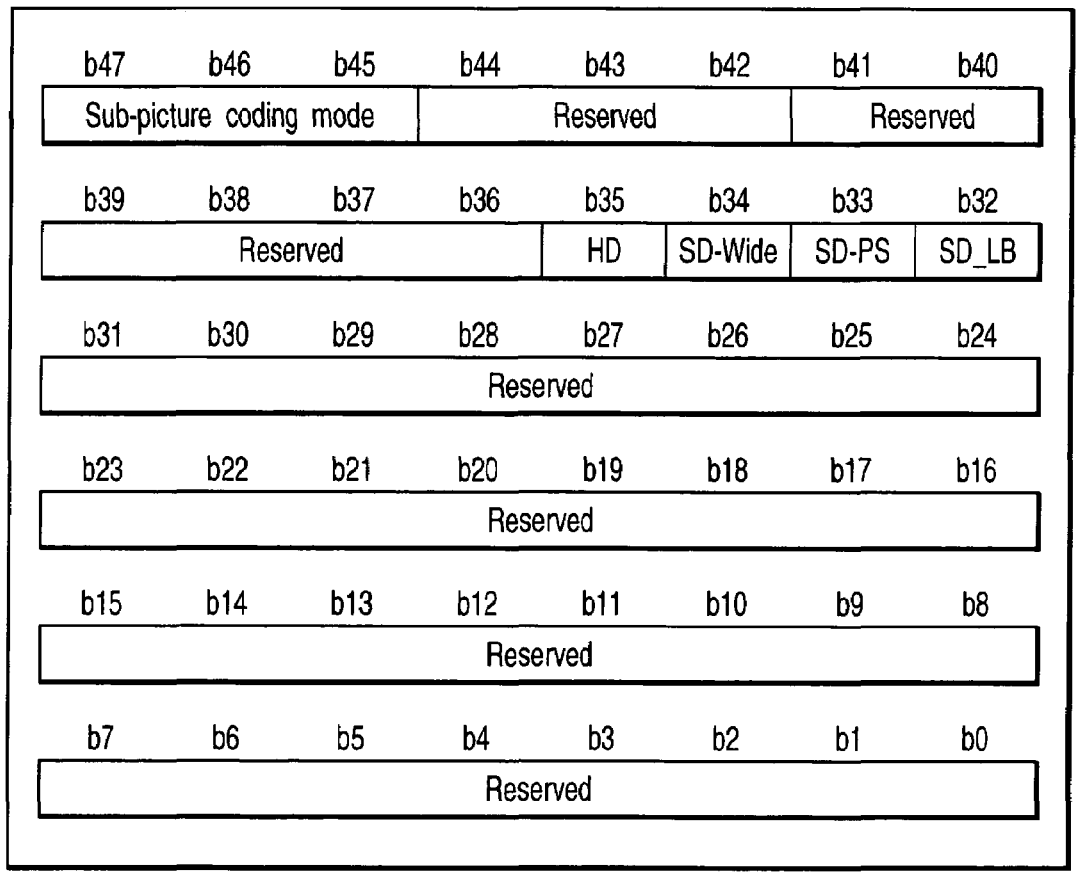
FIG. 95 is a diagram showing contents of VMGM sub-picture stream attribute (VMGM_SPST_ATR) in the VMGI_MAT shown in FIG. 79.

FIG. 95 shows the contents of a VMGM sub-picture stream attribute (VMGM_SPST_ATR) in VMGI_MAT shown in FIG. 79.

Sub-picture coding mode (b47 to b45)

000b: in Run length of 2 bits/1 pixel.

The value of PRE_HEAD is other than '0000h'.

001b: in Run length of 2 bits/1 pixel.

The value of PRE_HEAD is '0000h'.

HD (b35)

When a sub-picture coding mode is '001b', this flag denotes whether or not an HD stream exists.

0b: There is no HD stream

1b: There is an HD stream

SD-Wide (b34)

Figure 96:
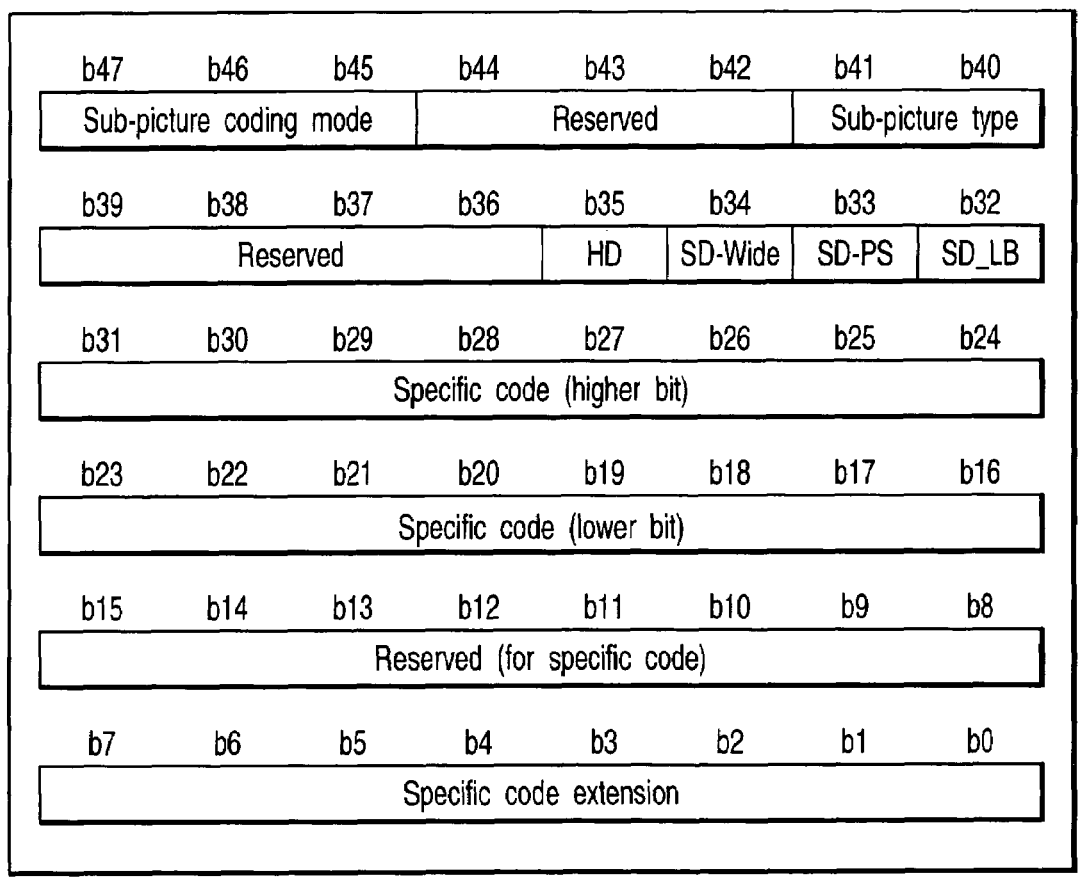
FIG. 96 is a diagram showing contents of HDVTS sub-picture stream attribute (HDVTS_SPST_ATR) in the HD video title set information management table (HDVTSI_MAT) shown in FIG. 21.

When a sub-picture coding mode is '001b', this flag denotes whether or not an SD-Wide (16:9) stream exists.
   0b: There is no SD-Wide stream
   1b: There is an SD-Wide stream
   SD-PS (b33)
When a sub-picture coding mode is '001b', this flag denotes whether or not an SD-Pan-scan (4:3) stream exists.
   0b: There is no SD-PS stream
   1b: There is an SD-PS stream
   SD-LB (b32)
When a sub-picture coding mode is '001b', this flag denotes whether or not an SD Letterbox (4:3) stream exists.
   0b: There is no SD-LB stream
   1b: There is an SD-LB stream FIG. 96 shows the contents of an HDVTS sub-picture stream attribute (HDVTS_SPST_ATR) in the HD video title set information management table (HDVTSI_MAT) shown in FIG. 21.
   Sub-picture coding mode (b47 to b45)
   000b: in Run length of 2 bits/1 pixel.

The value of PRE_HEAD is other than '0000h'.
   001b: in Run length of 2 bits/1 pixel.

The value of PRE_HEAD is '0000h'.
   Sub-picture type (b41 to b40)
   00b: Not specified
   01b: Language
   HD (b35)
When a sub-picture coding mode is '001b', this flag denotes whether or not an HD stream exists.
   0b: There is no HD stream
   1b: There is an HD stream
   SD-Wide (b34)
When a sub-picture coding mode is '001b', this flag denotes whether or not an SD-Wide (16:9) stream exists.
   0b: There is no SD-Wide stream
   1b: There is an SD-Wide stream
   SD-PS (b33)
When a sub-picture coding mode is '001b', this flag denotes whether or not an SD Pan-scan (4:3) stream exists.
   0b: There is no SD-PS stream
   1b: There is an SD-PS stream
   SD-LB (b32)
When a sub-picture coding mode is '001b', this flag denotes whether or not an SD Letterbox (4:3) stream exists.
   0b: There is no SD-LB stream
   1b: There is an SD-LB stream FIG. 97 shows the contents of one PGC sub-picture stream control information (PGC_SPST_CTL) in the PGC sub-picture stream control table (PGC_SPST_CTLT) shown in FIG. 34.
   SD availability flag (b31)
   1b: SD sub-picture stream is available in the PGC
   0b: SD sub-picture stream is not available in the PGC
   HD availability flag (b30)
   1b: HD sub-picture stream is available in the PGC
   0b: HD sub-picture stream is not available in the PGC
   The number of 4:3/HD decoding sub-picture streams (b28 to b24)

When an aspect ratio and a TV system of a current video attribute (FP_PGCM_V_ATR, VMGM_V_ATR, VTSM_V_ATR, or VTS_V_ATR) are '00b' and '00b' or '01b', and the SD availability flag is '1b', the lower 5 bits of the sub_stream_id of a corresponding 4:3 sub-picture steam number are described.

When an aspect ratio and a TV system of a current video attribute (FP_PGCM_V_ATR, VMGM_V_ATR, VTSM_V_ATR, or VTS_V_ATR) are '11b' and '10b' or '11b', and the SD availability flag is '1b', the lower 5 bits of the sub_stream_id of a corresponding HD sub-picture steam number are described.

The number of SD-Wide decoding sub-picture streams (b20 to b16)

When an aspect ratio of a current video attribute (FP_PGCM_V_ATR, VMGM_V_ATR, VTSM_V_ATR, or VTS_V_ATR) is '11b', and the SD availability flag is '1b', the lower 5 bits of the sub_stream_id of a corresponding SD-Wide sub-picture steam number are described.

The number of Letterbox decoding sub-picture streams (b12 to b8)

When an aspect ratio and a display mode of a current video attribute (FP_PGCM_V_ATR, VMGM_V_ATR, VTSM_V_ATR, or VTS_V_ATR) are '11b' and '00b' or '10b', and the SD availability flag is '1b', the lower 5 bits of the sub_stream_id of a corresponding Letterbox sub-picture steam number are described.

The number of Pan-Scan decoding sub-picture streams (b4 to b0)

When an aspect ratio and a display mode of a current video attribute (FP_PGCM_V_ATR, VMGM_V_ATR, VTSM_V_ATR, or VTS_V_ATR) are '11b' and '00b' or '01b', and the SD availability flag is '1b', the lower 5 bits of the sub_stream_id of a corresponding Pan-Scan sub-picture steam number are described.

Coding conditions for sub-picture stream used for respective stream numbers are the same as in P_PGCM_EVOB, VMGM_EVOBS, VTSM_EVOBS, or VTSTT_EBOVS.

When an SD availability flag is '1b', and an HD availability flag is '1b', a number which is the same as an HD decoding sub-picture stream number is used as respective decoding sub-picture stream numbers for SD-Wide, letterbox, and Pan-Scan.

A modified example of the PGC_GI shown in FIG. 33 is shown in FIG. 98. The PGC_GI is information of PGC, and the contents include the following.
   (1) PGC_CNT: PGC contents.
   (2) PGC_PB_TM: a total playback time in the PGC clocked by frames in hours, minutes, seconds, and a BCD format (based on a video time-code system defined by tc_flag).
   (3) PGC_UOP_CTL: PGC user operating time (During a PGC operation, a user operation is prohibited).
   (4) PGC_AST_CTLT: PGC audio stream control table. An availability flag of an audio stream and information on conversion from an audio stream number into a decoding audio stream number are described as follows.

The PGC_AST_CTLT consists of 8 PGC_AST_CTLs. One PGC_AST_CTL is described in each audio stream. When an audio stream number is less than 8, '0b' is inputted to each bit of PGC_AST_CTL which is not used.
   (5) PGC_SFST_CTLT: PGC sub-picture stream control table. An availability flag of a sub-picture stream and information on conversion from a sub-picture stream number into a decoding a sub-picture stream number are described as follows.

The PGC_AST_CTLT consists of 32 PGC_AST_CTLs. One PGC_AST_CTL is described in each audio stream. When an audio stream number is less than 32, '0b' is input to each bit of PGC_AST_CTL which is not used.
   (6) PGC_NV_CTL: PGC navigation control.

Next_PGCN describes a PGCN to be played back after the PGC. Previous_PGCN describes a PGCN to which a Link-PrevPGC command or a PrevPG_Search( ) refers. When PGCNs of two or more are played back next, one of the PGCNs is described. GoUp_PGCN describes the PGCN returned from the PGC.

When there is no PGC corresponding to Next_PGCN, Prev_PGCN, or GoUp_PGCN, '0b' is described in a corresponding field.

(7) PGC_SDSP_PLT: PGC sub-picture pallet for SD.

16 sets of luminance signals and two color-difference signals used in common for all the SD sub-picture streams in the PGC are described. Color codes from '0' to '15' are described.

(8) PGC_HDSP_PLT: PGC sub-picture pallet for HD.

16 sets of luminance signals and two color-difference signals used in common for all the HD sub-picture streams in the PGC are described. Color codes from '0' to '15' are described.

(9) PGC_CMDT_SA: PGC_CMDT start address.

A start address of a PGC_CMDT is described in a relative byte number (RBN) from the first byte of the PGCI. When there is no PGC_CMDT, '0000h' is input.

(10) PGC_PGMAP_SA: PGC_PGMAP start address.

A start address of a PGC_PGMAP is described in a relative byte number (RBN) from the first byte of the PGCI. When there is no PGC_PGMAP, '0000h' is input.

(11) C_PBIT_SA: C_PBIT start address.

A start address of a C_PBIT is described in a relative byte number (RBN) from the first byte of the PGCI. When there is no C_PBIT, '0000h' is input.

(12) C_POSIT_SA: C_POSIT start address.

A start address of a C_POSIT is described in a relative byte number (RBN) from the first byte of the PGCI. When there is no C_POSIT, '0000h' is input.

Next, a modified example of SD correspondence will be described.

There is the problem that a color matrix for SD and a color matrix for HD cannot be simultaneously set. Then, a pallet table PGC_SP_PLT is divided.

1) PGC_SDSP_PLT using a color matrix for SD
2) PGC_HDSP_PLT using a color matrix for HD In the two pallet tables, the number of pallets and a size of the respective pallets are the same.

Next, a player standard model for SD output will be described. The player has a function of mixing video data, graphic data, and sub-picture data by converting a display mode from an HDTV system into an SD TV system. The prerequisite for the player standard model is as follows.

1) The resolution of graphic data is equal to the resolution of video data.
2) Graphic data (if any) is initially mixed with video data.

FIG. 99 shows a basic player standard model.

FIG. 100 shows types of player standard models. There are four type of player standard models for SD output in accordance with a combination of input types and output types.

Case 1: There are video: HD, graphic: HD, and sub-picture: HD as input types, and there are (1) HD, (2) SD 16:9 Wide (down-converting after mixing), (3) SD 4:3 Pan-Scan (down-converting after mixing), and (4) SD 4:3 Letterbox (down-converting after mixing) as output types.

Case 2: There are video: HD, graphic: HD, sub-picture: HD, and sub-picture: SD (optional), (SD Wide/SD Pan-Scan/SD Letterbox) as input types, and there are (1) HD, (2) SD 16:9 Wide (mixing after down-converting), (3) SD 4:3 Pan-Scan (mixing after down-converting & Pan-Scan), and (4) SD 4:3 Letterbox (mixing after down-converting & Letterbox) as output types.

Case 3: There are video: SD, graphic: SD, sub-picture: SD, and sub-picture: SD (optional), (SD Wide/SD Pan-Scan/SD Letterbox) as input types, and there are (1) SD 16:9 Wide (mixing), (2) SD 4:3 Pan-Scan (mixing after Pan-Scan), and (3) SD 4:3 Letterbox (mixing after Letterbox) as output types.

Case 3': There are video: SD, graphic: SD, sub-picture: SD, and sub-picture: SD (optional), (SD Wide) as input types, and there are (1) SD 16:9 Wide (mixing), (2) SD 4:3 Pan-Scan (Pan-Scan after mixing), and (3) SD 4:3 Letterbox (Letterbox after mixing) as output types.

Case 4: There are video: SD, and sub-picture: SD (optional), (SD Wide/SD Pan-Scan/SD Letterbox) as input types, and there are (1) SD 16:9 Wide (mixing), (2) SD 4:3 Pan-Scan (mixing after Pan-Scan), and (3) SD 4:3 Letterbox (mixing after Letterbox) as output types.

Figure 101:
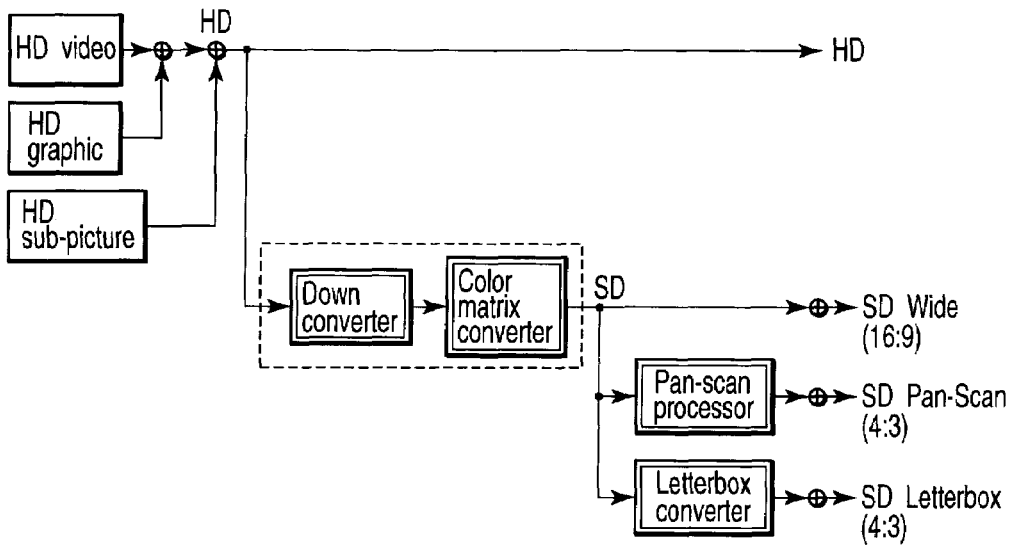
FIG. 101 is a diagram showing a player standard model in case 1.

A player standard model in case 1 is shown in FIG. 101. In this model, after the video data for HD and the graphic data for HD are mixed, the sub-picture for HD is mixed with them. The mixed data is down-converted, and thereafter, it is divided into SD Wide, SD Pan-Scan, and SD Letterbox.

Figure 102:
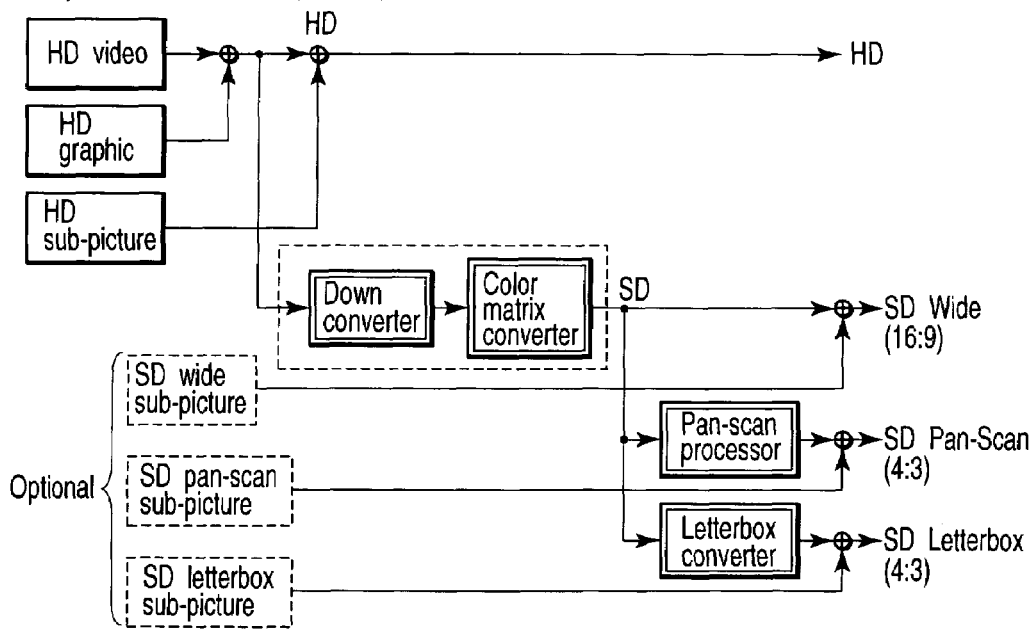
FIG. 102 is a diagram showing a player standard model in case 2.

A player standard model in case 2 is shown in FIG. 102. In this model, after the video data for HD and the graphic data for HD are mixed, the mixed data is down-converted, and thereafter, it is divided into SD Wide, SD Pan-Scan, and SD Letterbox. Note that a sub-picture for SD Wide, a sub-picture for SD Pan-Scan, and a sub-picture for SD Letterbox are optionally mixed with the SD Wide, SD Pan-Scan, and SD Letterbox data.

Figure 103:
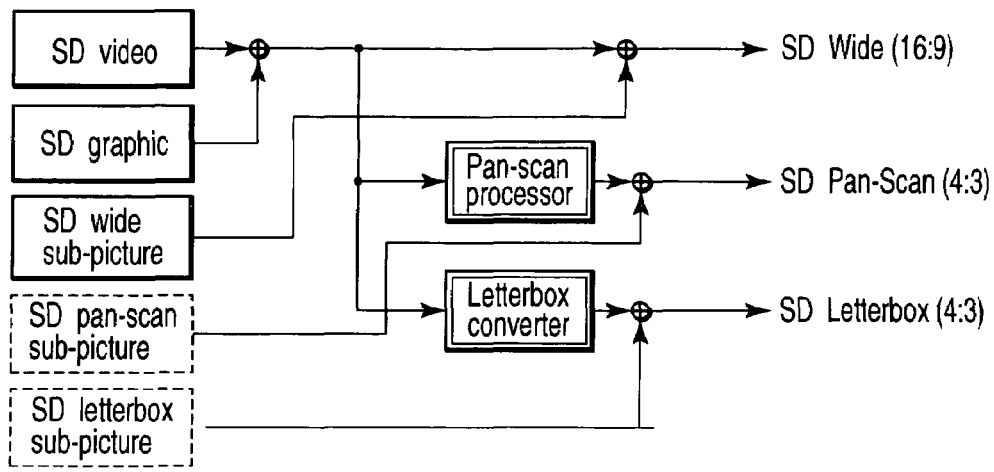
FIG. 103 is a diagram showing a player standard model in case 3.

A player standard model in case 3 is shown in FIG. 103. In this model, after the video data for SD and the graphic data for SD are mixed, the mixed data is divided into SD Pan-Scan and SD Letterbox. Note that a sub-picture for SD Pan-Scan and a sub-picture for SD Letterbox are optionally mixed with the SD Pan-Scan and SD Letterbox data. After the video data for SD and the graphic data for SD are mixed, a sub-picture for SD Wide is further mixed with those, and SD Wide is generated.

Figure 104:
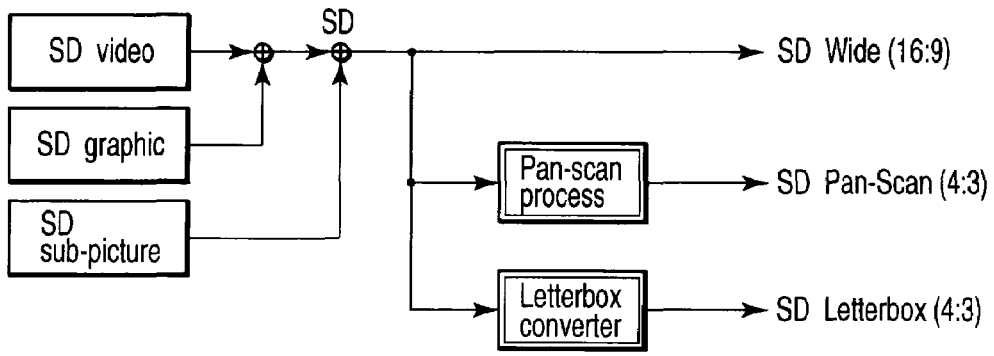
FIG. 104 is a diagram showing a player standard model in case 3'.

A player standard model in case 3' is shown in FIG. 104. In this model, after the video data for SD, the graphic data for SD, and the sub-picture data for SD are mixed, the mixed data is divided into SD-Wide, SD Pan-Scan, and SD Letterbox.

Figure 105:
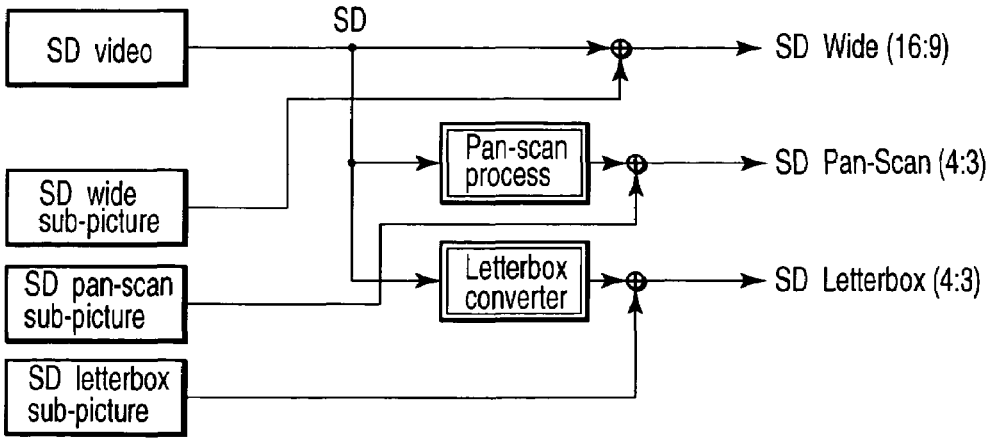
FIG. 105 is a diagram showing a player standard model in case 4.

A player standard model in case 4 is shown in FIG. 105. In this model, when there is no graphic data, the video data for SD and the sub-picture data for SD Wide are mixed, and SD Wide is generated. SD Pan-Scan and SD Letterbox are divided from the video data for SD. Note that a sub-picture for SD Pan-Scan and a sub-picture for SD Letterbox are mixed with the SD Pan-Scan and SD Letterbox data.

Next, resume command/cell command will be described.

The program chain command table PGC_CMDT describes program chain command table information PGC_CMDTI, pre-commands PRE_CMD and post commands POST_CMD of the PGC, cell commands C_CMD, and resume commands RSM_CMD.

The number i of pre-commands PRE_CMD, the number j of post commands POST_CMD, the number k of cell commands C_CMD, and the number m of resume commands RSM_CMD have a relationship of:

$$i+j+k+m<1023.$$

The program chain command table information PGC_CMDTI describes PRE_CMD_Ns: the number of pre-commands PRE_CMD, POST_CMD_Ns: the number of post commands POST_CMD, C_CMD_Ns: the number of cell commands C_CMD, RSM_CMD_Ns: the number of resume commands RSM_CMD, and PGC_CMDT_EA: a program chain command table PGC_CMDT and address.

The RSM_CMD_Ns: the number of resume commands RSM_CMD (FIG. 36) is described by using numbers among '0' to '1023'.

Annotation: The TT_PGC in which an RSM permission flag is '0b' has the command area. The TT_PGC, EP_PGC, VMGM_PGC, or VTSM_PGC in which an RSM permission flag is '1b' does not have the command area. This field is set to '0'.

A resume command RSM_CMD (FIG. 36) describes a command executed before resuming a PGC. The last command of a RSM_CMD is an interruption (beak) command.

Figures 107, 108:
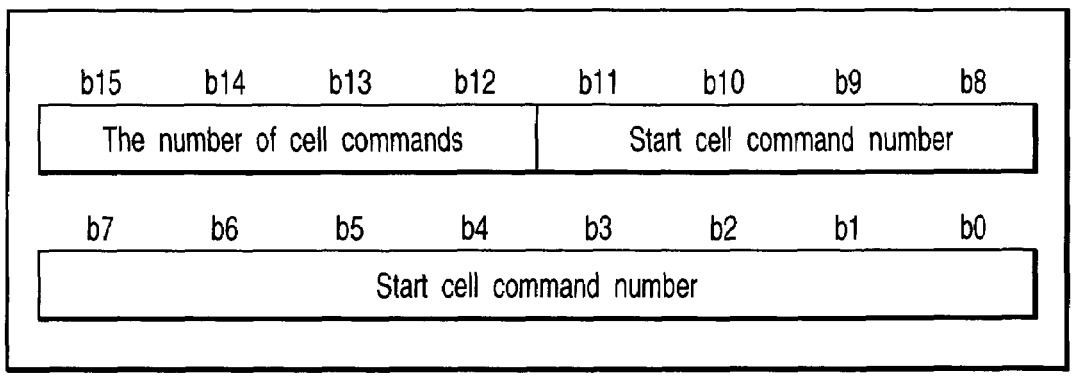
FIG. 107 is a diagram showing a modified example of cell playback information (C_PBI) shown in FIG. 38.
FIG. 108 is a diagram showing contents of a cell command sequence C_CMD_SEQ in which information on a cell command sequence shown in FIG. 107 is described.

FIG. 107 shows a modified example of the cell playback information (C_PBI) shown in FIG. 38. Here, the C_PBI includes the following:
(1) C_CAT: Cell category
(2) C_PBTM: Cell playback time
(3) C_FEVOBU_SA: Cell first EVOBU start address
(4) C_FILVU_EA: Cell first ILVU end address
(5) C_LEVOBU_SA: Cell last EVOBU start address
(6) C_LEVOBU_EA: Cell last ILVU end address
(7) C_CMD_SEQ: Cell command sequence.

FIG. 108 shows the contents of the cell command sequence C_CMD_SEQ which describes information of the cell command sequence shown in FIG. 107. The C_CMD_SEQ includes the following:

The number of cell commands (b15 to b12)

The number of cell commands executed successively from the first cell command number in the cell is described by the number from '0' to '8'. The value of '0' means that there are no commands executed in the cell.

Start cell command number (b11 to b0)

A start number of cell commands executed in the cell is described by the number from '0' to '1023'. The value of '0' means that there is no command executed in the cell.

Annotation: When a seamless playback flag in the C_CAT is '1b', and there are cell commands or one or more in the previous cell, a playback between the previous cell and this cell is made seamless. The command in the previous cell is executed within 0.5 seconds from a playback start of the cell. When the command includes a command to diverge playback, the playback of the cell is terminated, and new playback is started in accordance with a command.

FIG. 109 shows a configuration in which sub-picture information in HD and SD are selectively overlapped onto a main image in HD in accordance with a requested image output format in the information playback apparatus in accordance with the HD DVD video standard. In this case, as the input information, there are main image information in HD, graphic information in HD, Letterbox (LB) type sub-picture information in SD, and Pan-Scan (PS) type sub-picture information in SD.

The respective information are supplied to and separated in a separation unit 201. The main image information in HD separated in the separation unit 201 is decoded by a main image decoder unit 202a configuring a mixing unit 202. Further, the graphic information in HD separated in the separation unit 201 is decoded by a graphic decoder unit 202b configuring the mixing unit 202. Then, the main image information decoded by the main image decoder unit 202a and the graphic information decoded by the graphic decoder unit 202b are made to be main image information in HD by being added up in an adder 202c.

In this way, the main image information in HD output from the mixing unit 202 is added to sub-picture information in HD by an adder 203, which becomes image information in HD to be outputted. Further, the main image information in HD output from the mixing unit 202 is converted into main image information in SD by being passed through a down converter unit 204a and a color matrix converter unit 204b which configure an HD/SD converter unit 204, and the main image information in SD is added to Wide(W) type sub-picture information in SD by an adder 205, which becomes Wide(W) type image information in SD to be output.

In addition, the main image information in SD output from the HD/SD converter unit 204 is converted to be a Letterbox type by a Letterbox converter unit 206, and the Letterbox type main image information is added to Letterbox (LB) type sub-picture information in SD by an adder 207, which becomes Letterbox (LB) type image information in SD to be output.

Moreover, the main image information in SD output from the HD/SD converter unit 204 is converted to be a Pan-Scan type by a Pan-Scan converter unit 208, and the Pan-Scan type main image information is added to Pan-Scan (PS) type sub-picture information in SD by an adder 209, which becomes a Pan-Scan (PS) type image information in SD to be output.

On the other hand, respective type sub-picture information in HD and SD separated in the separation unit 201 are decoded by a sub-picture decoder 210. The respective type sub-picture information in HD and SD decoded by the sub-picture decoder 210 are selectively supplied to a color matrix adapter 212 by a change-over switch 211 controlled on the basis of sub-picture signal switching information which is output from the MPU unit 121 (refer to FIG. 48).

With respect to the color matrix adapter 212, when sub-picture information in HD is supplied, an HD sub-picture color coefficient stored in the above-described ROM unit 123 (refer to FIG. 48) is supplied, and when sub-picture information in SD is supplied, an SD sub-picture color coefficient stored in the ROM unit 123 is supplied. In this case, it is configured such that the HD sub-picture color coefficient and the SD sub-picture color coefficient stored in the ROM unit 123 are selectively supplied to the color matrix adapter unit 212 by a change-over switch 123a controlled on the basis of HD/SD sub-picture decoder switching information output from the above-described MPU unit 121.

Then, the sub-picture information in HD output from the color matrix adapter unit 212 is added to the main image information in HD outputted from the mixing unit 202 by the adder 203. Further, the Wide(W) type sub-picture information in SD outputted from the color matrix adapter unit 212 is added to the main image information in SD outputted from the HD/SD conversion unit 204 by the adder 205. Moreover, the Letterbox (LB) type sub-picture information in SD output from the color matrix adapter unit 212 is added to the main image information in SD output from the Letterbox converter unit 206 by the adder 207. Further, the Pan-Scan (PS) type sub-picture information in SD output from the color matrix adapter unit 212 is added to the main image information in SD output from the Pan-Scan converter unit 208 by the adder 209.

In accordance with a structure as described above, it is possible that sub-picture image information in HD and SD are selectively overlapped onto main image information in HD, and it is outputted in various formats.

FIG. 110 shows a flowchart in which the overlapping operations of the main image information and the sub-picture information are put in order. Namely, attribute information of sub-picture information (sub-picture stream) to be decoded is acquired (S61), and it is determined whether the sub-picture information is for HD or SD, and decoder units or decoding methods for decoding the sub-picture stream are switched (S62).

Thereafter, it is determined whether the sub-picture information is for HD or SD, and when the sub-picture information is for SD, it is determined whether it is a Wide (W) type, a Letterbox (LB) type, or a Pan-Scan type (PS), and the change-over switch 211 is switched such that the sub-picture information is mixed with main image information onto which corresponding conversion processing has been applied (S63), and the main image signal with which the sub-picture information has been mixed is output (S64).

FIG. 111 shows a flowchart in which operations that the HD sub-picture color coefficient and the SD sub-picture color coefficient are selectively read from the ROM unit 123 in accordance with a result of determination whether the sub-picture information is HD or SD, and the color coefficient is set in the color matrix adapter unit 212 are out in order. Namely, a sub-picture stream attribute (HDVTS_SP-ST_ATR) (refer to FIG. 96) which is attribute information of a sub-picture stream to be decoded (S71), and it is determined whether the attribute information.

Then, when a determined result is for HD (YES in S73), a sub-picture color pallet for HD (PGC_HDSP_PLT) (refer to FIG. 98) is selected (S74), and when a determined result is for SD (NO in S73), a sub-picture color pallet for SD (PGC_SDSP_PLT) (refer to FIG. 98) is selected (S75). Thereafter, a selected color pallet is set to the color matrix adapter unit 212 (S76).

Figure 112:
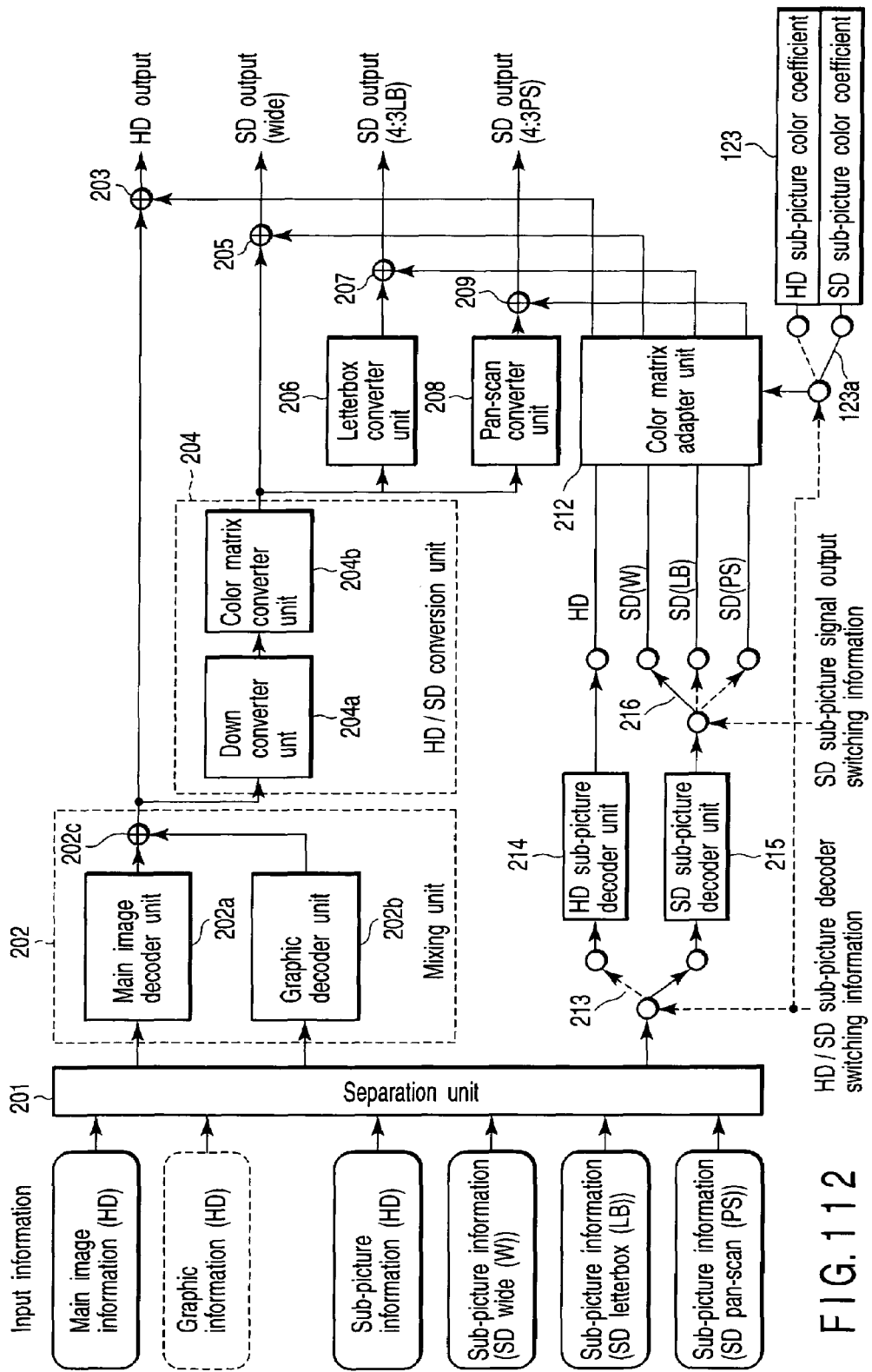
FIG. 112 is a block diagram for explaining a modified example of the information playback apparatus shown in FIG. 109.

Further, FIG. 112 shows a modified example of the information playback apparatus shown in FIG. 109. In FIG. 112, to describe such that same portions which are the same as those of FIG. 109 are denoted by the same reference numerals, the sub-picture information in HD separated at the separation unit 201 is supplied to and decoded by the HD sub-picture decoder unit 214 by the change-over switch 213 controlled on the basis of HD/SD sub-picture decoder switching information output from the above-described MPU unit 121 (refer to FIG. 48). The sub-picture information in HD decoded by the HD sub-picture decoder unit 214 is supplied to the color matrix adapter unit 212.

In addition, respective type sub-picture information in SD separated in the separation unit 201 are selectively supplied to the color matrix adapter 212 by a change-over switch 216 controlled on the basis of SD sub-picture signal output information which is outputted from the MPU unit 121.

In this way, it may be structured such that the sub-picture information in HD is decoded by the HD sub-picture decoder unit 214, and the sub-picture information in SD is decoded by the SD sub-picture decoder unit 215.

Figure 113:
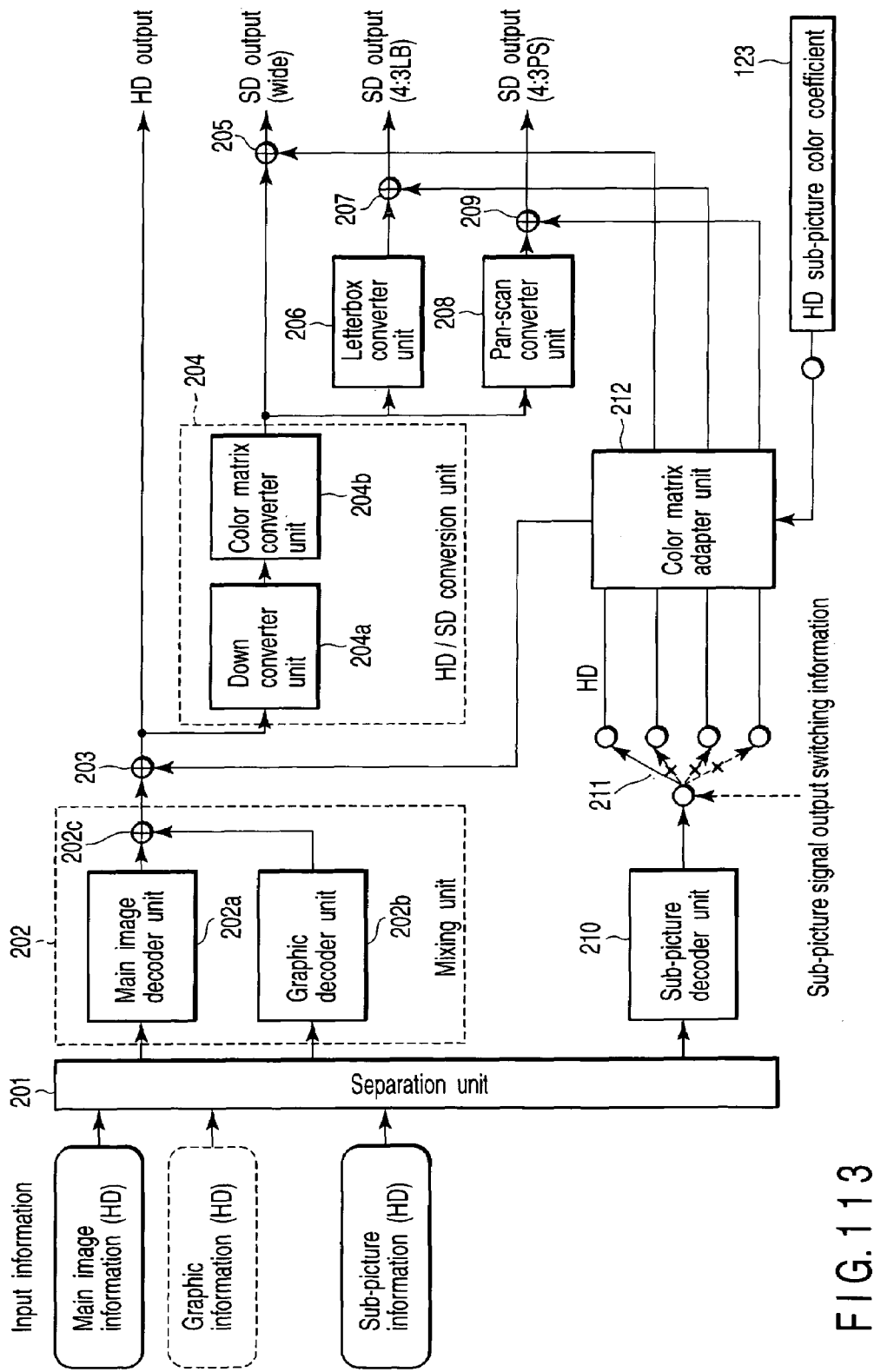
FIG. 113 is a block diagram for explaining another modified example of the information playback apparatus shown in FIG. 109.

Moreover, FIG. 113 shows another modified example of the information playback apparatus shown in FIG. 109. In FIG. 113, to describe such that same portions which are the same as those of FIG. 109 are denoted by the same reference numerals, main image information in HD, graphic information in HD, and sub-picture information in HD are objects as input information. In this case, the sub-picture decoder unit 210 decodes only the sub-picture information in HD, and the decoded sub-picture information in HD is added to the main image information in HD outputted from the mixing unit 202 by the adder 203 via the change-over switch 211 and the color matrix adapter unit 212 to which HD color coefficient is supplied.

Then the image information in HD output from the adder 203 is supplied to the HD/SD conversion unit 204 to be supplied to a Wide (W) type output, a Letterbox (LB) type output, and a Pan-Scan (PS) type output.

Note that the present invention is not limited to the embodiments described above as is, and at the stage of implementing the invention, the components can be modified to materialize within a range which does not deviate from the gist of the present invention. Further, various inventions can be embodied by appropriately combining a plurality of components disclosed in the above-described embodiments. For example, some of the components may be omitted from all of the components shown in the embodiments. Moreover, components over different embodiments may be appropriately combined.

What is claimed is:

1. An information playback apparatus configured to play back an information recording medium on which main image information having first resolution, first sub-picture information having the first resolution, second sub-picture information having second resolution which is lower than the first resolution, and attribute information including information denoting the resolution of the first and second sub-picture information have been recorded, the information playback apparatus comprising:

a first image information output unit configured to overlap the first sub-picture information onto the main image information to be output in accordance with a required image output format; and a second image information output unit configured to overlap the second sub-picture information onto information into which the main image information has been converted to have the second resolution to be output in accordance with a required image output format, wherein the first and second sub-picture information comprise a plurality of sub-picture units each having a sub-picture unit header, the sub-picture unit header includes a previous header and a subsequent header, and information distinguishing between the first sub-picture information and the second sub-picture information is recorded on the previous header.

2. An information playback apparatus according to claim 1, further comprising:

a storage unit configured to store a first color pallet corresponding to the first resolution and a second color pallet corresponding to the second resolution; and a switching unit configured to switch to reading of the first color pallet from the storage unit when the first sub-picture information is used, and to reading of the second color pallet from the storage unit when the second sub-picture information is used.

3. An information playback apparatus according to claim 1, wherein the second image information output unit can output image information in a format of one of a Wide type, a Letterbox type, and a Pan-Scan type in accordance with a required image output format.

4. An image playback method for playing back an information recording medium on which main image information having first resolution, first sub-picture information having the first resolution, second sub-picture information having second resolution which is lower than the first resolution, and attribute information including information denoting the resolution of the first and second sub-picture information have been recorded, the information playback method comprising:

overlapping the first sub-picture information onto the main image information to be outputted in accordance with a required image output format; and overlapping the second sub-picture information onto information into which the main image information has been converted to have the second resolution to be output in accordance with a required image output format, wherein the first and second sub-picture information comprise a plurality of sub-picture units each having a sub-picture unit header, the sub-picture unit header includes a previous header and a subsequent header, and information distinguishing between the first sub-picture information and the second sub-picture information is recorded on the previous header.

* * * * *